United States Patent [19]

Ishiwata

[11] Patent Number: 5,132,786
[45] Date of Patent: Jul. 21, 1992

[54] COLOR CONVERTING SYSTEM FOR IMAGE PROCESSING EQUIPMENT

[75] Inventor: Masahiro Ishiwata, Ebina, Japan

[73] Assignee: Fuji Xerox Co., Ltd., Tokyo, Japan

[21] Appl. No.: 486,059

[22] Filed: Feb. 27, 1990

[30] Foreign Application Priority Data

Feb. 27, 1989 [JP] Japan .................................. 1-47088

[51] Int. Cl.⁵ .............................................. H04N 1/46
[52] U.S. Cl. ...................................................... 358/75
[58] Field of Search ...................................... 358/75-81

[56] References Cited

U.S. PATENT DOCUMENTS 4,709,230  11/1987  Popowski et al. ................... 358/81
4,873,570  10/1989  Suzuki et al. ........................ 358/80
5,016,096   5/1991  Matsunawa et al. ................. 358/75

FOREIGN PATENT DOCUMENTS 62-46380  2/1987  Japan .

Primary Examiner—Stephen Brinich
Attorney, Agent, or Firm—Finnegan, Henderson, Farabow, Garrett and Dunner

[57] ABSTRACT

Conversion/non-conversion of input image data into replacing color data is controlled by a color converting system to produce output image data. Color detecting means detects a comparision color from the input image data by judging whether the input image data is within a preset comparison color range. Selecting means selects and outputs the input image data or the replacing color data provided by replacing color means on the basis of a judgment in the color detecting means.

22 Claims, 73 Drawing Sheets (REDUCTION)    (ENLARGEMENT)

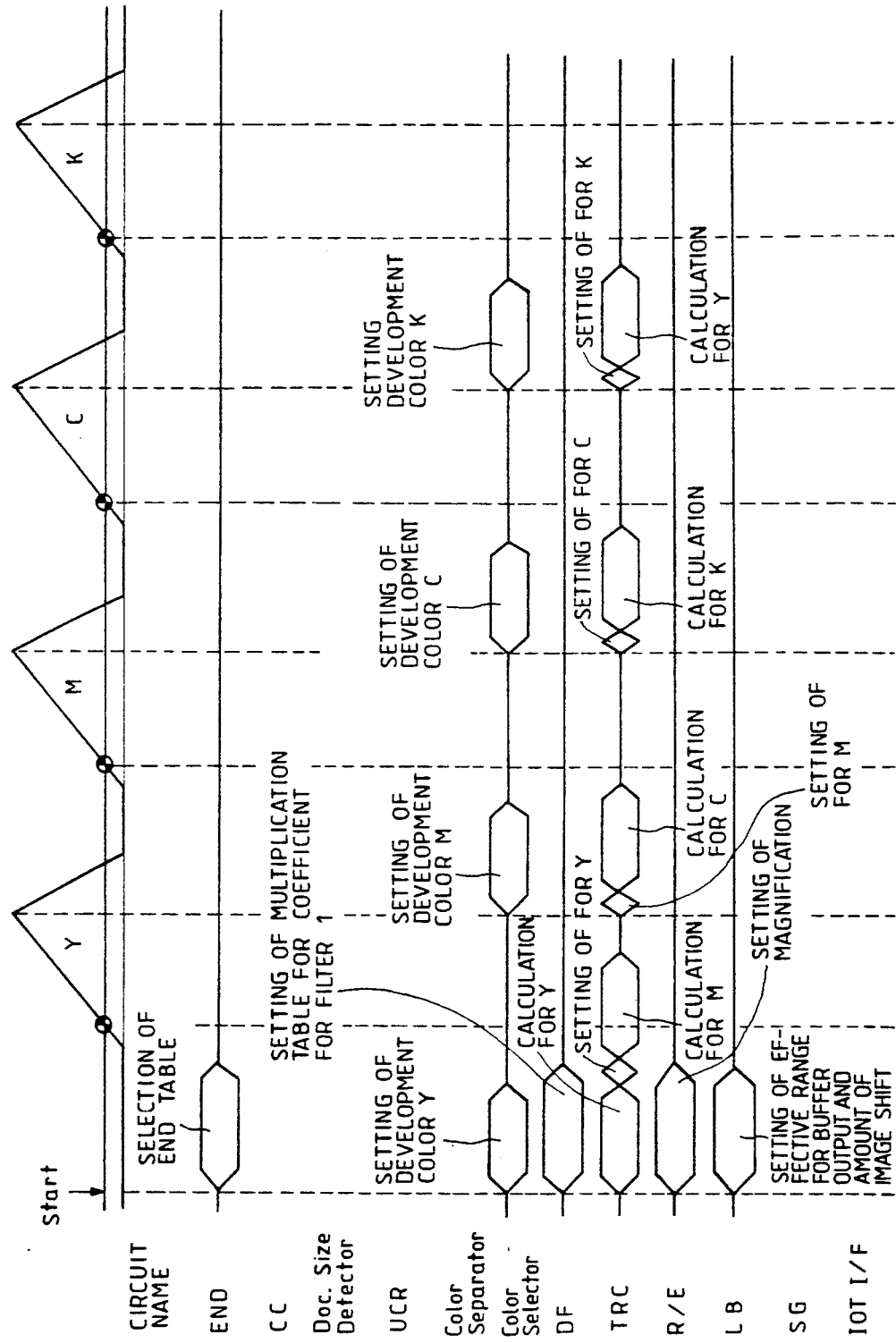

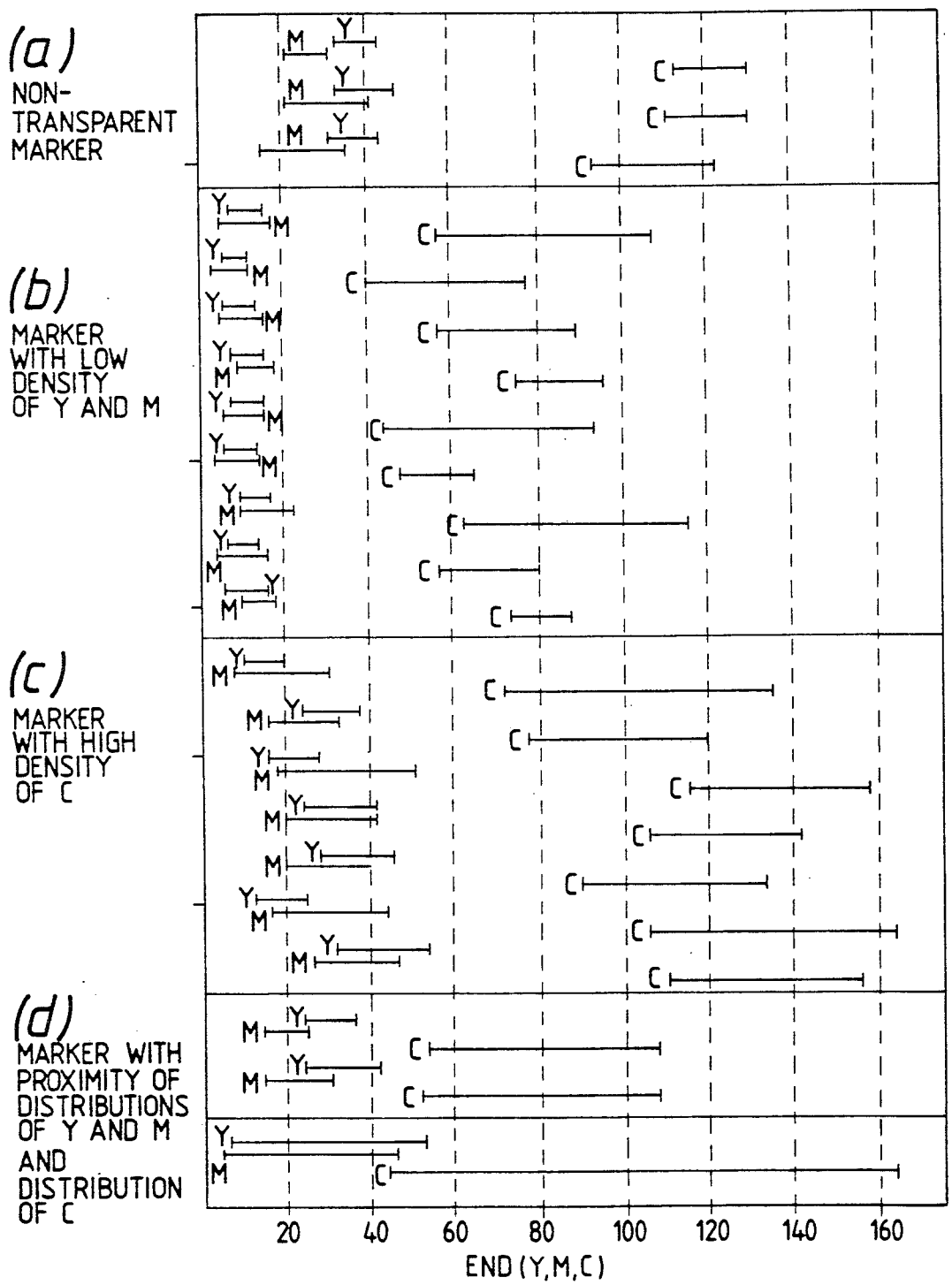

FIG. 52(a)

| PAPER | LOW DENSITY | | | MEDIUM DENSITY | | | HIGH DENSITY | | | RANGE COVERING TOTAL DISTRIBUTION | | |
|---|---|---|---|---|---|---|---|---|---|---|---|---|
| | Y | M | C | Y | M | C | Y | M | C | Y | M | C |
| PPC PAPER | 34→44 | 22→32 | 114→132 | – | – | – | – | – | – | 34→44 | 22→32 | 114→132 |
| COATING PAPER | 34→48 | 22→42 | 112→132 | – | – | – | – | – | – | 34→48 | 22→42 | 112→132 |
| ORDINARY PAPER | 32→44 | 16→36 | 94→124 | – | – | – | – | – | – | 32→44 | 16→36 | 94→124 |
| RANGE COVERING TOTAL DISTRIBUTION | 32→48 | 16→42 | 94→132 | – | – | – | – | – | – | 32→48 | 16→42 | 94→132 |

FIG. 52(b)

| PAPER | LOW DENSITY | | | MEDIUM DENSITY | | | HIGH DENSITY | | | RANGE COVERING TOTAL DISTRIBUTION | | |
|---|---|---|---|---|---|---|---|---|---|---|---|---|
| | Y | M | C | Y | M | C | Y | M | C | Y | M | C |
| PPC PAPER | 8→16 | 6→18 | 58→108 | 10→20 | 8→30 | 72→136 | 16→28 | 18→50 | 116→158 | 8→28 | 6→50 | 58→158 |
| COATING PAPER | 6→12 | 4→12 | 40→78 | 6→14 | 6→16 | 58→90 | 8→16 | 10→18 | 76→96 | 6→16 | 4→18 | 40→96 |
| ORDINARY PAPER | 24→36 | 14→24 | 54→108 | 24→38 | 16→32 | 78→120 | 24→42 | 20→42 | 106→142 | 24→42 | 14→42 | 54→142 |
| RANGE COVERING TOTAL DISTRIBUTION | 6→36 | 4→24 | 40→108 | 6→38 | 6→32 | 58→136 | 8→42 | 10→50 | 76→158 | 6→42 | 4→50 | 40→158 |

COLOR CONVERTING SYSTEM FOR IMAGE PROCESSING EQUIPMENT

BACKGROUND OF THE INVENTION

1. Field of the Invention

This Invention relates to a color converting system for detecting a specified color and converting the specified color into another specific color in an image processing equipment, such as copying machines, printers, and facsimile machines, for reproducing images recorded on an original sheet.

2. Description of the Related Art

A color image processing equipment, such as copying machines, read a color original sheet by means of a CCD line sensor to produce anaslog color decomposing signals and then, after converting the analog signals into digital signals, perform various processing operations. For example, since the color decomposing signals as read by means of the CCD line sensor are the signals obtained through detection of the light reflected from the original sheet, reproduction of the original on copying paper is performed by converting the color decomposing signals into recording signals for coloring materials (colorants), such as toners, forming a latent image on a photosensitive material by irradiating it with a laser beam modulated in accordance with the recording signals, material, and then developing, transferring, and fusing the images. In general practice, editing processes are performed in stages before the recording signals in the form of gradation signals are converted into on-off signals for the laser beam.

In the above digital image processing equipment, such as copying machines, printers, and facsimile machines, which is capable of reproducing an original sheet by processing it with digital signals, it is possible to set an area arbitrarily and to perform various types of editing processes, including color conversion, by performing operations of replacement, movement, etc. on the digital signals in such an area. In a color image processing equipment, for example, it is possible to perform color conversion by replacing the input image data with specific image data as specified for a particular area. By virtue of this feature, conversion into a monochromatic image, a black-and-white image or an image in a particular color can be performed in a specified area.

In order to perform the conversion of a particular color to be replaced (a comparison color) into a particular replacing color, it is necessary to specify both the color to be replaced and the replacing color. Japanese Patent Application Unexamined Publication No. 46380-1987 discloses a method of specification of color for such color conversion in a color printing/displaying equipment. The code data containing color specifying information sent out of a host system are temporarily stored in a source buffer memory, and the code data are then converted into bit data and stored in a bit map memory prepared for individual color types, i.e., N colors. This color printing/displaying equipment is also provided with an extracting color register which is used for specifying a color to be replaced, and a replacing color register which stores the data on the replacing color. In case it is found by comparison that the output from the bit map memory and the specified color in the extracting color register are in agreement, the equipment gives priority to and outputs, at the time of the agreement, the data in the replacing color register instead of the output from the bit map memory.

Moreover, as other examples of the editing processes, there is a process in which in case binary images such as characters and line drawings, and halftone images such as photographs and printed materials in halftone mesh are present in mixture, the resolution, grain properties and the reproducibility of chromatic gradation is improved in accordance with each image through application of an edge emphasizing process to the binary image with a change in a filter coefficient and a smoothing process to the halftone image, or by changing a threshold matrix of a screen generator. There also performed are color balance control and tone control such as contrast adjustment and density control.

However, it is extremely difficult for an operator to specify the color with accuracy. Even in the case of the specification of the primary colors, which is considered the simplest task, it frequently happens that the color area which is judged as the same color from the human perception is different from the area judged as the same color in terms of the color components. Accordingly, in an attempt of detecting a particular color and performing a color converting operation on the detected color, there sometimes occurs the problem that the color which should be detected from the human perception is not detected, so that a dispersion occurs in the color conversion process. In specific terms, the detection of the color blue, for example, is liable in some cases to a failure that the colors which appear to be blue in the visual perception are not detected as blue because the individual decomposed colors present subtle differences. On the contrary, the colors which are judged to be different in visual perception may in some cases are judged to be identical, so that those colors are detected at the same time, giving rise to the problem that the intended color conversion cannot be accomplished.

Furthermore, since the color conversion can be performed in a plurality of specified areas, it will be extremely difficult for an operator to perform the editing work while taking account of overlapping of the areas and the color conversion at the same time. Thus, it will be a subject in the color conversion performed together with the specification of areas to find out how to deal with the contention of colors in one area and the overlapping of areas.

A special case to be taken into consideration in connection with the color conversion in a specified area is the so-called marker editing process. By the term, marker, is meant a pen or the like which is used to indicate a special relation between the information on the original sheet and the color of the marker and the area by applying to the original sheet an overlay of a color in such density as permits the recognition of the characters on the original sheet. The marker editing process means the process of reading the information on the marker color and the marked area as indicated on the original sheet with a marker and utilizing such information for the editing work such as color conversion.

However, the marker editing process is affected considerably by such factors as the color distribution of the marker, the type of the marker, the degree of its deterioration, the intensity of marking, and the quality of paper. For instance, markers offered by different manufacturers are different in their color distribution, and there are varions types, such as a fluorescent ink type and a paint type. Moreover, even the same marker will produce different shades of color in visual perception depending on the quality of paper of such varieties as PPC paper, coating paper and the ordinary paper. Furthermore, the marking density will vary, depending on the density (degree of deterioration) of the marker and the number of times of repeated marking. Consequently, it is not possible to specify in a simple manner the threshold value for the recognition of the marker, and this causes the problem that the system is liable to the occurrence of editing errors due to a failure to recognize a marking and the occurrence of copying defects due to the wrong recognition of a marking.

FIG. 52 presents examples of color distribution of marking by markers of various densities on the various types of paper, i.e., PPC paper, coating paper and the ordinary paper. FIG. 52(a) shows the ranges of Y, M and C in 256 chromatic gradations marked with the marker manufactured by Company A (a non-transparent blue marker) while FIG. 52(b) shows the Y, M and C ranges in 256 chromatic gradations marked with the marker manufactured by Company B (a semi-transparent blue marker).

For example, the range for Y (low density) on the coating paper is from 34 to 48 in FIG. 52(a), but the range for Y (low density) on the same coating paper is from 6 to 12 in FIG. 52(b). Similarly, the range for C (low density) on the coating paper is from 40 to 78 in FIG. 52(b) while the range of C (high density) on the PPC paper is from 116 to 158 in the same figure, thus presenting a wide range of dispersion. Therefore, if the threshold values are to be set in such a way as to include all these values in the range of recognition, the threshold value for Y will be in the range from 0 to 54, that for M will be in the range from 0 to 50, and that for C will be in the range from 40 to 255. However, these three ranges of threshold value commonly include the range from 40 to 50, with a result that gray (highlight gray) will be recognized in this range. In other words, the part in highlight gray in halftone images on an original sheet in black and white will be recognized erroneously as the color of the marker. As a result, mistakes in the pickup and drop of the marker will take place, so that defects in the highlight part will eventually be conspicuous. That is, some image data is erroneously recognized as a marker and recognition of the marker is failed. Consequently, there occurs the problem that the highlight part in the image data is deleted as a result of the erroneous recognition of that part as a marker, or an area other than the area for editing is subjected to an editing operation. On one hand, part of the marking is output (recorded), without being deleted. The upper-limit portions of Y and M, as well as the lower-limit portion of C may be compressed in order to eliminate the erroneous recognition of this highlight gray, but then there arises another problem of the pickup error in which a marker with a thinned edge area, for example, fails to be recognized and is eventually recorded in the course of the main scanning process.

SUMMARY OF THE INVENTION

An object of this invention to detect within a prescribed range a color of an original sheet to be converted or a color of the original sheet not to be converted.

Another object of this invention is to construct a color converting system with simple circuitry.

Another object of this invention is to specify a plurality of color conversion areas in a simple manner. Still another object of this invention is to perform color conversion in the order of priority as set in case a plural number of areas are specified in overlapping for color conversion.

Still another object of this invention to specify a plural number of colors in one area.

Further of this invention is to reduce a pickup mistake and drop mistake of a marker. Another object of this invention is to attain a high degree of accuracy in recognition of markers even in case markers different in color distribution are used.

In order to accomplish these objects, this invention offers a color converting system for an image processing equipment which outputs image data with control over conversion or non-conversion of input image data into replacing color data, and the system is characterized by, as shown in FIG. 1(a), a selecting means 1 which selects and outputs either input image data or replacing color data, a color converting means 2 which feeds the replacing color data to the selecting means 1, and a color detecting means 3 which detects a comparison color from the input image data. With this construction, the system selects and outputs either the input image data or the replacing color data, judging whether or not the comparison color has been detected from the input image data, in a color conversion mode. The color detecting means 3 is characterized by detecting the comparison color within the range set with an upper-limit value and a lower-limit value or with a reference value and upper and lower ranges, and by performing the detecting process for each recording signal of a primary color.

Thus, the color conversion process into the replacing color can be performed through detection of the comparison color from the input image data with a simple construction, with the replacing color data being set in the color converting means 2 and the comparison color being set in the color detecting means 3. In this case, the comparison color is set in terms of the upper-limit value and the lower-limit value or the reference value and the upper and lower ranges and it is therefore possible to take the specified comparison color in a wide range, thereby eliminating a dispersion in color conversion.

For the specification and detection of the comparison color, the system is provided with a plural number of circuits, with which it is possible to specify and detect not only the primary colors but also intermediate colors. Moreover, the system is so constructed as to be capable of performing the color conversion process, with a plural number of comparison colors and the replacing colors being set up individually.

Furthermore, the system is provided with a color conversion mode setting means 4, and when an agreement mode of color conversion is selected by the means 4, the selecting means 1 selects the replacing color data if the comparison color is detected and selects the input image data if the comparison color is not detected. Conversely, when a disagreement mode of color conversion is selected, the selecting means 1 selects the input image data if the comparison color is detected and selects the replacing color data if the comparison color is not detected.

Therefore, by the setting of the mode of color conversion, the system is capable of readily setting or changing the procedure whether part of the comparison color or an area other than the part of the comparison color is subjected to conversion into the replacing color.

Furthermore, the system is provided with a priority processing means 5 and an area specifying means 6 which specifies an area for color conversion and generates a color conversion control signal for each area that is used for controlling the selecting means 1. Accordingly, the system is capable of setting the color conversion mode individually for a plural number of areas by setting the areas for color conversion in the area specifying means 6.

As it is evident from the above description, the system according to the present invention operates with a combination of the area specifying circuit and the color converting circuit and performs the color conversion process in accordance with the commands generated in the area specifying circuit, so that the system can freely set up a combination of the area specification and the color conversion. Also, in the detection of the comparison color, the system performs the detecting operation using the upper-limit value and the lower-limit value, and it is therefore possible for the system to detect the comparison color including slight differences in hue, thereby preventing defects in color conversion, such as a defect in which some part is left unconverted. Furthermore, by virtue of the construction so designed as to perform control of the switching of the color converting operation by performing the priority process on the basis of both the color detecting signal and the mode signal for color conversion (the signal indicating the egreement mode or disagreement mode), it is possible to simplify the circuit construction of the system. In addition, since the system selects the area with the highest priority by the operation of the priority circuit, it is possible to prevent the duplicate conversion of overlapping areas and the replacement of one area with another in the color conversion process. Since the system sets the priority other to the areas specified for color conversion, it is possible to easily predict the output even in the case of conversion of overlapping areas. Also, with higher priority given to the area specified later, it is easy to recognize the area of priority.

According to another aspect of this invention, a marker editing system for an image processing equipment is provided, as shown in FIG. 1(b), with an image reading means 11, which reads images by scanning an original sheet, an image data processing means 12 which performs processing and editing of the data so read, a recording means 13 which records the image data so processed and edited, and a controlling means 14 which controls the processing, editing, and recording operations, and the system sets editing information in an editing memory 19 of an editing section 18, by reading a marker in the process of prescanning, and edits and records image data by reading the original sheet by the main scanning operation. The image data processing means 12 is characterized by setting in a color detection and conversion section 16 judgment regions of a marker color with reference to a plural number of sets of threshold values, and performing the editing process on the basis of the marker if the detected color is judged to be the marker color in any of the judgment regions. With this construction, the system is capable of performing the detection of the marker color on the basis of the distribution of color of each marker, thus avoiding an erroneous recognition of highlight gray. Also, the judgment regions of the marker color are determined in such a manner that color distributions of various markers are sorted in accordance with types of the markers and threshold values are set for each sorted distribution, so that the threshold values are set so as to correspond to a non-transparent marker, a marker with low density, a marker with high density, and a marker close in color distribution to the three primary colors. Therefore, it is possible to set the threshold values in such a way as to exclude the range of highlight gray.

As it is evident from the above description, the system according to this invention sets the threshold values for the marker editing process for each sorted distribution in accordance with the color distributions of the markers of various types, and takes the logical sum of the comparison outputs. It is therefore possible for the system to attain a higher degree of accuracy in the recognition of the marker and also to expand the types of markers which can be recognized. Accordingly, this system is capable of preventing erroneous recognitions due to such factors as the difference in the quality of paper and the differences in the manufacturer and type of the marker used in the operation. In addition, it is possible to eliminate the defects of the marker editing process with a simple construction without performing special process for preventing such an erroneous recognition.

BRIEF DESCRIPTION OF THE DRAWINGS

The manner by which the above objects and other objects, features and advantages of the present invention are attained will be fully evident from the following detailed description when it is considered in light of the drawings, wherein:

FIGS. 22(a) and 22(b) illustrate an example of the construction of the image transfer unit;

FIGS. 41(a) through 41(g) explain the relationship between the scanning operation and the IPS setting;

FIG. 51 illustrates examples of dispersion by the characteristic features of color distribution; and FIGS. 52(a) and 52(b) illustrate two examples of the distribution of color which varies with the quality of the paper and the density of the marker.

DETAILED DESCRIPTION OF THE INVENTION

Figure 1A:
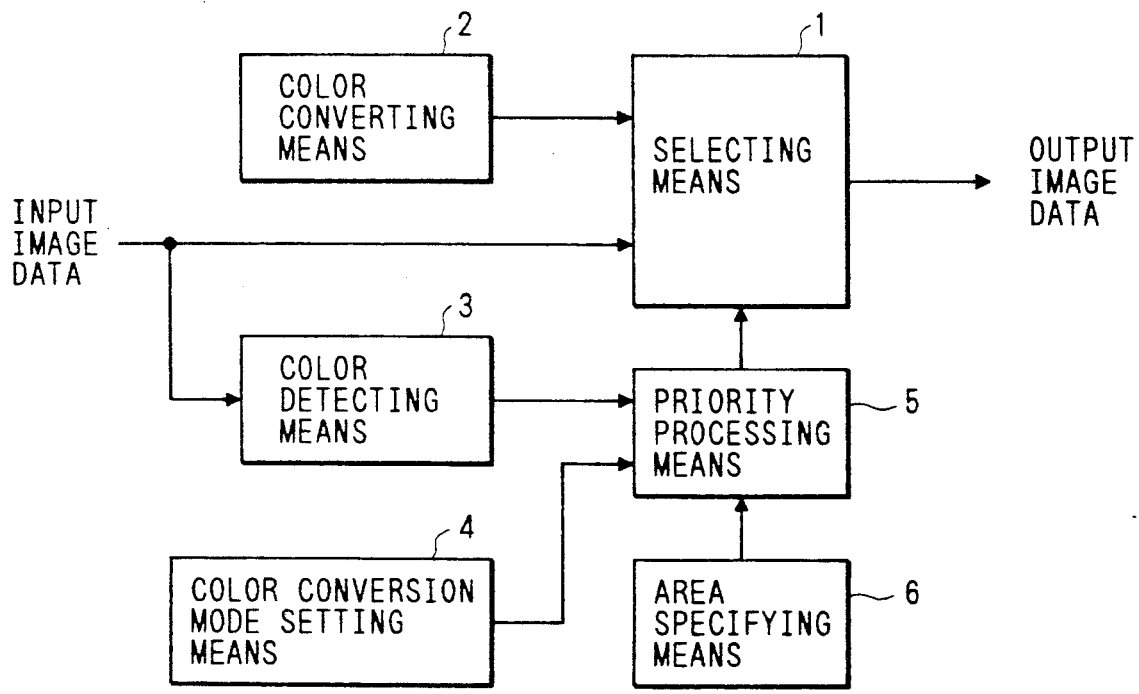
FIG. 1(a) is a chart illustrating an embodiment of a color converting system according to this invention for application to an image processing equipment.

Reference will now be made in detail to the present invention as illustrated in the accompanying drawings, in which the same reference characters and numerals designate like or corresponding parts throughout the several drawings.

In the description to follow, a color copying machine, more particularly xerographic reproduction machine, will be used as an example of the image recording equipment. It should be understood, however, that the present invention is not limited to a color copying machine, but may be applied also to other types of image forming devices, such as printers and facsimile devices.

The embodiment described in this specification is divided into the following sections and subsections. Sections I and II describe an overall system of a color copying machine incorporating the present invention. Section III describes in detail the embodiments of the present invention which are realized within the overall system of a color copying machine.

(I) INTRODUCTION
(I)-1 System Configuration
(I)-2 Functions and Features
(I)-3 Electrical Control System
 (II) SYSTEM DETAILS
(II)-1 General
(II)-2 Image Input Terminal (IIT)
(II)-3 Image Output Terminal (IOT)
(II)-4 User Interface (U/I)
(II)-5 Film image Reader
 (III) IMAGE PROCESSING SYSTEM (IPS)
(III)-1 IPS Modules
(III)-2 IPS Hardware
(III)-3 IPS Control
(III)-4 Construction of Editing Control System
(III)-5 Area Specification
(III)-6 Color Conversion

(I) INTRODUCTION (I-1) System Configuration

Figure 2:
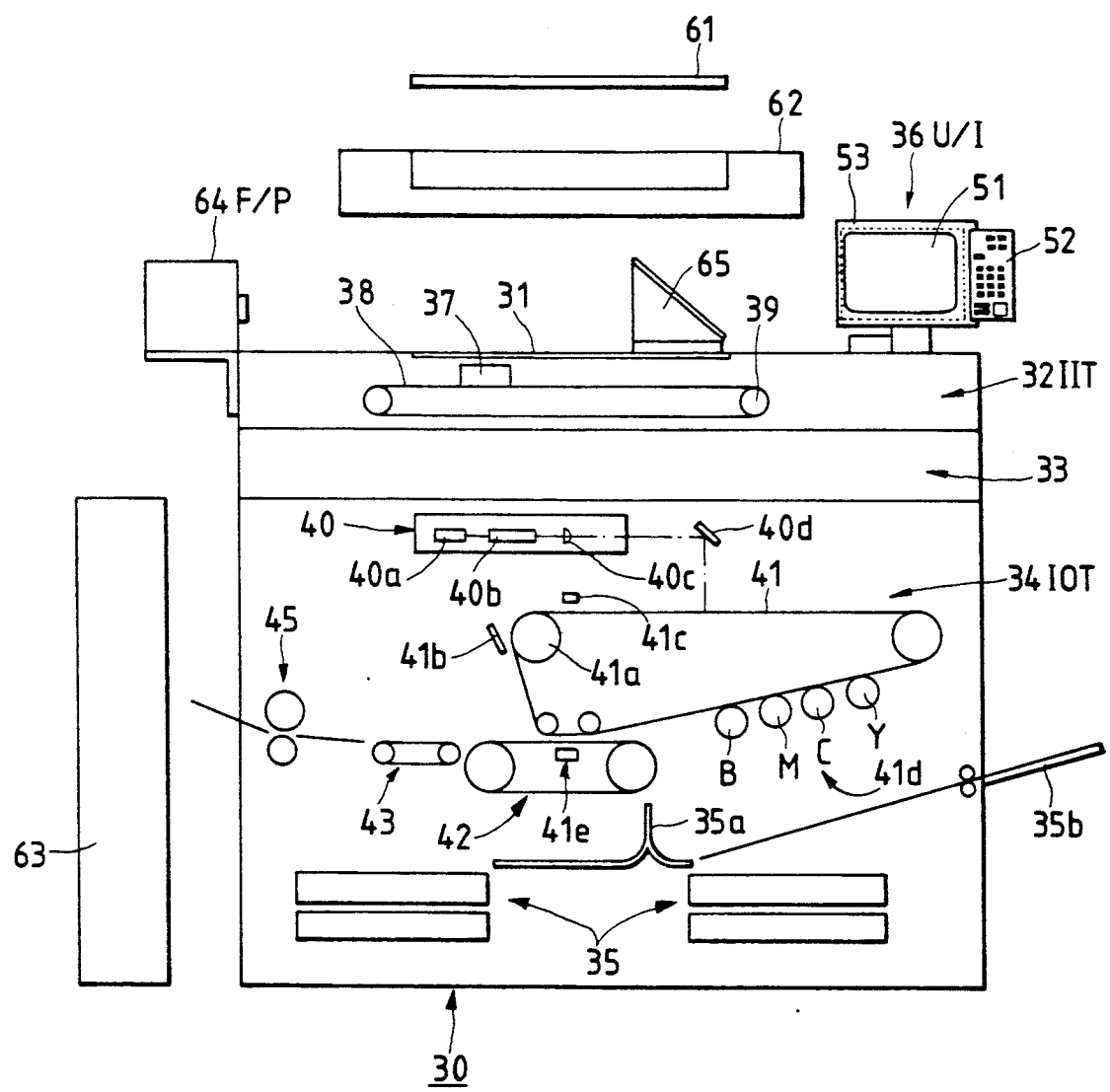
FIG. 2 is a chart illustrating the overall construction of the color copying machine to which this invention has been applied.

FIG. 2 shows one example of the overall construction of a color copying machine to which this invention is applied.

In the color copying machine incorporating the present invention, a base machine 30 contains an image input terminal (IIT) 32 which has a platen glass 31, an electric control housing 33, an image output terminal (IOT) 34, and a tray 35, and a user interface (U/I) 36. The base machine 30 optionally includes an editing pad 61, an automatic document feeder (ADF) 62, a sorter 63, and a film projector (F/P) 64.

Electrical hardware is required for controlling the IIT, IOT, U/I, etc. The electrical hardware is divided into a plurality of circuit sections with different signal/-data processing functions, such as IIT, IPS for processing the output image signals of the IIT, U/I, and F/P. These circuit sections are assembled into circuit boards, respectively. Together with a SYS board for controlling the above circuit boards, and an MCB (machine control board) for controlling the IOT, ADF, sorter, etc., these circuit boards are housed in the electrical control housing 33.

The IIT 32 is made up of an imaging unit 37, and the combination of a wire 38 and a drive pulley 39, which is for driving the imaging unit 37. The imaging unit 37 reads a color image on an original in terms of image signals of the primary colors, blue (B), green (G), and red (R), by using a CCD sensor and color filters, and converts them into digital image signals, and sends the separated color image signals to an image processing system (IPS).

In the IPS, the B, G, and R signals from the IIT 32 are converted into toner primary colors yellow (Y), cyan (C), magenta (M), and black (K). The Y, C, M, and K signals are subjected to various processings for improving the reproducibility of color, gradation, definition, and the like. Further, the gradation toner signal of each process color is converted into an on/off or two-level toner signal, and the two-level signals are transferred to the IOT 34.

In the IOT 34 containing a scanner 40 and a photosensitive belt 41, a laser output unit 40a converts the image signals from the IPS into light signals The light signals travel an optical path including a polygon mirror 40b, F/8 lens 40c, and reflecting mirror 40d, and reach the photosensitive belt 41, and forms a latent image corresponding to the original image on the surface of the belt. The photosensitive belt 41 is driven by a drive pulley 41a. A cleaner 41b, charger 41c, developing units 41d for the primary colors Y, M, C, and K, and a transfer unit 41e are disposed around the belt 41. A tow roll transfer loop 42 is disposed close to the transfer unit 41e, as shown. The tow roll transfer loop 42 picks up a sheet of paper as it is transported along a paper transfer path 35a from a tray 35, and in cooperation with the transfer unit, transfers color toners to the paper. In the case of the full color copy of the 4 pass color type, the tow roll loop is turned four times, and the color toners are transferred on the paper in the order of Y, M, C, and K. The paper bearing the transferred color toner image is transported through a vacuum transfer belt 43 to a fixing or fusing unit 45, and then is ejected outside the base machine. If necessary, a single sheet inserter (SSI) 35b may feed a sheet of paper to the paper transfer path 35a.

The U/I 36 is used by a user when selecting a desired function and sets up the conditions to exercise the function. The U/I 36 is provided with a color display 51, and a hard control panel 52 located by the display In combination with an infrared-ray touch board 53, it enables the user to directly designate necessary functions by soft buttons on the display screen.

The option units available for the base machine follows The first optional unit is an edit pad 61 as a coordinates input device, which is placed on the platen glass 31. The edit pad enables a user to variously edit images with the aid of a pen or by a memory card. Further, the ADF 62 and the sorter 63 may optionally be used.

A mirror unit (M/U) 65 may further be installed. In this instance, it is placed on the platen glass 31. In association with this, the F/P 64 is installed. A color image of a color film, for example, that is projected by the F/P 64, is read by the imaging unit 37 of the IIT 32. With the combination of the M/U 65 and F/P 64, the images of a color film can be copied directly from the color film. The object to be imaged may contain negative and positive films, and slides. Additionally, an auto focusing device and a correction-filter auto exchanging device are installed to the copying machine.

(I-2) Functions and Features (A) Functions

The color copying machine according to the present invention has various types of functions meeting user's needs, and is operable in a complete automated manner, throughout the copying process. A display unit, for example, a CRT, that is used in the user interface, visually presents selection of various functions, of the conditions to exercise the selected functions, and other necessary menus. Because of the function of the user interface, both highly skilled persons and beginners alike will find it easy to access and use the copying machine.

One of the major functions of the color copying machine consists of control panel select operations of items that are out of operation flows, such as start, stop, all clear, ten keys, interrupt, information, and languages, and selective operations of the respective functions by touching soft buttons in a basic display. Touching a pathway tab of a pathway as a function select area allows an operator to select any of various types of edit functions, such as marker edit, business edit, and creative edit. With such functions, an operator can operate the color copying machine to make both monocromatic and full color copies with the same simplicity and easiness as a conventional way.

The copying machine of the present invention has the full color or 4-color copying function, and is also operable in the 3-color or black copy mode, if necessary.

In respect to paper feed, an automatic paper size select and a paper size designation are possible.

Reduction/enlargement is possible in a broad range from 50% to 400% with every step of 1%. Additionally, separate magnifications of an image in the main and auxiliary scanning directions may be independently and automatically selected.

Optimum copy density may be automatically set for a mono color original, and when a color original is copied, an auto color balance mode may be used, in which a user may designate a subtractive color.

A memory card storing job programs is used for accessing the job programs. A maximum of eight jobs can be stored in the memory card. The memory card has a memory capacity of 32K bytes.

The copying machine has other additional functions of copy output, copy sharpness, copy contrast, copy position, film projector, page programming, and margin selection.

The copy output function is to restrain the copying machine from copying in excess of the maximam number of copying corresponding to the capacity of the sorter bin when the sorter is connected to the copying machine and an uncollated mode is selected in the copying machine.

In the copy sharpness function to effect the edge emphasis, a manual sharpness adjustment mode of seven steps and a photo sharpness adjustment mode of photo, character, print, and photo/character are optionally provided. Copy position is for selecting a position on a sheet of paper where an image is to be copied. An auto centering function to set the center of a copied image at the center of the sheet is optionally used. The default is the auto centering.

The film projector enables images of various types of films to be copied. Any of the following modes can be selected: projections of 35 mm negative and positive films, 35 mm negative film platen placement, 6 cm×6 cm slide platen placement, and 4 in×4in slide platen placement. In the film projector mode, paper of A4 size is automatically selected unless another paper size is designated. The film projector pop-up has a color balancer. When the color balancer is set to "Reddish", the projected image is tinged with red. When it is set to "bluish", the image is tinged with blue. Particular auto and manual density controls are used.

The page programming function comes in four varieties: a covering function to attach a front/back cover or a front cover to the copies; an insert function to insert a white sheet or a color sheet into a stack of copies; a color mode in which a color mode is set up for every page; and a paper size select function in which a desired paper tray, together with the color mode, is selected every page. The margin function is for setting the margin of the copy in steps of 1 mm in the range of 0 to 30 mm. The margin can be set for only one side for one original.

Marker edit edits the image within an area enclosed by a marker. This function is directed to the editing of documents and treats the documents as black and white documents. In a black mode, a designated area on the document is painted the color of the palette on the CRT, while all areas other than the designated area are painted black. In a reddish black mode, an image on the document is painted red, while the remainder is painted reddish black. The marker edit has the functions of trim, mask, color mesh, and black-to-color. The specific area may be designated by depicting a closed loop on the document, or by using the ten keyboard or the edit pad. This is also applied to the area designation in the editing functions to be given later.

The trim function allows the image within a marked area to be copied in mono color, but prevents the image outside the marked area from being copied, viz., to erase the image outside the marked area.

The mask function cause the image within a marked area to be used and allows the image outside the marked area to be reproduced in mono color.

When the color mesh mode is exercised, a designated color mesh pattern is placed on a marked area and an image is copied in mono color. The color of the color mesh may be selected from among eight (8) standard colors (predetermined colors) and eight (8) registered colors (registered by a user, and up to eight different colors can be selected from 16,700,000 colors and simultaneously be registered). A mesh pattern can be selected from among four patterns.

In the black-to-color mode, the image within the marked area can be copied with a color selected from the 8 standard colors and the 8 registered colors.

Business edit is mainly applied for business documents and quickly edits high quality originals. In this mode, the originals are treated as full color originals. The area or point designation is required for all the functions. A plurality of different functions can be simultaneously set for a single original. In a black/mono color mode, the image outside the specified area is black or mono color, while the black image within the specified area is changed to the palette color on the CRT display. In a reddish black mode, the image outside the specified area is colored in reddish black, while the image within that area is colored in red. The business edit, like the marker edit, is exercised in a variety of modes, such as trim, mask, color mesh, black-to-color, and further logotype, line, paint 1, correction, and function clear.

The logotype mode is used to insert a logotype such as a symbol mark at a specified point on an image. Two types of logotypes may be vertically or horizontally inserted. In this case, one logotype is allowed to be used for one original. The logo patterns are prepared in accordance with the client's request and stored into a ROM.

The line mode is provided to depict lines in two-dot expression vertically and horizontally with respect to the x-distance. The color of the line may be selected from the 8 standard colors and the 8 registered colors. An unlimited number of lines can be designated, and up to seven colors can be used simultaneously.

In the paint 1 mode, one point within an area defined by a closed loop is designated, and that area is entirely painted with one color selected from among the 8 standard colors and the 8 registered colors. When a plurality of loops are used, the painting is carried out for each area.

The mesh can be selected from four patterns for each area. The number of loops that can be designated is unlimited. Up to seven color mesh patterns can be used.

The correction function confirms, corrects, changes, and erases the matters concerning an area as specified, and executes these functions by using three operation modes, an area/point change mode, area/point correction, and area/point cancel mode. The area/point change mode confirms and changes the set functions for each area. The area/point correction mode changes the area size, and changes the point position in steps of 1 mm. The area/point cancel mode erases the specified area.

The creative edit is exercised by using many functions including an image composition, copy-on-copy, color composition, partial display change, multi-page enlargement, paint 1, color mesh, color change, negative/positive inversion, repeat, paint 2, density control, color balance, copy contrast, copy sharpness, color mode, trim, mask, mirror image, margin, line, shift, logotype, split scan, correction, function clear, and add function. In the creative edit mode, the original is treated as a color original. A plurality of functions can be set for one document. Different functions may be used for one area. The area may be specified in a rectangular by two-point designation and in a point by a one-point designation.

In the image composition mode, a base original is color copied through the 4-cycle color copying operation. The resultant copied paper is left on the transfer belt. Then, a trimmed original is superposed, copied through the 4-cycle copying operation, and outputted.

In the copy-on-copy mode, a first original is copied through the 4-cycle color copying operation. The resultant copied paper is left on the transfer belt. Then, a second original is superposed on the copied paper through the 4-cycle copying operation. Finally, the paper is outputted.

In the color composition mode, a first original is copied using magenta toner, and the copied paper is left on the transfer belt. A second original is superposed on the first copied paper, using cyan, and the copied paper is fixedly placed there. Finally, a third original is superposed on the second copied paper, using yellow. In a 4-color composition mode, a fourth original is superposed on the third copied paper using black.

In the partial display shift, after a color copy is obtained through the 4-cycle color copying operation, the color copied paper is left on the transfer belt. Subsequently, another copy is superposed on the first paper through the 4-cycle copying operation. Finally, the paper thus copied is outputted.

Of those color modes, the full color mode is based on the 4-cycle copying operation. The 3-pass color mode is based on the 3-cycle copying operation in other modes than the editing mode. The black mode is based on the 1-cycle copying operation in other modes than the editing mode. The plus-one mode is based on the 1- to 3-cycle copying operations.

The tool pathway mode is exercised by using many functions including an audiotron, machine setup, default selection, color registration, film type registration, color correction, preset, film projector scan area correction, audio tone, timer set, billing meter, diagnosis mode, max. adjustment, and a memory card formatting. In this pathway mode, a password is needed for making settings and changes. Accordingly, only key operators and customer engineers are permitted to make the settings/changes in this mode. Use of the diagnosis mode is permitted for customer engineers alone.

Color registration is used for registering colors in the register color button in the color palette The CCD sensor reads the color to be registered from the color original. Color correction is used for fine correction of the colors registered in the registered color button.

The film type registration is for registering a register film type used in a film projector mode. When it is not registered, a register button cannot be selected on the film projector mode display.

The preset mode is for presetting reduction/enlargement values, 7 steps of copy density, 7 steps of copy sharpness, and 7 steps of copy contrast.

Film projector scan area correction is for adjusting a scan area in the film projector mode. Audio tone is for adjusting the volume of a select sound, for example. Timer is for setting a timer releasable to key operators.

Additional functions are provided for a trouble diagnosis system. A first function is used when the subsystem is placed in a clashing state. In such a situation, this function operates and redrives the subsystem to recover it from the clashing state A second function is used when the subsystem is still in the clashing state even if the clash recovery is applied two times. In such a situation, this function operates to set up a fault mode in the subsystem. A third function operates when jamming occurs in the copying machine In this case, the third function operates to stop the machine operation.

It is evident that the color copying machine of the present invention is operable with the basic copying function and a combination of additional functions, and the combination of the basic copying function/additional functions and marker edit, business edit, creative edit, and the like.

A copying system including the color copying machine with the above functions offers advantageous and convenient features as described hereinafter.

(B) Features a. High quality full color

A high quality, clear and distinctive full color image of a color document is attained, with improvements of black image reproduction, light color reproduction, generation copy quality, OHP image quality, thin line reproduction, image quality reproduction of film copies, and copied image sustaining.

b. Cost reduction

The cost of image forming materials and expendables such as a photosensitive drum, developing unit and toner is reduced. Service cost including UMR and parts cost is reduced. The color copying machine is operable as a mono color copying machine. The copying speed for mono color copies is increased about three times that of the conventional copying machine, and is 30 copies/A4. In this respect, the running cost is reduced.

c. Improved reproducibility

Input/output devices such as an ADF and a sorter are optionally available, and hence a large number of documents can be copied. A magnification may be set in a broad range of 50% to 400%. The maximum size of document that can be copied is A3. Three stages of paper trays are used, the upper tray accommodates B5 to B4 size, the medium tray accommodates B5 to B4, and the lower tray accommodating B5 to A3 and SSIB5 to A3. The copy speed for the full color (4-pass color) copy is 4.5 CPM for A4, 4.8 CPM for B4, and 2.4 CPM for A3. The copy speed for the mono color copy is 19.2 CPM for A4, 19.2 CPM for B4, and 9.6 CPM for A3. The warmup time is within 8 minutes. FCOT is 28 seconds or less for the 4-color full color copy, and 7 seconds or less for the mono color copy. A continuous copy speed is 7.5 copies/A4 for the full color copy and 30 copies/A4 for the mono color copy.

d. Improved operability

Two types of operation buttons are used, hard buttons on the hard control panel and soft buttons on the soft panel of the CRT display screen. Use of these buttons provides an easy operation for beginners and simple operation for experts, and further enables operators to directly select desired functions. As for the layout of controls including these buttons, the controls are concentrated at one location for ease of operation. Effective use of colors correctly sends necessary information to operators.

A high fidelity copy can be obtained by using the operations on the hard control panel and the basic display. The hard button is used for the operations out of an operation flow, such as start, stop, all clear, and interrupt. The operations on the soft panel of the basic display are used for paper size select, reduction/enlargement, copy density, picture quality adjustment, color mode, color balance adjustment, and the like. The soft panel operations are easily accepted by users accustomed to mono color copying machine. To access the various edit functions, a passway is opened by merely touching a pathway tab in a pathway area on the soft panel, and an operator may readily access the edit modes. Storage of copy modes and conditions for exercising them in a memory card realizes an automation of relation manual operations.

e. Variety of functions

A variety of editing functions can be used by touching a pathway tab in the pathway area on the soft panel to open the pathway. In the marker edit, mono color documents can be edited by using a tool of a marker. In the business edit, mainly business documents can be prepared quickly and in high quality. In the creative edit, various editing functions are available In the full color, black and mono color copy modes, many choices are used to meet the needs of various expert operators, such as designers, copy service businesses, and professional key operators. The area specified when the editing functions are used is displayed in the form of bit map area, providing a visual confirmation of the specified area.

f. Power saving

A high performance, full color copying machine (4-pass color) is realized by the present invention which is operable at 1.5 kVA. A control system realizing the 1.5 kVA specification in the respective operation modes is used, and a power distribution to the circuit systems for different functions is also used. An energy transmission system table for confirming energy transmission systems is prepared. The management and verification of power consumption are carried out by using the energy transmission system table.

(C) Use Distinction

The color copy machine of the present invention is operable as a full color copying machine and a mono color copying machine. The copying machine with a variety of useful functions is used not only as a mere copying machine, but also as a machine to aid creative work. Accordingly, the copying machine satisfies the requirements of professional operators and artists as well. Some examples of the use of the color copying machine will be given.

Posters, calendars, cards or invitations cards, and New Year's cards with photographs that have been made at a printing machine, may be formed at much lower cost than by the printing machine, if the number of each of these items is not large If the editing functions are well used, original calendars, for example, may be made. Further, the calendars may be prepared for each division of a company As seen from recent marketing, the coloring of industrial products, e.g., electric appliances, and interiors greatly influences marketing success. The color copying machine of the present invention can be used for color selection at the manufacturing stage of products. Accordingly, a plurality of persons, including designers and persons relating to the manufacturing and selling of the products, can satisfactorily study and discuss the designs for producing products attractive to the market, by creating the colored design copies. In the apparel business, the present color copying machine is very useful in that the complete designs with the selected colors can be sent to the garment makers. Accordingly, the order is exactly understood and the manufacturing may be smoothly and effectively carried out.

The ability to produce both color copies and mono color copies of an original is convenient for students who are learning the chromatics in colleges and universities. When studying graphic design, they can copy the design in both the color and mono color copies, and comparatively study the design. Further, it can be seen how gray level and saturation affect the visual sensation.

(I-3) Electrical Control System

This section will discuss hardware architecture, software, and state division in an electrical control system of the color copying machine according to the present invention.

(A) Hardware Architecture and Software

A color CRT as an U/I, although it is used as the U/I in the color copying machine of the present invention, needs a larger amount of the data for color display than a monochromatic CRT. Attempt to build a more friendly UI by creating a layout of a display screen and display change also results in an increased amount of necessary data.

Use of a CPU with a large memory requires a large board. The large board creates additional problems. It is difficult to house it in the base machine. The large board makes it difficult to alter the design of the copying machine. Further, the large board increases the cost to manufacture.

Figure 3:
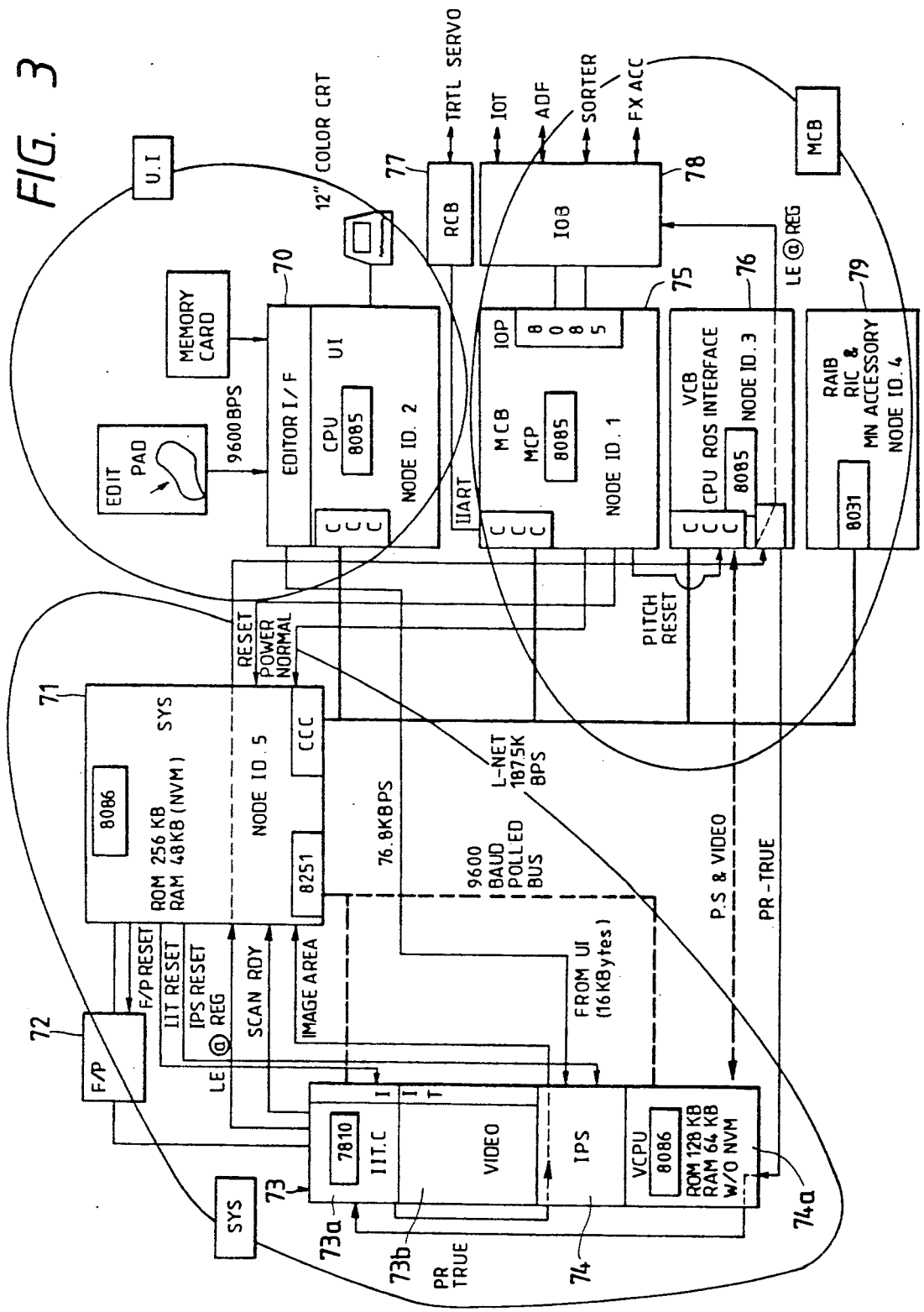
FIG. 3 illustrates the hardware architecture.

To cope with the increase of data amount, the instant color copying machine is arranged such that the data processing function (CPU) is decentralized. The hardware of the electrical system, as shown in FIG. 3, is composed of a UI system, SYS system and MCB system. The UI system contains a UI remote 70. In the SYS system, an F/P remote 72 controls the F/P, an IIT remote 73 reads an image of an original, and an IPS remote 74 for executing various image processings are contained and independently execute their own data processings. The IIT remote 73 includes an IIT controller 73a for controlling the imaging unit, and a VIDEO circuit 73b for digitizing the read image signals and sending the digitized image signals to the IPS remote 73b. The IIT remote 73 and the IPS remote 74, is controlled by a VCCPU 74a. An SYS (system) remote 71 is provided as a control unit to control the remotes as mentioned and to be given later.

The SYS remote 71 requires a large memory capacity, because a program to control the display changes of the UI, and others must be stored. The 8086 16-bit microprocessor is used for the SYS remote 71. If required, the 68000 microprocessor may be used.

The MCB system is composed of a VCB (video control board) remote 76, RCB remote 77, IOB remote 78, and an MCB (master control board) remote 75. The VCB remote 76, serving as a raster output scan (ROS) interface, receives from the IPS remote 74 a video signal to form a latent image on the photosensitive drum by a laser beam, and sends the video signal to the IOT. The RCB remote 77 is for the servo system of the transfer belt (turtle). The IOB remote 78 serves as an I/O port for the IOT, ADF, sorter, and accessory. The MCB remote 75 synthetically manages the decentralized accessory remote 79.

Each remote in the drawing of FIG. 3 is constructed with a single board. In the figure, a bold continuous line indicates a high speed communication network LNET of 187.5 kos; a bold broken line, a master slave type serial communication network of 9600 bps; and thin continuous lines, hot lines as transmission lines for control signals. A line 76.8 kbps indicates a dedicated line for transmitting graphic data depicted on the edit pad, copy mode data entered from the memory card, and graphic data in the edit area from the UI remote 70 to the IPS remote 74. CCC (communication control chip) indicates an IC for supporting a protocol of the high speed communication line LNET.

As described above, the hardware architecture is composed of the UI system, SYS system, and MCB system. The processings shared by those systems will be described with reference to software architecture of FIG. 4. Arrowheads indicate the directions of data transmission performed through the LNET high speed communication network and the master/slave type serial communication network and the directions of control signals flowing through the hot lines.

Figure 4:
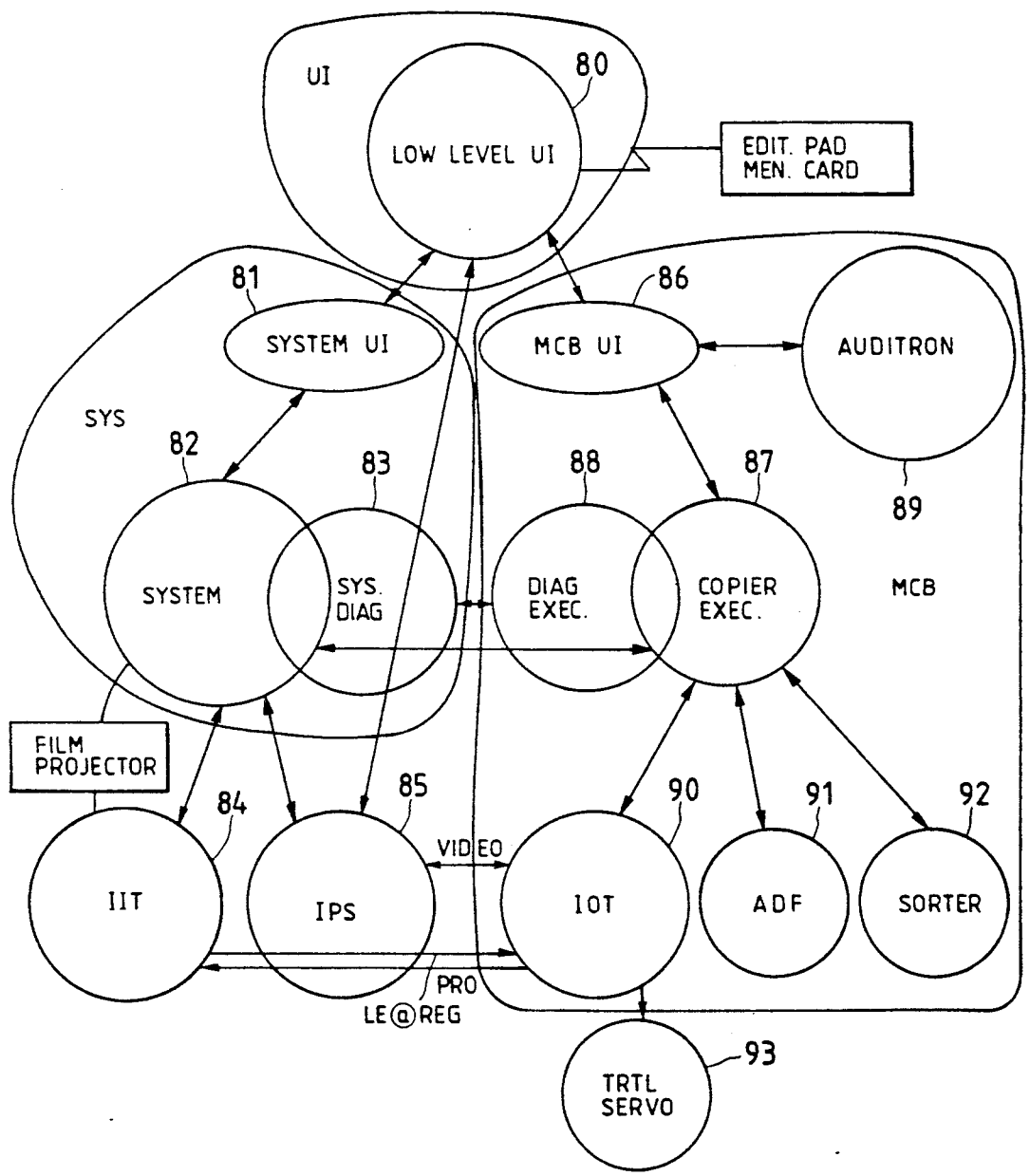
FIG. 4 illustrates the software architecture.

As seen in FIG. 4, the UI remote 70 is made up of an LLUI (low level UI) module 80 and a module for processing the data of the edit pad and the memory card. The LLUI module 80, which is similar to a called CRT controller, is a software module for displaying an image on a color CRT screen. The displaying of images on the display screen is controlled by an SYSUI module 81 and an MCBUIT module 86. This fact clearly indicates that the UI remote may be made common with another apparatus or device. The reason for this is that how to lay out the display screen and how to change the display depend on the type of the apparatus, but the CRT controller is used in combination with the CRT.

The SYS remote 71 is made up of three modules, SYSUI module 81, SYSTEM module 82, and SYS.-DIAG module 83.

The SYSUI module 81 is a software module for controlling the display change The SYSTEM module 82 contains software for recognizing what coordinates are selected on the software panel and what display presents the software panel containing the selected coordinates, viz., what job is selected, software for finally checking the job as to whether or not a contradiction exists in the copy exercising conditions, and software for controlling the transfer of various types of data, such as F/F select, job recovery, and machine state, with other modules.

The SYS.DIAG module 83 operates in a customer simulation mode in which the copying operation is performed in a diagnostic state for self-test purposes. In the customer simulation mode, the color copying machine under discussion operates as it operates in a normal copying operation mode. Accordingly, the DIAG module 83 is substantially the same as the SYS.DIAG module 82. However, it is used in a special state, or the diagnostic state. For this reason, the DIAG module is depicted separately from the SYSTEM module 82, but they partially overlap.

An IIT module 84 for controlling a stepping motor used in the imaging unit is stored in the IIT remote 73. An IPS module 85 for executing various processing is stored in the IPS remote 74. These modules are controlled by the SYSTEM module 82.

The MCB remote 75 stores software modules, such as an MCBUI module 86 as software for controlling the display change when the color copying machine or color copier is in a fault state such as by diagnostic, auditron, and jamming, an IOT module 90 for executing the processing necessary for the copying operation, such as photosensitive belt control, developing unit control, and fuser control, ADF module 91 for controlling the ADF, and SORTER module 92, and a copier executive module 87 for managing the software modules, dia. executive module 88 for executing a variety of diagnostic routines, and an auditron module 89 for processing charge calculation by accessing an electronic counter with a password.

Figure 5A:
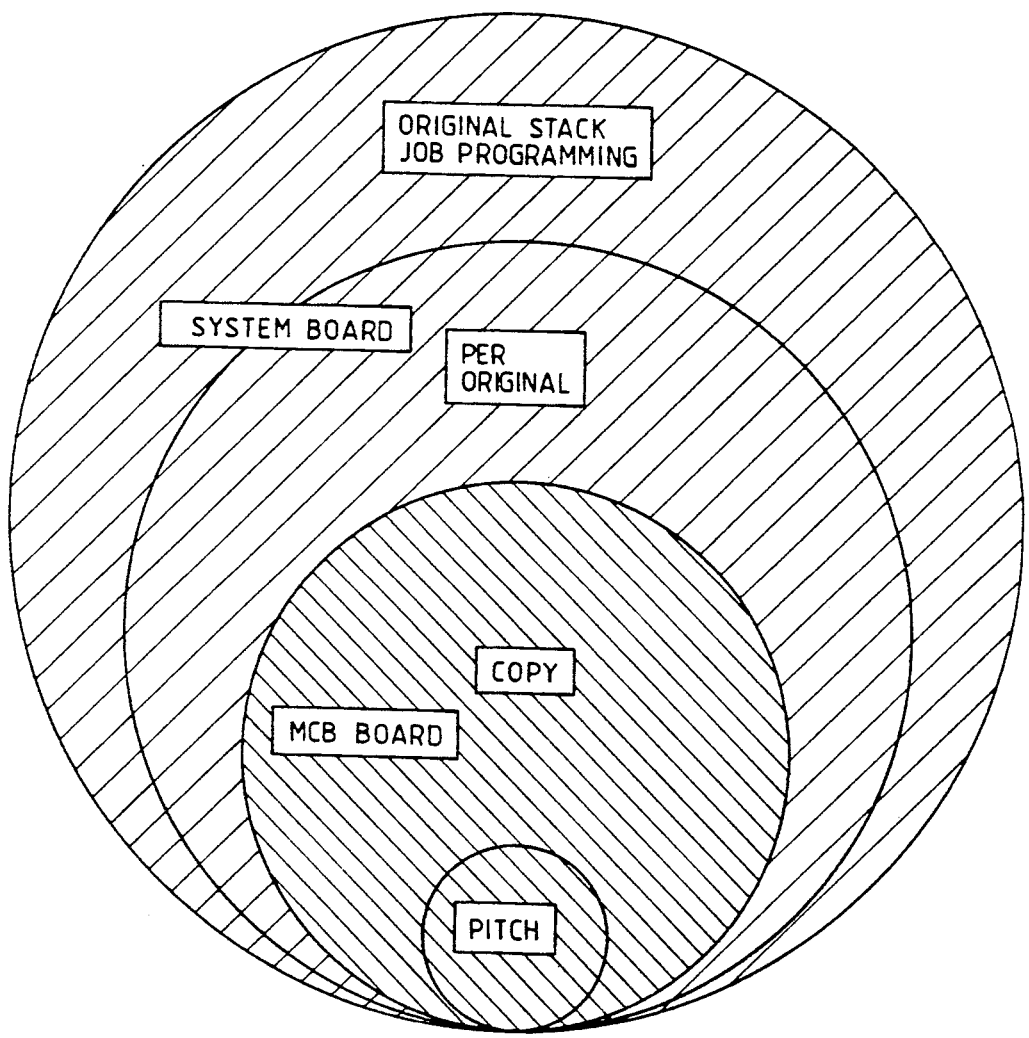
FIGS. 5 through 5(e) illustrate the copy layers.

The RCB remote 77 stores a turtle servo module 93 controlling the operation of the turtle. The module 93 is under control of the IOT module 90, in order to control the transfer process of the Xerography cycle. In FIG. 4, the copier executive module 87 and the dia. executive module 88 are depicted partially overlapping with each other to indicate shared processing. The shared processing will be described while tracing a sequence flow copying operation. The copying operation, except the difference of colors, consists of repetitive similar operations, and hence it may be divided into some layers, as shown in FIG. 5(a).

An operation unit, called pitch, is repeated to make a sheet of color copy. The operation for copying a mono color copy may consist of processings describing how to operate the developing unit, transfer unit, and the like, and how to detect jamming. The repetitive applications of a sequence of the pitch processings to three colors Y, M and C makes a three-pass color copy. When it is applied to four colors Y, M, C and K, a four-pass color copy is made. This sequence of copying operations forms a copy layer In the copy layer, the toners of three colors are transferred to the paper, the transferred color toner image is fused, and the copy paper or the paper bearing the fused color image is delivered outside the base machine. The processing up to this point is managed by the copier executive module 87.

The IIT module 84 and the IPS module 85 in the SYS system are also used for pitch processing. To this end, the IOT module 90 communicates with the IIT module 84 by using two types of signals, a PR-TRUE signal and a LE-REG signal. More specifically, a PR (pitch reset) signal providing a reference timing for the control of the IOT is recursively generated by the MCB every time the photosensitive belt rotates by $\frac{1}{2}$ or $\frac{1}{3}$ of a turn. To attain an effective use and increase a copy speed, the motion pitch of the photosensitive belt is divided in accordance with the size of paper. For example, for A3 paper it is driven at the rate of 2 pitches, and for A4 paper it is driven at the rate of 3 pitches. The period of the PR signal generated every pitch is long, 3 sec. for the 2-pitch rate, and is short, 2 sec. for the 3-pitch rate.

The PR signal generated by the MCB is distributed to the necessary portions within the IOT, such as a VB remote for handling mainly the VIDEO signal, by way of the hot lines.

The VCB, containing gate circuitry, selects only the pitch signal to allow imaging within the IOT, viz., allow the photosensitive belt to be exposed to an image light, and sends it to the IPS remote. This signal is a PR-TRUE signal. The data to generate the PR-TRUE signal on the basis of the PR signal that is received through the hot line from the MCB, is applied from the MCB through the LNET.

During the period that the image cannot be projected on the photosensitive belt, an idle pitch of 1 pitch is involved in the photosensitive belt. No PR-TRUE signal is outputted for such an idle pitch. No PR-TRUE signal is generated during the period from the instant that the transfer unit has eliminated the transferred copy paper until the next paper reaches the transfer unit. In the case of a long paper (A3 size), for example, if it is eliminated from the transfer unit immediately after the toner image is transferred onto the paper, the leading end of the paper hits the entrance of the fuser. At this time, the paper is shocked and with the shock, the transferred toner image is possibly damaged. To avoid this problem, following completion of the image transfer on large paper, the paper is rotated by one turn at a constant speed while being held by a grip bar, and is then transferred to the next stage. It is for this reason that the skip of 1 pitch is required for the photosensitive belt motion.

No PR-TRUE signal is generated also during a period from the copy start by a start key until a cycle-up sequence is completed, because during this period, the reading of an original image is not yet carried out and hence the photosensitive belt cannot be exposed to an image light.

The PR-TRUE signal outputted from the VCB remote is received by the IPS remote, and is also applied to the IIT remote. In the IIT remote, it is used as a trigger signal for scan start of the IIT.

The pitch processing in the IIT remote and the IPS remote may be synchronized with the operation of the IOT. At this time, a video signal to modulate a laser beam that is used for forming a latent image on the photosensitive drum is transferred between the IPS remote and the VCB remote 76. The video signal received by the VCB remote 76, which is a parallel signal, is converted into a serial signal. Then, the serial signal is directly applied, as a VIDEO modulation signal, to the laser output section 40a through the ROS interface.

The above sequence of pitch operations is repeated four times, to form a 4-pass color copy, and one cycle of copying operations is completed.

Figure 5B:
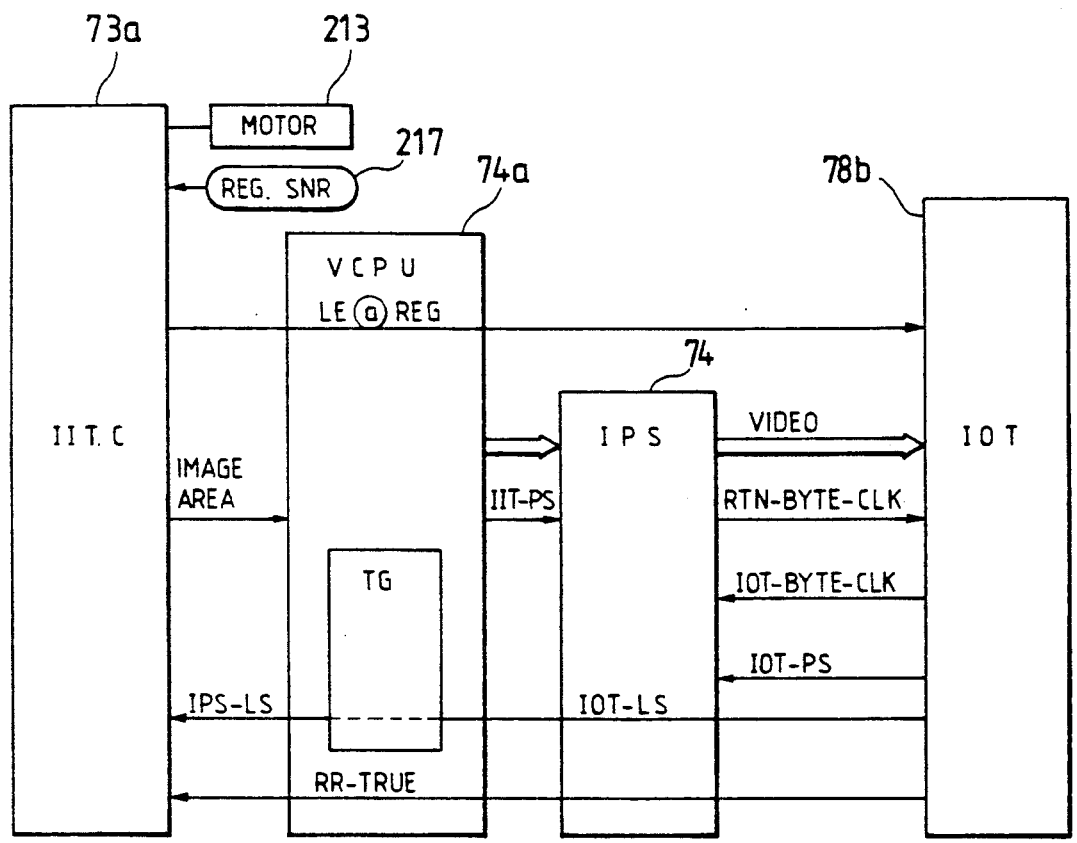

The signal transmissions and timings in a copying process between the outputting of image signals read by the IIT to the IOT and the image transfer on a sheet of paper at the transfer point will be described with reference to FIGS. 5(b) to 5(c).

When receiving a start job command from the SYS remote 71, the operation of the IOT 78b enters a cycle-up sequence, such as drive of a main motor and power on of a high voltage power supply, as shown in FIGS. 5(b) to 5(e). The IOT 78b produces a PR (pitch reset) signal, in order to form a latent image of a length corresponding to a paper length on the photosensitive belt. For example, a 3-pitch PR signal is generated for the A4 size, and a 2-pitch PR signal, for the A3 size. Upon completion of the cycle-up sequence in the IOT 78b, a PR-TRUE signal is applied to the IIT controller 73a in synchronism with the PR signal, in connection with only the pitch requiring the imaging.

From the IOT 78b, an IOT-LS (line sink) signal outputted every one-line rotation of the ROS (raster output scan) is sent to a timing generator (TG) in the VCPU74a. An IPS-LS, whose phase is advanced by a delay corresponding to a total of pipe lines of the IPS with respect to the IOT-LS signal, is transferred to the IIT controller 73a.

When receiving the PR-TRUE signal, the IIT controller 73a enables a counter, and counts the IOT-LS signal by the counter. When a count by the counter reaches a predetermined value, a stepping motor 213 for driving the imaging unit 37 is started up, and the imaging unit starts to scan an original. The counter further continues its counting, and after T2 sec., an LE-REG signal is outputted at the start position of reading the original, and is sent to the IOT 78b.

In respect to the read start position, a position of a reginsor 217 (near the reg. position, more exactly located at a position separated by about 10 mm from the reg. position toward the scan side) is detected, and a true reg. position is calculated using the detected position of the reginsor 217. At the same time, a normal stop position (home position) can also be calculated.

The reg. positions of the copying machines differ from one another due to a mechanical dispersion. To cope with this, the corrected values are stored in an NVM (nonvolatile memory). When the true reg. position and the home position are calculated, the stored values are used for their correction to obtain a correct original start position. The corrected value may be altered by electrically reprogramming at the factory or by a serviceman. The reason why the position of the reginsor 217 is separated by about 10 mm from the true reg. position toward the scan side is adjustment and the software A minus value can be always used for the correction.

The IIT controller 73a outputs an IMAGE-AREA signal in synchronism with the signal LE-REG. A length of the IMAGE AREA signal is equal to the scan length that is defined by a start command transferred from the SYSTEM module 82 to the IIT module 84. More specifically, when a document size is detected for the copying operation, the scan length is equal to the document length. When a magnification is designated for the copying operation, the scan length is determined by a divisor of a copy paper length and a magnification (100% is set at 1). The IMAGE-AREA signal is applied to the VCPU 74a. The VCPU 74a outputs it as an IIT-PS (page sink) for transmission to the IPS 74. The IIT-PS signal indicates time to execute an image processing.

When the LE-REG signal is outputted, data of one line of the line sensor is read in synchronism with the IOT-LS signal. The data as read is transferred to the VIDEO circuit (FIG. 3) where it is subjected to various correction processings and A/D conversion. The output data signal of the VIDEO circuit is then transferred to the IPS 74. The IPS 74 transfers the video data of one line to the IOT 78b in synchronism with the IOT-LS signal. At this time, a signal RTN-BYTE-CLK, together with the data, is returned to the IOT, and the data and clock are also delayed to secure a reliable synchronism.

When the signal LE-REG is inputted to the IOT78b, the video data is transferred to the ROS in synchronism with the IOT-LS signal, so that a latent image is formed on the photosensitive belt. When receiving the signal LE-REG, the IOT 78b starts to count by the signal IOT-CLK with reference to the timing of the signal LE-REG. The servo motor of the transfer unit is controlled so that the leading edge of a paper is positioned at the transfer point defined by a predetermined count. As seen from FIG. 5(d), the PR-TRUE signal generated by the rotation of the photosensitive belt is not inherently synchronized with the IOT-LS signal outputted by the rotation of the ROS. Therefore, when the signal PR-TRUE is received, the count starts at the next IOT-LS, the imaging unit 37 is driven at a count "m," and the signal LE-REG is outputted at a count "n", the signal LE-REG is delayed by time T1 behind the signal PR-REG. A maximum of this delay is one line sink. In the case of the full color copy, the delay is accumulated and the accumulation results in a color displacement.

Figure 5C:
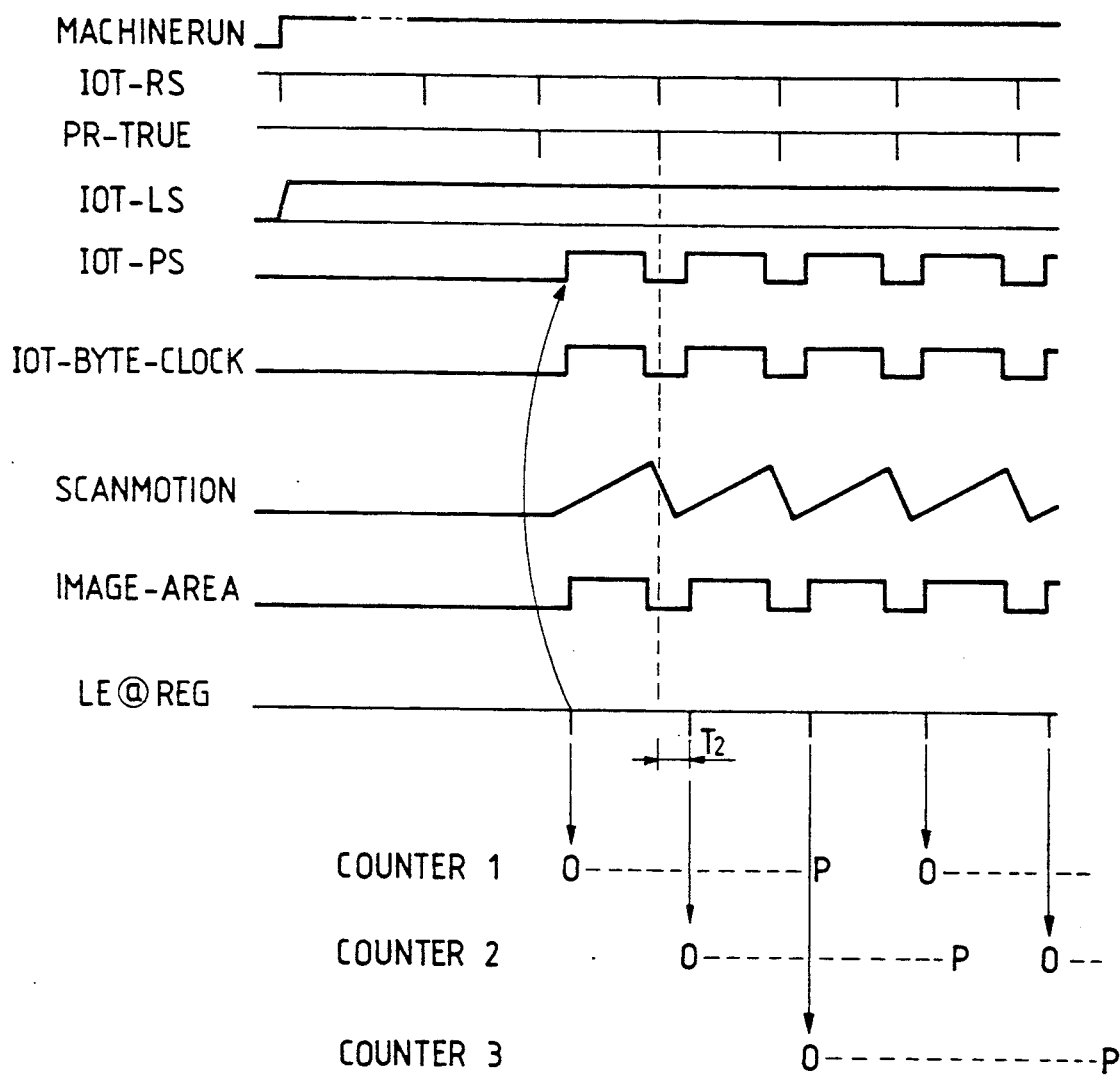
Figure 5D:
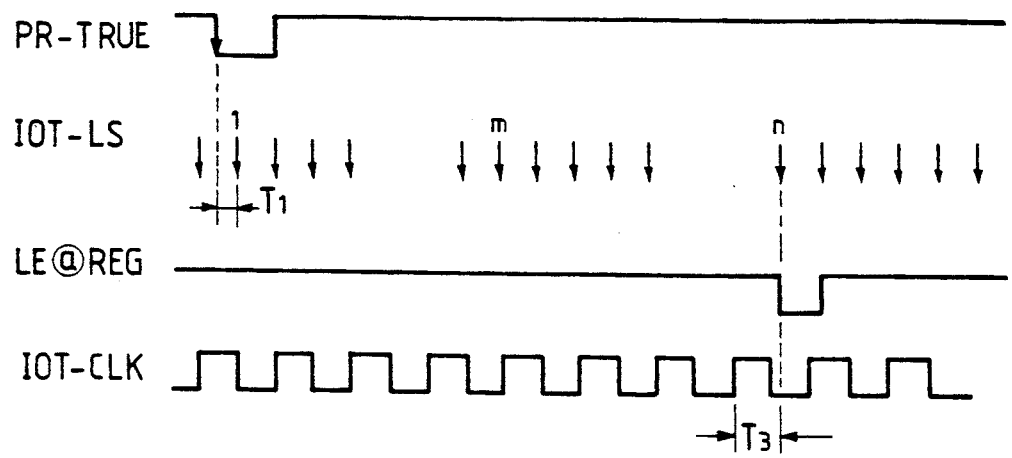
Figure 5E:
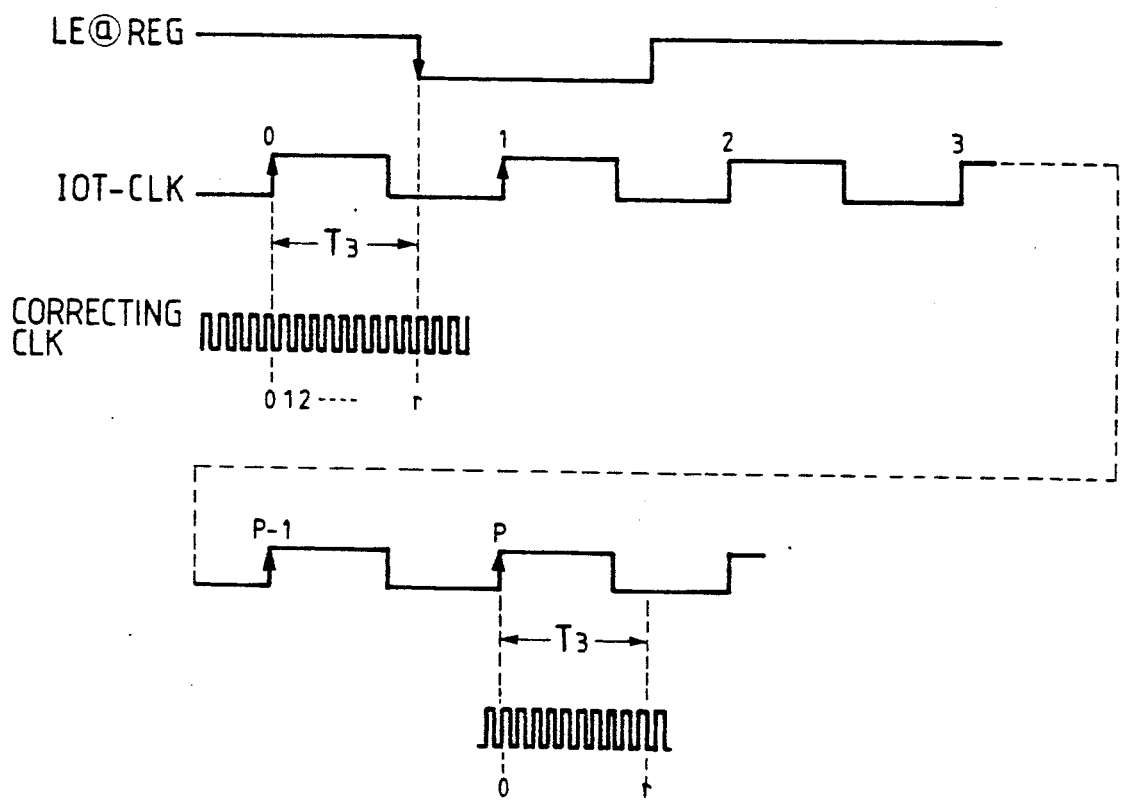

As a measure for the above, as shown in FIG. 5(c), when the first signal LE-REG occurs, the counter 1 starts to count, and when the second and third signals LE-REG occur, the counters 2 and 3 start to count. When the counters reach the count p" corresponding to the transfer point, the counters are cleared. For the fourth count and the subsequent ones, the counters start to count in a similar way. As shown in FIG. 5(e), when the signal LE-REG occurs, time T3 lasting from the pulse of the IOT-CLK immediately before the signal LE-REG is counted in accordance with a correction clock. A latent image formed on the photosensitive drum approaches to the transfer point and a count by the counter based on the signal IOT-CLK reaches the count "p". At the instant that the count "p" is reached, the counting based on the correction clock starts The sum of the correction clock and a count "r" corresponding to the time T3 indicates a correct transfer point. This is introduced into the control of the counter that is exclusively used for controlling a transfer point (timing) of the transfer unit. In this way, the servo motor of the transfer unit is controlled so that the leading end of the paper is exactly synchronized with the signal LE-REG.

Following the processings described above that are categorized into the copy layer, another processing step to set the number of jobs as copy units executed for an original, viz., to set the number of copies, is executed. This is executed per original (see FIG. 5(a)). An additional layer following the per original is a job programming layer to change parameters in jobs. More exactly, the job programming layer checks as to whether or not the ADF is used, a color of a part of an original is changed, and the one-side magnification function is operated. These layers of the per original and the job programming are managed by the SYS module 83 in the SYS system Accordingly, the SYSTEM module 82 checks and confirms the jobs transferred from the LLUI module 80, generates necessary data, and informs the IIT module 84 and the IPS module 85 of the job through the 9600 bps serial communication network, and also informs the MCB system through the LNET.

As seen from the foregoing description, the controls that can be independently processed and can be made common with another apparatus or device are decentralized into the UI system, SYS system, and the MCB system. The modules for managing the copying machine are determined in accordance with the layers of the copying processes. This approach brings about many advantageous features. The design work of the electrical control system the copying machine may be classified and itemized. The developing techniques, such as software, can be standardized. The time limit of delivery and the cost to manufacture can be exactly predicted. When some specifications are changed, it is only needed to replace the related modules with other new ones.

(B) State Division

In the previous subsection, the shared controls of the UI system, SYS system and MCB system were described. In this subsection, the controls by these systems control in the respective stages of the machine operation will be described by tracing a flow of the machine operation.

Figure 6:
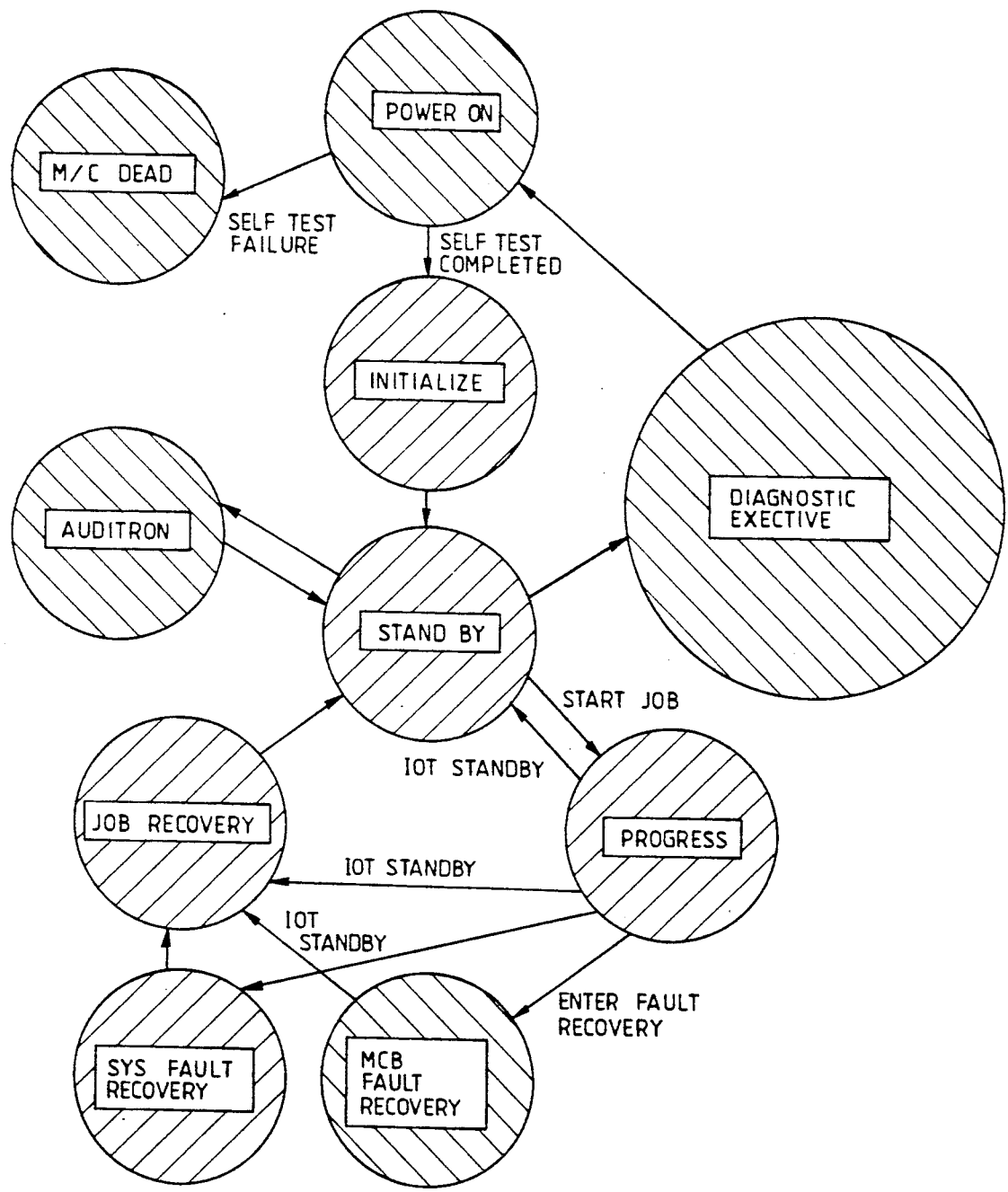
FIG. 6 illustrates the division of states.

In the present color copying machine, a flow of machine operations including power-on, copying, end of copying, and machine state copying operation, are divided into a plurality of states. These states are assigned jobs, respectively. Control cannot proceed to the next state until the job in a state is completed. This ensures efficient and precise control progression. The above manner to control the machine operation is called a state division. In this instance, the machine operation is divided into states, as shown in FIG. 6.

The state division is featured in that in some operation modes, the SYS remote 71 possesses a control right to control all of the states and a UI master right to use the UI in a state, and in some control modes, the MCB remote possesses them. With the decentralization of control, the LLUI module 80 of the UI remote 70 is controlled not only by the SYSUI module but also by the MCBUI module 86 The processings are shared such that the pitch and copy processings are under control of the copier executive module 87 in the MCB system, and the per original processings and the job programming processings are controlled by the SYS module 82. Accordingly, in some states the SYS module 82 has the control right and the UI master right in some states, and in some states the copier executive module 87 has them. In FIG. 6, in states indicated by circles filled with vertical thin lines, the UI . master right is possessed by the copier executive module 87 in the MCB system. In states indicated by circles painted black the UI master right is possessed by the SYS module 82.

Figure 7:
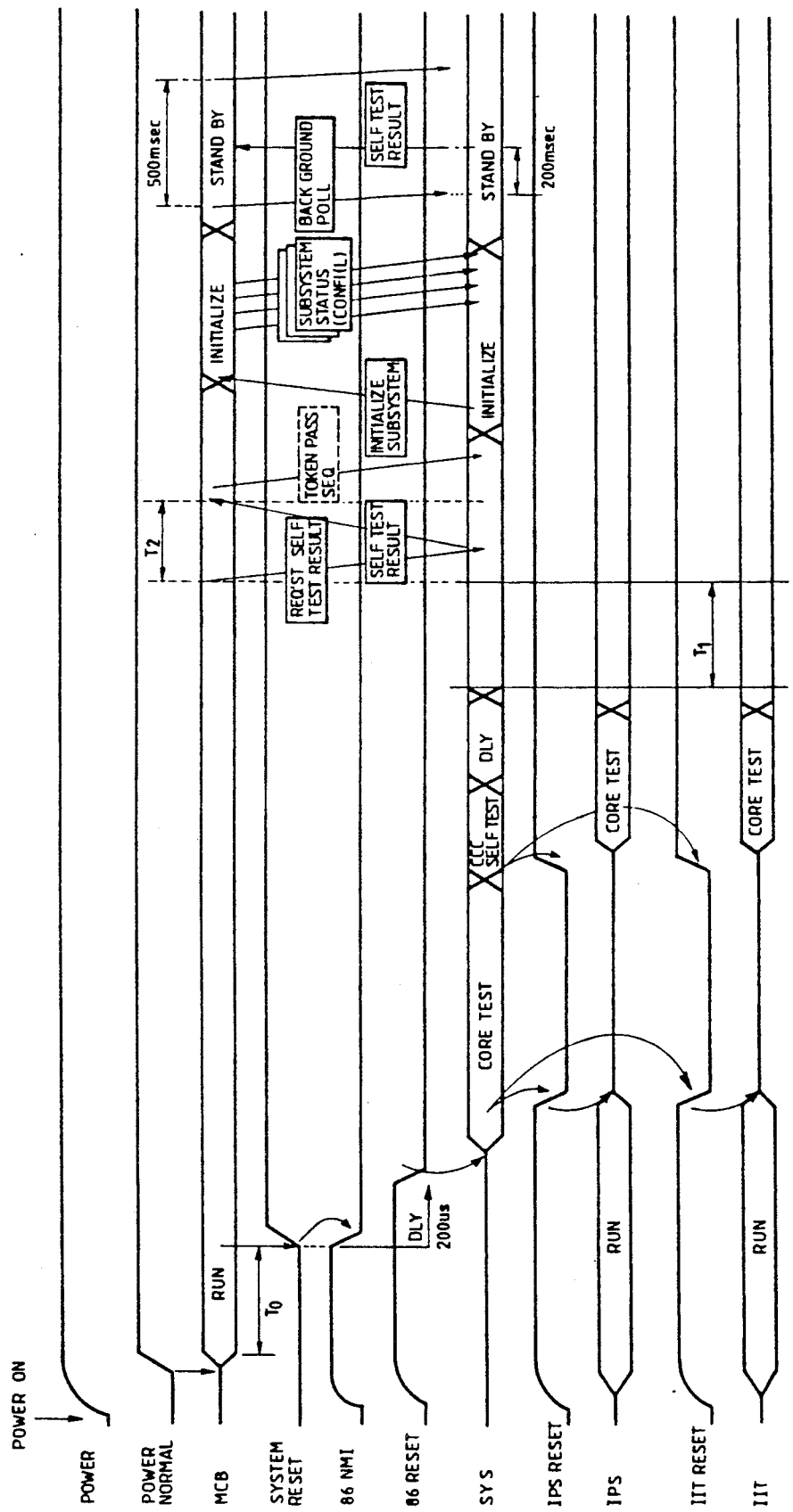
FIG. 7 illustrates the sequence from the power-on state to the stand-by state.

Of the states shown in FIG. 6, the machine operation from the power-on state to the standby state will be described with reference to FIG. 7. A power switch is turned on, and the machine is in a power-on state. An IPS reset signal and an IIT reset signal that are supplied from the SYS remote 71 to the IIT remote 74 and the IPS remote 74 (FIG. 3) become H (high) in logic state. Upon receipt of these signals, the IPS remote 74 and the IIT remote 73 are released from the reset status and start to operate. The settle-down of the power voltage is detected and a power normal signal rises. The MCB remote 75 starts to operate and to establish the control right and the UI master right. At the same time, it tests the high speed communication network LNET. The power normal signal is transferred from the MCB remote 75 to the SYS remote 71, by way of the hot line.

When time T0 elapses from the operation start of the MCB remote 75, a system reset signal supplied from the MCB remote 75 through the hot line to the SYS remote 71 goes high. Then, the SYS remote 71 is released from the reset status and starts to operate. The operation start of the SYS remote 71 is delayed by time T0 plus 200 usec by two signals, 86 NMI and 86 reset, that are internal signals of the SYS remote 71. The time period of 200 usec is provided for storing the present state of the copying machine into a nonvolatile memory when the copying machine stops or runs away due to clash, i.e., temporary trouble, power interrupt, software runaway, and software bug.

When the SYS remote 71 starts to operate, a core test is conducted for a period of approximately 3.8 sec. The test checks the contents of the ROM and RAM, and the hardware. At this time, if undesired data is mistakenly entered, the machine will possibly run away. To avoid this, the SYS remote 71, on its decision, renders low (L) the IPS reset signal and the II'P reset signal, at the time of the start of the core test. By the L signals, the IPS remote 74 and the IIT remote 73 are reset and come to a standstill.

Upon completion of the core test, the SYS remote 71 conducts a CCC self test during a period of 10 to 3100 msec, and at the same time renders high the IPS reset signal and the IIT reset signal to cause the IPS remote 74 and the IIT remote 73 to operate again, and to cause them to conduct the core tests. In the CCC self test, the SYS remote 71 sends predetermined data to the LNET, receives the return data, and checks as to whether or not the transmitted data is coincident with the received data. The times of the self tests of the CCCs are staggered to prevent the different self tests from being conducted concurrently.

The LNET employs a contention system. In this system, the nodes such as the SYS remote 71 and the MCB remote 75 transmit data when they desire. If different data collide, the same data is retransmitted after predetermined time lapses. The reason why the contention system is used is that when the SYS remote 71 is conducting the CCC self test, if another node uses the LNET, data collision occurs and the CCC self test cannot occur. Accordingly, before the SYS remote 71 starts the CCC self test, the LNET test by the MCB remote is completed.

When the CCC self test ends, the SYS remote waits till the core tests by the IPS remote 74 and the IIT remote 73 are completed. It conducts a communication test of the SYSTEM node during a period T1. This communication test is for testing the serial communication network of 9600 bps. In the test, predetermined data is transferred in a predetermined sequence. Upon completion of the communication test, during a period T2 the LNET communication test is conducted between the SYS remote 71 and the MCB remote 75. In the communication test, the MCB remote 75 requests the SYS remote 71 to return the results of the self test. In response to the request, the SYS remote 71 returns the results of the tests thus far conducted, as self test results, to the MCB remote 75.

When receiving the self test result, the MCB remote 75 issues a token pass toward the SYS remote 71. The token pass is used to transfer the UI master right. For example, when the token pass is transferred to the SYS remote 71, the UI master right is transferred from the MSB remote 75 to the SYS remote 71. The operations up to this point belong to a power-on sequence. In this sequence, the UI remote 70 displays a message of "Please wait a minute," for example, and executes various tests, such as a core test of the remote 70 itself and communication test.

In the self test sequence, when the return of the self test result is requested, but no return is made, or the returned self test result contains an error, the MCB remote 75 makes the copying machine inoperable, exercises the UI control right to control the UI remote 70, and visually presents a fault state of the machine.

An initialize state to set up the respective remotes follows the power-on state. In the initialize state, the SYS remote 71 possesses the control right to control all of the states and the UI master right. The SYS remote 71 initializes the SYS system, and issues a command INITIALIZE SUBSYSTEM to the MCB remote 75 and initializes the MCB system. The result of the initialization is returned as subsystem status from the MCB remote 75. Through the initializing state, in the IOT, the fuse is heated, and the elevator of the tray is set at a predetermined position. The operations up to this point constitute the initialize state.

Upon completion of the initialize state, the respective remotes enter a stand-by state in which the they are ready for a copying operation. In this state, the SYS remote 71 possesses the UI master right. Accordingly, it exercises the UI master right to display the F/F on the UI display screen, and is ready for accepting the conditions for executing the copying operations. At this time, the MOCB remote 75 monitors the IOT. In the stand-by state, to check for a fault in the copier, the MCB remote 75 issues a background poll to the SYS remote 71 every 500 msec. In response to this, the SYS remote 71 returns the self test result to the MCB remote 75 within 200 msec. When no return of the self test result is made, or the returned self test result contains an error, the MCB remote 75 informs the UI remote 70 of occurrence of a fault state, and causes it to display a fault state of the machine.

When the auditron is used in the stand-by state, the copier enters an auditron state. In this state, the MCB remote 75 exercises the auditron control, and at the same time controls the UI remote 70 to cause it to present an auditron display. When the F/F is set up and the start key is operated in the stand-by state, the copier enters a progress state. The progress state is further divided into six substates: set-up, cycle-up, skip pitch, normal cycledown, and cycledown shutdown. These substates will be described with reference to FIG. 8.

Figure 8:
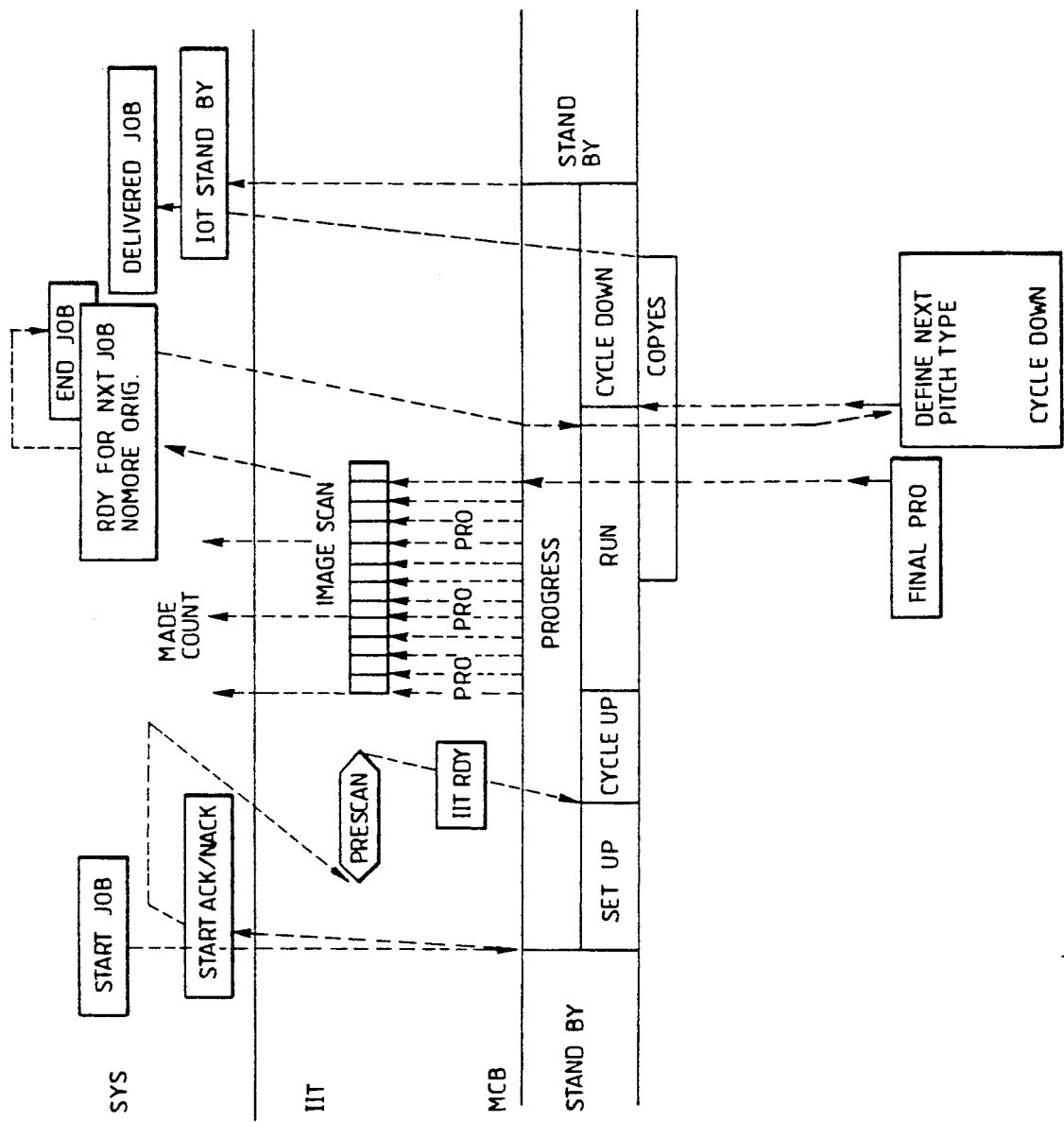
FIG. 8 illustrates the sequence of the progress state.

A timing chart illustrated in FIG. 8 was plotted under conditions that the copier is set in a platen mode, full color mode, and the number of copies is set at three.

When detecting the depression of the start key, the SYS remote 71 sends the contents of a job to the IIT remote 73 and the IPS remote 74, through the serial communication network. The SYS remote 71 also issues a command "start job," and sends the job contents and the start job command to the copier executive module 87 in the MCB remote 75. As a result, the copier enters the setup substate, and the respective remotes prepare for executing the designated job. In the IOT module 90, a main motor is driven, and parameters for the photosensitive belt are set to correct values. The SYS remote 71 confirms that an ACK (acknowledge) signal as a response of the MCB remote 75 to the start job reaches, and causes the IIT remote 73 to prescan. In this instance, four types of prescans are used; a prescan to detect the size of an original, a prescan to detect a color in a specified portion on the document, a prescan to detect a closed loop for an outline drawing for coloring, and a prescan for reading a marker in the marker edit mode. A maximum of three prescans is repeated in accordance with the selected F/F. At this time, the UI displays a message "Please wait a minute," for example.

When the prescan operation ends, a command "IIT ready" is issued to the copier executive module 87. From this point, the copier; or the copying machine, enters the cycle-up substate. In the cycle-up state, the copier waits for the respective remote to start up and settle down. The MCB remote 75 starts up the IOT and the transfer unit. The SYS remote initializes the IPS remote 74. At this time, the UI displays the progress state being exercised and the contents of the selected job.

Upon completion of the cycle-up substate, the run substate is executed and the copying operation starts. When the first PR0 signed is produced from the IOT module 90 of the MCB remote 75, the IIT performs a first time scan, and the IOT performs the development of a first color. Here, the processing of one pitch is completed. Then, when the second PR0 signed is produced, the processing of the second pitch is completed. The above processing sequence is repeated four times to complete the processing of 4 pitches. Then, the IOT fuses the toner image and delivers the paper with the fused image outside the base machine. At this point, the first copy is completed. The above processing sequence is repeated to produce three copies as is preset.

The processing of the pitch layer and the copy layer are under control of the MCB remote 75. The setting of the number of copies in the per original as the upper layer of the above two layers is carried out by the SYS remote 71. Accordingly, in order that the SYS remote 71 can recognize what number of copies is currently made, when the first PR0 signed for each copy is produced, the MCB remote 75 produces copies made count signal for transfer to the SYS remote 71. When the final PR0 signed is produced, the MCB remote 75 requests the SYS remote 71 to send the next job by issuing a command "RDY FOR NXT JOB" to the SYS remote 71. At this time, if the start job is issued, the job can be continued. When a user does not set the next job, the job ends. In this case, the SYS remote 71 issues a command "END JOB" to the MCB remote 75. When the MCB remote 75 receives the "END JOB" and confirms that the job ends, the copier enters the normal cycledown substate. In this state, the MCB remote 75 stops the operation of the IOT.

During the course of cycle down, when the copy papers have been delivered out of the base machine and the MCB remote 75 confirms the delivery of the copy papers, the remote 75 informs the SYS remote 71 by issuing a command "DELIVERED JOB". Also, when the normal cycle down ends and the machine comes to a stop, the MCB remote 75 informs the SYS remote 71 by issuing a command "IOT STAND BY." At this point, the progress state ends and control returns to the standby state.

The substates of the skip pitch and the cycledown shutdown that have not yet been described will be referred to below. In the skip pitch, the SYS remote 71 initializes the SYS system for the next job, and the MCB remote 75 is ready for the next copy. In the cycle down shutdown state that is used when a fault occurs, the SYS remote 71 and the MCB remote 75 both execute fault processing.

As seen from the foregoing description, in the progress state, the MCB remote 75 controls the pitch processing and copy processing, and the SYS remote 71 controls the per original and the job programming. Accordingly, the control right is possessed by the MCB remote 75 or the SYS remote 71 in accordance with the shared processing that is currently performed. The UI master right, however, is exclusively possessed by the SYS remote 71. The reason for this is that the UI must display the number of copies as is set and the selected edit processings. These jobs belong to the per original layer and the job programming layer, and hence under control of the SYS remote 71.

When a fault occurs in the progress state, control goes to a fault recovery state. The word "fault" means an abnormal state of the copier including no paper, jamming, abnormal and damaged parts, and the like. The fault comes in two categories, a first fault that a user can remove by resetting the F/F, and a second fault that requires some action by a serviceman, such as parts replacement. As described above, basically, the fault display function is shared by the MCBUI module 86, but the F/F is controlled by the SYS module 82. The machine recovery from the first fault that can be cured by the resetting of the F/F is shared by the SYS module 82. The machine recovery work from other faults is shared by the copier executive module 87.

The SYS system and the MCB system are used for detecting faults. Faults occurring in the IIT, IPS, and F/P are detected by the SYS remote 71, because these are controlled by the remote 71. Faults occurring in the IOT, ADF, and sorter are detected by the MCB remote 75, because these are controlled by the remote 75. Accordingly, the faults possibly occurring in the copying machine may be categorized into four types of faults to be given below.

a. Fault Detected and Cured by SYS Node

This type of fault occurs when the start key is depressed before the F/P is set. The fault state of the machine can be removed by resetting the F/P.

b. Fault Detected by SYS node, but Cured by SYS node

This type of fault includes trouble of the reginsor, abnormal speed of the imaging unit, overrun of the imaging unit, abnormal PR0 signal, abnormal CCC, trouble in the serial communication network, check error of the ROM or RAM, and the like. When any of 1, the above fault states occurs, the UI displays the contents of the fault and a message "Call a serviceman."

c. Fault Detected by MCB Node and Cured by SYS Node

When the sorter is actually set, if the F/F sets the sorter, the MCB node detects a fault. Such a fault state in the copying machine can be removed by resetting the F/F by a user. The same thing is true for the ADF. A fault is detected when an inadequate amount of toner is left, no tray is set, and no paper is present. These faults can be removed by merely supplying toner and setting a tray. When papers are used up in a tray, selection of another tray can cause recovery from the machine from the fault state. When toner of a certain color is used up, designation of toner of another color can cause a recovery from the fault machine. Thus, since the F/F selection can cause the recovery from the fault state, the recovery work is shared by the SYS node.

d. Fault Detected and Cured by MCB node

When the developing unit is abnormal, the toner supply is abnormal, the motor clutch is abnormal, or the fuser is abnormal, the MCB node detects such a fault and the UI displays a fault location and a message "Call a servicemen." When jamming occurs, the UI displays the jam location and the way to clear jamming. In this way, the machine recovery work is put into the hands of users.

As described above, in the fault recovery state, the control right and the UI master right are possessed by the SYS node or the MOCB node depending on the fault location and the recovery method used.

After fault recovery, when the MCB node issues an IOT stand-by command, control goes to the job recovery state and executes the remaining jobs. If the number of copies is set at 3, for example, and a jam occurs during the copying operation of the second copy, after the jam is cleared, the remaining two copies must be made. Accordingly, the SYS node and the MCB node execute their processes, to recover the job. Also, in the job recovery state, the control right is possessed by the SYS node or the MCB node depending on their sharing of process functions, but the UI master right is possessed by the SYS node. The reason for this is as follows. To exercise the job recovery state, a display for job recovery must be made, such as "Push a start key" and "Set the remaining document." Such display processing belongs to the per original layer or the job programming layer that are under control of the SYS node.

Also, when an IOT stand-by command is issued in the progress state, the job recovery state is exercised. When the job execution end is confirmed, control goes to the stand-by state, and waits for the next job. In the stand-by state, control is allowed to proceed to the diagnostic (referred simply to as a diag.) state by a predetermined key operation.

Figure 9:
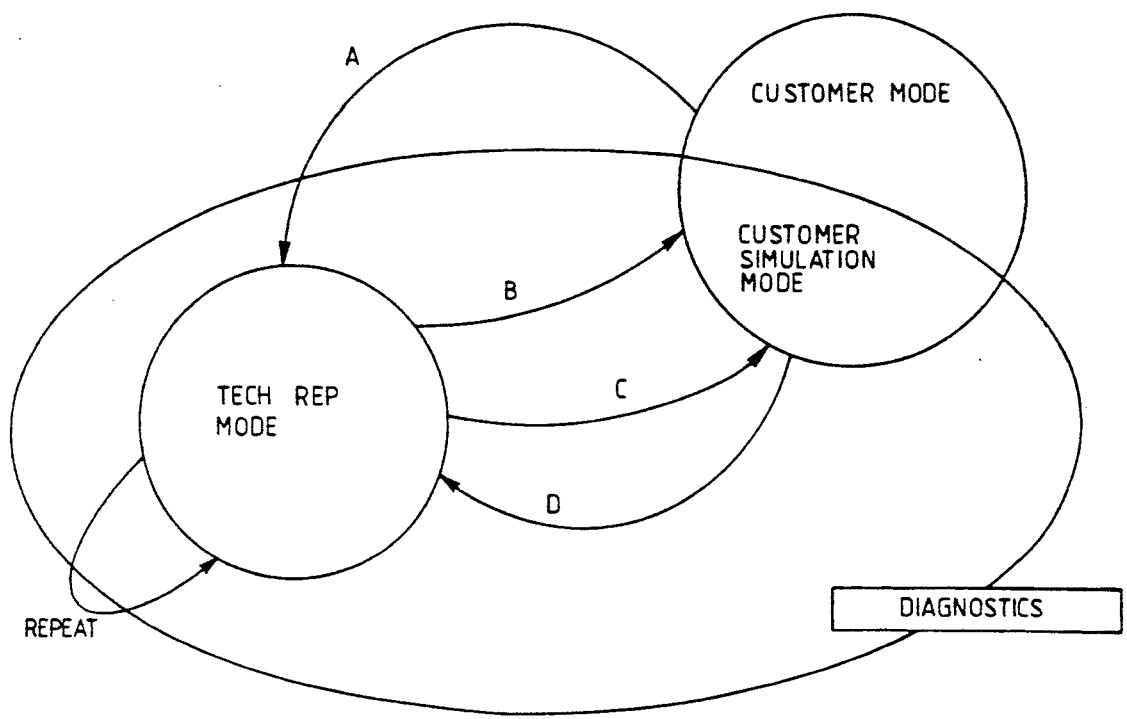
FIG. 9 explains the concept of the diagnostics.

The diag. state consists of self test processing such as for input/output check of parts, setting of various parameters, setting of various modes, and initializing the NVM (nonvolatile memory). The schematic illustration of the diag. state is given in FIG. 9. As seen from the figure, two modes are used, a TECH REP mode and a customer simulation.

The TECH REP mode is used for the machine diagnosis by a serviceman, such as input and output checks. The customer simulation node simulate copying operations by customers in the diag. state. If control proceeds from the stand-by state of the customer mode to the TECH REP mode by way of a route A, various checks and parameter settings in the TECH REP mode are made and control returns to the customer mode (by way of a route B), a mere operation of a predetermined key allows control to go to the power-on state (FIG. 6) and to return to the stand-by state through the sequence of FIG. 7. Because the copying machine of the present invention makes color copies and is provided with various edit functions, after various parameters are set in the TECH REP mode, checks must be made to determine whether or not desired colors are produced and whether the edit functions are normal or not by actually making copies. It is the customer simulation mode that executes the above checks. The customer simulation mode is different from the customer mode in that no billing is made and the UI displays the diag. state being exercised.

The shift of control from the TECH REP mode to the customer simulation mode (via a route C) and the reverse shift of control from the customer simulation mode to the TECH REP mode (via a route D) may be made by pregiven operations. The TECH REP mode progresses under control of the diag. executive module 88 (FIG. 4). In this case, the MCB node has both the control right and the MCB master right. In the customer simulation mode, the actual copying operation is performed under control of the diag. module 83 (FIG. 4). In this case, the SYS node has both the control right and the US master right.

(II) SYSTEM DETAILS (II-1) System Configuration

Figure 10:
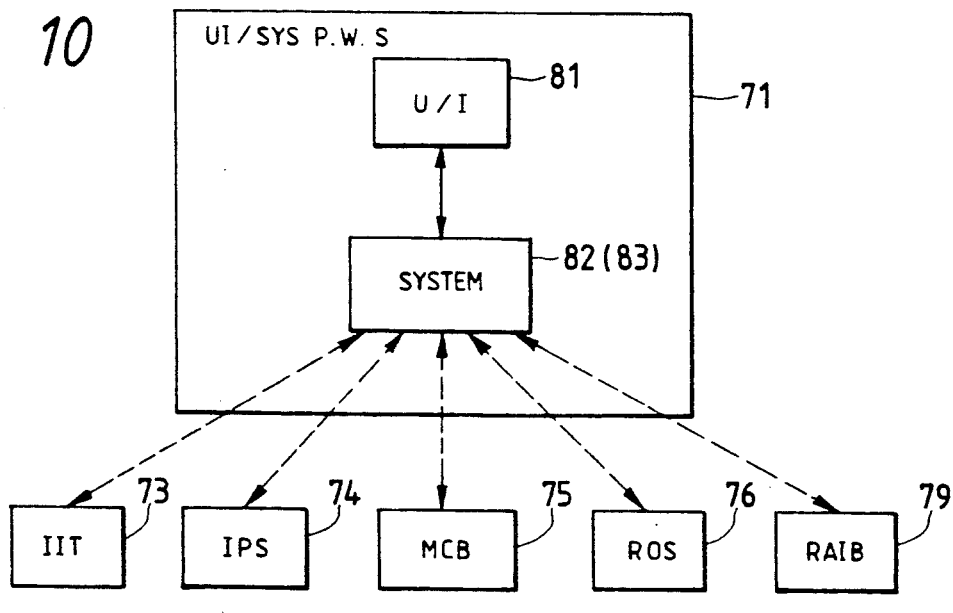
FIG. 10 illustrates the relationship between the system and the other remote units.

FIG. 10 shows relationships between the system and other remotes. As described, the SYS remote 71 uses the SYSUI module 81 and the SYSTEM module 82. Data is transferred between these modules 81 and 82 through a module interface. A serial communication interface intervenes between the SYSTEM module 82, and the IIT 73 and IPS 74. An LNET communication network couples the SYSTEM module 82 with the MCB 75, ROS 76 and RAIB 79.

Figure 11:
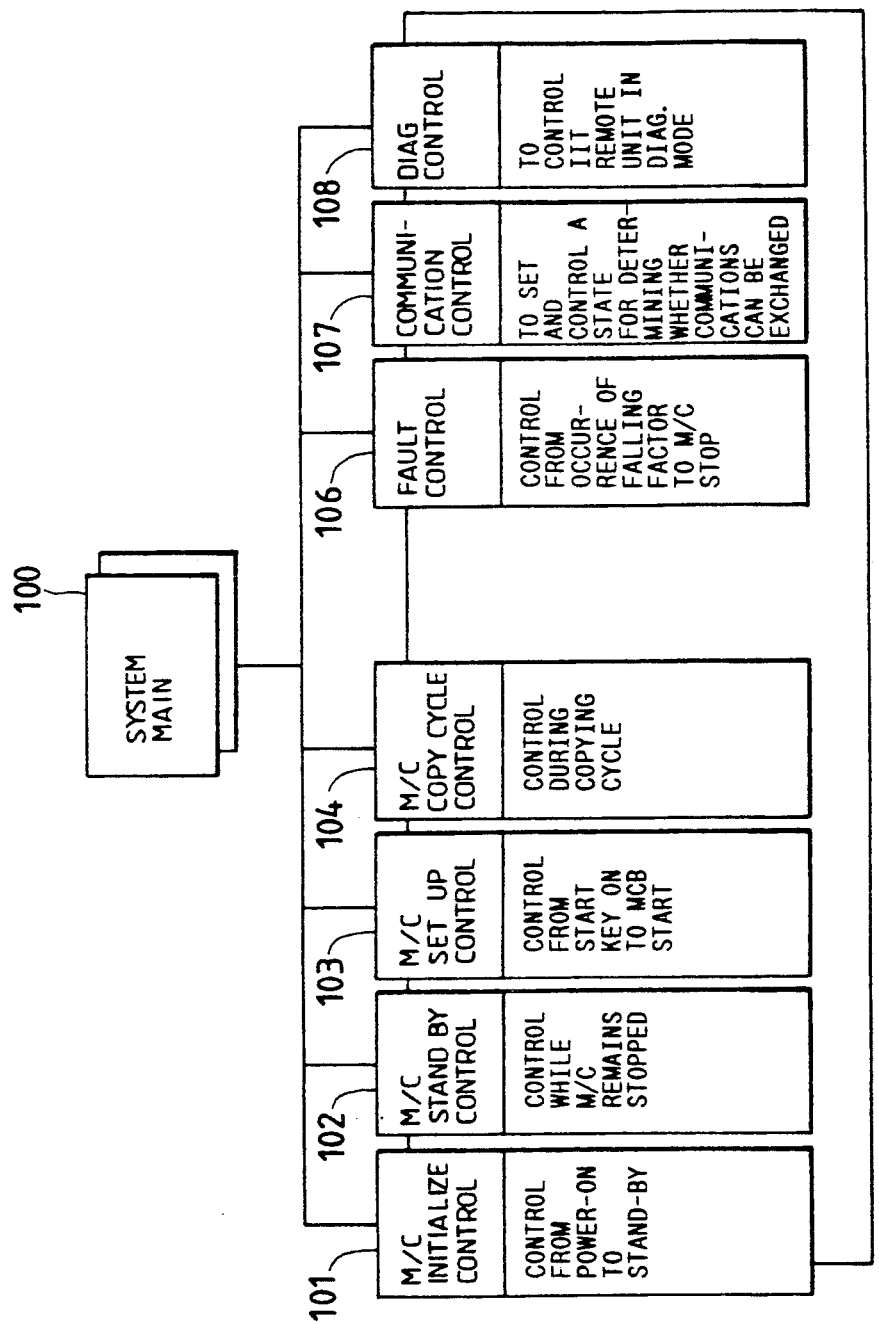
FIG. 11 illustrates the construction of the modules in the system.

A module configuration of the system will be described with reference to FIG. 11. In the color copying machine of the present invention, the modules such as IIT, IPS and IOT function like passive parts, and the modules in the system for controlling the above modules function like active parts. The copying machine employs a decentralized CPU system. The per original layer and the job programming layer are shared by the system. The system has the control right to control the initialize state, stand-by state, set-up-state, and cycle state, and the UI master right for using the UI in the above states. A system main 100 fetches the data received from the SYSUI, MCB, and the like into the internal buffer, clears the data in the internal buffer, calls the respective lower order modules in the system main 100 and transfers the job to them to execute updating processing.

An M/C initialize control module 101 controls an initialize sequence from the power-on to the setting up of the stand-by mode. This is driven when the power-on state for executing various types of tests after power-on by the MCB.

An M/C set-up control module 103 controls a set-up sequence from the pushing of the start key until the MCB executing the copy layer is driven. Specifically, the module 103 forms job modes using FEATURE (directions given to the M/C in order to reply to the request by a user) that is specified by the SYSUI, and determines a set-up sequence in accordance with the job modes.

Figure 12A:
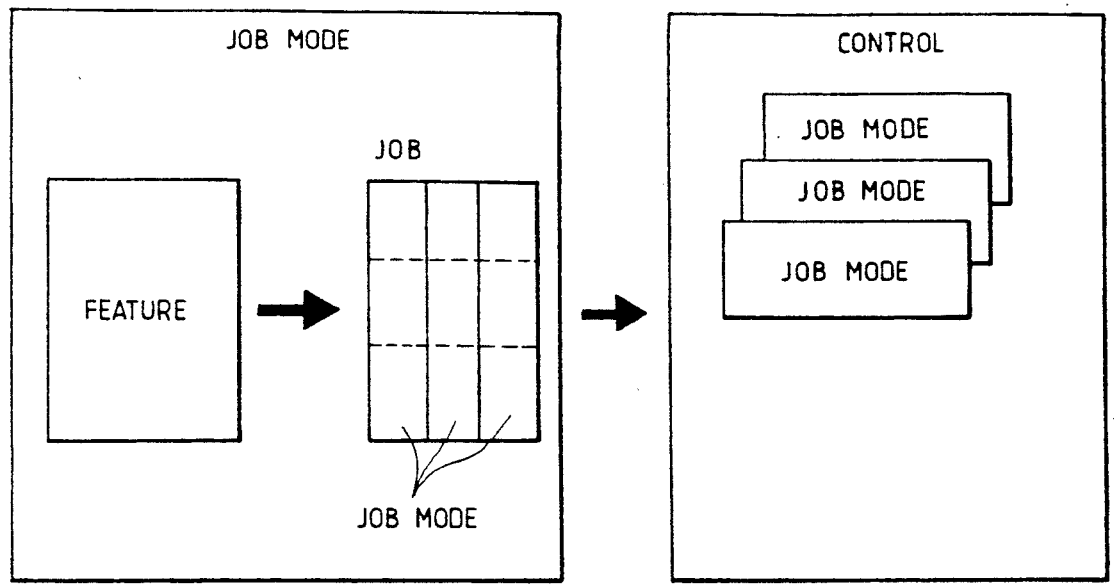
FIGS. 12(a) through 12(c) illustrate the creation of a job mode.
Figure 12B:
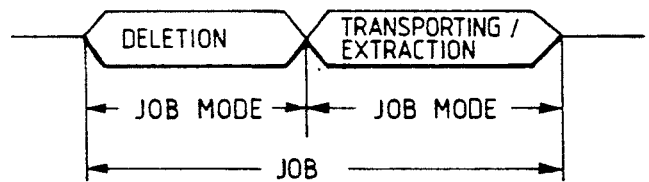
Figure 12C:
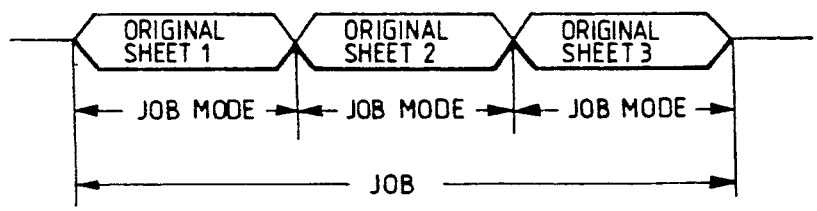

As shown in FIG. 12(a), for forming the job modes, an mode as indicated by the F/F is analyzed and divided into job modes. Here, the job means the M/C operation from the start until the copies are all delivered as requested and operation stops. The job mode is the unit of the smallest job into which the job is allowed to be divided. The job is a collection of the job modes. For example, in the case of an inlay composition, the job modes are a delete and a movement/extraction. These modes constitute a job. In the case of three ADF originals, job modes are feed processings of originals 1, 2 and 3. These job modes are collected into a job.

In an auto mode, a document scan is done. In a coloring-outline-drawing mode, a prescan is done. In a marker edit mode, a prescan is done. In a color detection mode, a sample scan is done (a maximum of three prescans is allowed). A copy mode required for the copy cycle is assigned to the IIT, IPS and MCB. At the end of the set-up sequence, the MCB is driven.

An M/C stand-by control module 102 controls a sequence during the M/C stand-by state. More exactly, it controls reception of the start key and color registration, and enters the diag. mode.

An M/C copy cycle control module 104 controls a copy sequence from the start of the MCB to the stop. Specifically, it provides information of a paper feed count, recognizes the end of a job and requests the start of the IIT. Further, it recognizes the stop of the MCB and requests the stop of the IPS. Additionally, the module 104 sends a through command that is generated during the M/C stop or the M/C operation, to a destination remote.

A fault control module 106 monitors stop parameters from the IIT and IPS. When a stop parameter is generated, the module 106 requests the stop of the MCB. More specifically, the module 106 recognizes a fail command from the IIT or IPS, and stops it. After a stop request is generated by the MCB, the fault control module determines the recovery when the M/C is stopped, and makes the recovery in response to a jamming command from the MCB, for example.

A diag. control module 108 controls in the input check mode and the output check mode that are contained in the diag. mode.

Figure 13:
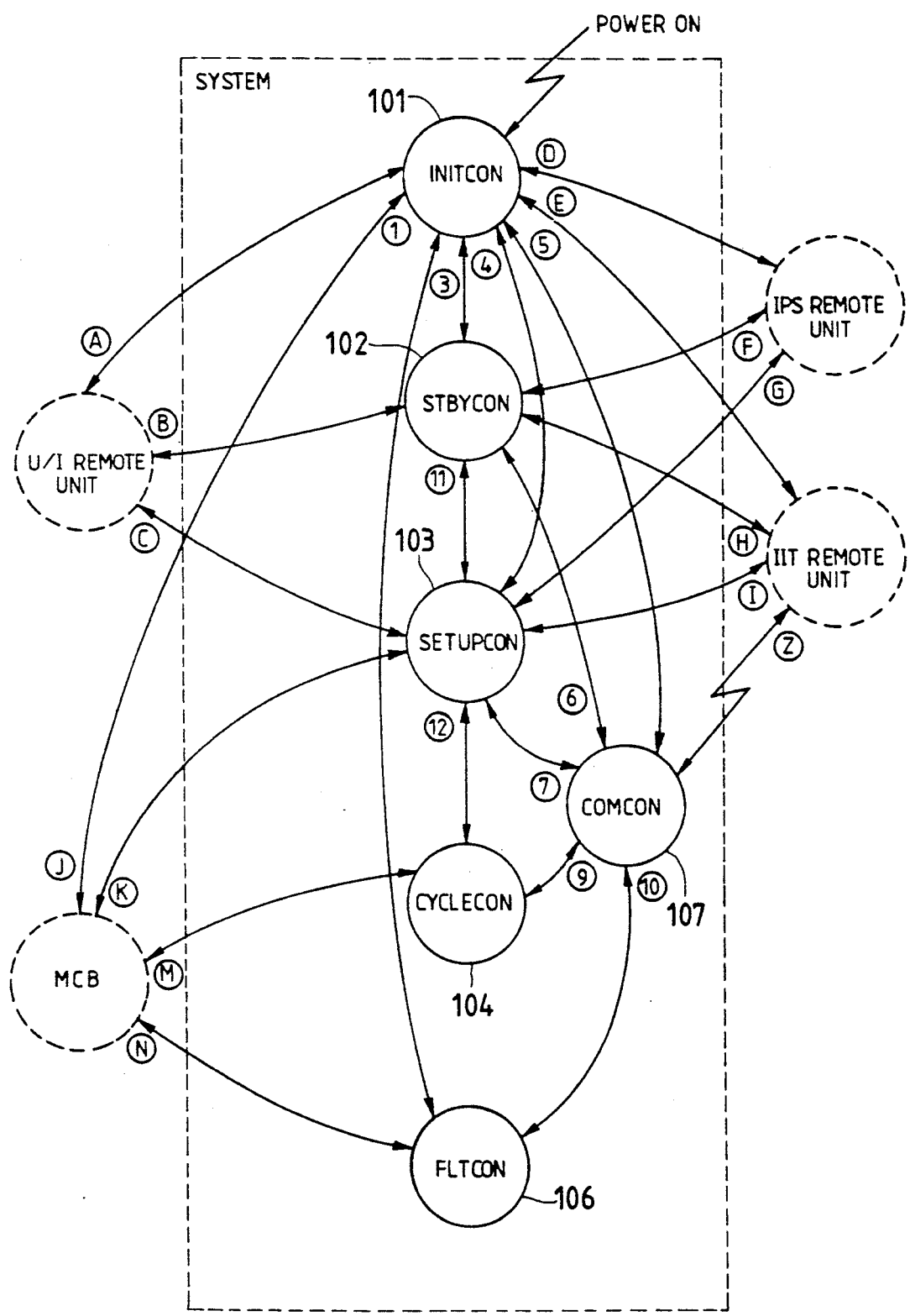
FIG. 13 illustrates the data flow between the system and each of the individual remote units as well as the data flow among the modules within the system.

Data transfer among the modules or between the modules and other subsystems will now be described. FIG. 13 illustrates data flows between the system and the remotes, and data flows among the modules in the system. In the figure, A to N indicate serial communications, Z a hot line, and (1) to (12) data flow among the modules.

In the communication between the SYSUI remote and the initialize control module 101, the SYSUI sends a token command indicative of transfer of the control right for the CRT, to the SYSTEM node. The initialize control module sends a config. command to it.

In the communication between the SYSUI remote and the stand-by control module 102, the SYSUI remote sends to the stand-by control module a mode change command, a start copy command, job cancel command, color registration request command, and tray command. The stand-by control module 102 sends to the SYSUI remote an M/C status command, tray status command, toner status command, toner collection bottle command, color registration ans. command, and token command.

In the communication between the SYSUI remote and the set-up control module 103, the set-up control module 103 sends an M/C status command (progress) and APMS status command. The SYSUI remote sends a stop request command and an interrupt command.

In the communication between the IPS remote and the initialize control module 101, the IPS remote sends an initialize command to the control module 101. The control module 101 sends an NVM parameter command to the IPS remote.

In the communication between the IIT remote and the initialize control module 101, the IIT remote sends an IIT ready command to the module 101. The module 101 sends an NVM parameter command and an initialize command to the IIT remote.

In the communication between the IPS remote and the stand-by control module 102, the commands sent by the IPS remote to the control module 102 are an initialize free hand area command, answer command, remove area answer command, and color data command. The commands sent by the module 102 to the IPS remote are a color detect point command, initialize free hand area command, and a remove area command.

In the communication between the IPS remote and the set-up control module 103, the commands sent by the IPS remote to the control module 103 are an IPS ready command a document information command. The commands sent by the set-up control module 103 to the IPS module are a scan information command, basic copy mode command, edit mode command, and an M/C stop command.

In the communication between the IIT remote and the stand-by control module 102, the IIT remote sends an IIT ready command indicative of the prescan end to the control module 102. The control module 102 sends to the IIT remote a sample scan start command and an initialize command.

In the communication between the IIT remote and the set-up control module 103, the IIT sends an IIT ready command and an initialize end command to the control module 103. The control module 103 sends a document scan start command, sample scan command, and copy scan start command to the IIT remote.

In the communication between the MBC remote and the stand-by control module 102, the stand-by control module 102 sends an initialize subsystem command and a stand-by selection command to the MBC remote. The MBC remote sends a subsystem status command to the stand-by control module.

In the communication between the MBC remote and the set-up control module 103, the module 103 sends a start job command, IIT ready command, stop job command, and declare system fault command to the MBC remote. The MBC remote sends an IOT stand-by command and a declare MCB fault command to the module.

In the communication between the MBC remote and the cycle control module 104, the module 104 sends a stop job command to the MBC remote. The MBC remote sends a made command, ready for next job command, job delivered command, and IOT stand-by command to the control mode.

In the communication between the MBC remote and the fault control module 106, the control module 106 sends a declare system fault command and a system down end command to the MBC remote. The MBC remote sends a declare MCB fault command and a system shutdown command to the control module 106.

In the communication between the IIT remote and the communication control module 107, the IIT remote sends a scan ready signal and an image area signal to the control module 107.

The interfaces among the respective modules will be described below. The system main 100 sends reception remote numbers and reception data to the respective modules (101 to 107). Upon receipt of them, each module transfers data to and from its remote. On the other hand, the respective modules sends nothing to the system main 100.

The initialize control module 101, when completing the initialize processing, sends a system state (stand-by) to the fault control module 106 and the stand-by control module 102. The communication control module 107 sends communication yes/no data to the initialize control module 101, stand-by control module 102, set-up control module 103, copy cycle control module 104, copy cycle control module 104, and fault control module 106.

The stand-by control module 102 sends a system state (progress) to the set-up control module 103, when the start key is depressed.

The set-up control section 103, when the set-up is completed, sends a system state (cycle) to copy cycle control module 104.

(II-2) Image Input Terminal (IIT)

(A) Document Scanning Mechanism

Figure 14:
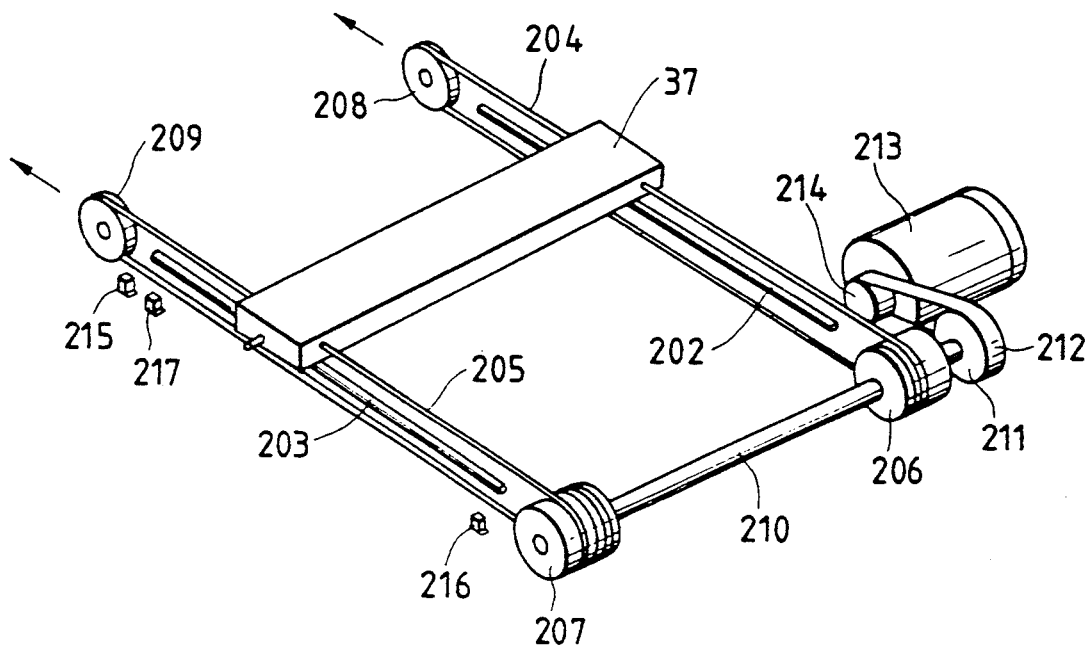
FIG. 14 is a perspective view of a document scanning mechanism.

FIG. 14 showing a document scanning mechanism used in the color copy machine according to the present invention. The imaging unit 37 is removably placed on a pair of slide shafts 202 and 203, and is fixed at both ends to wires 204 and 205. These wires 204 and 205 are wound around drive pulleys 206 and 207 and tension pulleys 208 and 209, respectively. The tension pulleys 208 and 209 are pulled in the direction of the arrows. The paired drive pulleys 206 and 207, and a reduction pulley 211 are mounted to a drive shaft 210, as shown. Limit switches 215 and 216 are sensors for sensing both ends of the imaging unit 37 when it is moved. A registration sensor 217 senses a document read start position.

To make a color copy, the IIT must repeat the scan four times. It is a significant matter how to reduce an out-of-synchronization state of the scan and a displacement from the document read start position. To reduce the out of-synchronization and the displacement, it is needed to minimize fluctuation of the stop position of the imaging unit 37, fluctuation of the time taken for the imaging unit to travel from the home position to the registration position, and fluctuation of the scan speed. To this end, a stepping motor 213 is used. The stepping motor 213 suffers from a higher vibration and is more noisy, when compared with the servo motor. Many countermeasures have been taken to realize high picture quality and high speed.

(B) Control System for the Stepping Motor

The stepping motor 213 is arranged such that a motor winding is wired in a pentagon fashion, its connection points are connected through pairs of transistors to the positive and the negative terminals of a power supply, and the motor is driven in a bipolar mode using ten transistors. The motor current is fed back to smooth a current variation and hence to hold back vibrations and noise.

Figure 15A:
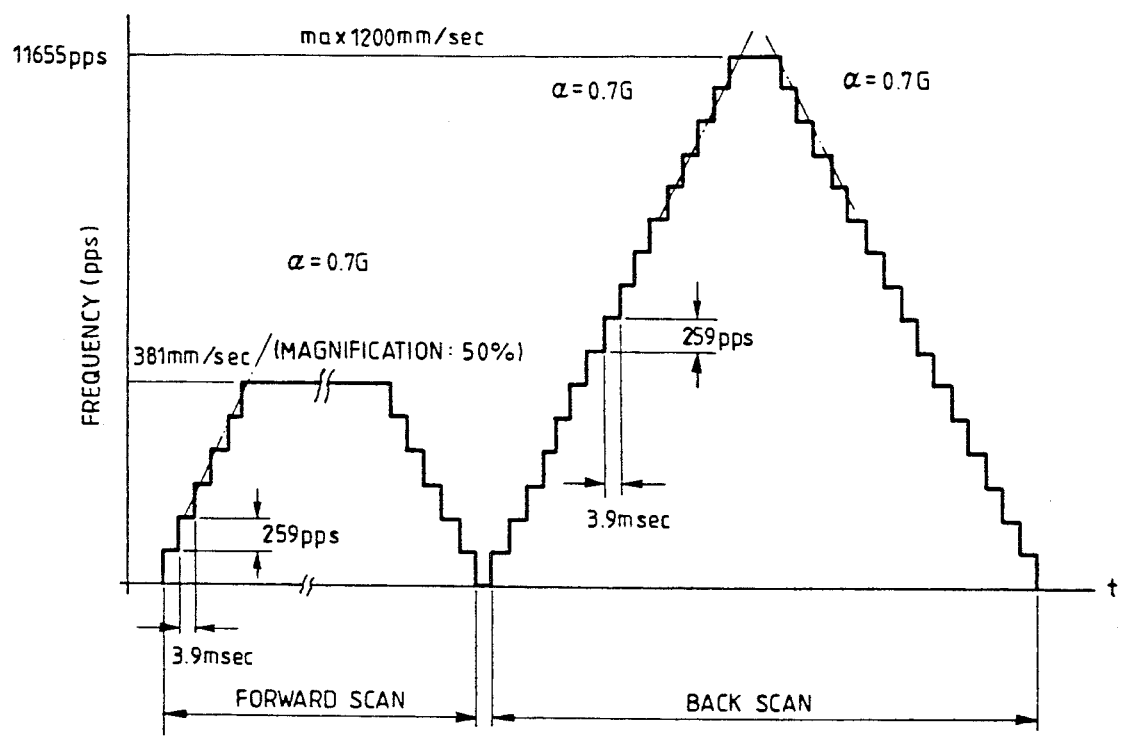
FIGS. 15(a) through 15(e) the system for controlling the stepping motor.

FIG. 15(a) shows a scan cycle of the imaging unit 37 driven by the stepping motor 213. More specifically, the figure also shows a relationship between the speed of the imaging unit 37, viz., the frequency of a signal applied to the stepping motor and time, when the imaging unit executes a forward scan and a back scan at the 50% magnification, or the maximum speed. In an acceleration mode, as shown in FIG. 15(b), the frequency is increased up to approximately 11 to 12 kHz in steps of 259 Hz.

Figure 15B:
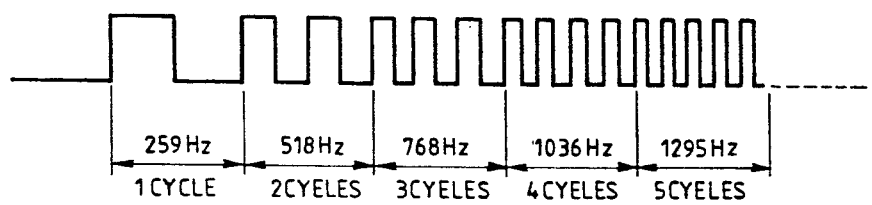

A trapezoidal speed variation profile of is formed by increasing the signal frequency at the rate of 259 pps/3.9 ms (FIG. 15(b)). A rest period is provided between the forward scan and the back scan. During this rest period, vibration in the IIT mechanism system settles down, and the synchronization of the imaging unit operation with image outputting in the IOT is secured. An acceleration of 0.7 G, which is higher than that of the conventional copier, reduces a scan cycle time.

Figure 15C:
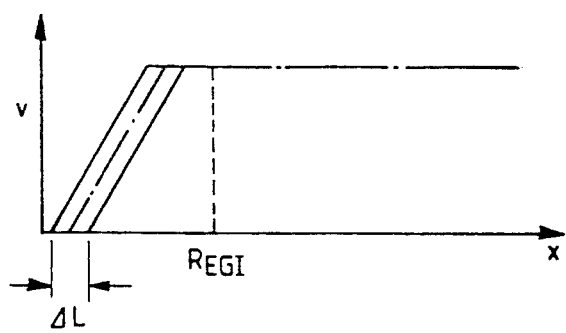
Figure 15D:
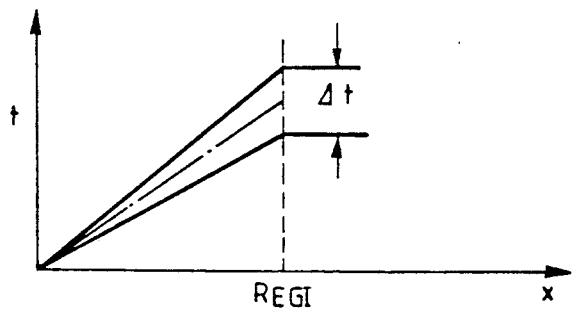
Figure 15E:
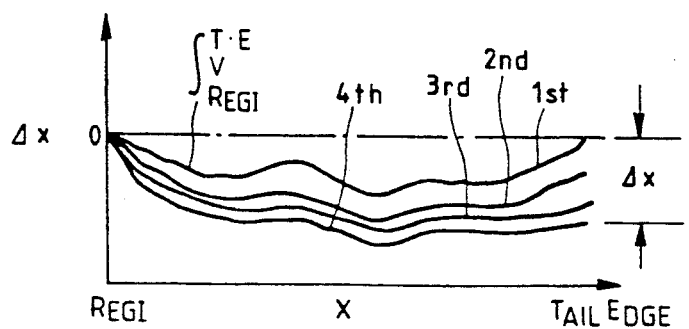

As already mentioned, in the color document reading, it matters how to reduce the displacement from the home position during the four scans, consequently how to reduce a color displacement or an image distortion. FIGS. 15(c) to 15(e) explain the causes of the color displacement. FIG. 15(c) shows a fact that the imaging unit after scanning returns and comes to a standstill at a position different from the home position. Accordingly, in the next scan, the time taken for the imaging unit to reach the registration position is different from that in the previous scan, resulting in a color displacement.

In the case of FIG. 15(d), with a transient vibration of the stepping motor (speed fluctuation until the motor speed settles down at a steady speed) during the 4-scan period, the time taken for the imaging unit to reach the registration position becomes different from a predetermined time, and consequently causes color displacement. FIG. 15(e) shows different variations of the constant speed scan characteristic of the imaging unit between the registration position and the tail edge when the imaging unit is moved for scanning four times. As seen, the speed of the imaging unit of the first scan varies more than that of the imaging unit of the second to fourth scans. For this reason, the instant color copier is designed so that the toner color Y for which displacement is indistinctive is developed for the first scan. Other causes for color displacement include aging of the timing belt 212 and wires 204 and 205, and mechanical factors such as viscosity drag existing between the slide pad and the slide rails 202 and 203.

(C) IIT Control System

The IIT remote has many functions, such as sequence control for various copy operations, service support, self check, and fail safe. The sequence control of the IIT generally consists of a scan, sample scan, and initialize controls. Various commands and parameters for controlling the IIT come from the SYS remote 71 through the serial communication network.

Figure 16A:
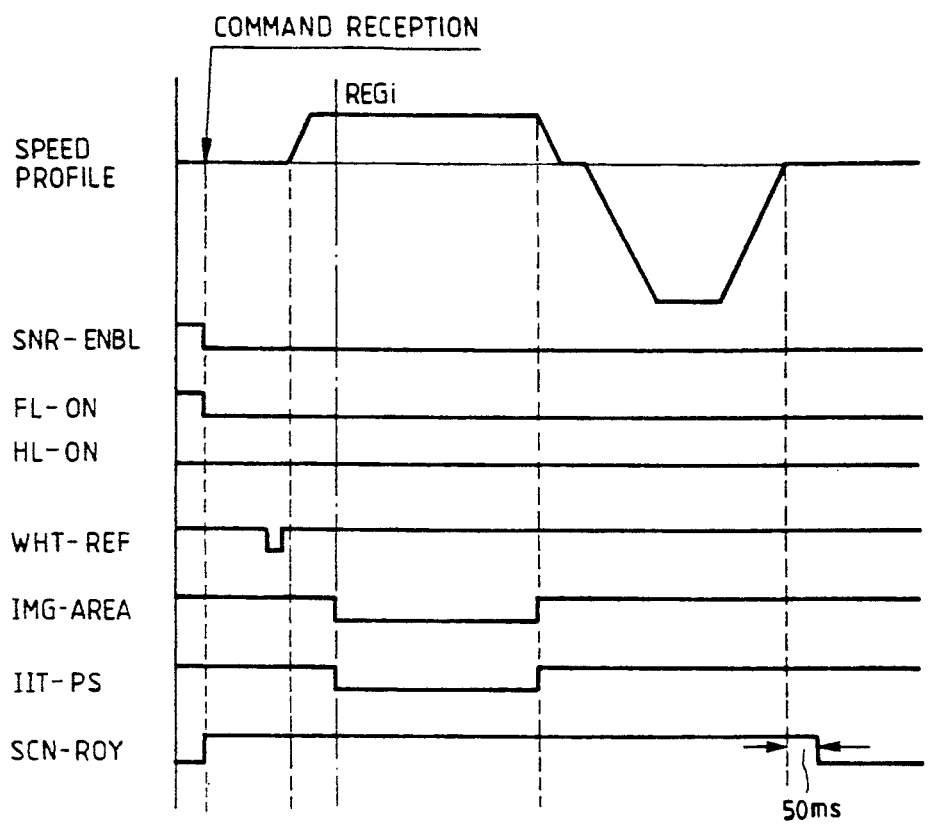
FIGS. 16(a) through 16(c) present a timing chart for the IIT control system.

FIG. 16(a) shows a timing chart of a normal scan operation. The scan length data is determined depending on paper length and magnification, and is exactly 0 to 432 mm (with the steps of 1 mm). The scan speed depends on the magnification (50% to 400%). The prescan length data (distance between the stop position and the registration position) also depends on the magnification (50% to 400%). When receiving a scan command, the IIT remote produces an FL-ON signal to light on a fluorescent lamp. The same turns on a motor driver by a SCN-RDY signal. After a preset time, it produces a shading correction pulse WHT-REF to cause the imaging unit to start the scanning operation. When the imaging unit passes the registration sensor, an image area signal IMG-AREA goes low and its low level state lasts during a period corresponding to the scan length. In synchronism with this, the IIT-PS signal is outputted to the IPS.

Figure 16B:
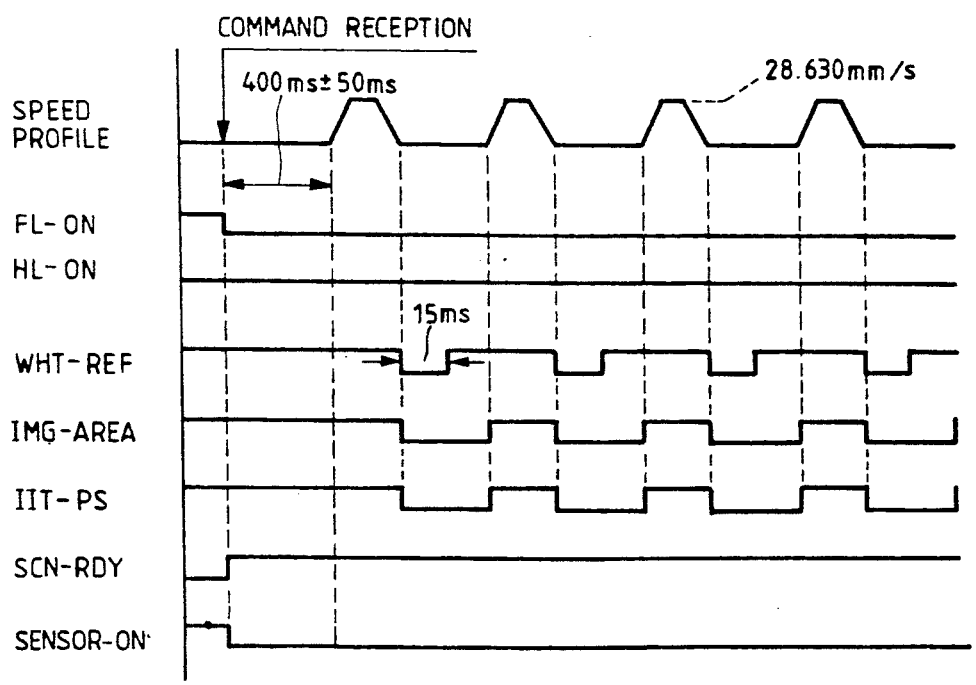
Figure 16C:
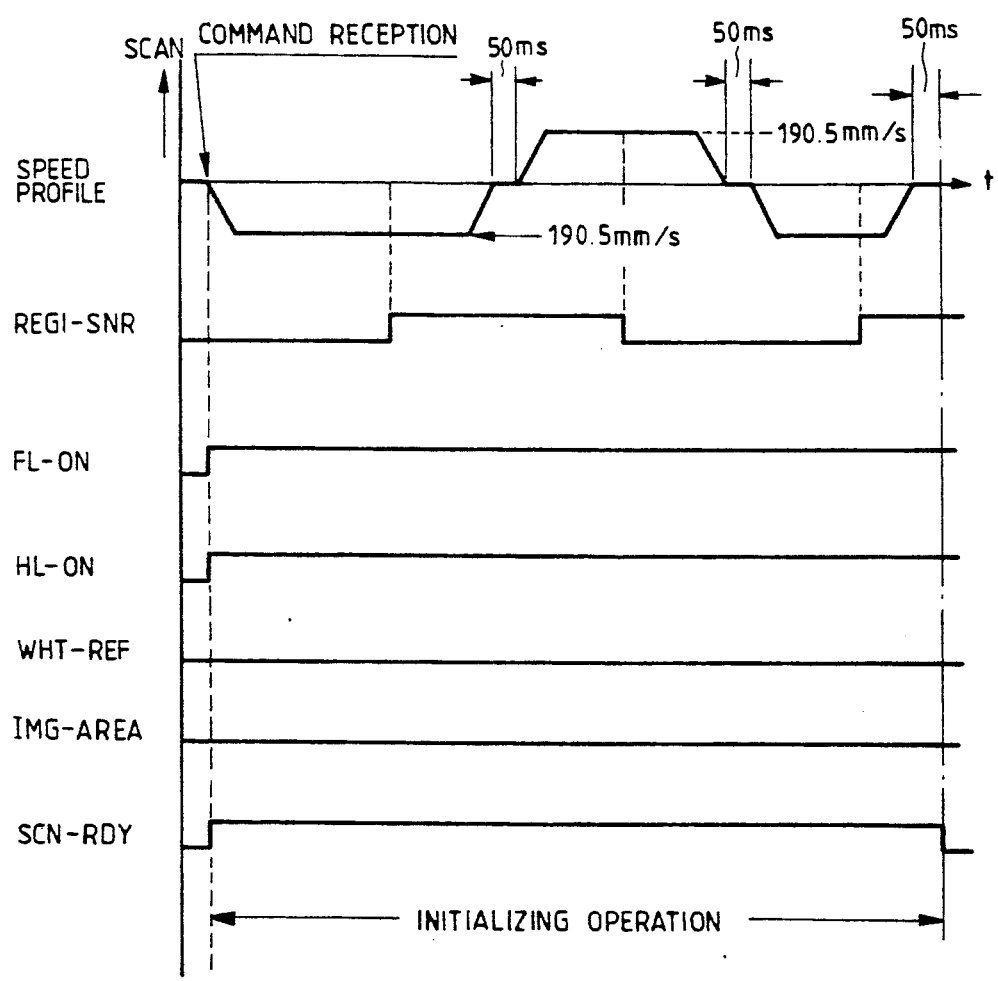

FIG. 16(b) shows a timing chart of the sample scan operation. The sample scan is used for color detection at the time of color change, color balance correction when the F/P is used, and shading correction. In the sample scan, the imaging unit is moved to a preset sample position and temporarily stops there, or repeats a fine motion several times and then stops, on the basis of the data of stop position from the registration position, moving speed, the number of fine motions, and step intervals.

(D) Imaging Unit

Figure 17:
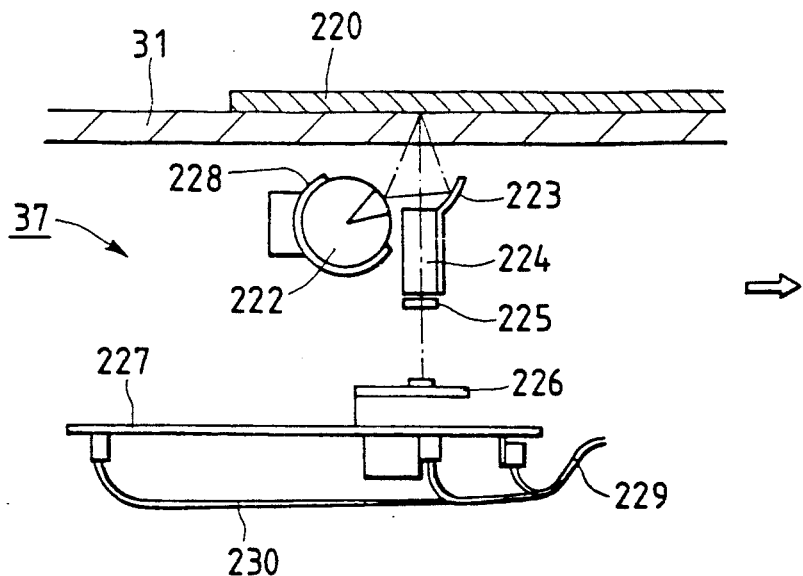
FIG. 17 is a sectional view of the imaging unit.

FIG. 17 shows a sectional view of the imaging unit 37. An original 220 is set on the platen glass 31, with its image surface facing down. The imaging unit 37 moves under the platen glass in the direction of the arrow. Throughout the movement of the imaging unit, the image surface of the original placed on the platen glass is illuminated with the combination of the daylight fluorescent lamp 222 of 30 W and a reflecting mirror 223. The light reflected from the original 220 passes through a selfoc lens 224 and a cyan filter 225 and forms a normal equal-size image on the light receiving surface of a CCD sensor array 226. The selfoc lens 224 is a compound eye lens consisting of four rows of fiber lens. This lens is bright and has high resolution. This lens is advantageous in that power consumption of the light source is reduced and the imaging unit may be made compact. The imaging unit 37 is provided with a circuit board 227 containing a CCD line sensor drive circuit, CCD line sensor output buffer circuit, and the like. A lamp heater 228 is provided as a flexible cable 229 for the illumination power source 230.

Figure 18A:
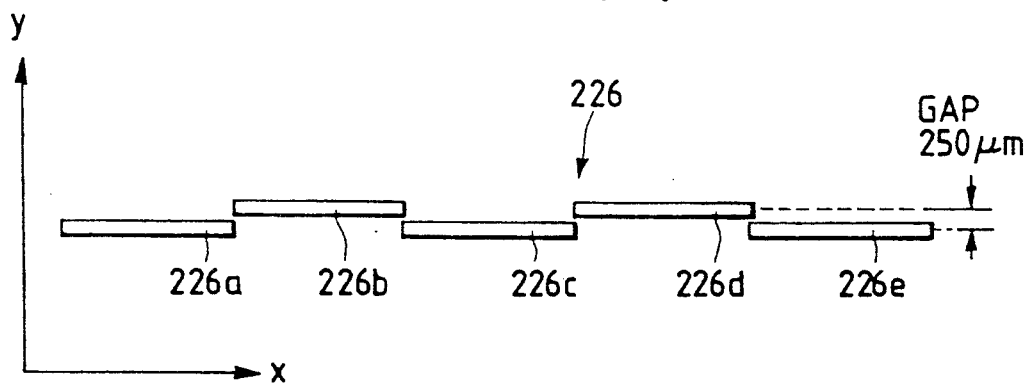
FIGS. 18(a) and 18(b) illustrate an example of the arrangement of the CCD line sensors.
Figure 18B:
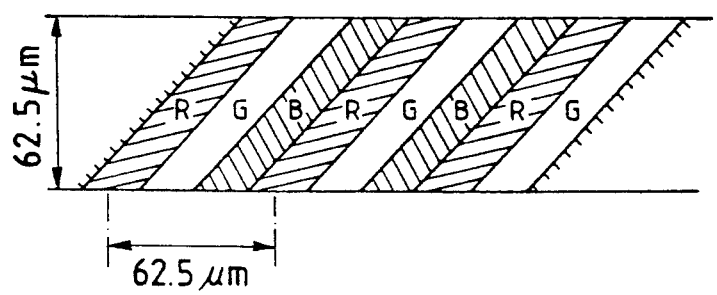

As shown in FIG. 18(a), five CCD line sensors 226a to 226e are laid out in zig-zag fashion in the main scan direction. The reason a zig-zag layout of CCD sensors is used is that when a single CCD line sensor is used, it is difficult to array a number of photo sensor elements without any drop of element and to obtain a uniform sensitivity. When a plurality of CCD line sensors are arrayed in a line, it is difficult to form pixels in the CCD line sensor up to both end portions and light insensitive portions are present in the CCD sensor.

As shown in FIG. 15(b), in the sensor portion of the CCD line sensor array 226, trios of color filters R, G, and B comprise pixels repeatedly laid out in this order, and the adjacent three bits form one pixel at the time of reading. When a read pixel density of each color is 16 dots/mm and the number of pixels of each chip is 2928, the length of one chip is: $2928/(16 \times 3) = 61$ mm and hence the total length of five chips is $61 \times 5 = 305$ mm. Accordingly, a CCD line sensor of the equal size type capable of reading an original of A3 can be obtained. The respective pixels of R, G, and B are slanted by 45°, to reduce moire.

When a plurality of CCD line sensors 226a to 226e are disposed in a zig-zag fashion as in the above case, the adjacent CCD line sensors scan different portions on the original surface. When the original is scanned by moving the CCD line sensors in the vertical scan direction Y orthogonal to the main scan direction X, there is a time lag between the signals derived from the CCD line sensors 226b and 226d of the first row that precedingly scan the original and the signals derived from the CCD line sensors 226a, 226c and 226e of the second row that succeedingly scan the original. The time lag corresponds to a difference between the positions where the CCD line sensors of the first and second rows are located.

To obtain a continuous signal of one line from the image signals dividedly read by the plurality of CCD line sensors, the signals from the first row CCD line sensors 226b and 226d that precedingly scan the original are stored, and the stored signals must be read out in synchronism with the outputting of the signals from the second row CCD line sensors 226a, 226c and 226e that scan the original succeeding to the first CCD row line sensors. In this case, if the position difference is 250 um and the resolution is 16 dots/mm, a delay of 4 lines is needed.

In the image reader, the reduction/enlargement is carried out in such a manner that increase and decrease processing, and other processing by the IPS are used for reduction/enlargement in the main scan direction, and the increase or decrease of the moving speed of the imaging unit 37 is used for the reduction/enlargement in the vertical scan direction. Accordingly, the resolution in the vertical scan direction is changed by changing the moving speed of the imaging unit 37, while the reading speed (the number of read lines per unit time) of the image reader is fixed. If the resolution is 16 dots/mm at 100% magnification, the magnification percentage, speed, resolution and the number of zig-zag correction lines are as shown in the following table.

| Magnification (%) | Speed (times) | Resolution (dots/mm) | No. of zig-zag correction lines |
| --- | --- | --- | --- |
| 50 | 2 | 8 | 2 |
| 100 | 1 | 16 | 4 |
| 200 | ½ | 32 | 8 |
| 400 | ¼ | 64 | 16 |

As seen from the above table, as the magnification percentage increases, the resolution increases, and hence the number of necessary line memories for correcting a difference of 250 um in the zig-zag layout of the CCD line sensors is also increased.

(E) Video Signal Processing Circuit

Figure 19:
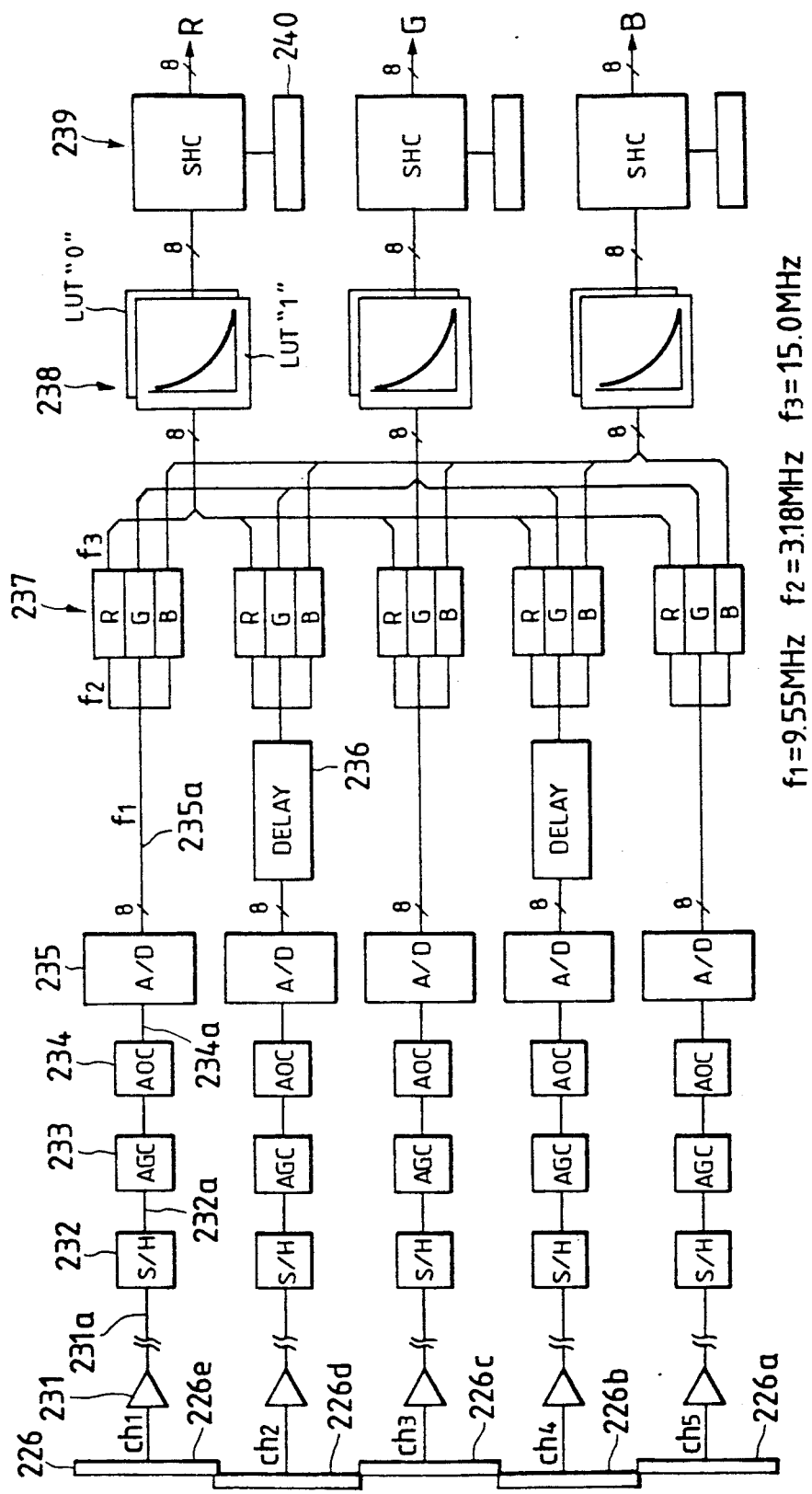
FIG. 19 illustrates one example of the construction of the video signal processing circuit.

The description to be given below with reference to FIG. 19 is an elaboration on a video signal processing circuit for reading a color original for each trio of colors, R, G, and B in terms of reflectivity signals by using the CCD line sensor array 226 when the reflectivity signal is converted into a digital signal as a density signal.

An image of an original is read by using the CCD line sensor array 226 consisting of five CCD line sensors in the imaging unit 37. In the image reading, the CCD line sensor array divides the original image into five portions and reads these portions through five channels. Further, in reading the segmented image, the image light reflected from the image is separated into trios of colors R, G, and B. The color signals (in a channel typically used for ease of explanation) are amplified to a predetermined level by a amplifier 231. The amplified color signals are transmitted to the circuit of the base machine through a transmission cable connecting the imaging unit to the base machine (FIG. 20, 231a).

Figure 20:
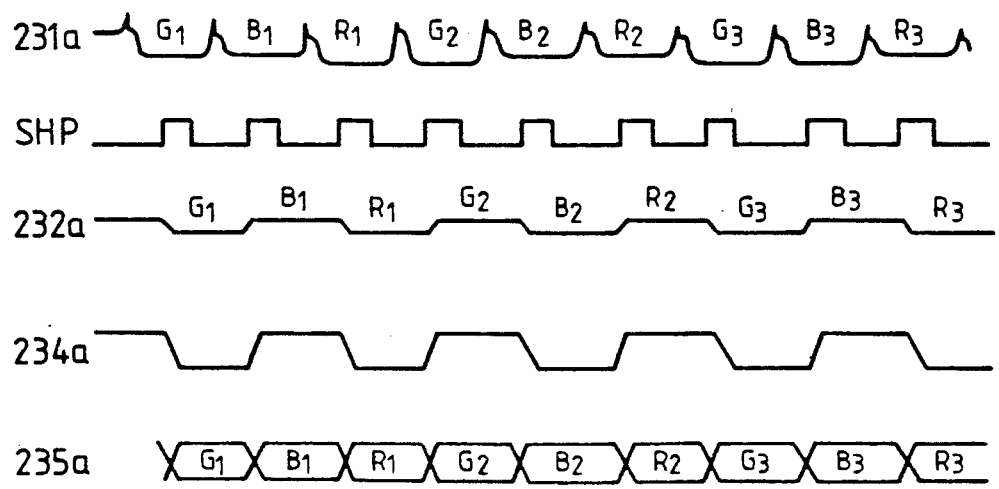
FIG. 20 presents a timing chart illustrating the working of the video signal processing circuit.

In the base machine, a sample/hold circuit SH232, by use of a sample hold pulse SHP, removes the noise of the color signals and shapes the signals (FIG. 20, 232a). The photoelectric converting characteristic of the CCD line sensor differs for each pixel and each chip. Accordingly, when an original with a uniform density is read by the CCD line sensor, the output signals of the line sensor are not uniform. If these signals are image processed, stripes and irregularities appear in an image formed by the thus image processed signals. Therefore, correction processing must be applied to the signals derived from the CCD line sensor array.

An automatic gain control (AGC) circuit 233 controls the gain for the sensor output signals. This control is called a white level adjustment. This circuit is used for reducing an error in the A/D conversion in a circuit for amplifying the output signals of each sensor and applying them through an AOC (automatic affect control circuit) 234 to an A/D converter 235. To this end, reference data is collected by each sensor, is digitized, and is stored into a shading RAM 240. The data of one line is compared with preset reference data in the SYS remote 71 (FIG. 3). A digital value providing a given gain is converted into an analog signal, and is applied to the AGC 233. In this way, its gain is changed in 256 steps.

The AOC circuit 234 controls a dark voltage outputted from each sensor. This control is called a black level adjustment. For the adjustment, the fluorescent light is off and the output voltage of each sensor is measured. These output voltages are digitized and stored into the shading RAM 240. The data of one line as read out is compared with a predetermined reference value by the SYS remote (FIG. 3). An offset value is converted into an analog signal, and applied to the AOC 234. In the AOC 234, the offset voltage is controlled in 256 steps. The AOC controls the original density as finally read so that its output density falls within a predetermined value.

The data thus digitized by the A/D converter 235 (FIG. 20, 235a) is outputted in the form of a stream of 8 bits of GBRGBR . . . . A delay circuit 236 is a memory of the FIFO type capable of storing the data of a plurality of lines. The delay circuit 235 stores the data signals derived from the preceding scan, 1st row CCD line sensors 226b and 226d, and outputs the data in synchronism with the outputting of the data signals from the succeeding scan, 2nd row CCD line sensors 226a, 226c and 226e.

A separate/compose circuit 237 separates the R, G, and B data for each CCD line sensor, and composes these items of data into serial data for each color, R, G, and B and for each line. A converter 238, e.g., a ROM, stores a logarithm converting table LUT"1". In the table, the received digital data is used as addresses to access the table stored in the ROM. The table converts the R, G, and B reflectivity data into density data.

A shading correction circuit 239 will be described. The shading stems from variances of the light distribution characteristics of the light source, reduced light amount at the end portion of the fluorescent light when it is used as a light source, sensitivity variances of pixels of the line sensor, smear on the reflecting mirror, and the like.

To correct for the shading, at the start of the shading correction, the light reflected from a white plate, that is to be used as reference density data for shading correction, is applied to the CCD line sensor. The output signal from the line sensor is subjected to A/D conversion and logarithm conversion in the signal processing circuit. The reference density data log ($R_i$) thus obtained is stored into the line memory 240. Then, the reference density data log $R_i$) is subtracted from the image data log ($D_i$) read from the original through the scanning operation. That is, $$\log (D_i) - \log (R_i) = \log (D_i/R_i)$$

In this way, logarithmic values of the pixel data are obtained which are shading corrected. With the above approach wherein the shading correction follows the logarithm conversion, satisfactory logic operation can be realized by using an ordinary full adder IC, instead of intricate, large scale, hard logic dividers used in conventional converters.

(II-3) Image Output Terminal (IOT)

(A) Outline

Figure 21:
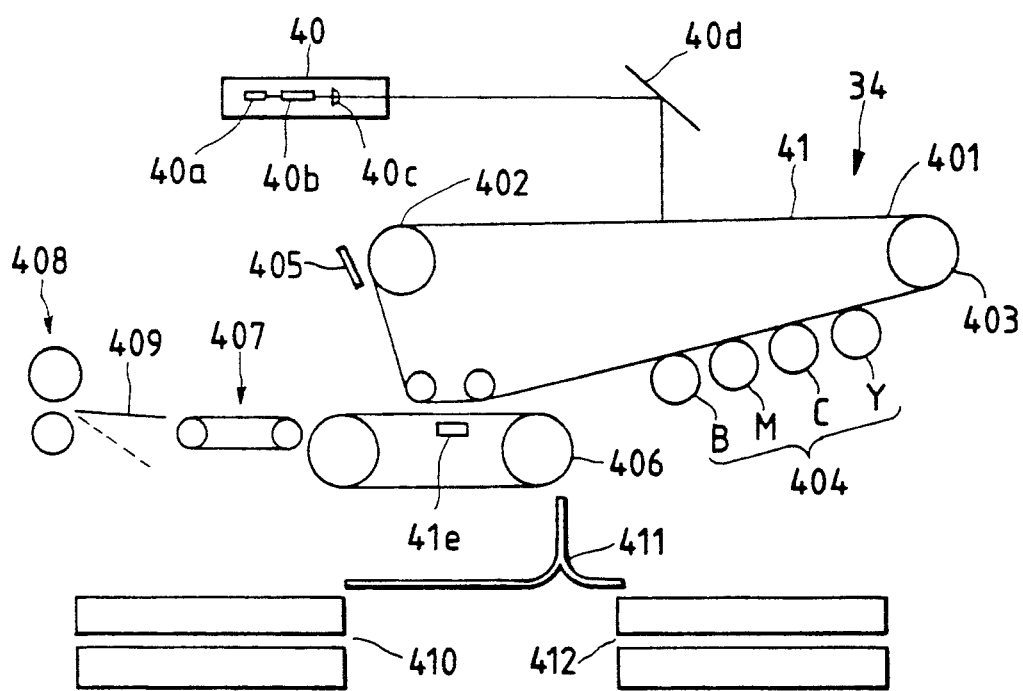

An outline of the image output terminal (IOT) is shown in FIG. 21. The IOT uses a photo receptor belt as a photo sensitive member. The IOT is provided with a developing unit 34 comprising a group 404 of four developing devices for full color development, i.e., black (K), magenta (M), cyan (C) and yellow (Y), a tow roll transfer loop 406 for transferring paper to the transfer unit, a vacuum transfer 407 for transferring paper from the tow roll transfer loop 404 to a fuser 408, paper trays 410 and 412, and a paper transfer path 411. The three units of the photo receptor belt, developing unit 412, and paper transfer path 411 can be pulled out of the front side of the IOT.

The data light obtained by modulating a laser beam from a laser source 40 is guided by a mirror 40d onto the surface of the photo receptor belt 41 to form a latent image thereon. The latent image formed on the surface of the tow roll transfer loop or turtle 41 is developed into a toner image by the developing unit 404. The developing unit 404 consists of four developing devices of K, M, C, and Y which are disposed as shown. The layout of the developing devices allows a relationship between dark attenuation and the characteristics of the respective toners, difference in the results of mixing of the respective color toners with the black toner, and the like. In the case of the full color copy, these developing devices are driven in the order of Y→C→M→K.

Papers fed from the two-stage elevator tray 410 and another tray 412 are supplied through the transfer oath 411 to the transfer tow roll transfer loop 406. The loop 406 is disposed in the location of the transfer unit 34, and is made up of a pair of rolls rotatably coupled by a timing chain or a timing belt, and a gripper bar to be described later. The paper is gripped and transferred by using the gripper bar, and the toner image on the surface of the photo receptor belt is transferred onto the paper. In the case of full color, the paper is turned four times by the tow roll transfer belt, during the four turns, the toner images of Y, C, M, and K are successively transferred onto the paper in this order. After the image transfer, the paper is released from the gripper bar, and transferred to the vacuum transfer 407, and fed to the fuser 408. The toner image on the paper is fused by the fuser and delivered outside the base machine.

The vacuum transfer 407 absorbs the difference of the speeds of the transfer loop 406 and the fuser 408, and thereby synchronizes their operation. In this instance, the transfer speed (process speed) is 190 mm/sec. In the case of full color copy, the fusing speed is 90 mm/sec. Thus, the transfer speed is different from the fusing speed. To secure the fusing speed, the process speed is reduced. Since the 1.5 kVA power must be secured, the power cannot be distributed to the fuser.

To cope with this, when small size paper such as B5 and A4 is used, at the instant that the image transferred paper is released from the transfer loop 406 and rides on the vacuum transfer 407, the speed of the vacuum transfer 407 is decreased from 190 mm/sec to 90 mm/sec to make it equal to the fusing speed.

The instant copier is designed to be compact by making the distance between the transfer loop and the fuser as short as possible. The A3 paper is in excess of the distance of the transfer point and the fuser. If the speed of the vacuum transfer is decreased, there inevitably occurs a situation that the leading end of the paper reaches the fuser, but the trailing portion of the paper is under image transfer process. In such a situation, the paper is braked and consequently color displacement possibly occurs. To solve this problem, a baffle plate 409 is provided between the fuser and the vacuum transfer. When the A3 paper arrives, the baffle plate is turned down to curve the A3 paper along the plate, to effectively elongate the path between the fuser and the vacuum transfer. Accordingly, the vaccum transfer is operable at the same speed as the transfer speed of the turtle 406. With such an arrangement, after the image transfer is ended, the leading end of the paper reaches the fuser. In other words, the speed difference between the turtle and the fuser is absorbed and both are operable synchronously. The above approach for A3 paper is correspondingly applied to the OHP, because it has poor thermal conduction.

The instant copier is designed such that a black copy as well as a full color copy can made at high efficiency. In the case of the black copy, the toner layer is thin and hence it can be fused by less heat. Accordingly, the fusing speed is 190 mm/sec and is not reduced in the vacuum transfer The same thing is applied to a single color copy because the single color copy has a single toner layer. After the transfer process is completed, the toner remaining on the surface of the photo receptor belt is wiped off by a cleaner 405.

(B) Transfer Loop

Figure 22A:
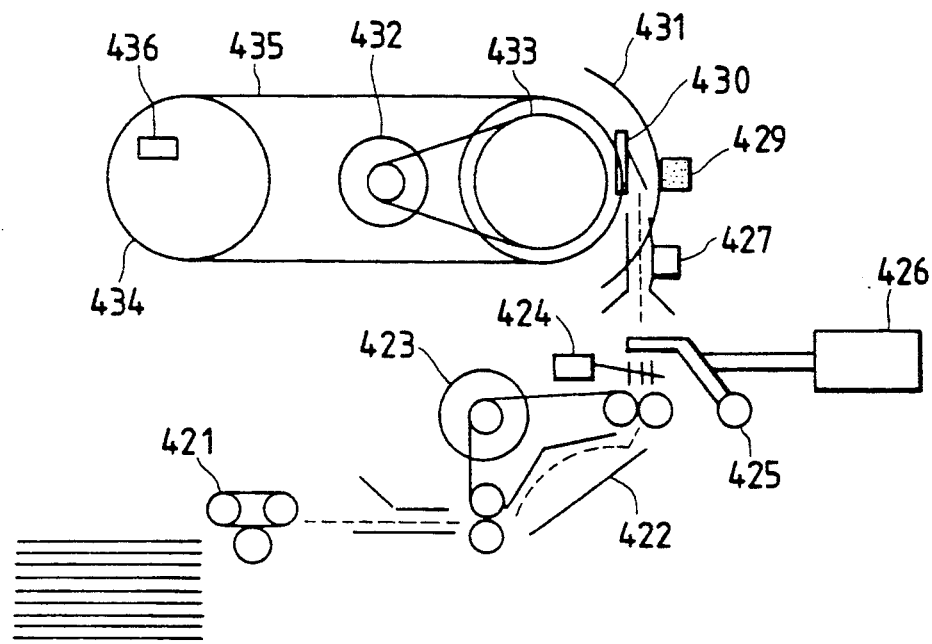
FIG. 22(a) and 22(b) illustrates the outline construction of the IOT.

The tow roll transfer loop 406 is configured as shown in FIG. 22(a).

The use of the tow roll transfer loop 406 means that no mechanical paper support member is used to eliminate color irregularity, and the transfer speed can be increased through speed control. Papers are picked up from a tray sheet-by-sheet by a feed head 421 and are transported through a buckle chamber 422 and a registration gate 425 that is controlled by a registration gate solenoid 426, to the transfer loop. Arrival of the paper at the registration gate is detected by a pre-registration gate sensor 424.

The transfer loop is driven counterclockwise by rotating a roller 433 by a servo motor 432 through a timing belt. No particular drive is applied to another roller 434. A timing chain or belt is wound around the paired rollers. A grip bar or gripper 430 is provided between the chains (in the direction orthogonal to the paper transfer direction). The gripper 430 is opened at the entrance of the transfer loop with the aid of a solenoid. The gripper 430 grips and pulls the paper for transfer at the entrance to the transfer loop. Conventionally, an aluminum or steel support covered with a mylar sheet or mesh supports the paper. When it is heated, the difference of thermal expansion with respect to the support makes the support surface irregular. The poor flatness on the support causes nonuniform transfer efficiency over the support surface, and consequently color irregularity. The use of the gripper 430 eliminates the need for the paper support, and hence the color irregularity.

The transfer loop is not provided with a support for the transferred paper, and the paper is released by centrifugal force. To hold the paper against the centrifugal force, the paired rollers are designed to draw a vacuum and attract the paper. Therefore, after passing the roller, the paper may flutter. At the transfer point, the paper is electrostatically attracted toward the photo receptor belt near a detach corotron and a transfer corotron, and the toner image on the photo receptor surface is transferred onto the paper. After the image transfer, at the exit of the transfer loop, the present position of the gripper 430 is detected by a gripper home sensor 436. At a proper timing, the gripper 430 is opened by a solenoid to release the paper and transfer it to the vacuum transfer 413.

In the case of the full color copy, the paper is turned around the transfer loop four times, for the color image transfer purposes. In the case of the three-pass color copy, it is turned three times.

Figure 22B:
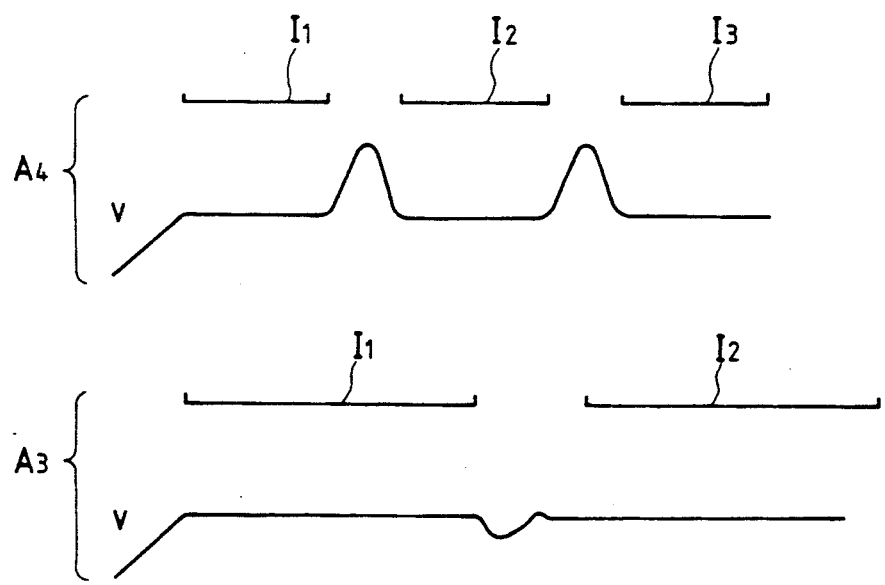

The timing control of the servo motor 432 will be described with reference to FIG. 22(b). The control of the transfer loop is such that, during image transfer, the servo motor 432 is driven at a constant speed, and after the transfer process ends, the leading edge transferred onto the paper is coincident with the transfer point of the next latent image. The length of the photo receptor belt 41 is equal to a length required for three latent images to be formed for A4 paper, and two latent images to be formed for A3 paper. The length of the belt 435 is slightly longer than the length of the A3 paper, more exactly approximately 4/3 times the length of the A3 paper.

To make a color copy of A4 size, when a latent image I1 of the first color is transferred to the paper, the servo motor 432 is driven at a constant speed. After the transfer ends, the servo motor is rapidly accelerated so that the lead edge transferred onto the paper coincides with the leading edge of a latent image I2 of the second color. To make a color copy of A3 size, after the transfer of the first color latent I1 ends, the servo motor is decelerated and waits until the lead edge transferred onto the paper coincides with the leading edge of a latent image I2 of the second color.

(II-4) User Interface (U/I)

(A) Use of Color Display

Figure 23A:
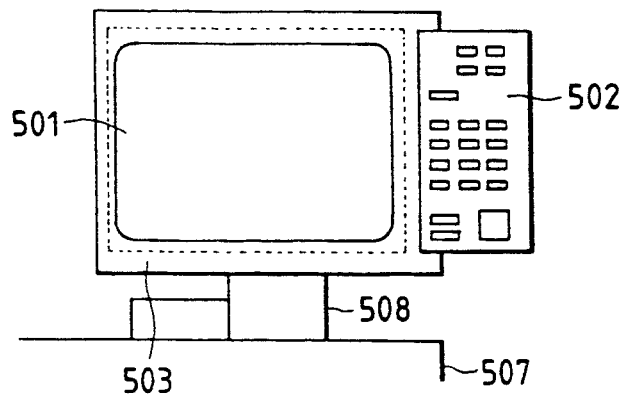
FIGS. 23(a) through 23(c) illustrate an example of the installation of the UI with the use of a display unit.
Figure 23B:
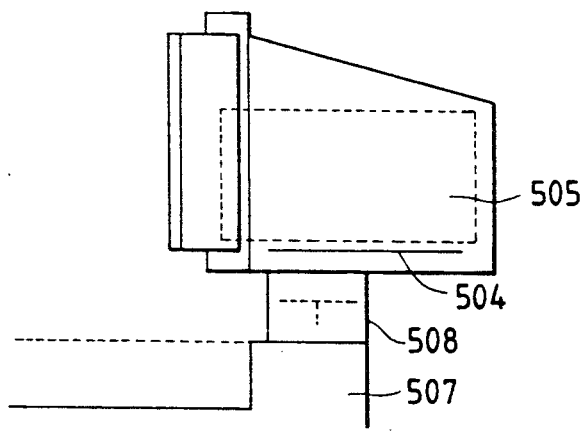
Figure 23C:
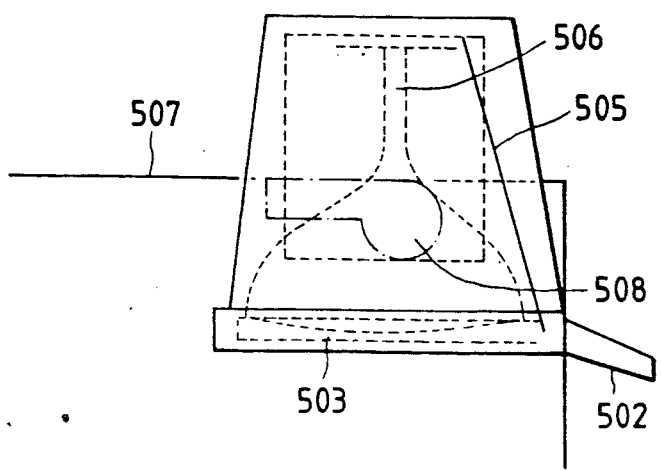
Figure 24A:
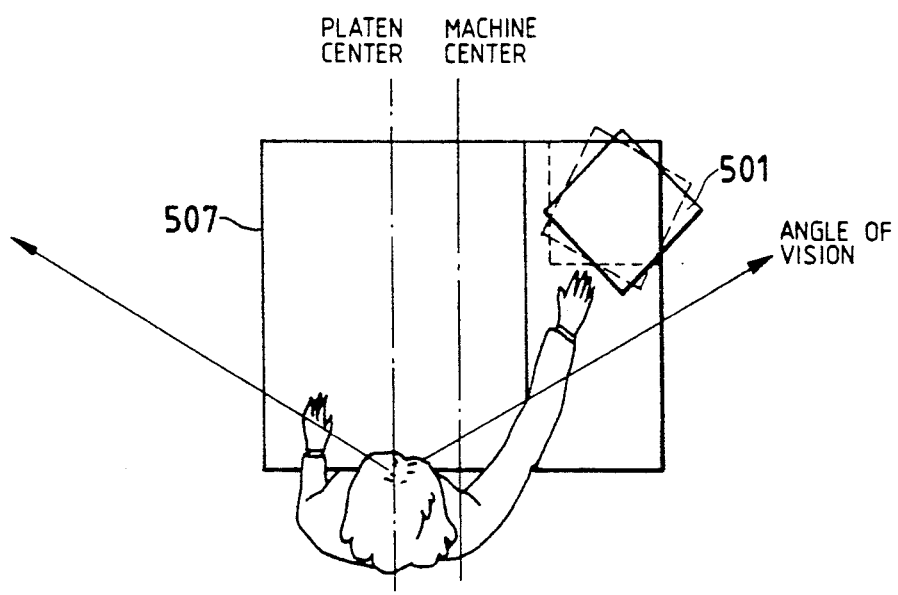
FIGS. 24(a) and 24(b) illustrate some examples for the setting of the angle and height for the installation of the UI.
Figure 24B:
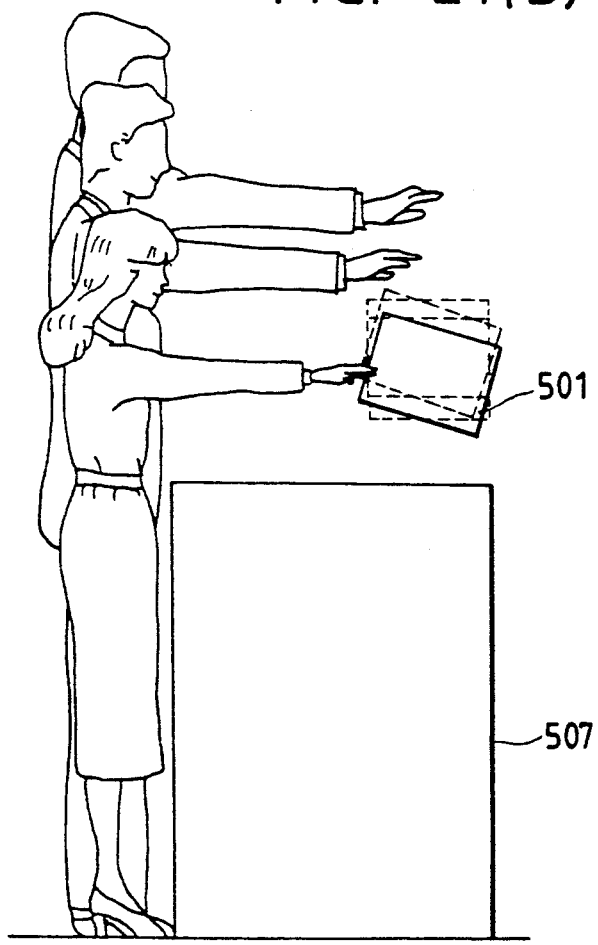

FIG. 23(a), 23(b), 23(c) show how a user interface (UI) using a display device is mounted and FIGS. 24(a) and 24(b) illustrate the angle and height of the user interface mounted to the base machine.

The user interface is a man-machine interface. It must be operable in a simple manner, and distinctively and impressively present necessary information to an operator. The user interface according to the present invention is user friendly and intelligible to beginners, and simple to use for experienced operators. The main interface allows a user to directly select desired functions, and exactly and quickly provides necessary information to operators by using colors, icons, and buttons.

Operability constitutes an important factor in evaluating the user interface. To improve the operability of the user interface, the user interface is provided with a color display or monitor 501 and a hard control panel 502 placed by the monitor, as shown in FIG. 23(a). A creative color display provides legible menus to users. Further, an infrared ray touch board 503 is disposed on the periphery of the color display 501. Use of the touch board allows a user to directly access the machine by soft buttons to be displayed in the display screen of the display 501. Various types of operations are properly assigned to the hard buttons on the hard control panel 502 and the soft buttons in the screen of the display 501 to provide simple operations and effective use of menu displays.

The color display 501 and the hard control panel 502 are provided on the rear side with a monitor control/power supply board 504, a video engine board 505, and a CRT driver board 506, and the like, as shown in FIGS. 23(b) and (c). As shown in FIG. 23(c), the hard control panel 502 is inclined toward the front of the display 501.

It is noted that the color display with the hard control panel 502 is placed atop a support arm 508 standing erect on the base machine 507, viz., not directly placed on the base machine. Since the stand type of the color display 501, not the console panel that is used in the conventional machine, is used, the display may be installed above the base machine 507. Particularly, when it is located at the right back corner, the copier may be designed without having to take the console panel space into account A compact copier may, therefore, be designed.

The platen or the base machine is waist high, which is best for a user to set an original on the platen table. This height limits the design freedom in selecting the height of the base machine. The conventional console panel is mounted on the top of the base machine. The console is placed substantially at the height of the waist, and access to the console panel by the hands is easy. However, the display and operating sections for selecting the various functions and for setting the conditions to execute the functions are relatively remote from the operator's eyes.

In the case of the user interface of the present invention, the display and operating sections are placed above the platen and more level with the operator's eyes. Such a placement makes it easy to operate the machine and provides additional space to accommodate the control board and option devices including a memory card device, a key counter, and the like. Accordingly, when a memory card device is assembled into the copying machine no structural and outer appearance modifications are required for the base machine.

(B) System Configuration

Figure 25:
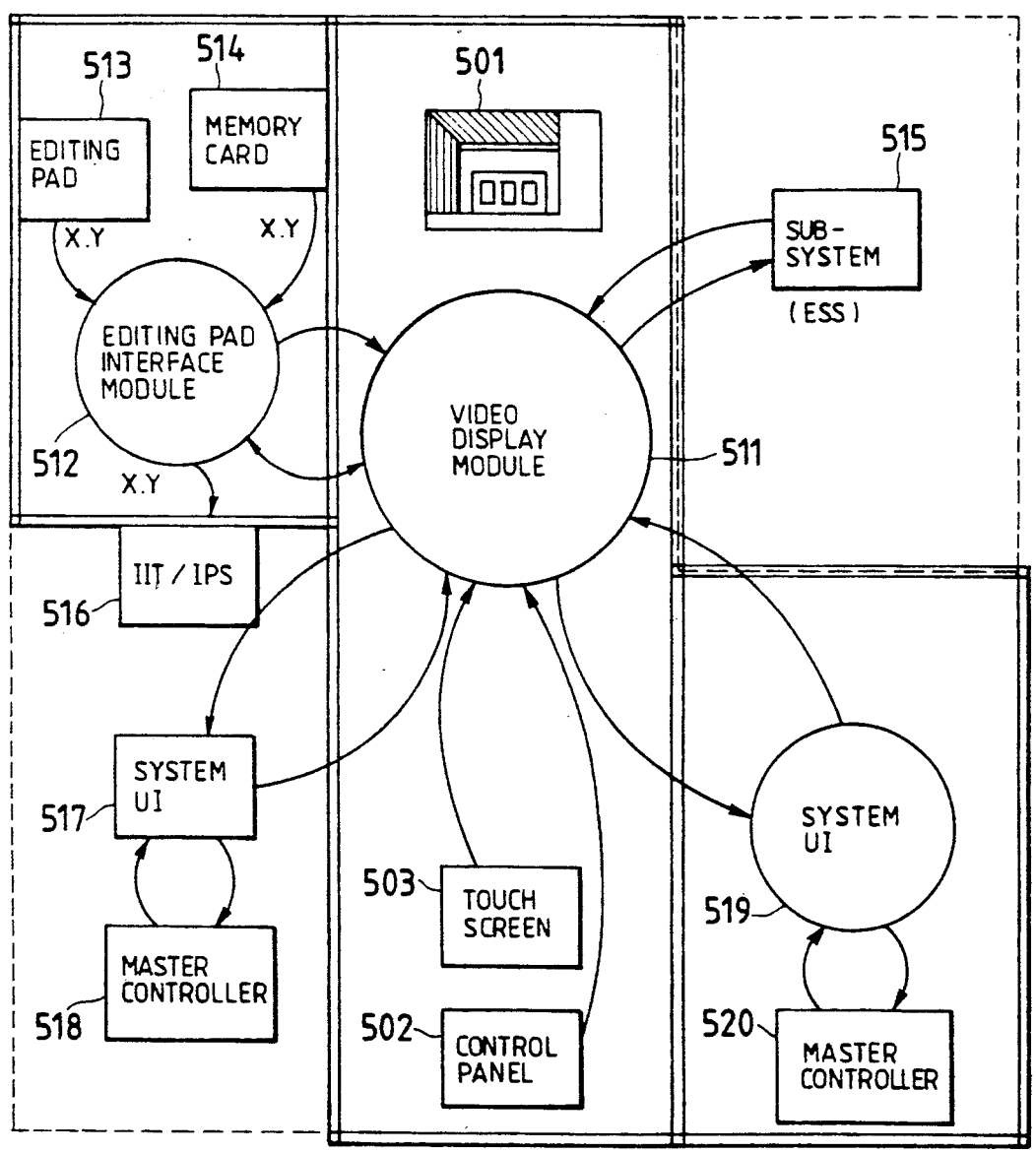
FIG. 25 illustrates the construction of the modules in the UI.
Figure 26:
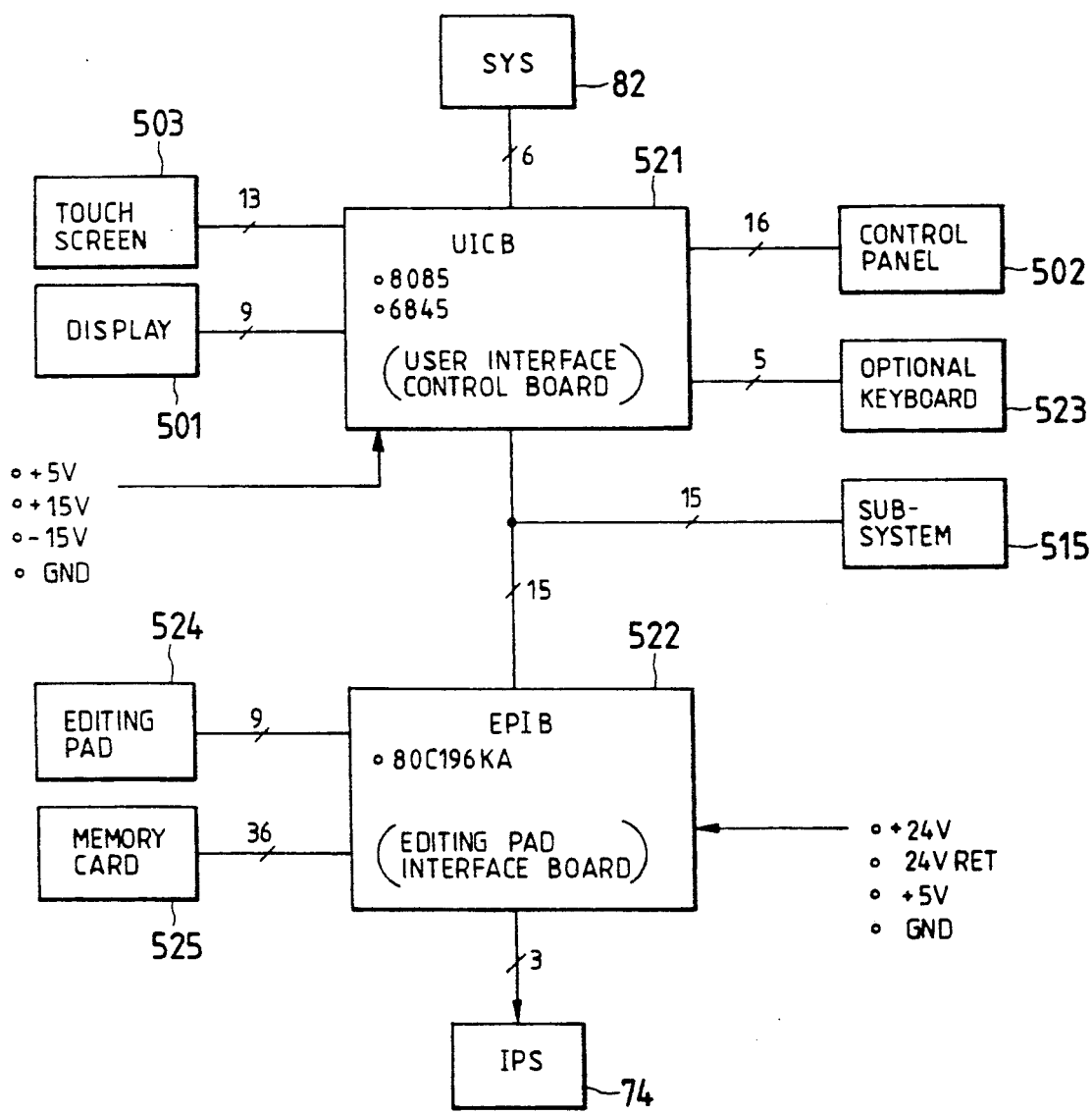
FIG. 26 illustrates the hardware construction of the UI.

FIG. 25 shows a module configuration of the user interface, and FIG. 26 shows a hardware configuration of the same.

As shown in FIG. 25, the user interface of the present invention is composed of a video display module 511 for controlling the display screen of the color display 501, and an edit pad interface module 512 for inputting and outputting an edit pad 513 and a memory card 514. System UIs 517 and 519 and a subsystem 515 for controlling the above modules, and a touch screen 503 and a control panel 502 are connected to the video display module 511. The edit pad interface module 512 enters X and Y coordinates data from the edit pad 513, and receives jobs and X and Y coordinates from the memory card 514, sends video map display data to the video display module 511, and transfers UI control signals to and from the video display module 511.

An area designation consists of a marker designation to designate a specific area on an original by a red or blue marker for effecting trimming and color change process, a 2 point designation by using coordinates data in a rectangular area, and a closed loop designation by tracing an edit pad. The marker designation has no data in particular. The 2 point designation is for designating a small amount of data. The closed loop designation needs a large amount of data for the area to be edited. The IPS is used for the editing data. The amount of the data is too large to transmit at high speed. For this reason, the transfer line connected to the IIT/IPS 516 and exclusively used for transmitting the X and Y coordinates data is provided separately from the ordinary data transmission line.

The video display module 511 enters vertical and horizontal input points (coordinate positions on the touch screen) on a touch screen 503, recognizes a button ID, and enters a button ID on the control panel 502. Further, the video display module 511 sends a button ID to the system UIs 517 and 519, and receives a display request from the system UIs 517 and 519. The subsystem (ESS) 515 is connected to a work station and a host CPU, for example, and serves as a print controller when the copying machine is used as a laser printer. In this case, the data of the touch screen 503, control panel 502, and keyboard (not shown) is transferred to the subsystem 515. The contents in the display screen are sent from the subsystem 515 to the video display module 511.

The system UIs 517 and 519 transfer the copy mode and machine state data to and from master controllers 518 and 520. In connection with the software architecture shown in FIG. 4, one of the system UIs 517 and 519 is the SYSUI module 81 in FIG. 4, and the other is the MCBUI module 86 of the MCB remote.

The hardware of the user interface according to the instant invention is made up of a couple of control boards, UICB 521 and EPIB522, as shown in FIG. 26. In connection with the above module configuration, the functions of the user interface are also categorized into two groups. The UICB 521 uses two CPUs, such as Intel 8085 and 6845 microprocessors or their equivalents in order to control the hardware of the UI, to drive the edit pads 513 and 514, and to process the received data of the touch screen 503 and to write the results on the CRT screen. The EPIB 522 uses a CPU of 16 bits such as 80C196KA made by Intel, and transfers the depicting data of the bit map area to the UICB in the DMA mode. The 16-bit CPU is used because a CPU of 8 bits is unsatisfactory to depict data in the bit map area. In this way, the many functions used are decentralized.

Figure 27:
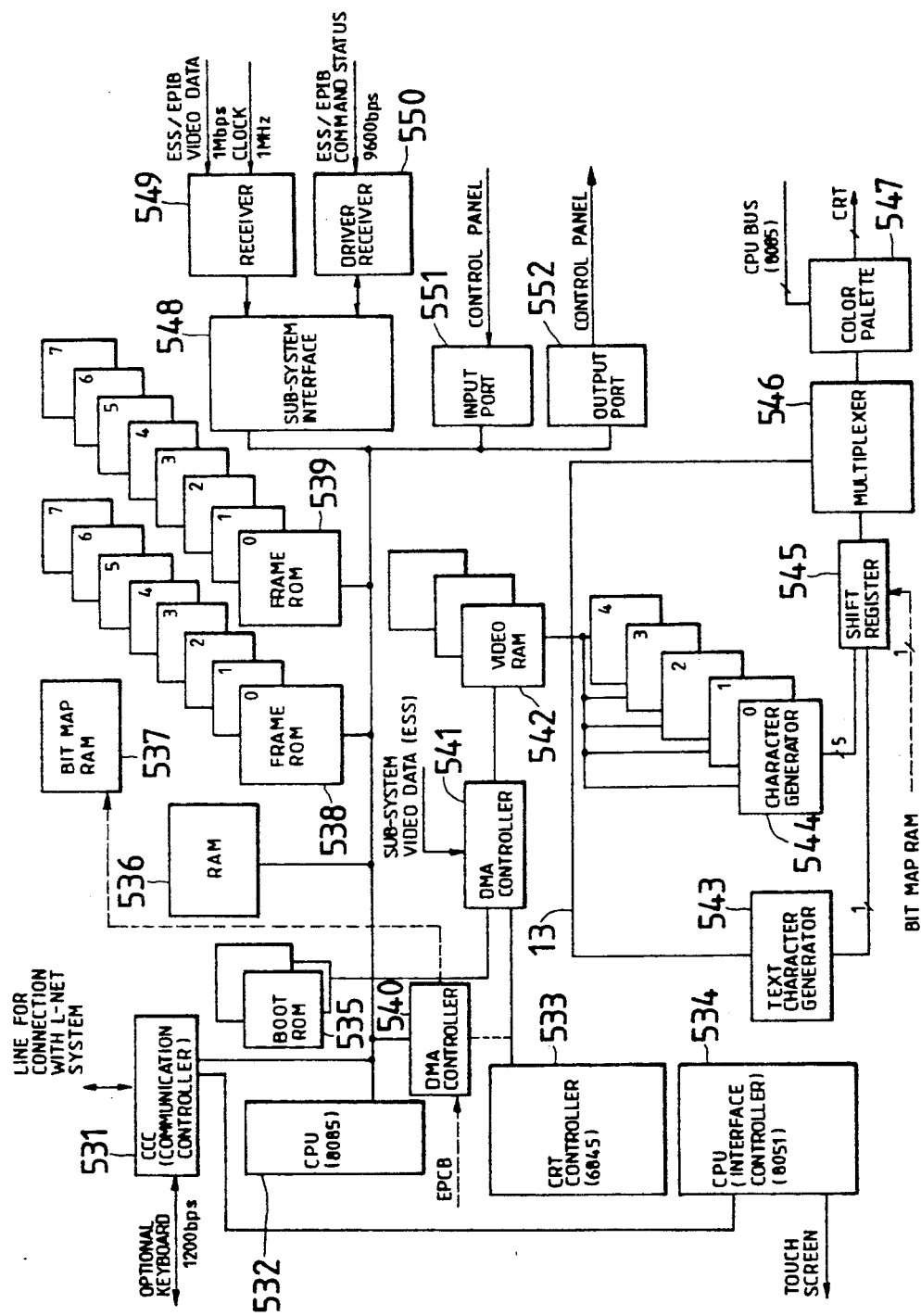
FIG. 27 illustrates the configuration of the UI CB.

FIG. 27 shows a circuit arrangement of the UICB. The UICB uses a CPU 534 such as an Intel 8051 or its equivalent, in addition to the above CPUs CCC 531 is connected to the high speed communication line L-NET or a communication line of an optional keyboard, and it controls the communication by the CPU 534 and CCC 531. Further, the CPU 534 is also used for driving the touch screen. The signals of the touch screen (the coordinate position data) are fetched through the CCC531 into the CPU 532 from the CPU 534. In the CPU 532, the button ID is recognized and processed. The UICB is connected to the control panel through an input port 551 and an output port 552. Further, it receives video data at 1 Mb/sec together with a 1 MHz clock signal from the EPIB 522 and the subsystem (ESS) through the subsystem interface 548, receiver 549, and driver 550, and is capable of transmitting and receiving commands and status data at 9600 bps.

The memories used are a boot ROM 535 storing a bootstrap program, frame ROMs 538 and 539, RAM 536, bit map RAM 537, and V-RAM 542. The frame ROMs 538 and 539 store the data with regard to the display screen whose data structure is not a bit map and, therefore, may be handled in the software, viz., not bit map. When a display request arrives through the L-NET, the CPU 532 generates depicting data in the RAM 536 that is used as a work area. The data generated is written into the V-RAM 542 by the DMA 541. The bit map data is transferred from the EPIB 522 to the bit map RAM 537, and written thereinto by the DMA 540. A character generator 544 is for a graphic tile, and a character generator, for a character tile. The V-RAM 542 is controlled by a tile code. The tile code consists of 24 bits (3 bytes). In the tile code, 13 bits are assigned to indicate the kinds of tiles; 2 bits to identify text, graphic or bit map; 1 bit for brink data; 5 bits for color data of the tiles; and 3 bits for data indicative of background or foreground. A CRT controller frames a display according to the tile code data that is stored in the V-RAM 542, and feeds the video data to the CRT screen by way of a shift register 545, multiplexer 546, and color palette 547. Depiction in the bit map area is changed by the shift register 545.

Figure 28:
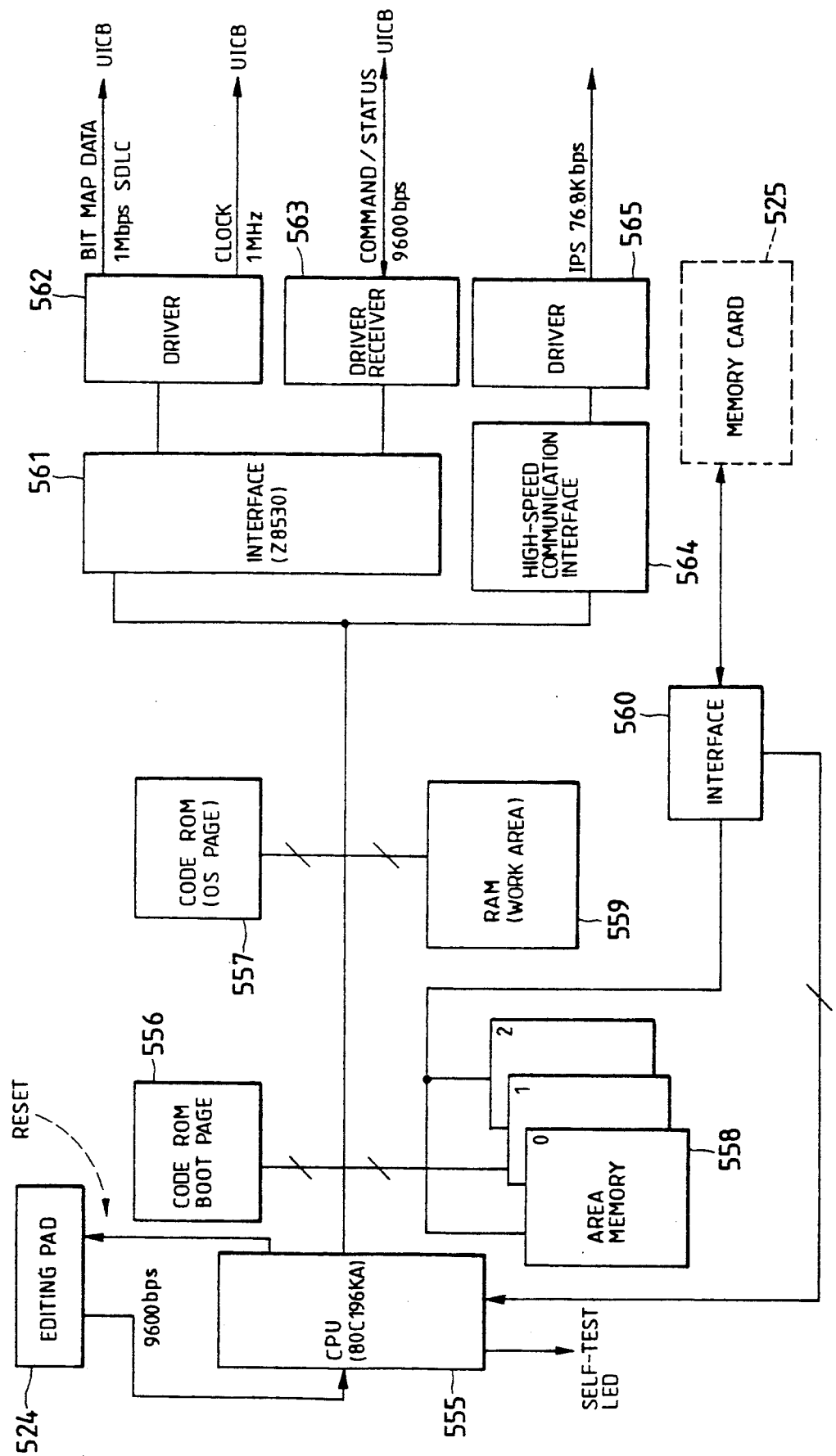
FIG. 28 illustrates the configuration of the EP IB.

FIG. 28 shows an arrangement of the EPIB. The EPIB is made up of a 16-bit CPU 555, such as on Intel 80C196KA or its equivalent, boot page code ROM 556, OS page code ROM 5557, area memory 558, and RAM 559 used as a work area. The EPIB transfers bit map data to the UICB, and transfers commands and status data to and from the same, through a driver 562 and a driver/receiver 563. Through a high speed communication interface 564 and a driver 565, the EPIB transfers X and Y coordinate data to the IPS. Data transfer to and from a memory card 525 is performed through an interface 560. Accordingly, when the EPIB receives the data to designate a closed loop edit area or copy mode data from the edit pad 524 or the memory card 525, the received data is transferred to the UICB through the interface 561 and the driver 562, and to the IPS through the high speed communication interface 564 and the driver 565.

(C) Effective Use of Display Screen

The case use of the display system for the user interface presents a large amount of data of the multi-functioning copying machine. The increased data requires a broad display area, but this is contrary to the concept of a compact machine. If a compact size display is used and all necessary data must be displayed in one display screen, the display density would be unacceptable and further, if it would be realized, the displayed items are illegible to operators.

In the present invention, creations are introduced into the display screen layout and its controls, enabling use of a compact display. The color display can provide various display modes by controlling many attributes of the display, for example, color, brightness, and the like. In this respect, the color display is superior to LEDs and LCDs used in the conventional console panel. By making use of the advantageous features, a legible display is obtained with a compact display unit.

For example, the information to be displayed on the display screen is categorized into a plurality of groups of information. These groups of information are displayed in a plurality of displays. With regard to one display, the detailed information is displayed in a pop-up manner, and is not displayed in the primary display screen. Accordingly, the display is concise and clear with only necessary information. For the display containing different items of information, color and emphatic indications are used so that the operator can readily and distinctly recognize the necessary information on the display screen from among the information.

a. Screen layout

Figure 29A:
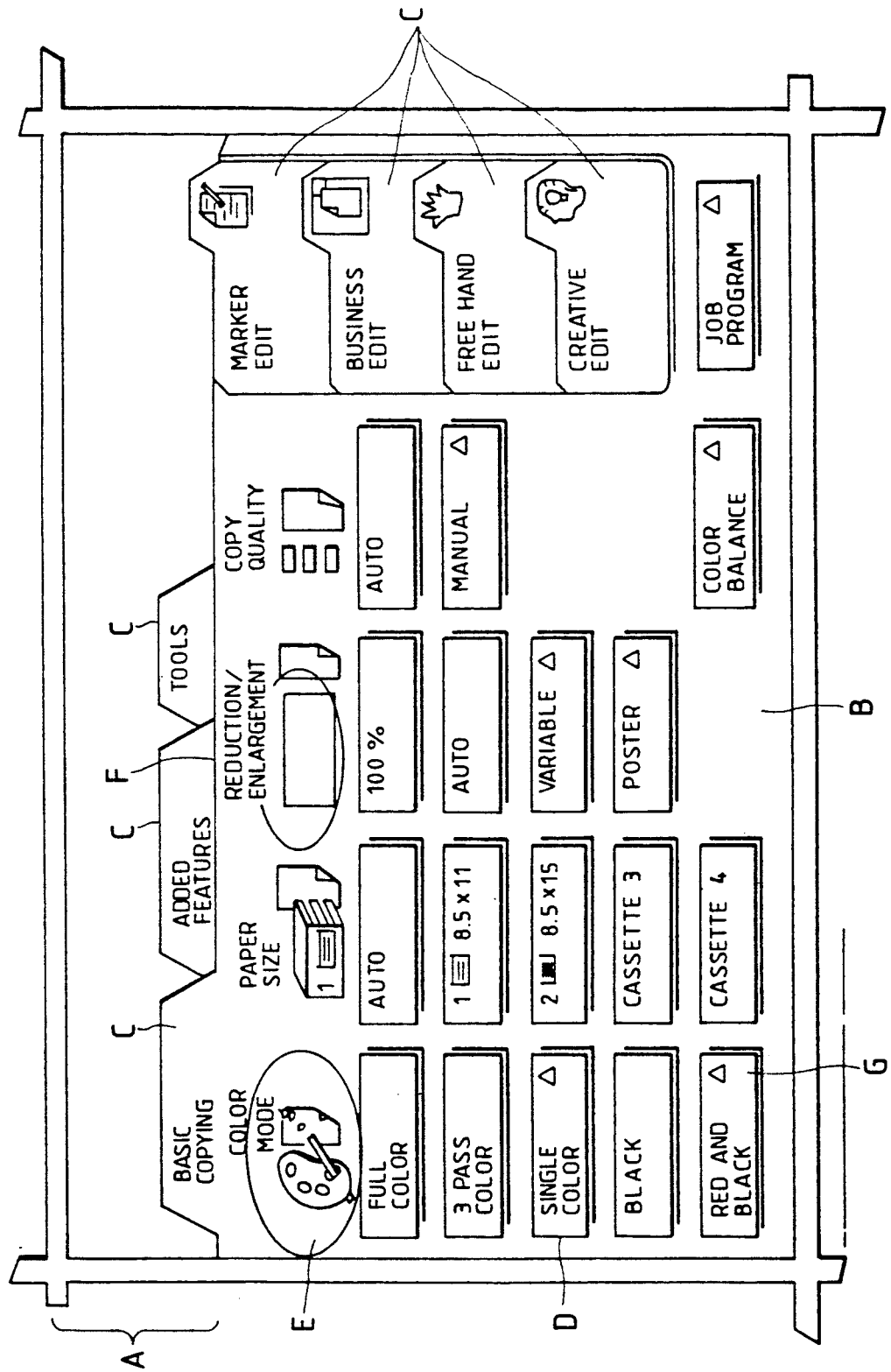
FIGS. 29(a) through 29(c) an example for the composition of the display screen.
Figure 29B:
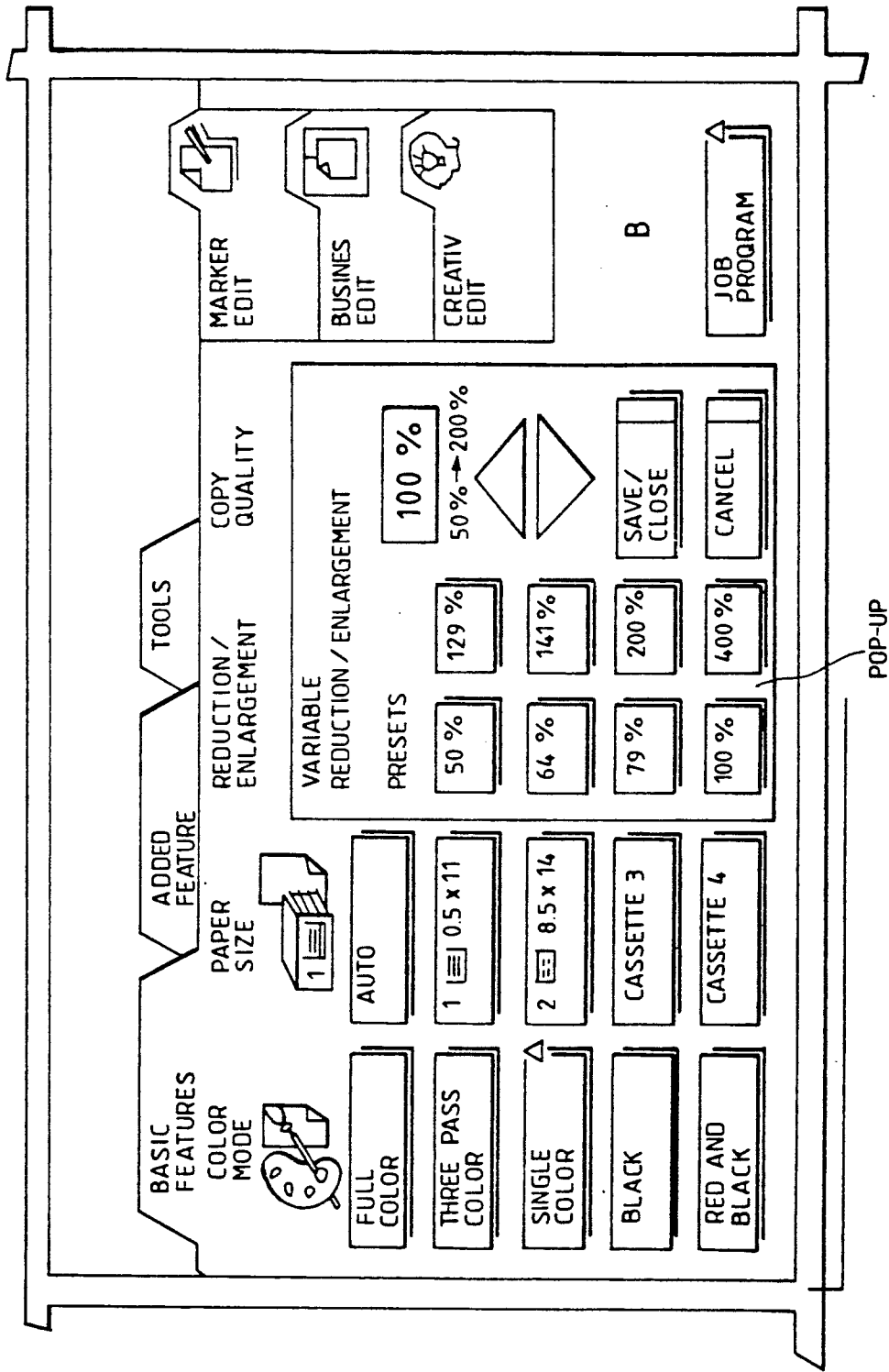
Figure 29C:
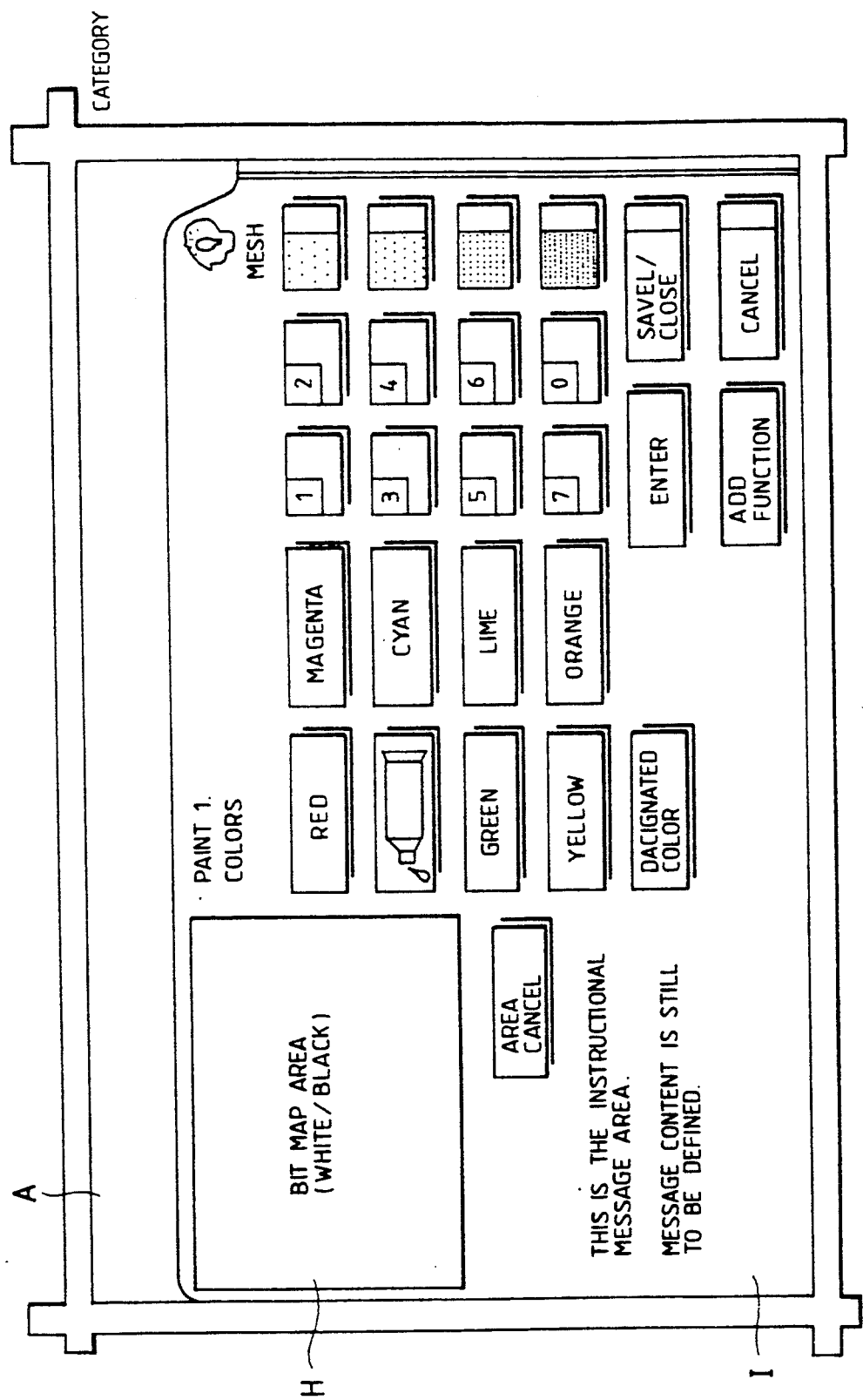

FIG. 29 shows some layouts of display screen. FIG. 29(a) shows a basic copy display. FIG. 29(b) shows a display in which a pop-up display is inserted in the basic copy display. FIG. 29(c) shows a paint 1 display of the creative edit.

In the user interface according to the present invention an initial display is the basic copy display for setting copy modes as shown in FIG. 29. The display for setting copy modes is divided into two sections, a message area A and a pathway area B, as shown in FIG. 29.

The message area consists of the upper three lines on the screen. The first line is for a statement message. The second and third lines are for various messages, such as a guide message when different functions are contradictively selected, a message showing a fault state of the machine, and an alarm message. The right end portion of the message area is used as an area for displaying the number of copies, such as the number of copies set by a ten key keypad, and the number of copies under copying operation.

The pathway area B is an area for selecting various functions, and contains many pathways of a basic copy, added feature, marker edit, business edit, free hand edit, creative edit, and tool. The pathway tabs C for those pathways are displayed. Each pathway uses a pop-up function for improving operability. The pathway area B further contains soft buttons D as choices for selecting functions by touching it by the finger, an icon (picture) E for indicating the function selected, and an indicator F for indicating magnification percentages. Those soft buttons with the pop-up functions are each marked with a pop-up mark G of delta (Δ). By touching the pathway tab C, the pass-way of the touched tab is opened. By touching the soft button, the function indicated by the touched soft button is selected. For gaining a good operability, the soft buttons D are arrayed so that for function select, those buttons are operated in the order from the left upper button to the right lower button The basic copy display and other displays are sorted to maximize a community between it and other devices, and between the soft panel and the hard console panel. Further, the edit displays each consist of a plurality of levels that can be selected in accordance with the degree of skill of the operator. Further, the pop-up function is used. Of those functions displayed, the functions requiring a high level of technique or complicated functions are displayed in a pop-up manner.

The pop-up display has detailed setting items data for a specific function. The display has a pop-up open function. To see detailed setting items data, the pop-up is opened. With this, the display of each pathway is easy to see and is simple. The pop-up display is opened by touching the soft button with the pop-up mark and is closed when a close button or a cancel button or an all-clear button are pushed, or when an auto clear function operates. A display shown in FIG. 29(c) appears when the reduction/enlargement function is selected, the pop-up display is opened by touching a variable reduction/enlargement soft button.

In the basic copy display, when the pathway tab for the creative edit is touched, the display is changed to the screen of the creative edit pathway. The display of paint 1 of those creative edit pathway displays is shown in FIG. 29(c). The display includes a bit map area H and an instructional message area I. The bit map area H is located in the left upper portion in the screen. When an edit area is designated by the edit pad, a single color bit map is displayed in the area. An instructional message area I is located in the lower left portion in the screen. By using this area, instructive messages for edit work are presented to the operator. As a matter of course, the message differs with the type of the edit work. In the screen, a work area occupies an area except for the bit map area H, instructional area I, and the message area A in the upper portion of the screen.

b. Basic copy display

As shown in FIG. 29(a), the pathway for the basic copy includes soft buttons (choices) for selecting the color mode, paper select, reduction/enlargement, copy image quality, color balance, and job program, and the pathway tabs for the maker edit, business edit, freehand edit, and creative edit, and the edit feature and tool. This pathway is an initial pathway as is displayed after power on and when an auto clear mode is set up by pushing the all clear button.

The color mode consists of five modes, a full color (4 pass color) mode using four colors Y, M, C, and K for copy, 3-pass color mode using three colors except color K, single color mode using a single color selected from among 12 colors, black mode, and black/red mode. A default automatically selected may be set appropriately. The single color mode and the black/red mode have detailed setting items. Accordingly, these modes are displayed in a pop-up code.

The paper select mode consists of an automatic paper select (APS), tray 1 and tray 2, cassette 3 and cassette 4. The APS functions when a specific magnification is set in the reduction/enlargement mode, and does not function when an auto magnification select (AMS) mode is set up. The default is the APS.

The reduction/enlargement mode has two choices, 100%, an AMS for determining a magnification on the basis of document size and paper size when paper of a specific size is set, and a variable magnification select. In this mode, a set, calculated on auto magnification is indicated by the indicator on the top. In the variable magnification select, a magnification may be set in steps of 1% in the range from 50% to 400%. The magnifications in the vertical and the horizontal directions may independently be set. Accordingly, these detailed items are displayed in the pop-up mode. The default is 100%.

In respect to the reduction/enlargement, as described above, the magnification in the vertical scan direction (X direction) is adjusted by controlling the scan speed. The magnification in the main scan direction is adjusted by changing the method of reading data from the line memory in the IPS.

The copy image quality consists of two choices, an auto mode and a manual mode. In the auto mode, an optical density is automatically controlled for a mono color document, and a color balance is automatically controlled for a color document. In the manual mode, the pop-up technique is used for controlling the optical density of the document in seven steps. The control is carried out by the IPS.

The job program is effective only when a memory card is inserted into a slot of the card reader. In this mode, jobs can be written into and read out of the memory card. The memory card used in this instance has 32K bytes and is capable of storing a maximum of 32 jobs. Accordingly, all other jobs than that of the projector mode can be programmed.

c. Edit feature display

The pathway of the bit feature display includes soft buttons (choices) for selecting a copy output, copy sharpness, copy contrast, copy position, film projector, page programming, job program, and binding margin, and the pathway tabs for the maker edit, business edit, freehand edit, and creative edit, and the basic copy and tool.

The copy output has two choices, a top tray and a sort mode. The default is the top tray, and when no sort mode is used, this item is not indicated.

The copy sharpness has three choices; standard, manual, and photo. In manual mode, the pop-up display is used and control in 7-steps is possible. In the photo mode, the pop-up display is used. It contains items of photo, character, print and photo/character. The control for this is carried out in the IPS.

The copy contrast has a copy contrast control in seven steps. The copy position has a choice of an auto center function in which the center of the copy image is positioned at the center of paper by the default.

The film projector is used for copying images on various kinds of films, and will be described in detail later. The pop-up display is used for selecting any of 35 mm negative and 35 mm positive by the projector, and 35 mm nega. 6 cm×6 cm slide, and 4"×5" slide on the platen.

The page programming has choices of cover mode for applying a cover to copies, insert mode for inserting white or color paper into copied papers, color mode to set color copying for every page of the document, and paper to select a desired tray for every page of the document. This item is not displayed when the ADF is not set up.

In the binding margin mode, the margin may be set in steps of 1 mm in the range of 0 to 30 mm. The binding margin designates one location for one document. The length of the binding margin is from the lead end of the paper to the lead end of an image area. The length of the margin in the main scan direction is adjusted by a shift operation by the line buffer in the IPS. The length of the margin is adjusted by shifting the scan timing of the IIT.

d. Edit display and tool display

The edit display consists of four pathways, the marker edit, business edit, free hand edit, and creative edit.

The marker edit pathway and the free hand pathway have choices of extract, delete, color application (mesh/line/solid), and color change. Further, it has pathway tabs of a basic copy, edit feature, and tool.

The business edit pathway has choices of extract, delete, color application (mesh/line/solid), color conversion, coloring, logotype insertion, and binding margin. Further, the business edit, like the marker edit pathway, etc., has pathway tabs of a basic copy, edit feature, and tool.

The creative edit pathway has choices of extract, delete, color application (mesh/line/solid), color conversion, coloring, logotype insertion, binding margin, negative/positive inversion, inlay composition, transparency composition, paint, reflected image, repeat, enlargement, continuous projection, partial movement, corner/center movement, manual/auto one-side magnification, color mode, color balance control, page continuous copy, and color composition. Further, the creative edit, like the marker edit pathway, etc., has pathway tabs of a basic copy, edit feature, and tool.

The tool pathway is used by key operators and customer engineers. This pathway is opened by entering a password. Choices of the tool pathway are: an auditron, machine initial value set-up, select of default of the respective functions, color registration, film type registration, fine adjustment of registered color, preset of the respective choices of the machine, setting of a film projector scan area, audio tone (kind of tone and volume), setting of timers for the paper transport system and others (auto clear, etc.), billing meter, setting of dual languages, diag. mode, max. control value, and memory card format.

The default select is directed for the color mode, paper select, copy density, copy sharpness, copy contrast, paper tray for page programming, color of the single color, color and mesh of a color palette for color application, pattern of a logotype, binding margin, and color balance.

e. Other display controls

In the user interface, progress of the copying operation is constantly monitored. When jamming occurs, the user interface displays the jamming occurrence. In respect to the function settings, an information display for presenting the information of the current display is provided, which is ready for display at all times.

The displays except the bit map area are composed of tiles whose width is 3 mm (8 pixels) and height is 6 mm (16 pixels). The width of each display is 80 tiles and the height is 25 tiles. The bit map area is displayed with pixels and its height is 151 pixels and width is 216 pixels.

As described above, the user interface is arranged such that the functions are categorized into different modes such as the basic copy, edit feature, and edit. The displays are assigned to those modes, and accordingly, the display is changed in accordance with the mode used. The display of each mode presents items of function select, setting of conditions for function exercise, and the like. For exercise of a function, a choice is selected by pushing the related soft button. Necessary condition data can be entered while seeing the display. Some of the choices in the menu are displayed in the form of a pop-up display (overlay display or window display). Use of the pop-up display provides a concise and easy-to-see visual presentation, even if the number of selectable functions and conditions settings is large. Accordingly, the operability of the copying machine is improved.

(D) Hardware Control Panel

The hardware control panel, as shown in FIG. 23, is disposed on the right side of the color display panel, and is slightly bent toward the center. The control panel is provided with various buttons of ten keys, ten key clear, all clear, stop, interrupt, start, information, audiotron, and language.

The ten key buttons are used to set the number of copies, to enter codes and data, and to enter a password when the tool is used. These buttons are invalid when a job occurs or it is interrupted.

The all clear button is used to return all of the copy modes to default values, and to return the displays to the basic copy display except when the tool display is opened. When an interrupt job is being set, the copy mode returns to the default, but the interrupt mode is not removed.

The stop button is used to interrupt the job at a proper place to end in the copy during the execution of copying operation, and to stop the machine after the copied paper is delivered outside. In the diag. mode, it is used to stop (interrupt) the input/output check.

The interrupt button is used to set up an interrupt mode during the primary job except when the job is interrupted, and returns control to the primary job when control is being interrupted. When this button is operated during the execution of the primary job, the machine is placed into a reserve mode, and the job is interrupted or ends at the end of delivering the copied paper.

The start button is used to start the job or to restart the interrupted job. In the diag. mode, it is used to enter and save codes and data, and to start the inputting and outputting of the same. When the machine is being preheated, if this button is operated, the machine automatically starts at the end of preheating.

The information button consists of an on button and an off button. These buttons are in a ready state except the progressing of copying operation. When the on button is operated, an information display for the display being currently presented appears. To remove the information display, the off button is operated.

The auditron button is used to enter a password at the start of a job. The language button is used to select a desired language of expressions in the display from among a plurality of languages. The hard control panel is also provided with LEDs for indicating operations of the respective buttons.

(II-5) Film Image Reader (A) General

The film image reader, as shown in FIG. 2, is composed of a film projector (F/P) 64 and a mirror unit (M/U) 65.

a. File Projector (F/P)

Figure 30:
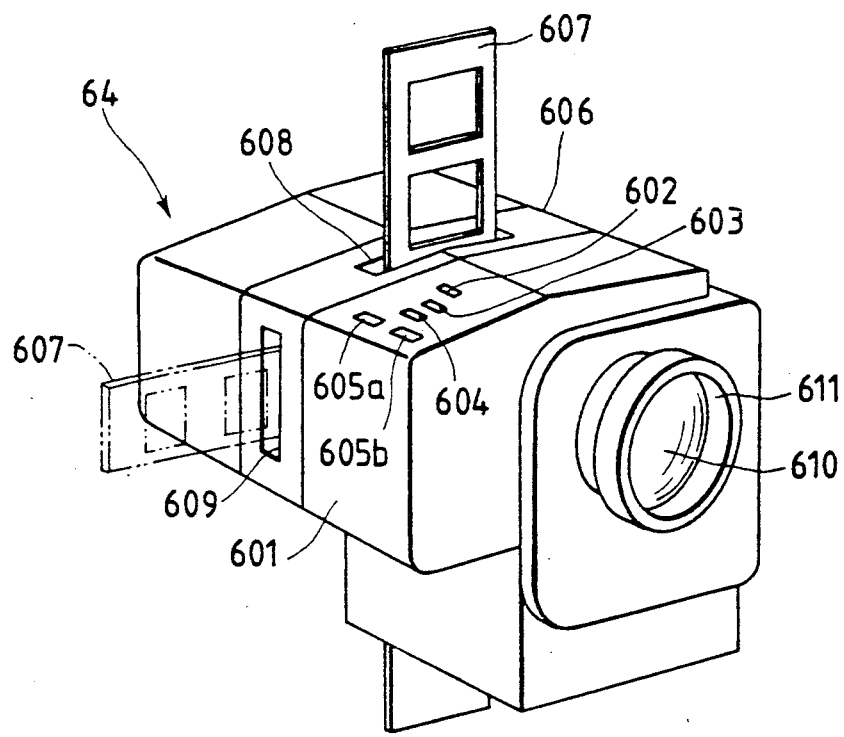
FIG. 30 is a perspective view of the F/P.

As shown in FIG. 30, the F/P is provided with a housing 601. The housing 601 is further provided with an operation check lamp 602, manual lamp switch 603, auto focus/manual focus (AF/MF) select switch 604, and manual focus (M/F) operation switches 605a and 605b. The housing 601 is further provided with an open/close member 606 swingable for opening and closing. Slots 608 and 609 are formed in the upper surface and the sidewall of the open/close member 606. A film holder 607 holding an original film 633 is inserted into the housing 601 through either of these slots. In use, these slots are selectively used in accordance with the orientation of the image recorded in the film 633. Slots (not shown) are additionally formed in the bottom surface and the wall opposite to the above. Through these slots, the film holder 607 may be ejected. The open/-close member 606 is hinged to the housing 601 or removably mounted to the housing 601. With provision of the open/close member 606 thus mounted, when foreign material enters the housing 601, an operator opens the member 606, and may remove the material.

In this instance, two types of film holders are used, one for 35 mm negative film, and the other for 35 mm positive film. The F/P 64 accepts these types of films, and further negative films of 6 cm × 6 cm and 4″ × 5″. In the case of negative film, it is placed close between the M/U 65 and the platen glass 31.

Figure 33:
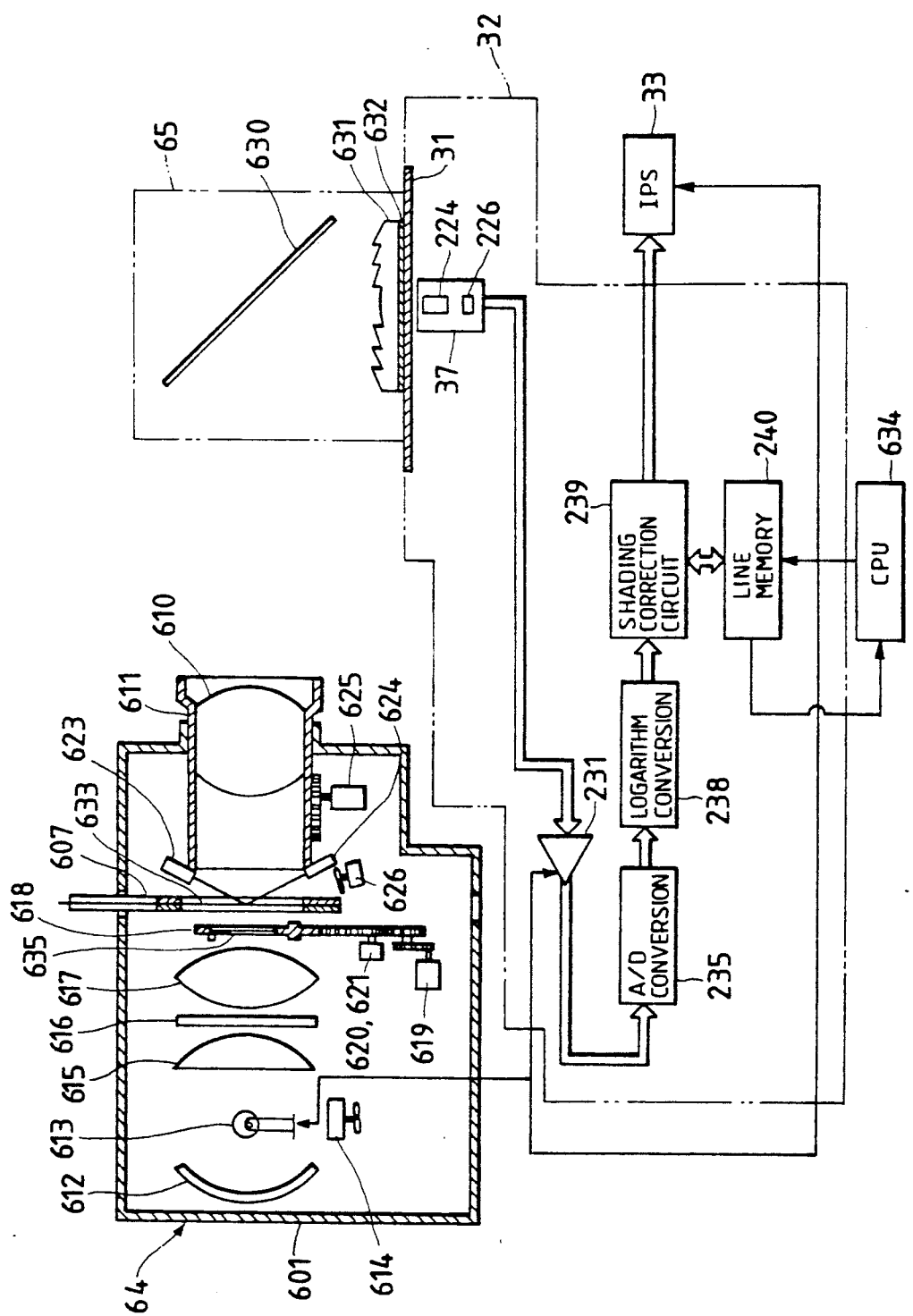
FIG. 33 illustrates in outline the configuration of the F/P and also explains the relations between the F/P, the M/U and the IIT.

As shown in FIG. 33, a lens holder 611 holding a projection lens 610 is slidably supported in the right portion of the housing 601 as viewed in the drawing.

Within the housing 601, a reflector 612 and a light source lamp 613 such as a halogen lamp is disposed in alignment with the projection lens 610 with respect to an optical axis. A cooling fan 614 for cooling the lamp 612 is disposed near the lamp 613. An aspheric surface lens 615 for converging rays of light from the lamp 613, heat wave absorbing filter 616 for cutting off the light of a predetermined wave length, and a convex lens 610 are disposed on the right side of the lamp 613 and in alignment with the same with respect to the optical axis.

An auto exchanger for correction filter is installed on the right side of the convex lens 617. The auto filter exchange includes a correction filter holder 618, motor 619, first and second position sensors 620 and 621, and controller (not shown, but is housed in the F/P 64). The filter holder 618 holds a correction filter 635 for correcting the film density of the 35 mm negative film and the positive film. The correction filter illustrated is for one of the two types of films. The motor 619 drives the filter holder 618.

The first and second position sensors 620 and 621 are for detecting angular displacements of the filter holder 618. In use, a correction filter corresponding to the original film 633 is automatically selected from those contained in the filter holder 618, and is aligned with the projection lens 610 and other lenses with respect to the optical axis. The auto filter exchanger 635 may be any other place than the above, if it lies on an optical axis of the projection light, for example between the platen glass 31 and the imaging unit 37.

An auto focus device is further installed, which is composed of a light emitting means 623 such as a photo diode and a photo sensor 624 that operate in connection with the lens holder 611, and a motor 625 for sliding the lens holder 611 of the projection lens 610 with respect to the housing 601. When the film holder 607 is inserted through the slot 608 or 609 into the housing 601, the original film 633 contained in the film holder 607 is positioned between filter holder 618 and the paired photo diode 623 and photo sensor 624. A fan 626 for cooling the original film 633 is located near the place where the original film 635 is set.

A power supply for the F/P 64 is different from that for the base machine 30, but may be installed within the base machine 30.

b. Mirror Unit (M/U)

Figure 31:
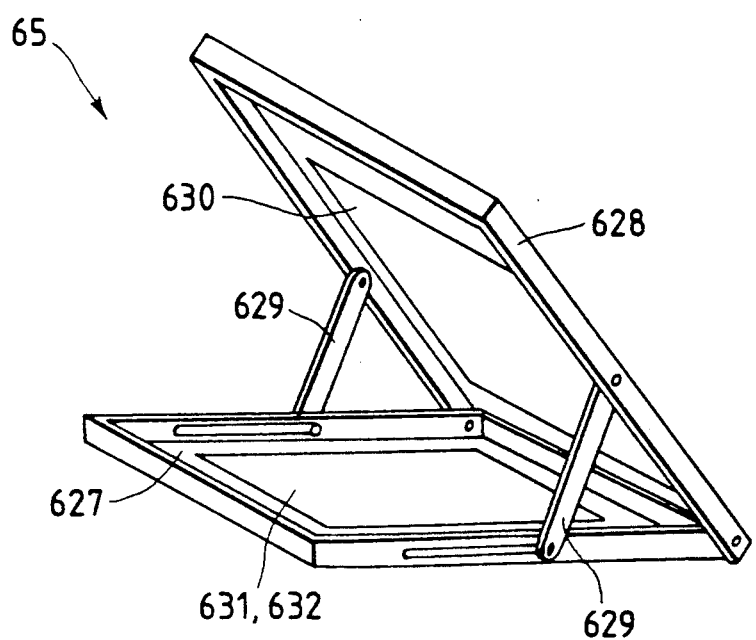
FIG. 31 is a perspective view of the M/U.

As shown in FIG. 31, the mirror unit (M/U) 65 is made up of a bottom plate 627 and a cover 628 swingably mounted at one end of the bottom plate 627. Supports 629 are coupled between the bottom plate 627 and the cover 628. The supports 629 support the cover 628 at 45° with respect to the bottom plate 627 when the bottom plate is fully opened. A mirror 630 is mounted to the rear side of the cover 628. The bottom plate 627 has a large opening which is filled with a fresnel lens 631 and a diffusion plate 632.

As best illustrated in FIG. 33, the fresnel lens 631 and the diffusion plate 632 are formed by a single acrylic plate. The top surface of the acrylic plate constitutes the fresnel lens 631, and the bottom surface constitutes the diffusion plate 632. The fresnel lens 631 converts the light reflected from the mirror 630 that otherwise will spread out, into parallel rays of light to prevent the peripheral portion of an image from being darkened The diffusion plate 632 slightly diffuses the parallel rays of light to an extent to prevent the line sensor 226 from detecting a shadow of the selfoc lens 224 within the imaging unit 37.

When the color copying using the F/P 64 is not selected, the mirror unit 65 is folded and stored in a given storage place. In use, it is opened and placed at a predetermined location on the platen glass 31 of the base machine 30.

(B) Major Functions a. Auto exchange of correction filter

The halogen lamp as is generally used as the light source lamp 613 of the F/P 64 has a spectral characteristic of more red (R) than blue (B). When, with the light emitted from the halogen lamp, an image on a film is projected, a ratio of red (R), green (G) and blue (B) of the projection light is influenced by the spectral characteristic of the lamp. Therefore, some correction of the spectral characteristic of the halogen lamp must be made.

A variety of the film recording images exist, such as negative films and positive films. The negative and positive films per se each consist of many types of films. These films are featured by their own spectral characteristics, respectively. For example, in the case of the negative film, the transmittance of R is high and the transmittance of B is low. Accordingly, for negative film the spectral characteristic must be corrected to increase the amount of blue light.

The F/P 64 is provided with a correction filter effecting such a correction of the spectral characteristic. In the F/P 64, these correction filters are automatically exchanged by the auto filter exchange as already discussed. More specifically, a microprocessor (CPU) in the system (SYS) issues a 2-bit command signal to set a correction filter corresponding to the original film 633 at a predetermined position. In response, the controller drives the motor 619 so that 2-bit signals derived from the first and second position sensors 620 and 621 coincide with the 2-bit command signal from the CPU. When these signals are coincident, the controller stops the motor 619 and the correction filter corresponding to the original film is automatically set at the predetermined position. In this manner, the correction filter can be exchanged readily and exactly.

b. Original film inserting direction detection

The original film 633 may be inserted into the housing through either of the slots 608 and 609. In other words, in accordance with the orientation of the image of the film, the film may be inserted into the housing vertically or horizontally. In this case, at least one of the slots 608 and 609 is provided with a film detecting switch. In other words, at least one film detect switch is provided. If the slot 608 has the film detect switch, the film holder 607 is inserted through the hole 608, detect the film and to turn on and produce a detect signal. When the detect signal is present, a necessary area of the line sensor 226 is vertical, that is, the scanning direction is set to be coincident with the longitudinal direction of the projection image. When the film holder 607 is inserted through the slot 609, the switch is in off state and no detect signal is produced. When the detect signal is absent, the necessary area is lateral, viz., the main scan direction is set to be in the longitudinal direction of the projection image.

Also, when the film detect switch is provided in the slot 609 alone, or both the slots 608 and 609 have switches, when the film holder 607 is inserted through the slot 608, the necessary area of the line sensor 226 is set so that the vertical scan direction is in the longitudinal direction of the projection image. When the film holder 607 is inserted through the slot 609, the necessary area of the line sensor 226 is set so that the main scan direction is in the longitudinal direction of the projection image. That is, the on and off signals of the film detect switch are set so as to set up the above operations.

c. Auto focus (AF) function

When the film holder 607 is set to the F/P 64, the original film 633 must be positioned with a precision of several tens mm. Therefore, after the original film 633 is set, a focusing operation is required. To manually effect the focusing, an image of the original film 633 is projected onto the diffusion plate 632 of the M/U 65, an operator slides the projection lens holder 611 for focusing, while seeing the projection image. In this case, the image projected onto the diffusion plate 632 is hard to see and therefore, it cannot be expected that exact focusing is attained. To cope with this, the F/P 64 is arranged to automatically focus the projection image when it is set to the F/P 64.

The AF function is exercised by the AF in the following way. A related key on the display of the U/I 36 is operated to set up an F/P mode. The photo diode 623 emits light. In FIG. 30, the AF/MF select switch 604 is set to the AF side. The AF is ready for operation. As shown in FIG. 33, when the film holder 607 containing the original film 633 is set, the light from the photo diode 623 reflects at the original film 633. The reflected light is detected by the photo sensor 624 of the two element type, for example, for the AF purposes.

The two elements of the photo sensor 624 produces signals amounting to the amount of the reflected light, and applies it to a CPU 634. The CPU 634 calculates a difference of these signals. When the difference is not 0, the CPU produces a signal and drives the motor 625 in the direction to reduce the difference. With the rotation of the motor, the projection lens holder 611 slides. With the sliding of the lens holder, the photo diode 623 and the photo sensor 624 both move. When the difference between the signals of the sensors is reduced to 0, the image is in focus and the CPU 634 stops the motor 625.

In this way, the AF operation is carried out. As seen from the above, when the film holder containing the original film is loaded into the F/P 64, the focusing is automatically carried out without any assistance of any manual operation. Consequently, the focusing operation is free from trouble due to manual operation and improperly focused copies are avoided.

d. Manual focusing (MF) function

To exercise this function, the AF/MF select switch 604 is set to the MF side, and the lamp 613 automatically lights up for a predetermined period of time, to set up an MF mode. In this mode, an operator operates the switches 605a and 605b while observing the projection image on the diffusion plate 632. Through the MF, the film image is focused at a specific portion.

e. Manual turn-on of light source lamp

When a manual lamp switch 603 is pushed, the lamp 613 is turned on. The switch is not used in normal mode, but is used for back lighting to copy an image recorded on a relatively thick original including paper, films, and the like, to view a projection image for a long period of time in the AF mode, and to check if the lamp is working.

The instant copying machine is so arranged that by setting the paper size by the U/I 36, an optimum paper size is automatically selected. Additionally, when the kind of film used is selected by the U/I 36, a copy area is automatically selected in accordance with the kind of film.

f. Automatic changing of magnification and scanning area

The system is designed to automatically set the proper copy magnification with respect to the paper size selected via the U/I 36. Moreover, the system is capable of automatically selecting the proper copy area with respect to the type and size of film selected via the U/I 36.

g. Automatic shading correction

The ROM of the CPU 634 prestores density data of the orange mask of the ASA 100 of each of negative films produced by FUJI (trade mark), KODAK (trade mark) and KONICA (trade mark). When one of these films is selected, the CPU 634 automatically makes the shading correction on the basis of the density data stored in the ROM. In this case, there is no need for loading the base film of that film into the F/0 64. Further, density data of the orange mask of one type of film other than the above three types of films can be recorded. This data is stored into the RAM in the system of the copying machine.

h. Automatic image quality adjustment

Corrections, for example, gamma (F) correction are performed on the basis of various conditions such as the density characteristic of the original film and exposure conditions at the time of film-recording. Density control and color balance adjustments are automatically carried out.

(C) Image Signal Processing a. Need and principle of image signal correction

Generally, the image density range of a film is broader than that of a document. The density range differs with the type of film. For example, the density range of positive film is broader than that of negative film. Further, the density range of film depends on film-recording conditions such as exposure light amount, density of an object to be photographed, and brightness at the time of photographing. Actually, the density of the object is broadly distributed over the entire density range of the film.

When the image recorded in the film with the above density characteristic is copied by a copying machine using the light reflected from the image on the film, if the same signal processing as that for the ordinary document copying is used, the reproduced image is unsatisfactory in quality. To cope with this, correction is applied to the read image signal so as to have proper densities for major objects.

Figure 32:
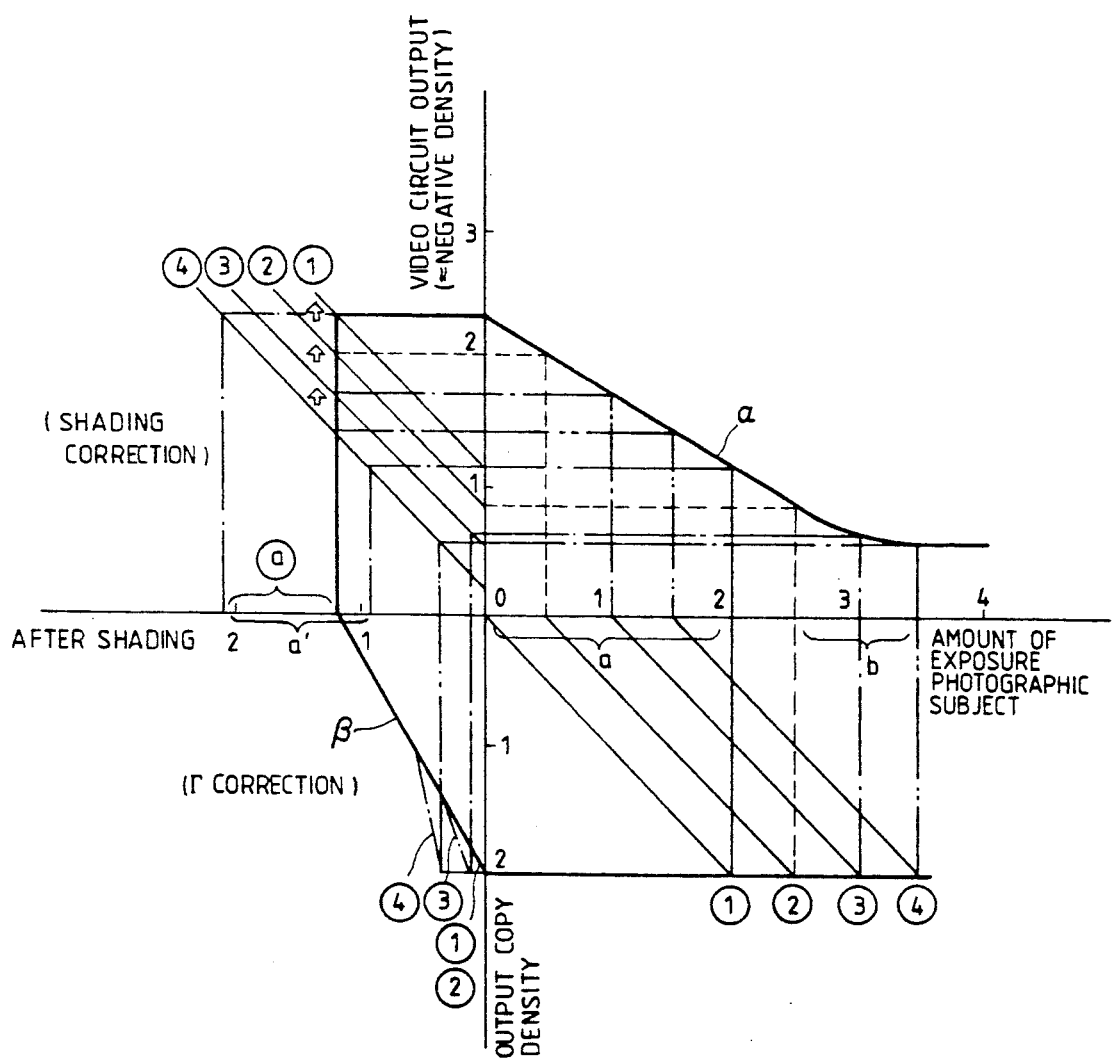
FIG. 32 explains the density characteristics and the principle of correction of a negative film.

FIG. 32 graphically illustrates the density characteristic of negative film and the principle of its density correction. In the figure, the right half of the abscissa represents the amount of exposure light applied to the object (corresponding to a density of the object), and the left half represents density after the shading correction. The upper half of the ordinate shows video circuit output (approximately equal to the density of negative film), and the lower half shows the density of the output copy. Thus, the first quadrant shows a density characteristic of a negative film; the second quadrant, shading correction; the third quadrant, gamma ($\Gamma$) correction; and the fourth quadrant, the relationship of exposure light amount vs. density of an output copy.

The density characteristic of the negative film is represented by a line "a". As shown, when the amount of the exposure light from the object is large, the density of the negative film is large. As the exposure light amount becomes small, the density of the negative film becomes linearly small. When the amount of the exposure light from the object decreases to or below prescribed a value, the linear relationship between the exposure light amount and the density of the negative film is lost. When the exposure light amount is small, contrast problems are created, and, for example, the contrast of the face and hair is lost. Also, when the exposure amount is large, if the inclination of the line "a", viz. the gamma ($\Gamma$) value is less than 1, and correction is not made, the resultant copy is soft. It is for this reason that gamma ($\Gamma$) correction is needed.

The principle of gamma ($\Gamma$) correction will be described with reference to FIG. 32. As shown, an END curve "B" is present in the third quadrant. An inclination gamma ($\Gamma'$) of the END curve "B" is selected to be $1/\Gamma$ in order that a relationship between the amount of exposure light from an object to be copied and the output copy density is expressed by a straight line inclined at 45°.

It is now assumed that in the region "a" where the exposure light amount is relatively large, a density adjustment value set in the register of the shading correction circuit is expressed by a straight line (4). In this case, the density after shading correction lies in the region "a'." This region "a'" is out of the conversion region by the END curve "B". Therefore, a portion of the reproduced image corresponding to this region is smeared with white. To avoid this, the straight line (4) representative of the density adjusting value is shifted to the straight line (1) so that the density after the shading correction falls within the conversion range by the END curve. If the density adjusting value is so set, the relationship between the exposure light amount and the output copy density traces a straight line (1) in the fourth quadrant. The copied image has a gradational density. In a region "b" where the exposure light amount is relatively small, the relationship between the exposure light amount and the negative film density loses its linearity. In this case, the density adjusting value of the shading correction circuit is changed to a straight line (4) in the second quadrant. When the exposure light amount lies in the region "b'" and an image of a person with black hair and wearing a brown hat is copied, the densities of the hair and the hat are substantially the same, and the resultant copied image has a good contrast between the hair and th hat.

b. Method of Image Signal Processing

As shown in FIG. 33, the line sensor 226 reads a projection light of an image on the document film 633 in the form of the amounts of color lights of R, G, and B, and produces analog signals representative of them. The analog image signals representing the light amounts are amplified by an amplifier 231 up to preset levels. The amplified image signals are digitized by an A/D converter 235. The digital signals indicative of the light amounts are then converted into signals indicative of densities by a log converter 238.

The density image signals are subjected to shading correction by the shading correction circuit 239. Shading correction removes from the image the nonuniform light amount of the selfoc lens, the variance of the sensitivities of the pixels of the line sensor 226, variances of the spectral characteristics and the light amounts of the correction filters and the lamps 613, and the adverse effects due to aging.

Before shading correction, reference data is stored into the line memory 240. To effect this, when a document film is selected from among the three types of films and the registered films, the related correction filter is selected and set to the positive film filter. The copying machine is operated with the original film 633 not being set. Under this condition, the amount of light from the lamp 613 is read, amplified, digitized, and converted into a density signal. The data based on the density signal thus obtained is stored in the line memory 240, as the reference data. More specifically, the imaging unit 37 is step scanned 32 lines for each pixel of R, G and B. The sampled data is transferred through the line memory 240 to the CPU 634. The CPU 634 produces an average density of the sampling data of 32 lines through its calculation. In this way, the shading data is obtained. The averaging of the sampling data eliminates the error for each pixel.

Then, the original film is set, and the image of the original film is read. The CPU 634 calculates a density adjusting value DADj by using the density data of the film as is read out of the ROM, and replaces the DADj value in the register of the LSI in the shading correction circuit 239. Further, the CPU 634 adjusts the amount of light of the lamp 613 and the gain of the amplifier 643 in accordance with the selected film.

The shading correction circuit 239 adds the DADj value to the actual data obtained by reading the original film, and shifts the read value. The shading circuit 239 subtracts the shading data of each pixel from the adjusted data to effect shading correction.

For copying the films that are not stored in the ROM of the CPU 634 and in the RAM of the system, a base film is set to collect the density data of the film, and a DADj value must be calculated on the basis of the collected density data.

After shading correction, the IIT 32 transmits density signals of R, G, and B to the IPS 33.

The CPU 634 selects the END curve on the basis of the actual data of the original film, and produces a correction signal for the gamma (Γ) correction on the basis of the selected curve. The IPS 33 exercises the gamma (Γ) correction to remove the poor contract problem due to the nonlinear characteristic and the fact that the gamma of the original film is not 1.

(D) Operation Procedure and Signal Timing

Figure 34:
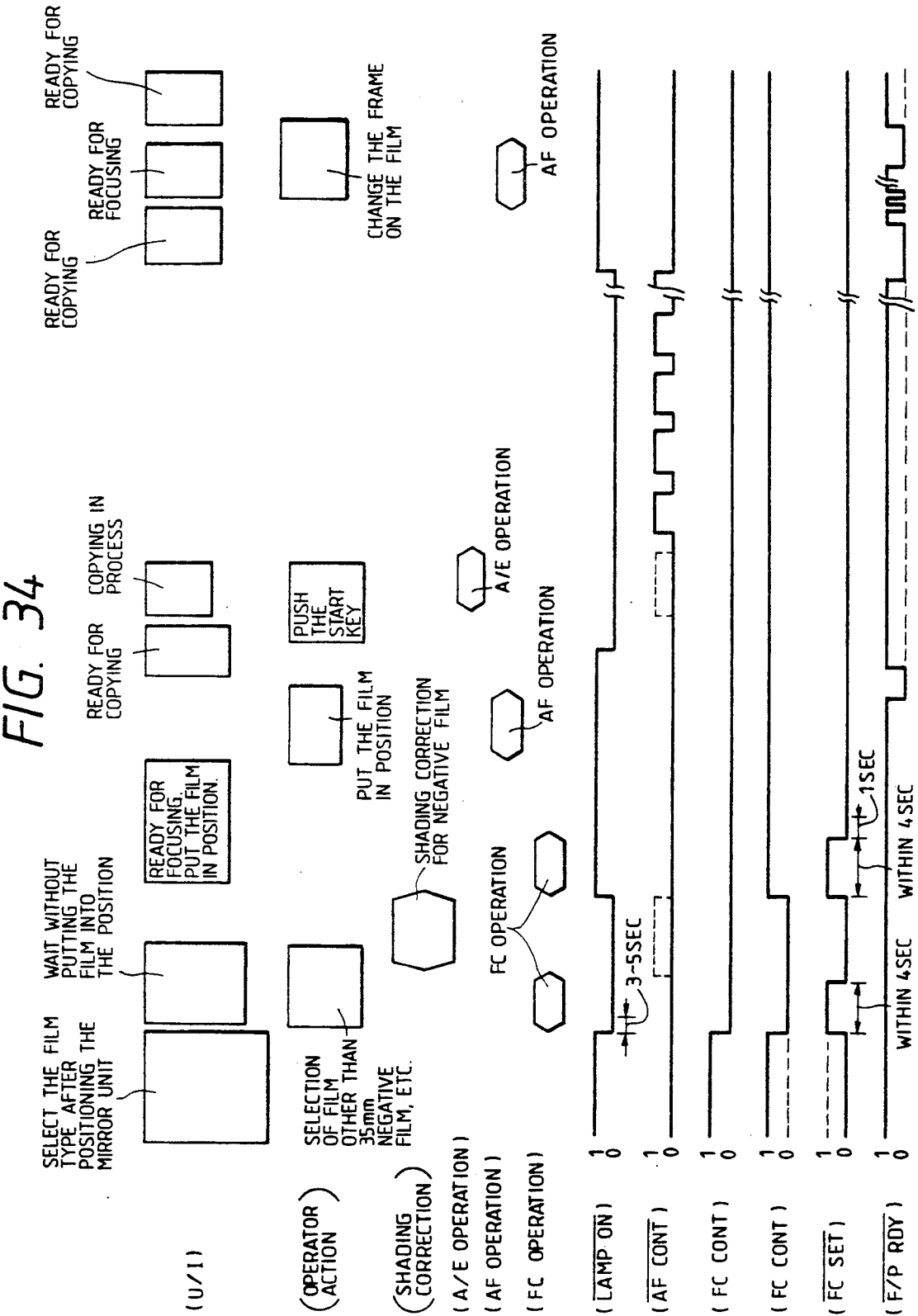
FIG. 34 explains the operating steps and the timing.

The operation procedure and signal timing will be described with reference to FIG. 34. In the figure, broken lines indicate signals that may be used.

The operation of the F/P 64 is executed by the U/I 36 of the base machine 30. Specifically, by operating the F/P operation key displayed on the U/I display, the base machine 30 is placed into the F/P mode. It is assumed now that the original film is any of the three types of films and the registered films. As shown in FIG. 34, the display of the U/I 36 presents a message "Place the mirror unit, and select your film". After seeing this, an operator opens the M/U 65, and sets it at a position preset for use on the platen glass 31.

When the film select key is touched, a message "Wait while not placing the film." At the same time, the lamp 613 lights up, and the correction filter control (FC CONT) signal becomes (0, 0), and the FC operation starts. More specifically, the auto filter exchanger operates to set the positive correction filter at a preset position. When the correction filter is set, a correction filter exchange end signal (FC SET) goes LOW.

When the FC SET signal goes LOW and after 3 to 5 seconds have elapsed from the lighting of the lamp 613, the shading data collection starts for shading correction. After the shading data collection ends, the FC SET signal goes (0, 1) in logical state, and the auto filter exchanger starts to operate and set the film correction filter at the preset position. Upon triggering of shading correction, the display presents a message "Set a film for focusing." At this time, the lamp 613 is off. After seeing this message, the operator loads the film holder 607 containing the document film 633 into the F/P 64. The light from the photo diode 623 is reflected by the film, and the reflected light is received by the photo sensor 624.

When the difference between the amount of light received by the two elements of the photo sensor 624 is not 0, the motor 625 of the AF unit operates for focusing. That is, the AF operation is performed. After the focusing operation, an F/P ready (F/P RDY) signal goes LOW.

Following this, the FC SET signal goes LOW, and after one minute, the display presents a message "Ready for copy." When the start key of the U/I 36 is pushed, the display gives a message "Copy progresses". The lamp 613 is on, and after the lamp stabilizes data for the auto density adjustment is collected. Specifically, the imaging unit 37 scans the film one time to read a part or the entire of the projection image, for density adjustment, color balance adjustment, and gamma (Γ) correction.

In the full color mode, the imaging unit scans four times for copying operation. In this case, the shading correction and the density adjustment are carried out on the basis of the shading data and the automatic density adjustment data. When the copy operation ends, the lamp 613 is off and the display displays a message "Ready for Copy." Accordingly, a new copy may be made by operating the start key. To copy another image, another frame of the film is set. When the frame of the film is changed, the F/P $\overline{\text{RDY}}$ signal goes HIGH, and the display gives a message "Adjust the focus." When the new frame is set, the AF operation is performed. At the same time, the signal F/P RDY goes LOW, and a message "Ready for copy" is displayed. Then, the start key may be pushed to again start the copying operation.

(III) Imaging Processing System (IPS)

(III-1) IPS modules

Figure 35:
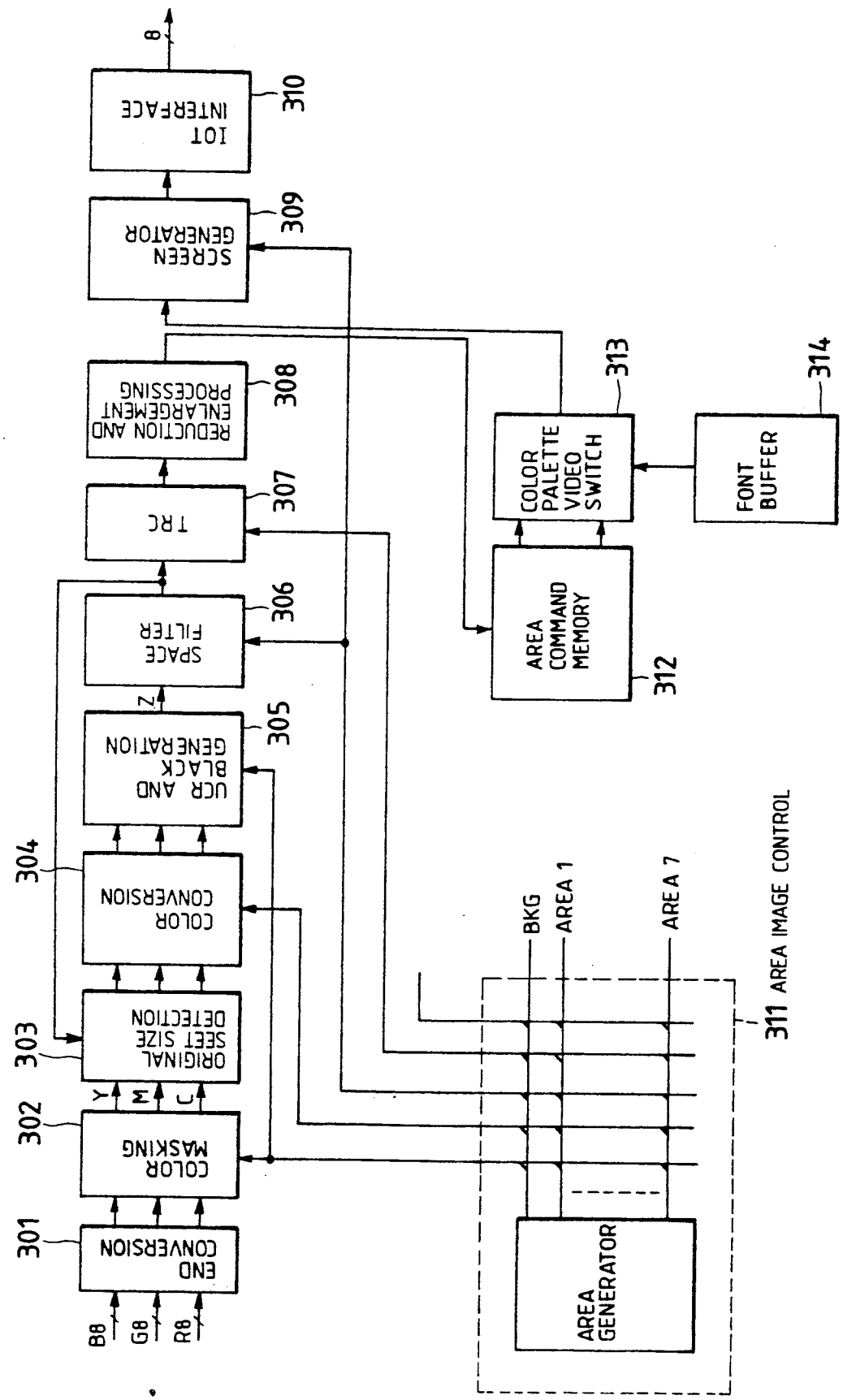
FIG. 35 illustrates an outline of the module construction of the IPS.

FIG. 35 shows an arrangement of IPS modules in the image processing system (IPS). In the color image forming apparatus, the IIT (image input terminal) reads a color image on an original in the form of the primary colors B (blue), G (green), and R (red) by using the CCD image sensor, and converts these signals to primary toner colors of Y (yellow), M (magenta), C (cyan), and K (black or tusche), and the IOT (image output terminal) performs the exposure by the laser beam and development to reproduce the original color image. In this case, the four separated toner images of Y, M, C, and K are used. A copy process (pitch) is performed one time using the process color of Y. Subsequently, the copy processes will be performed for the remaining process colors M, C, and K. A total of four copy cycles are executed. These four images consist of mesh points and are superposed to reproduce a single color image of the full color. Accordingly, when the separated color signals of B, G, and R are converted into toner signals of Y, M, C and K, a problems occurs on how to adjust the color balance, how to reproduce colors in accordance with the read characteristic of the IIT and the output characteristic of the IOT, how to adjust the balance of density and contrast, how to adjust the emphasis and blur of the edge, and how to adjust Moire.

The IPS receives the separated color signals of B, G, and R, processes these signals to improve the reproducibility of colors, tone, and definition, converts the toner signals of the developing process colors into on/off signals, and outputs them to the IOT.

As shown in FIG. 35, the IPS is made up of an END (equivalent neutral density) conversion module 301, color masking module 302, original size detect module 303, color conversion module 304, UCR (under color removal)/black generating module 305, spatial filter 306, TRC (tone reproduction control) module 307, reduction/enlargement processing module 308, screen generator 309, IOT interface module 310, area image control module 311 including an area generator and a switch matrix, and an edit control module including an area command memory 312, color palette video switch circuit 313, and font buffer 314.

In the IPS, the 8-bit data (256 gray levels) on each of the separated color signals B, G and R is applied to the END conversion module 301. The module 301 converts the data into the toner signals of Y, M, C, and K. A process color toner signal X is selected, and is digitized. The digitized signals are transferred, as the on/off data of the process color toner signals, from the IOT interface module 310 to the IOT. Accordingly, in the case of full color copying (4 colors), the prescan is executed to detect an original size, an edit area, and other necessary information of the original. Then, a first copy cycle is executed using Y as the toner signal X of the process color. Then, a second copy cycle is executed using M for the toner signal X. Subsequently, copy cycles will be executed for the remaining process colors. A total of four copy cycles are repeated.

In the IIT, the color components of R, G, and B of the image are read by using the CCD sensor with the size of one pixel of 16 dots/mm. The IIT outputs the read signals as the data of 24 bits (3 colors×8 bits: 256 gray levels). B, G, and R filters are laid on the upper surface of the CCD sensor with the density of 16 dots/mm and a total length of 300 mm. The CCD sensor makes scans 16 lines/mm at the process speed of 190.5 mm/sec. Accordingly, the sensor produces the read data at the rate of about 15M pixels/sec for each color. The IIT log converts the analog data of B, G, and R pixels to obtain the density data from the reflectivity data, and then digitizes the density data.

The respective modules will be described in detail. FIGS. 36 [although 36(q)] are explanatory diagrams for explaining the respective modules of the IPS.

(A) END conversion module

Figure 36A:
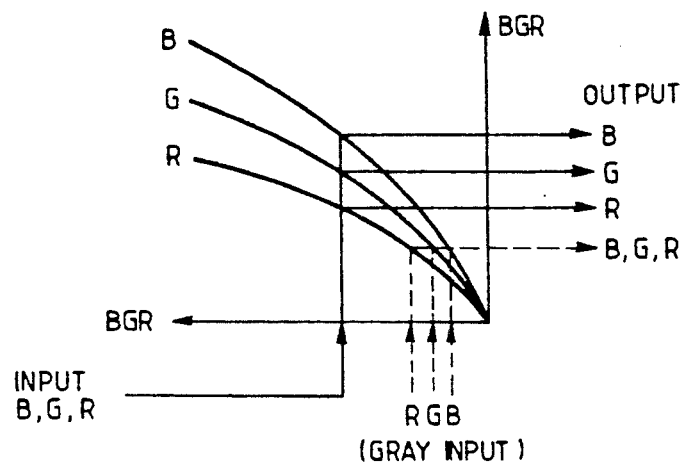
FIGS. 36(a) through 36(q) explain the individual modules forming the IPS.

The END conversion module 301 adjusts (converts) the optically read signal of the color original obtained by the IIT into a gray balanced color signal. The toners of the color image are equal to one another when the color is gray. The toner amount of gray is used as a reference toner amount. However, the separated color signals of B, G, and R produced from the IIT when it reads a gray document are not equal in value because the spectral characteristics of the light source and the color separation filter are not ideal. The imbalanced color signals are balanced by using a converting table (LUT: look up table) as shown in FIG. 36(a). This balancing work by the LUT is the END conversion. When a gray original is read, the LUT converts the B, G, and R color separated signals into signals of equal gradation in accordance with a level (black→white) of the gray signal. The LUT depends on the characteristics of the IIT and 19 LUTs may be used. Of those LUTs, 16 tables are for the film projectors including negative films. 3 tables are for copy, photograph, and generation copy.

(B) Color Masking Module

The color masking module 302 converts the B, G, and R color signals into signals indicative of toner amounts of Y, M, and C, respectively, through a matrix operation. This conversion is applied to the signals after they are subjected to the gray balance adjustment by the END conversion.

In this instance, the conversion matrix for the color masking is a 3×3 matrix exclusively used for converting the B, G, and R into Y, M and C. A matrix capable of dealing with BG, GR, RB, B2, G2, and R2, in addition to B, G, and R may also be used. Any other suitable matrix may be used, if necessary. Two sets of matrices are used, one for an ordinary color adjustment and other for emphasis signal generation in the monochromatic color mode.

Thus, when the video signal from the IIT is processed by the IPS, the gray balance adjustment is first conducted. If it follows the color masking process, the gray balance adjustment using the gray original must be made allowing for the characteristics of the color masking. This makes the conversion table more intricate.

(C) Original Size Detection Module

Figure 36B:
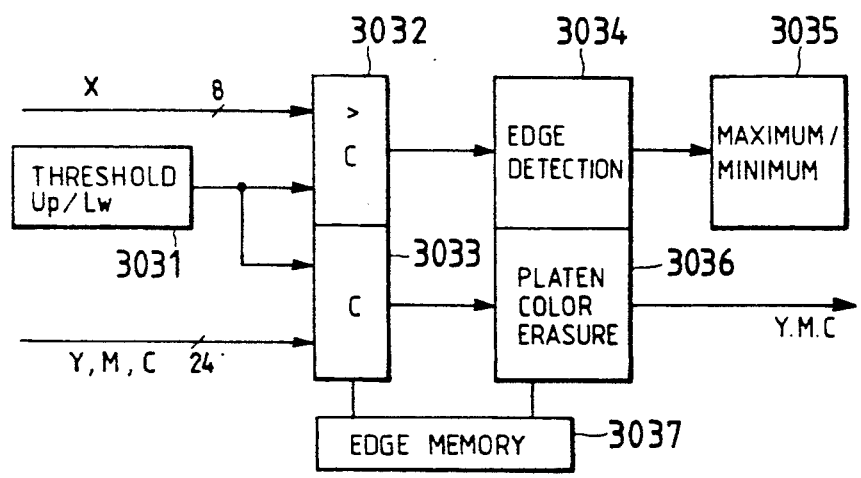

Originals that can be copied include not only standard size documents, but also patched up documents and others. To select paper of a proper size corresponding to the size of an original, it is necessary to detect the original size. In case that the paper size is larger than the original size, if the peripheral region of the original is masked, the resultant copy is excellent. For this reason, the original size detection module 303 detects the original size at the time of scanning and suppresses the platen color (edge suppress) at the time of scanning to read the original image. Accordingly, color, for example, black, that is clearly distinguished from the original is used for the platen color. The upper limit value and lower limit value for platen color discrimination are set in a threshold register 3031, as shown in FIG. 36(b). At the time of prescan, the signal is converted by gamma (Γ) conversion into a signal X representing the data approximate to the reflectivity of the original (by using the spatial filter 306 to be given in detail). The signal X is compared with the upper/lower limit value as is set in the register 3031, by a comparator 3032. An edge detect circuit 3034 detects the edge of the original, and stores the maximum and minimum values of X and Y as coordinates into a max./min. sorter 3035.

As shown in FIG. 39(d), when the original is oblique or non-rectangular, the maximum values and the minimum values (s1, x2, y1, y2) at four points on the outline of the figure are detected and stored. At the time of scanning for reading the original, the comparator 3033 compares the Y, M, and C of the original with the upper/lower limit values in the register 3031. A platen color suppress circuit 3035 suppresses the pictorial information outside the edge, viz., the read signal of the platen, to effect the edge suppressing processing.

(D) Color Conversion Module

Figure 36C:
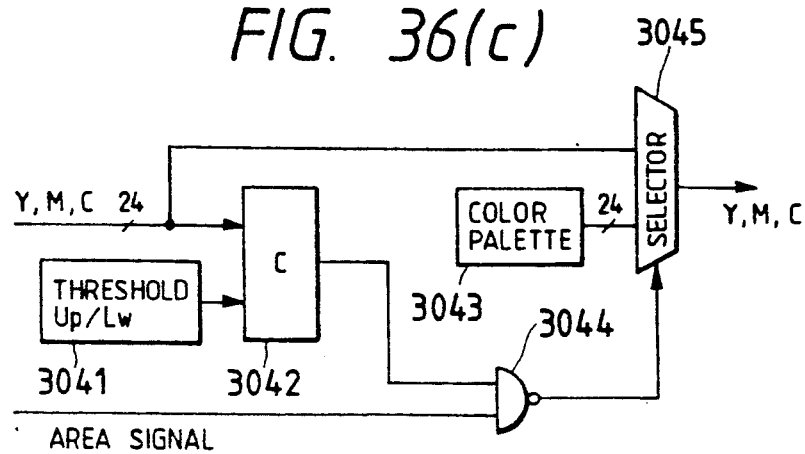
Figure 36D:
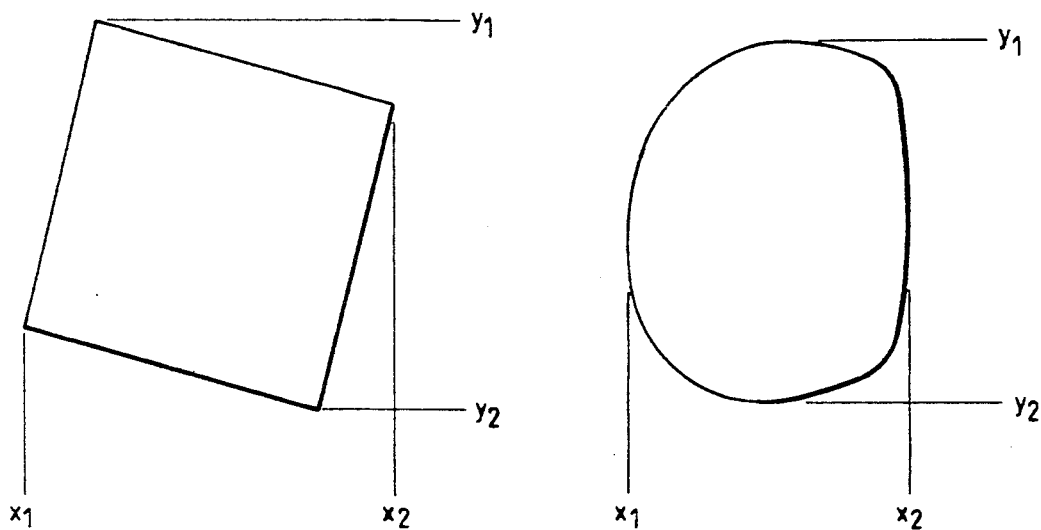

The color change module 304 sets up a condition that a designated color in a specific area on an original is erasable. As shown in FIG. 36(c), this module is made up of a window comparator 3042, threshold register 3041, and color palette 3043. To effect color change, the upper/lower limit values of Y, M, and C of the colors to be changed are set in the threshold register 3041. The upper/lower limit values of Y, M, and C of the converted colors are set in the color palette 3043. According to an area signal applied from the area image control module, the NAND gate 3044 is controlled. When it is not a color change area, the color signals of Y, M, and C of the original are transferred without change from a selector 3045.

When the color change area is reached, and the color signals of Y, M, and C of the original are between the upper limit values and the lower limit values as set in the threshold register 3041, the selector 3045 is switched by the output signal of the window comparator 3042 and it sends the converted color signals of Y, M, and C that are set in the color palette 3043.

As for the designated color, by directly pointing an original by a digitizer, 25 pixels of B, G, and R in the vicinity of the coordinates (as designated at the time of prescan) are averaged and the designated color is recognized on the basis of the average. By the averaging operation, even in the case of an original of 150 lines, the designated color can be recognized with a precision within 5 of color difference. To the B, G, and R density data, the designated coordinates are converted into an address and the density data are read out of the IIT shading correction circuit with that address. In the address conversion, readjustment corresponding to the registration adjustment is needed, as in the case of the original size detection. In the prescan, the IIT operates in the sample scan mode. The B, G, and R density data read out of the shading RAM are subjected to a shading correction by software, and are averaged. Further, the data are subjected to END correction and color masking, and then are set in the window comparator 3042. The registered colors are selected from 16,700,000 colors, and up to eight colors can be simultaneously registered in the color pallet 3043.

The reference color prepared include a total of 14 colors, Y, M, C, G, B and R, colors between these colors, and K and W.

(E) UCR/Black Generation Module

When color signals of Y, M, and C having equal quantities are combined, gray is produced. Theoretically, the same color can be obtained by replacing the colors of Y, M, and C of equal quantities with black. In this case, however, the color is impure and hence the reproduced color is not fresh. To cope with this problem, the UCR/black generation module 305 generates a proper amount of K to prevent such a color impurity, and equally reduces the toner colors Y, M and C, in accordance with the amount of the generated K (this process is called an under color removal (UCR). More specifically, the maximum and the minimum values of the toner colors Y, M, and C are detected. A K is generated by a conversion table in accordance with the difference between the maximum value and the minimum value. Further, the toner colors Y, M, and C are UCR processed in accordance with the generated K.

Figure 36E:
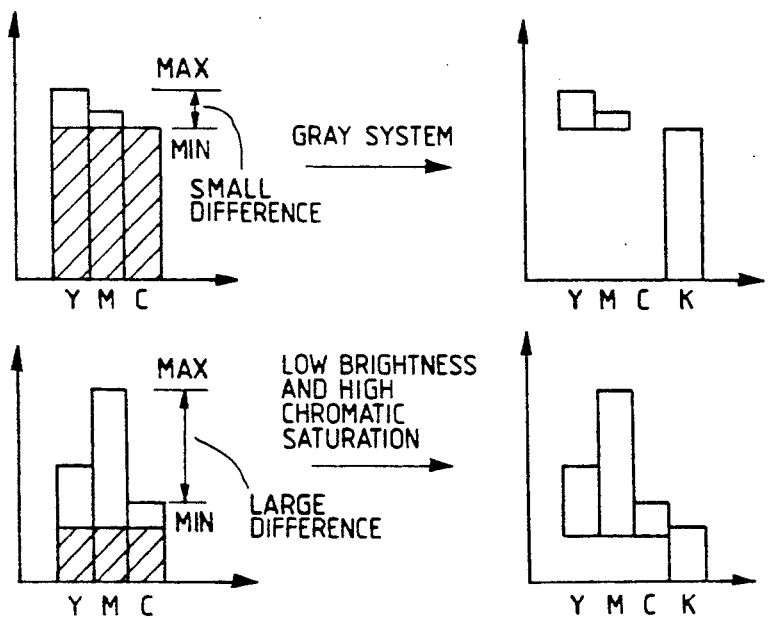

As shown in FIG. 36(e), in the case of a color closer to gray, the difference between the maximum and the minimum values is small. Accordingly, the minimum value or its near value of each color Y, M, and C is removed for generating the color K. When the difference is large, the quantities of the colors Y, M, and C to be removed are set below the minimum values to reduce the quantity of the generated K. In this way, the mixing of tusche into the pure color and the hue degradation of a low gradation, high hue color can be prevented.

Figure 36F:
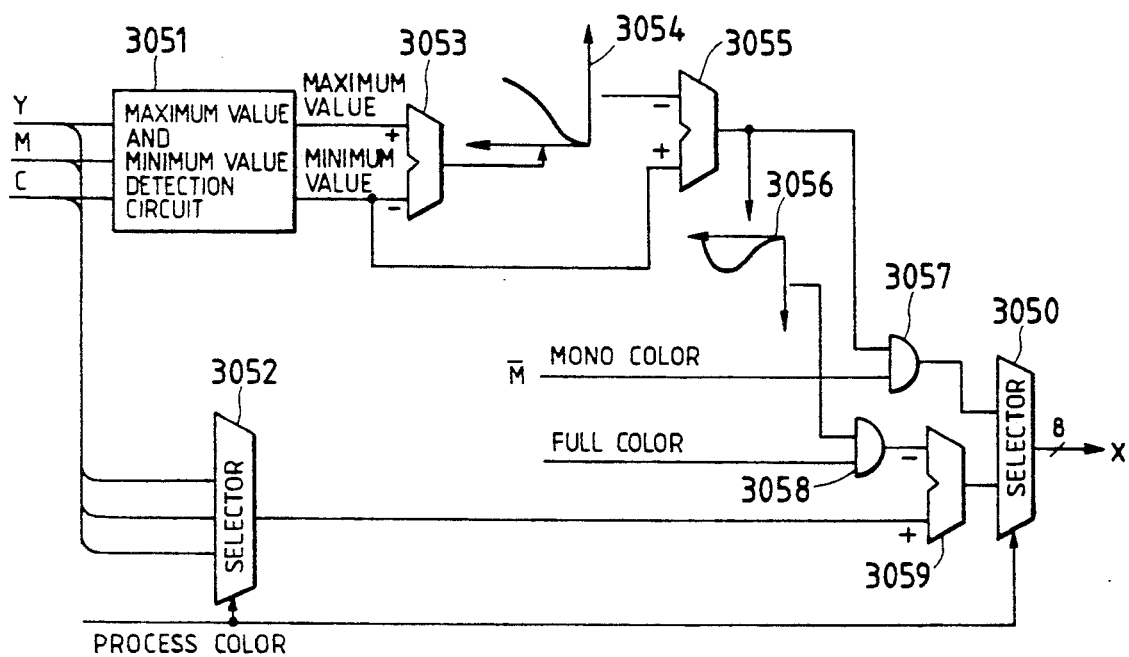

FIG. 36(f) shows a specific circuit arrangement of the UCR/black generation module, a max./min. value detector 3051 detects the maximum and the minimum values of the process colors Y, M, and C. A calculating circuit 3053 calculates the difference between the maximum and the minimum values of each color. A conversion table 3054 and another calculating circuit 3055 cooperate to generate black K. The conversion table 3054 adjusts the value of K.

When the difference between the maximum and the minimum values is small, the output signal of the conversion table is zero. Accordingly, the calculating circuit 3055 produces the minimum value as intact in the form of the value of K. When the difference is large, the output value of the conversion table 3054 is not zero, the calculating circuit 3055 subtracts the difference from the minimum value and produces the result of the subtraction as the value of K. A conversion table 3056 provides the values to be removed from the colors Y, M,, and C in accordance with the K value. In cooperation with the conversion table 3056, an additional calculating circuit 3059 subtracts the values as defined by the k value from the process colors Y, M, and C. AND gates 3057 and 3058 operate for the signal K, and the signals of Y, M, and C after UCR processing in accordance with the signals in the mono color mode and the full color mode. The selectors 3052 and 3050 are used for selecting any of the toner signals Y, M, C, and K by the process color signals. A color is thus reproduced by the mesh points of Y, M, and C. Accordingly, the curves and tables that are empirically formed are used for the removal of Y, M, and C and for determining the generation ratio c.f K.

(F) Spatial Filter Module

In the color image forming apparatus incorporating the present invention, the IIT reads an image of an original while the original image is being scanned by the CCD. When the data is used intact, the resultant data is faded data. The mesh points are used for image reproduction. Accordingly, Moire occurs between the mesh point period of the printed matter and the sampling period of 16 dots/mm. The same phenomenon occurs between the mesh point period generated by the machine and that of the original. The spatial filter module 306 is provided to remove the above fading and the Moire phenomenon. For the Moire removal, a low-pass filter and for edge emphasis, a high-pass filter are used.

Figure 36G:
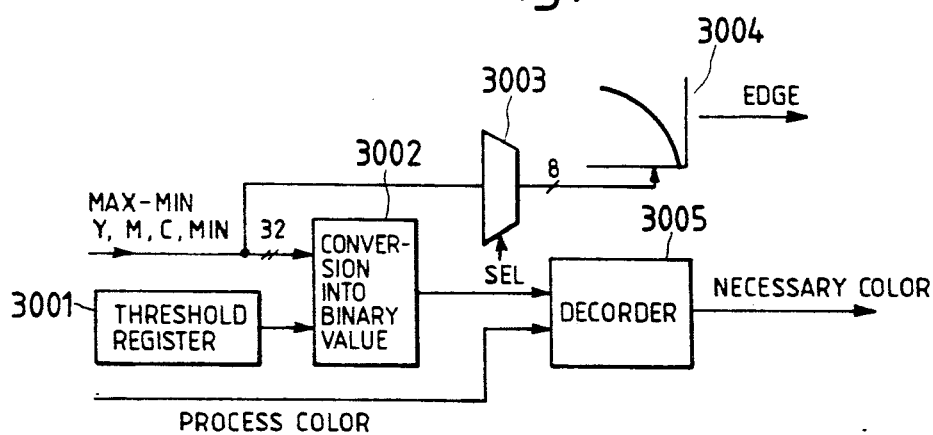

In the spatial filter module 306, as shown in FIG. 36(g), a selector 3003 selects one of the input signals Y, M, Min and Max-Min. A conversion table 3004 converts it into data signals approximately indicative of reflectivity. Use of this type of data makes it easy to pick up the edge data. In this instance, the selected color signal is Y. A threshold register 3001, a 40-bit digitizer 3002, and a decoder 3005 separates the color signals Y, M, C, Min, and Max-Min into eight colors, Y, M, C, K, B, G, R, and W (write), for each pixel. A decoder 3005 recognizes the hue in accordance with the digitized data signal, and produces a 1-bit data indicate of necessary process color or not.

Figure 36H:
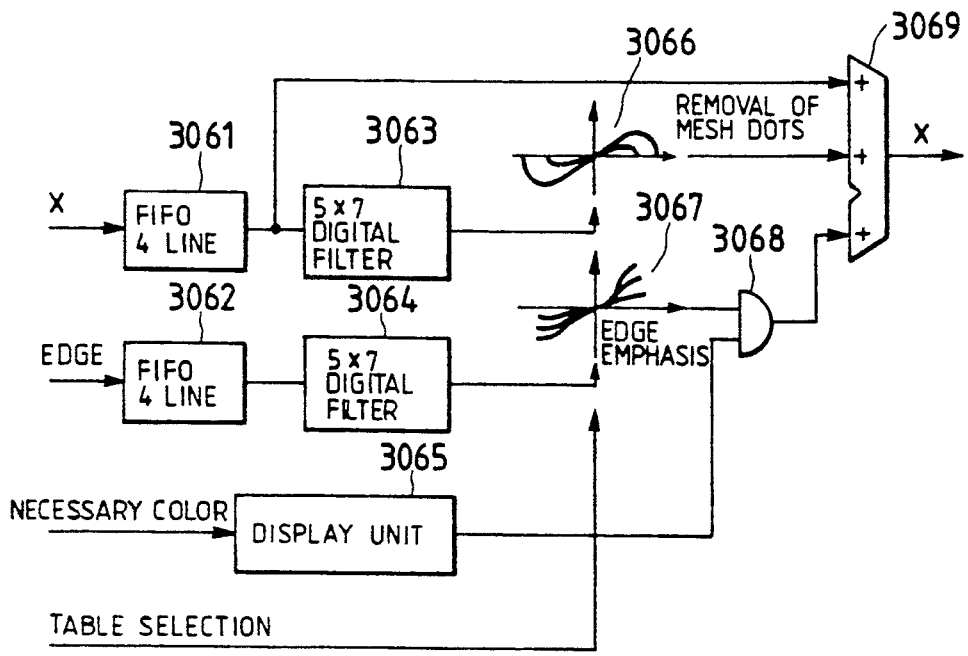

The output signal of the circuit of FIG. 36(g) is applied to a circuit of FIG. 36(h). In the circuit, a FIFO 3061, a 5×7 digital filter 3063, and a modulation table 3066 cooperate to generate the mesh-point removal data. A FIFO 3062, a 5×7 digital filter 3064, a modulation table 3067, and a delay circuit 3065 cooperate to generate edge emphasis data by using the output data of the output circuit of FIG. 36(g). The modulation tables 3066 and 3067 are selectively used in accordance with the selected copy mode, such as photograph copy, character only copy, and photo/character copy.

Figure 36J:
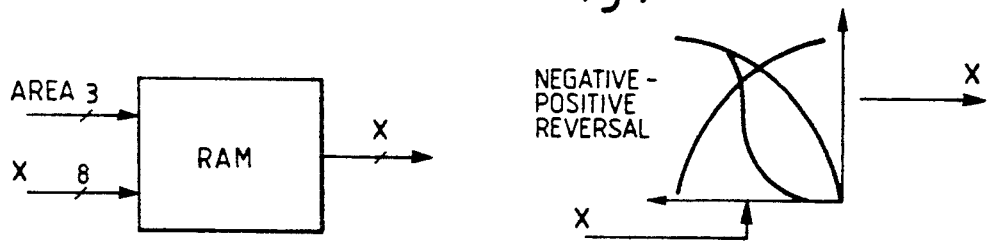
Figure 36K:
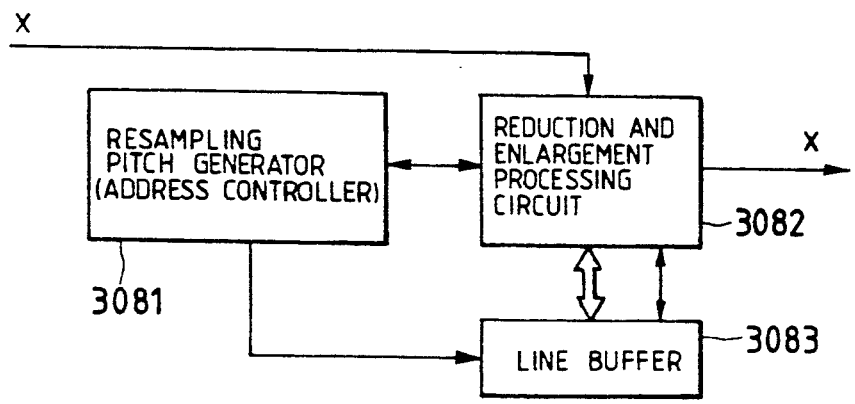
Figure 36I:
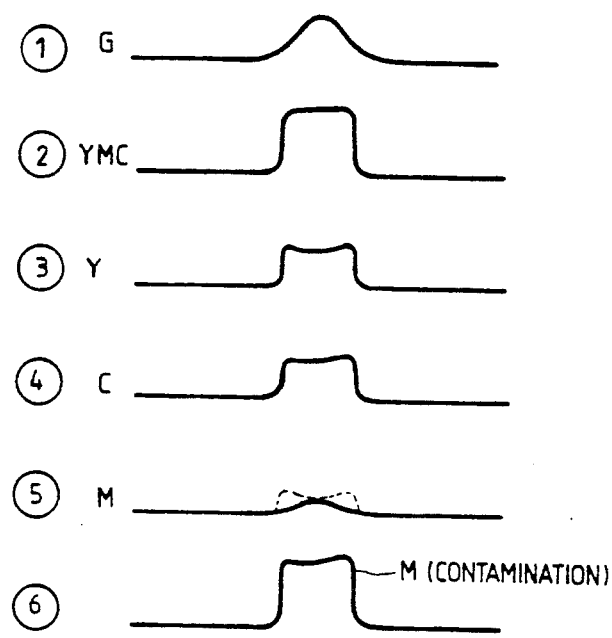

In respect with the edge emphasis, when a green character as shown in FIG. 36(i) (1) is reproduced in the form of a character (2), the colors Y and C are emphasized at the edges as indicated by waveforms (3) and (4), but the color M is not emphasized as indicated by a solid line of waveform (5). The switching for this is carried out by the AND gate 3068. In this case, if waveform (5) indicating the color M is emphasized as indicated by the broken line, M is emphasized at the edges as shown in a waveform (6) and accordingly the color purity is lost (contamination of M). To switch the emphasis by the AND gate 3068 for each process color, the delay circuit 3065 synchronizes the FIFO 3062 with the 5×7 digital filter 3064. When a fresh green character is reproduced by using conventional image processing, the magenta M is emphatically mixed into the green character and the color purity is lost. To solvent this, the spatial filter module, when recognizing green, outputs the colors Y and C in an ordinary manner, but outputs the magenta M for edge emphasis.

(G) TRC Conversion Module

The IOT exercise the copy cycles four times using process colors of Y, M, C, and K in accordance with an on/off signal derived from the IPS (in the case of the full color copy). With this, reproduction of a full color original is realized. Actually, however, to exactly reproduce the colors theoretically obtained through the signal processing, delicate and careful adjustment is required to take the characteristics of the IOT into consideration. The TRC conversion module is used to improve the color reproduction. An address conversion table containing various combinations of Y, M, and C which is accessed with 8-bit image data is stored in the RAM, as shown in FIG. 36(j). With use of such a table functions such as density adjustment, contrast adjustment, negative/positive inversion, color balance adjustment, character mode, and transparent composition, may be exercised in accordance with an area signal. The bits 0 to 3 of the area signal are assigned to the upper four bits of the RAM address. In an out-of-area mode, the above functions may be appropriately combined. In this instance, the RAM has a memory capacity of 2k bytes (256 bytes×8 planes), and eight conversion tables. During the IIT carriage return, a maximum of 8 conversion tables are stored for every cycle of Y, M, and C. These table are selectively used in accordance with an area designation and the copy mode used. If the memory capacity of the RAM is increased, there is no need for storing the tables during every cycle.

(H) Reduction/Enlargement Module

Figure 36L:
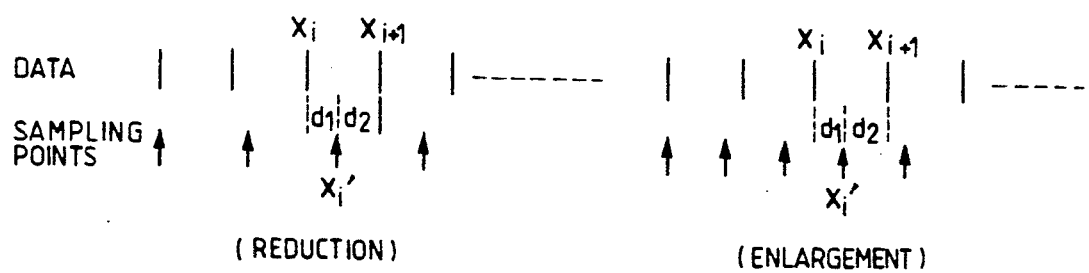

The reduction/enlargement module 308 exercises the reduction/enlargement processing by a reduction/enlargement processor 3082 during the period that data X is temporarily stored in a line buffer 3083 from which it is transferred. A resampling generator/address controller 3081 generates a sampling pitch signal and a read/write address for the line buffer 3083. The line buffer 3083 serves as a ping-pong buffer of two lines in which line data is read out of one of the lines, while at the same time the next line data is written into the other line. The reduction/enlargement processing in the main scan direction is digitally processed by the reduction/enlargement module 3082. For the reduction/enlargement in the vertical scan direction, the scan speed of the IIT is appropriately varied. The scan speed is varied in the range from 2 times to ¼ time, to vary the magnification from 50% to 400%. In digital processing, when the data is transferred to and from the line buffer 3083, the reduction is based on a thinout interpolation, while the enlargement is based on an additional interpolation. When the data lies between the adjacent sampling points, the interpolation data is obtained by weighing the inbetween data in accordance with the distances of that data to the data located on both sides, as shown in FIG. 36(l). If the data is $X_i'$, for example, the following calculation, $$(X_i \times d_2) + (X_{i+1} \times d_1)$$

where $d_1 + d_2 = 1$, and $d_1$ and $d_2$ are distances from a sampling point to the data $X_i$ and $X_{i+1}$ on both sides of the data $X_i'$.

In the reduction processing, data is loaded into the line buffer 3083 while interpolating the data. At the same time, the reduced data in the previous line is read out of the buffer, and sent to the succeeding stage. In enlargement processing, the data is loaded into and temporarily stored in the line buffer, while the data is interpolated for enlargement while reading the previous line data out of the line buffer. When the interpolation for enlargement is conducted at the time of writing, a clock frequency must be increased in accordance with magnification. Such an enlargement process, however, allows the same clock to be used for both the read and write operations. Further, shift image processing in the main scan direction is possible by reading data at a midpoint between one read timing and the next read timing or by delaying the read timing. The repetitive processing is possible by repeatedly reading data. The mirror image processing is also possible when data is read out in the reverse direction.

(I) Screen Generator

A screen generator 309 converts a gradation toner signal of each process color into an on/off or binary toner signal. In the screen generator, the digitizing processing and the error diffusion processing are conducted by comparing a threshold matrix with the gradated data. The IOT receives the binary toner signal, and turns on and off a laser beam to reproduce a halftone image. In this case, the laser beam is elliptically shaped in cross section with its geometry of about 80 μm long and about: 60 μm wide. These figures are selected so as to satisfy the recording density of 16 dots/mm.

Figure 36M:
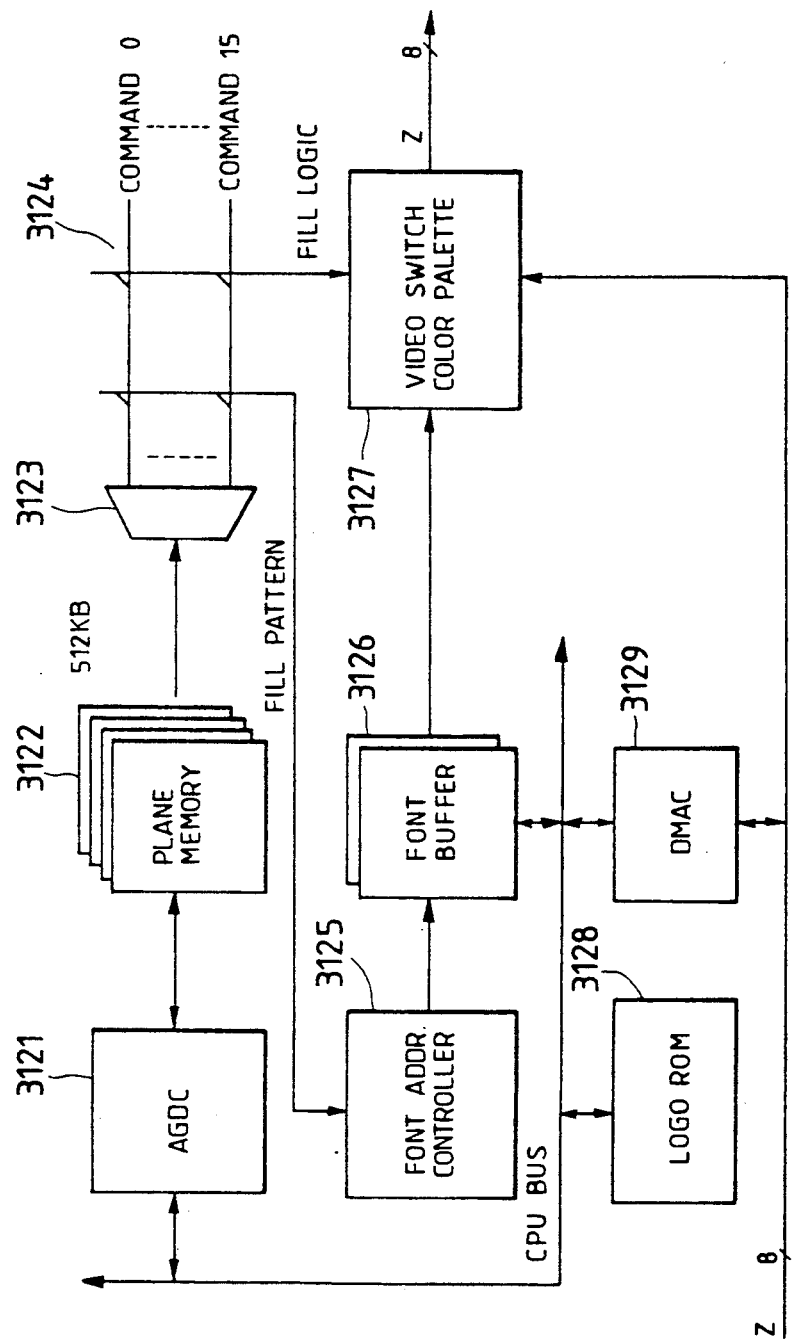
Figure 36N:
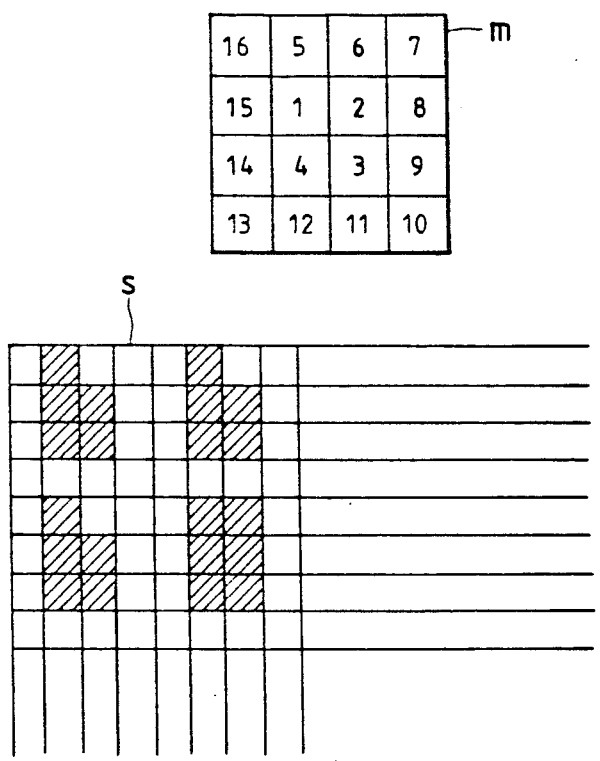

How to express gradation will first be described, and the description to follow is directed to forming halftone cells each of 4×4, for example, as shown in FIG. 36(n). To form the cells, the screen generator sets up a threshold matrix "m" corresponding to such a halftone cell. Then, it compares the matrix with the gradated data. If the value of data is "5," the screen generator generates signals that are turned on in the squares of the matrix "m" whose figures are less than "5".

Figure 36O:
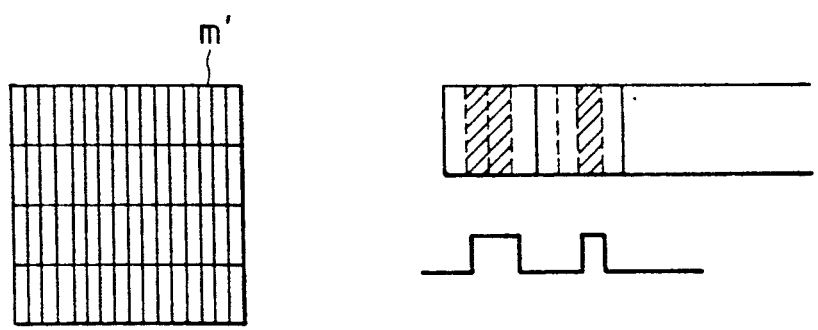

The 4×4 halftone cell of 16 dots/mm is generally called a mesh point of 100 psi and 16 gradations. If an image is depicted by such mesh points, the image reproduction is poor. In the present invention, to increase the gradations, the 16 dots/mm pixel is further divided into four in the vertical direction (main scan direction). Accordingly, the laser beam is turned on and off at distances of ¼ unit, viz., at 4-times the frequency, as shown in FIG. 36(o). The gradation attained is four times that of conventional gradation expressing methods. To this end, a threshold matrix "m'" as shown in FIG. 36(o) is set up in the present invention. Further, if a submatrix method is used, the number of lines will effectively be increased.

Figure 36P:
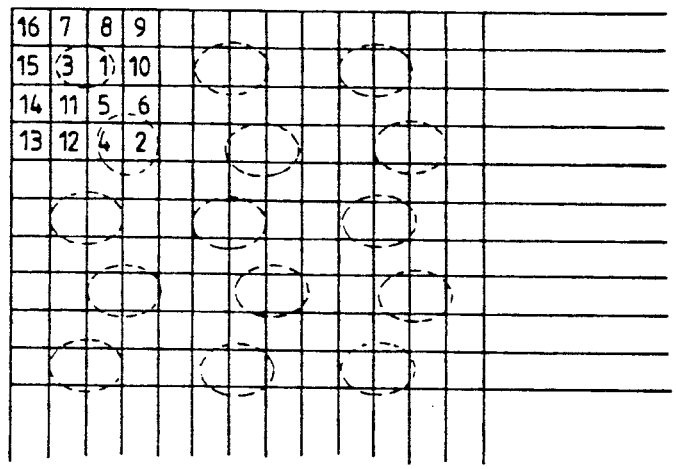
Figure 36Q:
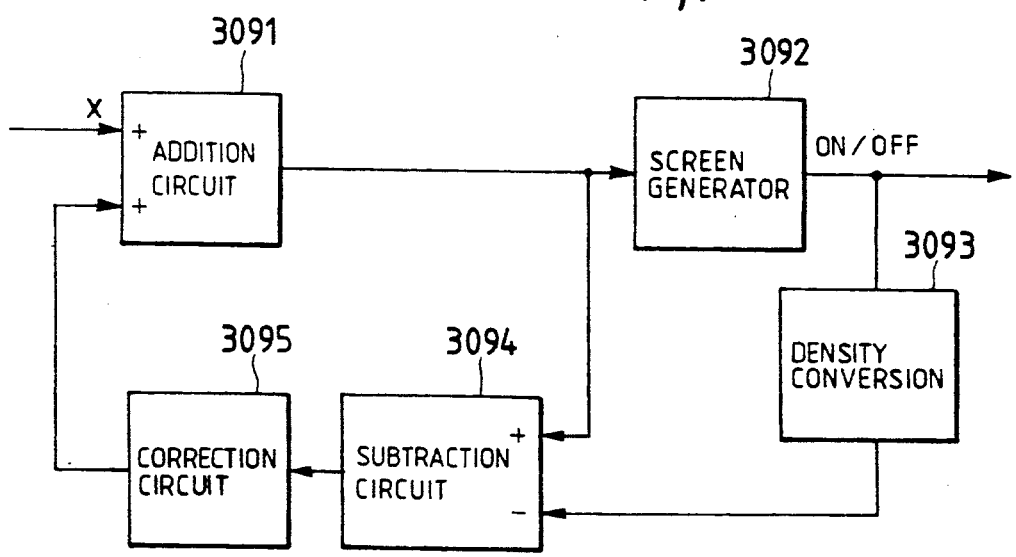

The above instance uses the threshold matrices "m" of the type in which the center portion of each halftone cell is used as a sole growth nucleus. In the submatrix method, a pixel consists of a plurality of unit matrices. Each matrix has two growth nuclei or more, as shown in FIG. 36(p). If such a screen pattern design method is used, the number of lines and the gradation may be changed in accordance with bright or dark portions, in such a way that 141 psi and 64 gradations are used for bright portions, and 200 psi and 128 gradations, for dark portions. Such a pattern may be designed while visually judging smoothness in gradation, definition, graininess, and the like.

When the halftone image is reproduced by using the above dot matrix method, the gradation or gray level and the resolution contradictorily coexist. For example, if the gray level is increased, the resolution becomes poor. On the other hand, if the resolution is increased, the gray level is decreased. If small threshold data matrices are used, the image actually outputted suffers from quantification error. The error diffusion processing is to improve the gradation reproducibility. The quantification errors, the on/off or binary signal generated by a screen generator 3092, and the input gradation signal are detected by a density converting circuit 3095 and adder 3091, and are fed back by using a correction circuit 3095 and an adder 3091. For example, the corresponding position of the previous line and the pixels on both sides of it are convoluted through a digital filter.

The screen generator changes over the threshold error and a feedback coefficient for the error diffusion processing every original or area in accordance with the type of image, such as halftone image and character images. In this way, the reproduction of images of high gradation and high definition is improved.

(J) Area Image Control Module

In the area image control module 311, seven rectangular areas and a priority order can be set in an area generator. Control data relating to the respective areas are set in a switch matrix. The control data includes data of color change and a color mode indicative of monochromatic color or full color, modulation select data of photograph, characters, and the like, select data of TRC, select data of the screen generator, and the like. The control data is used for controlling the color masking module 302, color conversion module 304, UCR module 305, spatial filter 306, and TRC module 307. The switch matrix may be set by software.

(K) Edit Control Module

The edit control module execute outline-drawing processing in which an original bearing a circular figure, such as a circular graph, not a rectangular figure is read, and a specified area of indefinite configuration is painted with specified color. As shown in FIG. 36(m) a CPU bus is clustered with an AGDC (advanced graphic digital controller) 3121, font buffer 3126, logo ROM 3128, and DMAC (DMA controller) 3129. The CPU writes an encoded 4-bit area command into a plane memory 3122 through the AGDC 3121, and the font is loaded into the font buffer 3126. The plane memory 3126 consists of four memory planes. Each point on an original can be set by 4 bits of planes 0 to 3 in such a manner that for "0000," a command 0 is used to output an original. A decoder 3123 decodes the 4-bit data into commands 0 to 15, and a switch matrix 3124 converts the commands 0 to 15 into commands to make jobs of fill pattern, fill logic, and logotype. A font address controller 3125 generates an address of a font buffer 3126 in accordance with a pattern such as mesh point shade and hatching shade, by using a 2-bit fill pattern signal.

A switch circuit 3127 selects one of document data X, font buffer 3126 and color palette in accordance with a fill logic signal of the switch matrix 3124 and the contents of the original data X. The fill logic is used to fill only the background of an original with a color mesh, the change the color in a specific portion of the mask to another color, to mask or trim a specific portion of the image, and to fill specific image portions with a color.

As seen from the foregoing description, in the IPS, the read signals from the IIT are subjected to END conversion, and the color masking process. The read signals are further subjected to edge suppress and color change, and the under color removal process. A tusche color is generated. Then, the read signals are converted into the process colors. In the case of the processings, such as spatial filter, color modulation, TRC, and reduction/enlargement, it is better to use the process color data rather than to use the full color data because the amount of processed data is small, and hence the number of the used conversion tables may be reduced to ½. Accordingly, more varieties of the conversion tables may be used to improve the reproducibility of colors, gradation, and definition.

(III-2) IPS Hardware

Figure 37A:
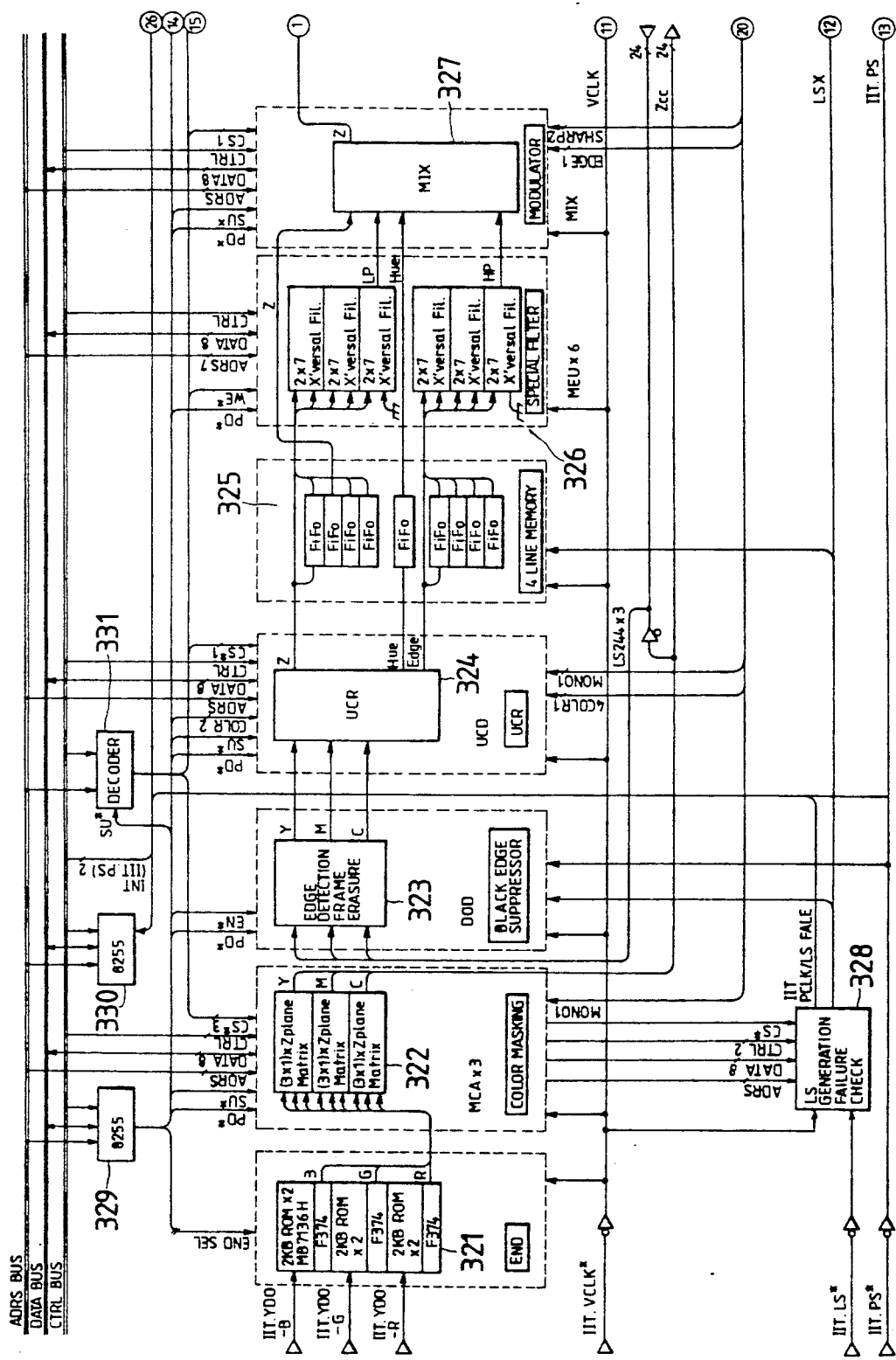
FIGS. 37(a) through 37(d) explain the hardware construction of the IPS.
Figure 37B:
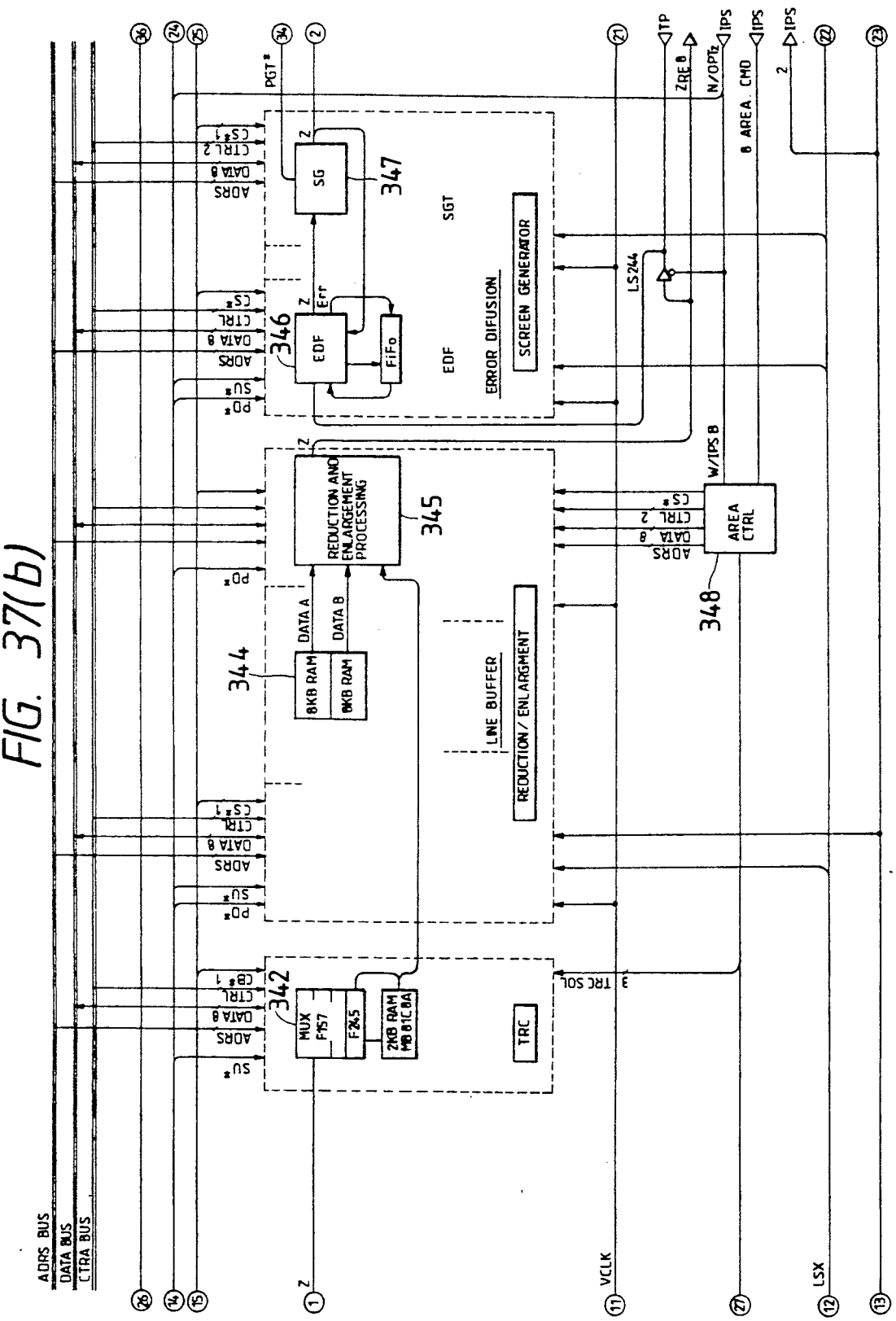
Figure 37C:
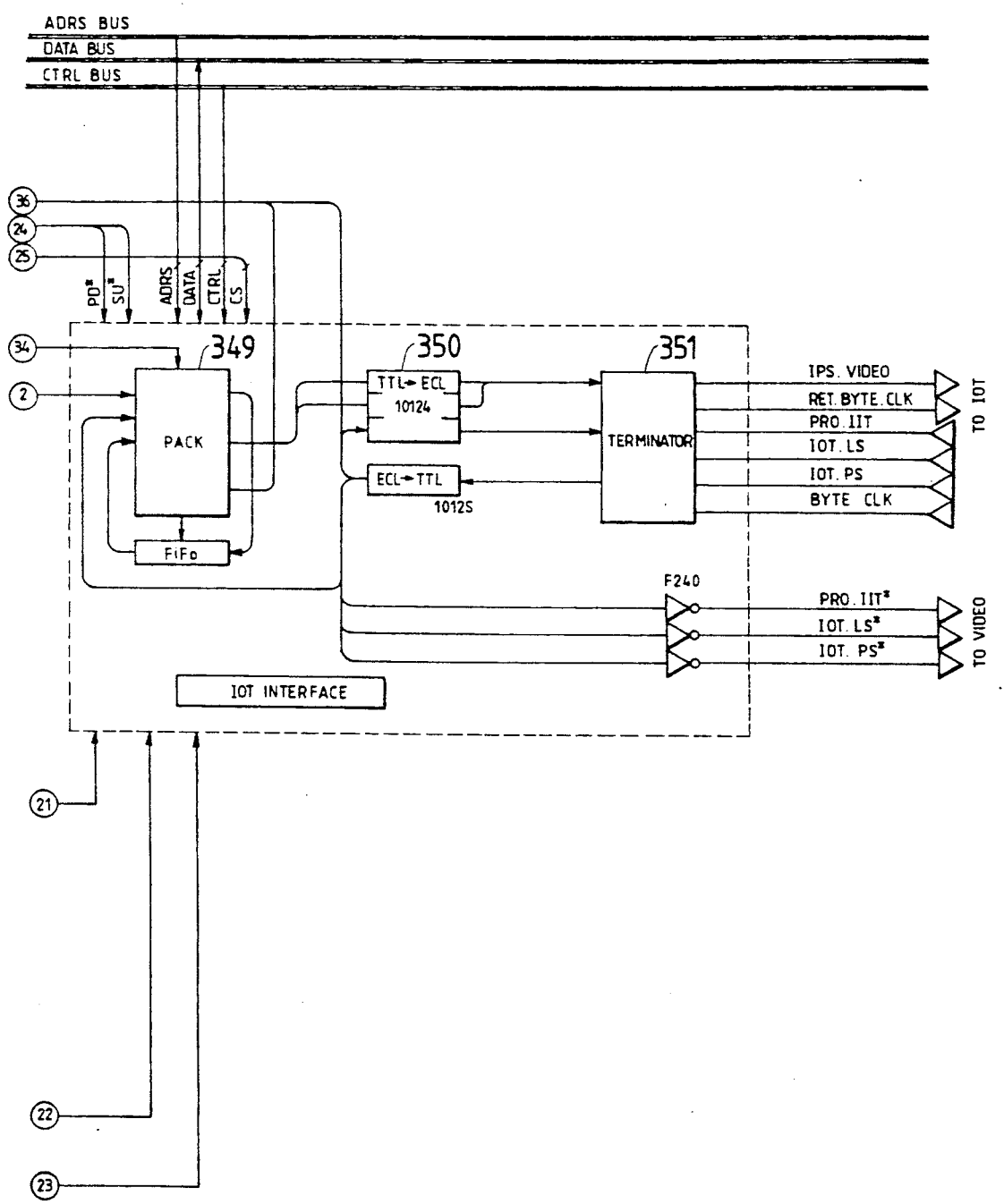
Figure 37D:
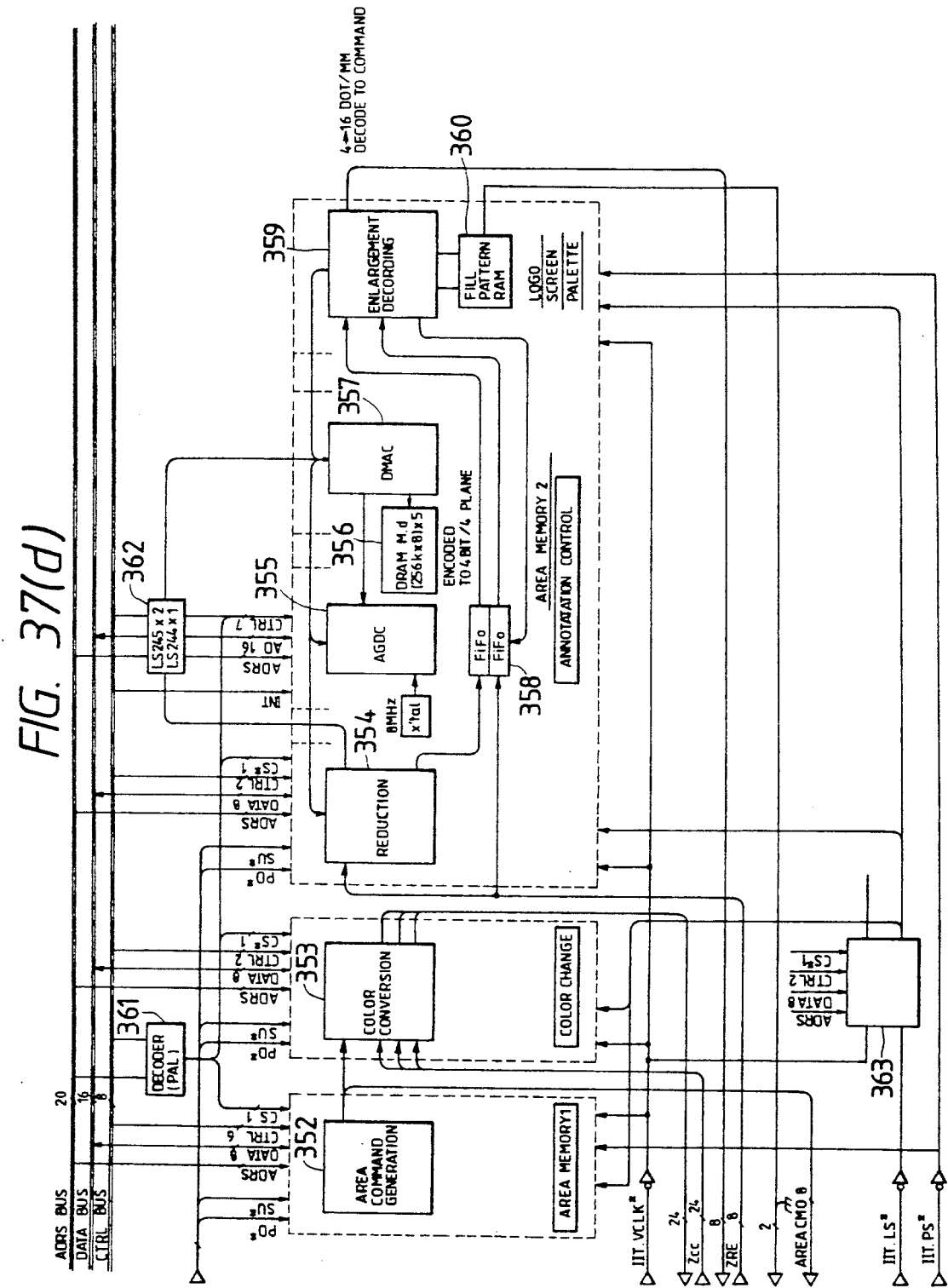

FIGS. 37(a) to 37(d) show a hardware configuration of the IPS. The circuitry of the IPS is divided into two circuit boards IPS-A and IPS-B. The circuit board IPS-A contains circuitry for exercising the basic functions of the color image forming apparatus, such as reproductions of colors, gradation, and definition. The second circuit board ISP-B contains circuitry for exercising applications and professional work, such as edit work. An arrangement of the circuitry contained in the first circuit board IPS-A is as shown in FIGS. 37(a) to 37(c). A circuit arrangement contained in the second circuit board IPS-B is as shown in FIG. 37(d). During the course of using the copier as the color image forming apparatus of the present invention, there will inevitably occur user demands for additional new applications and professional work. The copier may flexibly cope with such demands by merely modifying and altering only the circuitry of the second circuit board IPS-B, because the basic functions of the copier are secured by the circuitry of the first circuit board.

The IPS board is coupled with CPU buses including an address bus ADRSBUS, data bus DATABUS, and control bus CTRLBUS. The board is also coupled with video data B, G, and R from the IIT, video clock IIT VCLK as a sync signal, line sync signal (the main scan direction and the horizontal sync) IIT IS, and page sync (vertical scan direction, vertical sync) IIT PS.

The video data is pipeline processed in the stage after the END converting unit. Accordingly, the video data is delayed by a delay amount to the number of clocks required for the respective processing stages in the pipeline processing. A line sync generator/fail check circuit 328 is provided for generating and distributing horizontal sync signals to meet a delay, and for the fail check of the video clock and the line sync signal. Therefore, the line sync signal generator/fail check circuit 328 is coupled with the video clock IIT VCLK and the line sync signal IIT IS. To change the settings of the circuit 328, it is coupled with the CPU buses (ADRSBUS, DATABUS and CTRLBUS), and a chip select signal CS.

The video data B, G, and R from the IIT are inputted to the ROM 321 in the END converting unit. The END conversion table may be loaded into a RAM, for example, under control of the CPU. Actually, however, when use of the copier progresses it is unlikely likely that the END table must be altered when the image data is being processed. For this reason two 2K byte ROMs may be used for each of the END conversion tables of B, G, and R. That is, a LUT (look-up table) system using the ROMs and 16 conversion tables may be provided and selectively used by a 4-bit select signal ENDSel.

The END converted data signal outputted from a ROM 321 is coupled with a color masking unit made up of a calculation LSI 322 having several planes of a 3×2 matrix for each color the calculation LSI 322 is coupled with the CPU buses, and the coefficients of the matrices may be set in the calculation LSI 322 form the CPU. The LSI 322 is a set-up signal SU and a choice select signal CS. These signals are used for connecting the calculation LSI 322 that processed the image signals to the CPU buses so as to allow the CPU to reprogram the settings in the LSI 322. A 1-bit select signal MONO is coupled with the calculation LSI 322 for selection of the matrices. The LSI 322 further receives a power down signal PD. When no scan is made in the IIT, viz., no image processing is performed, the internal video clock is stopped by the power down signal PD.

Those signals of Y, M, and C that have been converted from the color image signals B, G, and R by the LSI 322, are applied to a color change LSI 353 in the second circuit board IPS-B shown in FIG. 37(d). Here, the colors of these signals are changed, and inputted to a DOD LSI 323. The color change LSI 353 contains four color change circuits each including of a threshold register for setting the unchanged colors, color palette for setting changed colors, and a comparator. The DOD LSI 323 contains an original edge detector, black edge suppressor, and the like.

The black edge suppressed data signal outputted from the DOD LSI.323 is applied to an UCR LSI 324. This LSI contains an UCR circuit, black generating circuit, and necessary color generators.

The LSI 324 produces a process color X corresponding to the toner color, necessary colors Hue, and edge signal Edge. Accordingly, this LSI also receives a process color designating signal COLR and color mode signals (4COLR, MONO).

The line memory 325 consists of two types of FIFOs. The first FIFOs are used for storing the data of 4 lines in order to transfer the signals of the process color X, necessary colors Hue, and edge Edge to a 5×7 digital filter 326. The second FIFOs are for adjusting the delays by the first FIFOs. The process color X and edge Edge signals of 4 lines are stored, and a total of five lines of those data signals are transferred to the digital filter 326. The data signal of the necessary color Hue is delayed by the FIFO, to synchronize it with the output data signal of the digital filter 326, and then is transferred to a MIS LSI 327.

The digital filter 326 consists of a couple of 5×7 filters (low-pass filter LP and high-pass filter HP) each consisting of three 2×7 filter LSIs. One of the 5×7 filters is used for processing the process color X, and the other, for processing the edge Edge data signal. The MIS LSI 327 applies the mesh-point removal and the edge emphasis to these output data signals by using the conversion tables, and these processed data signals are mixed into the process color X. The LSI 327 receives an edge EDGE signal and a sharp Sharp signal for switching the conversion tables one to another.

The TRC 342 consists of a RAM of 2K bytes containing eight conversion tables. The conversion tables may be reprogrammed during the return period of the carriage before each scan. A 3-bit select signal TRSel is used for selecting any of those conversion tables. The data processed by the IRC 342 is transferred to a reduction/enlargement LSI 345 by a transceiver. In the reduction/enlargement unit, RAMs 344 of 8K bytes constitute a ping-pong buffer (line buffer). The LSI 343 generates resampling pitches, and the addresses for the line buffer.

The output data of the reduction/enlargement unit returns by way of an area memory portion in the second circuit board of FIG. 37(b). An EDF LSI 346 contains a FIFO retaining the data of the previous line, and performs error diffusion processing by using the previous line data. A signal X after error diffusion processing is outputted to an IOT interface by way of an SG LSI 347 in a screen generator unit.

In the IOT interface, the signals outputted from the SG LSI 347 which are received in the form of 1-bit on/off signals are packed into an 8-bit data signal, and sent in parallel to the IOT.

In the second circuit board shown in FIG. 37(d), the data signals actually flowing in the board are for the 16 dots/mm record density. Because of this, a reduction LSI 354 reduces the data into ¼ and digitizes them, and finally stores them into an area memory. An enlargement decode LSI 359 contains a fill pattern RAM 360. When reading the area data out of the area memory to generate a command, the LSI 359 expands the data into 16 dots/mm data. By using the expanded data, it generates a log address, color palette, and filter pattern. A DRAM 356, consisting of four planes, stores coded area data of 4 bits. An AGDC 355 is a controller exclusively used for controlling the area commands.

(III-3) IPS Control

(A) VCPU

In the present invention, the VCPU manages and controls the image data processing system composed of the IIT and the IPS. At each of the stages in the processing of image data with the IPS, flexibility is secured in the processing of the image data for their conversion, correction, etc. by the adoption of conversion tables (LUT: Look-Up Tables) as already mentioned. In other words, the use of such conversion tables makes it possible freely to set the data for nonlinear conversion, correction, and so forth and also to obtain the desired calculated value at a high speed without performing any arithmetic operation merely by reading the conversion table if the value for the result from the arithmetic operation is set in advance. In addition, with the system constructed with a plurality of the tables so as to permit the selection of such tables in a manner suitable for the type of the image, it is possible to perform the conversion, correction, etc. of the image data in such a way as to fit the particular type of the image data, i.e. photographs, characters, printed images, and their mixtures, thus ensuring the reproducibility of the particular images in a manner suitable for the individual originals. On top of this feature, this construction with the conversion tables can reduce the number of gates and the capacity of memory in the processing circuits for conversion, correction, and so forth, and, since it is possible to obtain the desired data by reading the data out of the tables with the input data used as the address, this construction can realize a higher processing speed. The VCPU 74a performs the setting and control of the various types of tables and registers which make up the IPS with such features and also controls the image data processing system of the IIT.

The VCPU board (VCPU PWBA) on which the VCPU 74a is mounted is connected after the analog board (ANALOG PWBA), as viewed in relation to the flow of the image data illustrated in FIG. 19, and the board is mounted also with the individual circuits for the ITG (the IIT Timing Generator) and those for the SHC (the Shading Correction Circuit) in addition to the VCPU 74a. The VCPU 74a performs the setting and control of the various types of tables for the LSI forming the IPS, as mentioned above, and also performs the control of the ITG and the SHC and further the control of the various circuits built into the Analog board.

The bus shown in FIG. 37 is the bus for this VCPU 74a, and not only the setting of data in the individual registers and memory devices in the LSI, as a matter of course, but also the setting of data in the other LSI's are performed by way of this bus. The VCPU 74a has basic parameters in it and executes the writing process at the time of the start of a copying operation or a carriage return (back scanning) of the IIT, depending on the executing conditions for the copying mode, etc. For example, prior to the prescanning operation, the prescribed data are written to the individual registers and the tables on the basis of the type of the copying mode and the type of prescanning, and, before each copy scanning operation, the prescribed data are written to the individual registers and the tables in correspondence with the individual colors, M, C, ..., for development. Accordingly, with a screen generator which varies the screen angle according to the color for development, the rewriting of the data will take place at each copy scanning operation. Moreover, the writing process with the VCPU 74a is executed also for color masking and the tables, the registers, etc. of the UCR, the TRC, etc., in addition to the writing of data mentioned above, and, in order to perform these writing operations efficiently in a short duration of time taken for the carriage return, the VCPU 74a is so designed as to perform arithmetic operations in the scanning interval to calculate the data to be written next.

Next, a summary is presented with respect to the control performed by the VCPU 74a in relation to the IIT.

When the color decomposing signals (video signals) for the five layers of elements in the CCD line sensor are input from the IIT sensor board to the analog board, the analog board inputs the data via the individual amplifiers into the corresponding A/D converters (235 in FIG. 19), which convert the data into a series of eight-bit digital data, GBRBBR ..., and transmit the converted data to the VCPU board. For this analog board, the VCPU 74a sets the rate of amplification in the gain control amplifier and the offset control amplifier.

The ITG on the VCPU board controls the delay amount setting circuit (236 in FIG. 19), which performs the zigzag correction, and the separating and synthesizing circuit (237 in FIG. 19), and these circuits are controlled with the registers as set by the VCPU 74a. The delay amount setting circuit, which performs the zigzag correction, corrects the amount of deviation in the auxiliary scanning direction in the installation of the CCD line sensor in five layers, and the separating and synthesizing circuit, which is provided with a line memory, separates the GBRGBR ... into the respective color signals in each channel and, holding the said signals for one line, synthesizes the color signals for each channel.

The SHC performs the correction of the picture elements and the shading correction, with the picture element data for the individual colors being input from the ITG. The shading correction is a process whereby the difference between the input image data and the reference data written in the SRAM is found and output. As the reference data, the average value of the dark time output, which is the output at the dark time when the fluorescent lamp is turned off, for the $\Delta V$ dark correction and the output read from the white color reference board for the white correction are respectively corrected for the deviation of the picture elements and written to the SRAM.

Also, in the case of color detection, a writing operation is performed to the SRAM in synchronization with the line synchronizing signal IPS-LS from the IPS upon the elapse of 50 mS after the movement of the IIT carriage to the specified point. Then, with the next line synchronizing signal IPS-LS, the picture element data at the specified point are transferred to the RAM of the VCPU 74a. This color detection is applied to the five picture elements from the specified point in the main scanning direction and to the five picture elements from the specified point in the auxiliary scanning direction. Therefore, the picture element data at the specified point and the five points subsequent thereto are read into the RAM of the VCPU 74a from the picture element data for one line in the main scanning direction as written in the SRAM, and, with the IIT carriage being moved four times by one pulse at a time, the reading process for the picture element data is performed similarly on every five points. The operations just mentioned constitute the process performed in case there is one specified point. Accordingly, in case there are a plural number of specified points, the same process will be performed repeatedly on each of the specified points.

(B) Construction of IPS Control System

Figure 38:
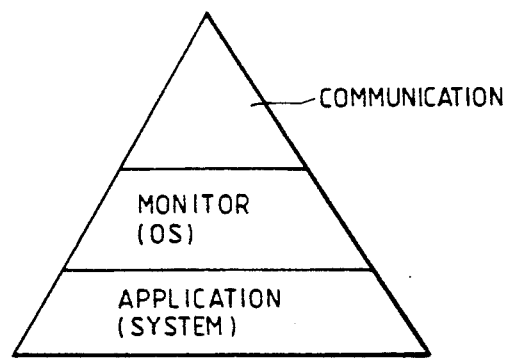
FIG. 38 illustrates the layer construction of the IPS control system.
Figure 39:
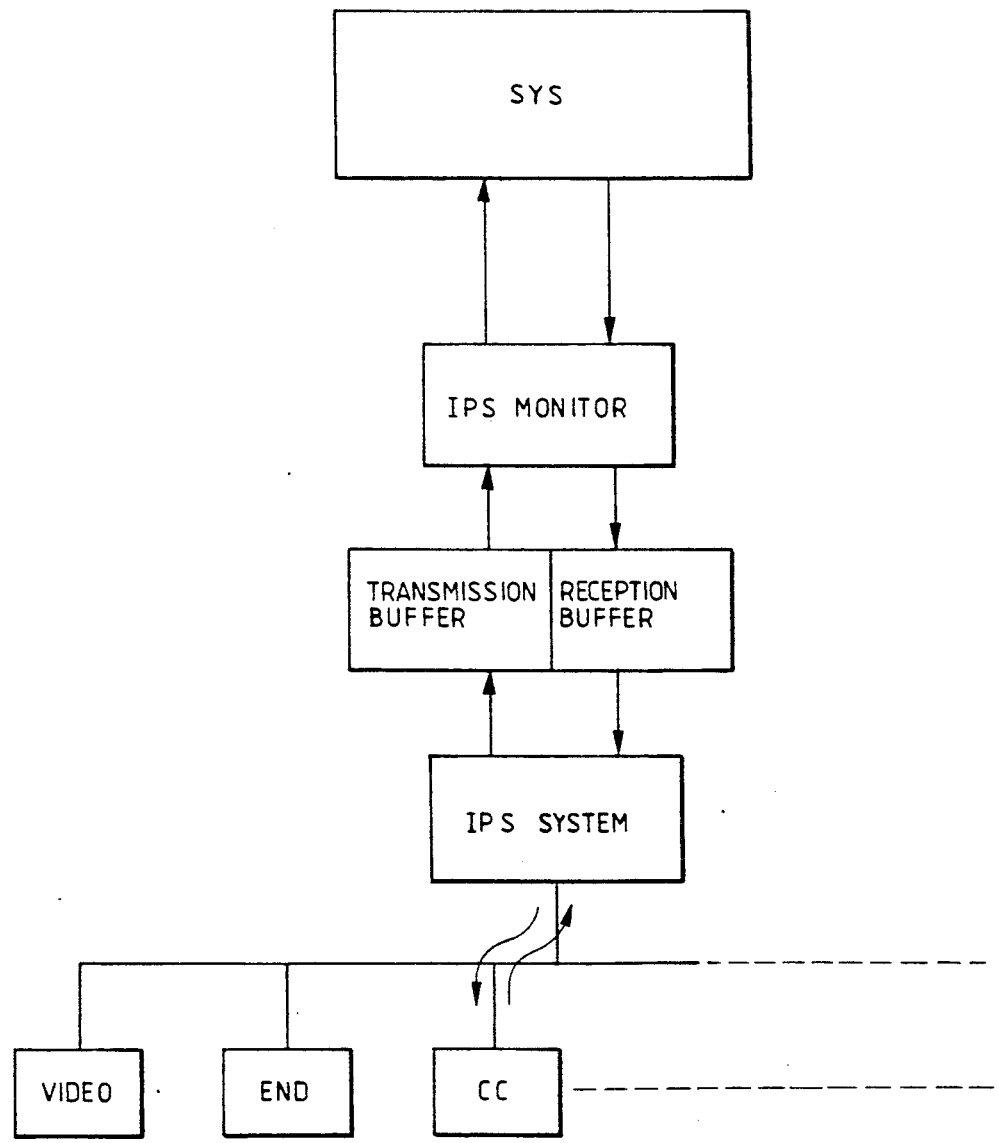
FIG. 39 illustrates the construction of the IPS control system.
Figure 40A:
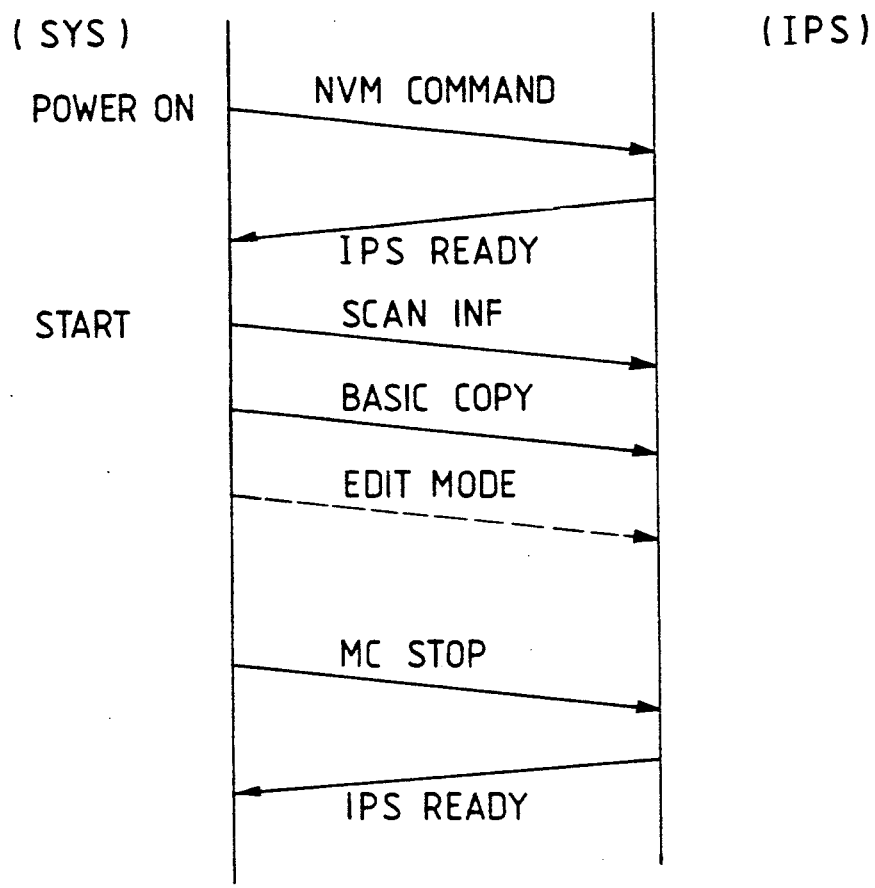
FIGS. 40(a) and 40(b) illustrate the communications between the SYS and the IPS.

FIG. 38 illustrates the layer construction of the IPS control system, and FIG. 39 illustrates the construction of the IPS control system. FIG. 40 explains the communications between the SYS and the IPS, and FIG. 41 explains the relationship between the scanning operations and the setting of the IPS.

In the individual LSI's of the IPS mentioned above, the necessary information is set by the IPS control system composed of the VCPU 74a, depending on the copying mode and other modes, and the layers of the IPS control system are structured in three layers, which consist of a layer for communications in the upper position and the monitor layer and the application layer in the lower positions, as illustrated in FIG. 38. The monitor generates the communication clock and the other necessary clocks, also, periodically operating the application and counting with the timer, monitors whether or not the tasks registered by the applications are executed accurately, and performs its essential function as the Operating System (OS), which executes the prescribed task, calling the address for interruption in case an interruption is put in. The application is assigned to a fixed set of tasks which it should perform to the IPS, namely, the execution and completion of the LSI in the IPS system in a state of handshake, performing the setting of the LSI.

The construction of the IPS control system (VCPU) is composed of the lower-ranking modules, which have the function of setting the necessary information in correspondence with the individual LSI's, which are VIDEO (for the shading correction, etc.), END, CC (color masking), and so forth, the IPS system, which instructs the particulars of the setting, the timing, and so forth to these lower-ranking modules, the signal transmission buffer, the signal reception buffer, and the monitor, as shown in FIG. 39. The IPS system instruct the items of setting on the basis of the NVM information and the ROM parameters, depending on the conditions, such as the power-on, the start, and the switching of the cycle, and performs the handshake. In other words, the IPS system instruct the execution of the setting of the LSI, calling the individual modules in the regular sequence. In response to such instructions, the individual modules report the completion of the instructed tasks to the IPS system when they have completed their execution.

Between the monitor and the IPS system, communications are exchanged via the signal transmission buffer and the signal reception buffer. For example, the monitor is put under an interruption of signal reception when a certain command is sent to the monitor from the SYS, and the monitor sets up a flag at the same time as it sets the command in the signal reception buffer. Thereupon, the IPS system calls the necessary lower-ranking module, viewing the command set in the signal reception buffer. When a report comes from the lower-ranking module on the completion of its execution of the instructed task, the IPS system sets the end information and sets up a flag in the signal transmission buffer, and the monitor reports the completion of the task with the IPS READY signal to the SYS by an interruption for a signal transmission.

Between the SYS and the IPS (VCPU), the the NVM information necessary for the IPS, such as the register adjusting value and the magnification adjusting value, is set in the IPS, with the NVM command being sent at the power-on time, as illustrated in FIG. 40. When this setting operation is completed, the IPS reports the completion to the SYS by the IPS READY signal. Then, with the Copy Start, the SCAN INF command, and the BASIC COPY command, and also the EDIT MODE command, in case any editing job is to be performed, are sent out.

With the SCAN INF command, information is furnished on the point whether the copying operation is to start with the ordinary copying scan or with the scan for detecting the original, or what scan is to be performed ahead of the copying scan. With the BASIC COPY command, information is furnished on the point what color mode, copy quality (color balance, contrast, density, sharpness modes), paper size, magnification, etc. are to be used for the copying job. With the EDIT MODE command, information is furnished on the area specifying coordinates in case there is any area specification, the editing functions, the color conversion, and so forth. Then, when the required run length is taken, the SYS transmits the MC STOP signal to the IPS, which responds thereto with the IPS READY signal.

Figure 40B:
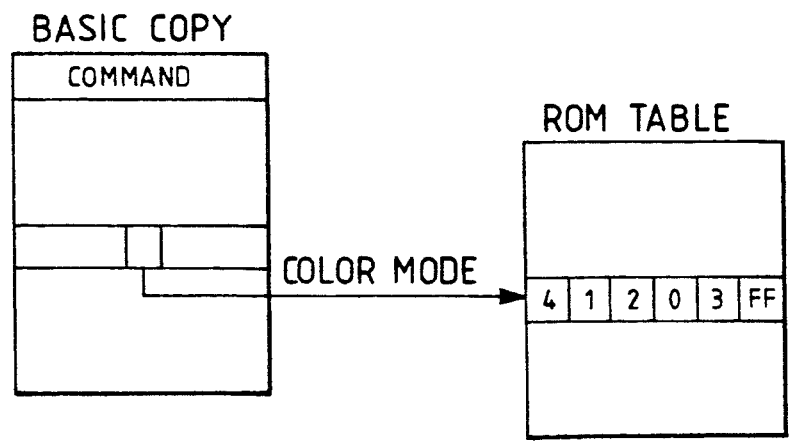

The BASIC COPY command is affixed with the numbers indicating the sequence of development. This sequence for development is provided in ten and several combinations for their application depending on such differences as full-color copying in four colors, full-color copying in three colors, and mono-color copying, and, as shown in FIG. 40(b), the IPS has the information on the number of the developing cycles and the developing sequence on the ROM table and selects the information on the ROM table by setting the appropriate numbers on the pointer. Then, the developing cycle is counted with the IIT page synchronizer PS by the use of the counter. For example, supposing that the number of the developing cycles is "4" and that the developing sequence is "1 (M), 2 (C), 0 (Y), 3 (K)", developing operations are performed to develop M at the count "1", C at the count "2", returning to "1" when this cycle of operations is performed up to the count "4" and continuing the cycle until the IPS STOP command is issued.

Figure 41A:
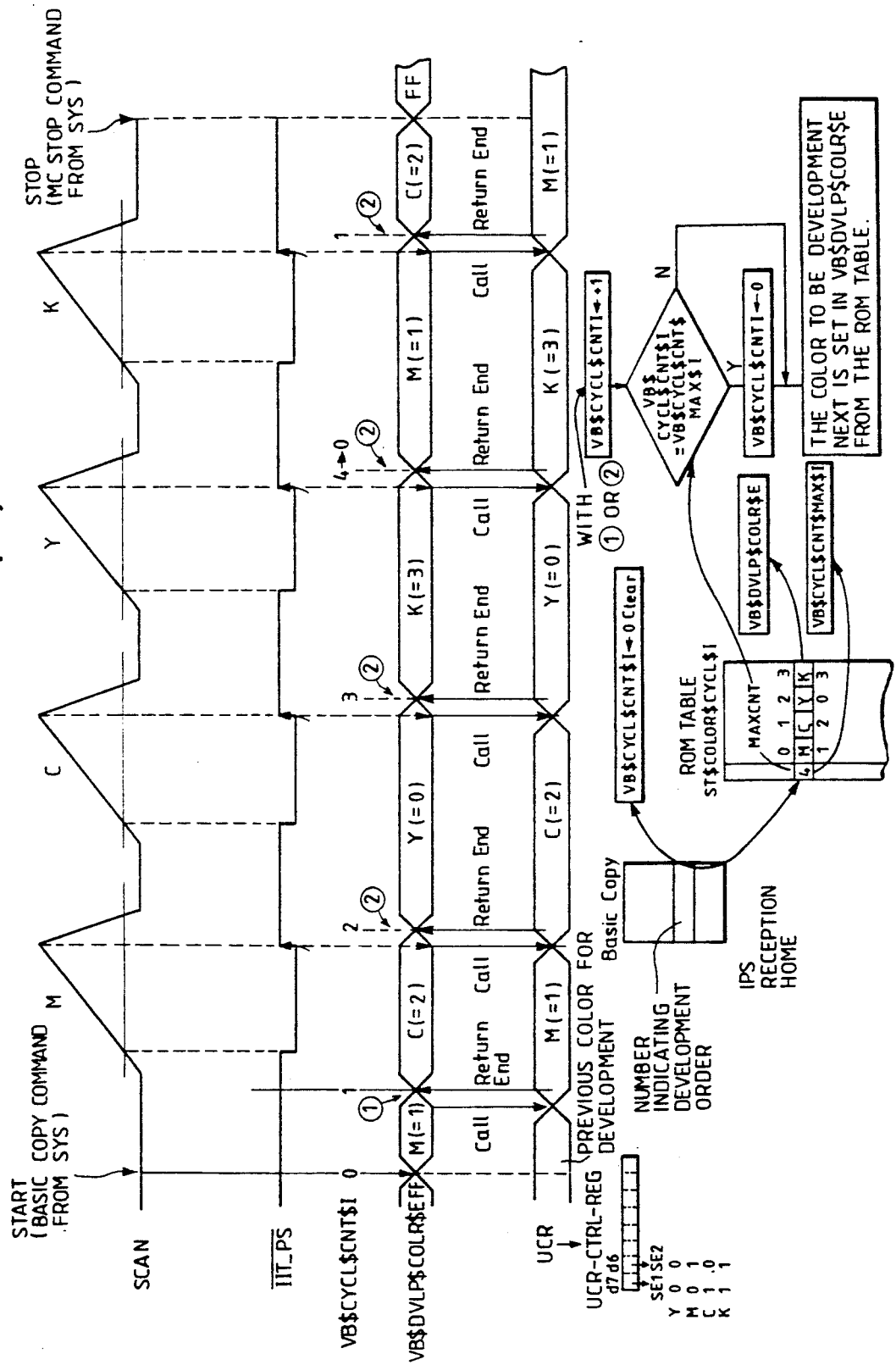

Next, a description is made of the lower-ranking modules of the IPS system. In respect of these operations, let us now assume that the scanning operation is performed in the developing sequence, M, C, Y, and K, as shown in FIG. 41(a), and the process for setting the LSI is performed with a lead by one cycle in relation to this developing cycle. For example, in order to set the space filter, the TRC, etc., it takes time to calculate the setting value. Thus, the IPS system judges the next color and makes the lower-ranking modules perform the calculation and setting of the data corresponding to the next color and makes the UCR select the color to be developed. With the Start, when the BASIC COPY command is received, the signal of the color to be developed first is judged on the basis of the color mode number, and Y, for example, is placed in the variables for the developing cycle. As shown in FIG. 41(b), the IPS system holds in the ROM the particulars of the processes to be performed at the time of the start, the said particulars including those for the selection of the table in respect of the END, those for the setting of the color Y for development in respect of the color selector, those for the setting of the multiplying calculation table for the filter coefficient 1 in respect of the space filter, those for the calculation and setting of the table applicable to Y in respect of the TRC, those for the setting of the magnifying ratios in respect of the R/E, those for the effective range of the buffer output and the setting of the amount of the image shift in respect of the line buffer, those for the TRC table in respect of the area memory 1, those for the modes of the space filter, and those for the setting of the color modes. Hence, the IPS system calls the individual lower-ranking modules in the regular sequence in accordance with the said particulars and gives instructions on the setting of each LSI and delivers the setting information. When the setting of each LSI is completed and a job end signal comes from each of the lower-ranking modules, the IPS system sets the color for development in the SE bit of the control register of the UCR and at the same time effects a change to the next color with respect to the calculation process, etc. for the data, returning the IPS READY to the SYS. In this way, the IPS system precedes the color for development by one cycle, with an interruption being put in upon the rise of the IIT page synchronizer PS. And, the IPS system delivers the information on the magnifying ratio, the sharpness control value, the sharpness mode, and the color for development to the space filter and the information on the color balance adjustment, the contrast adjustment, the density adjustment, the character mode, the negative-positive reversal, the openwork synthesis, the mono-color, the OHP, etc. to the TRC.

Figure 41C:
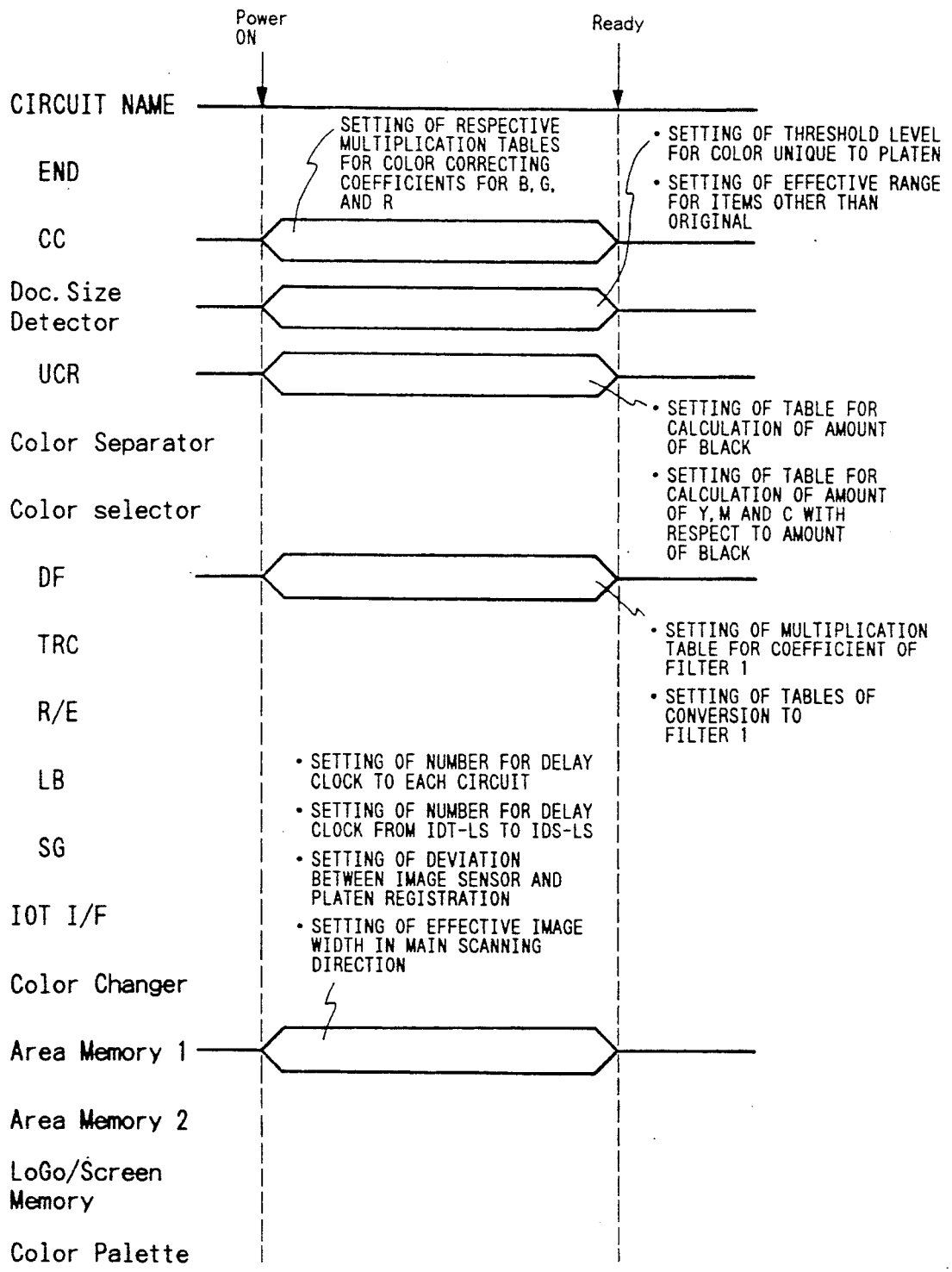
Figure 41D:
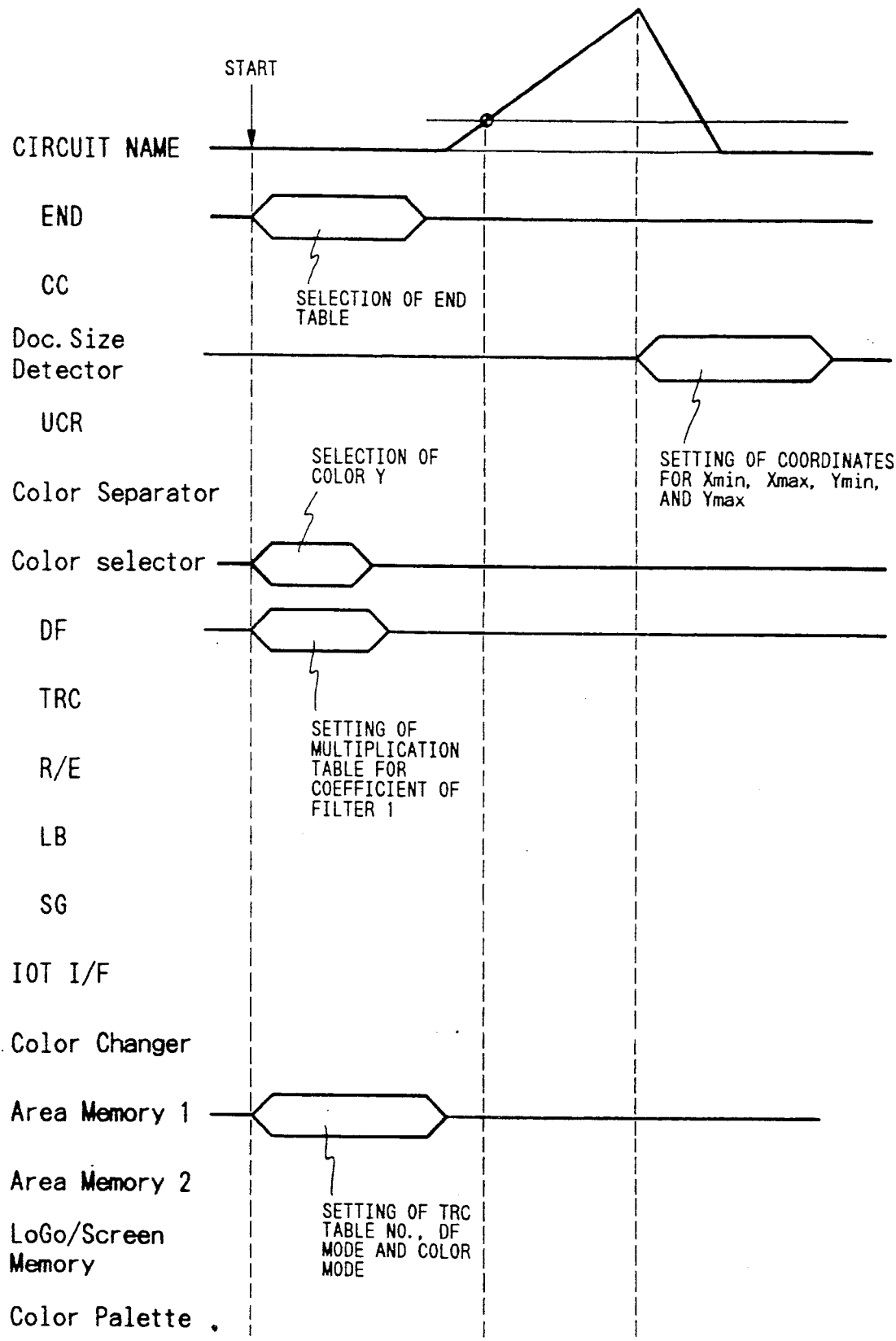
Figure 41E:
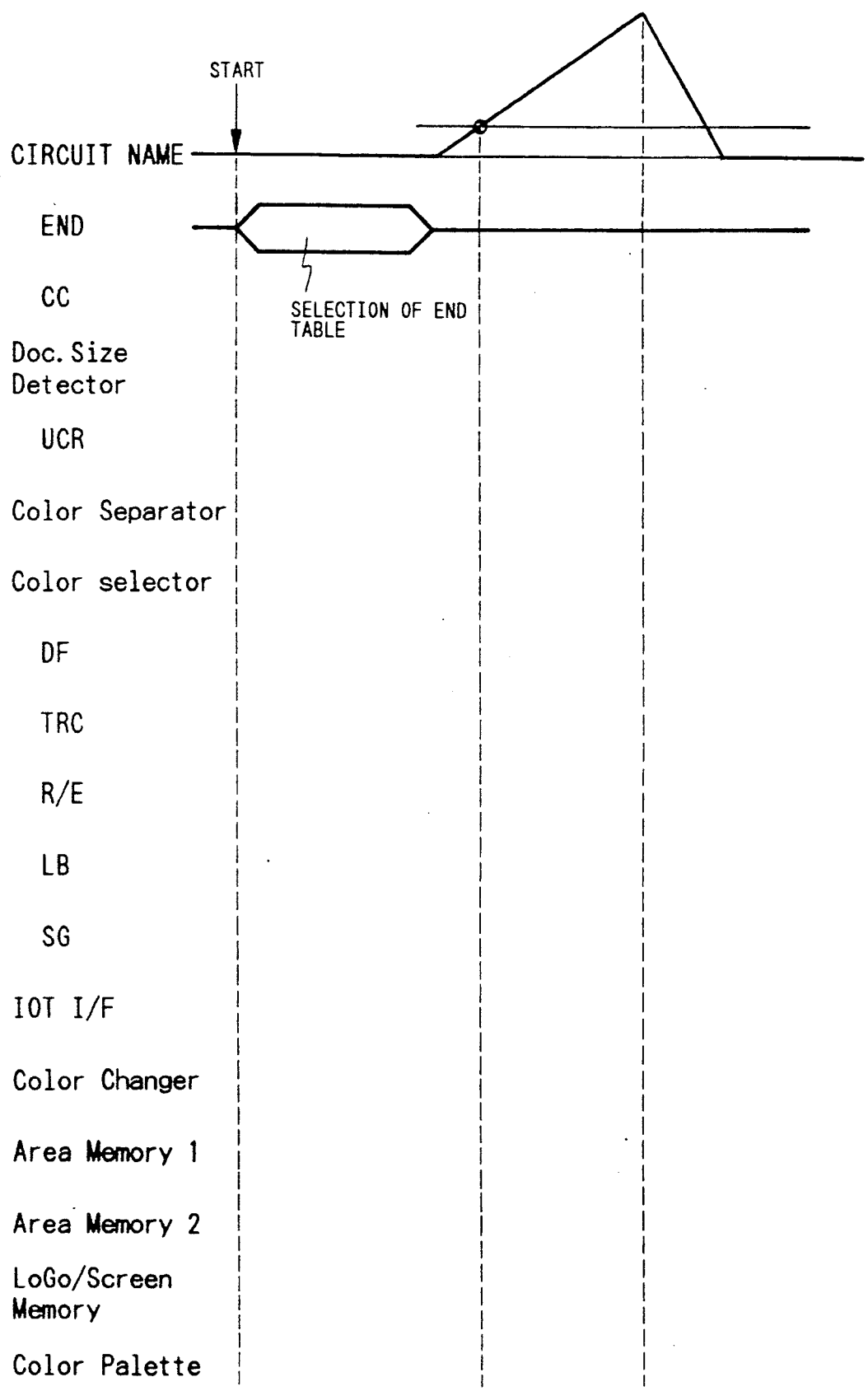
Figure 41F:
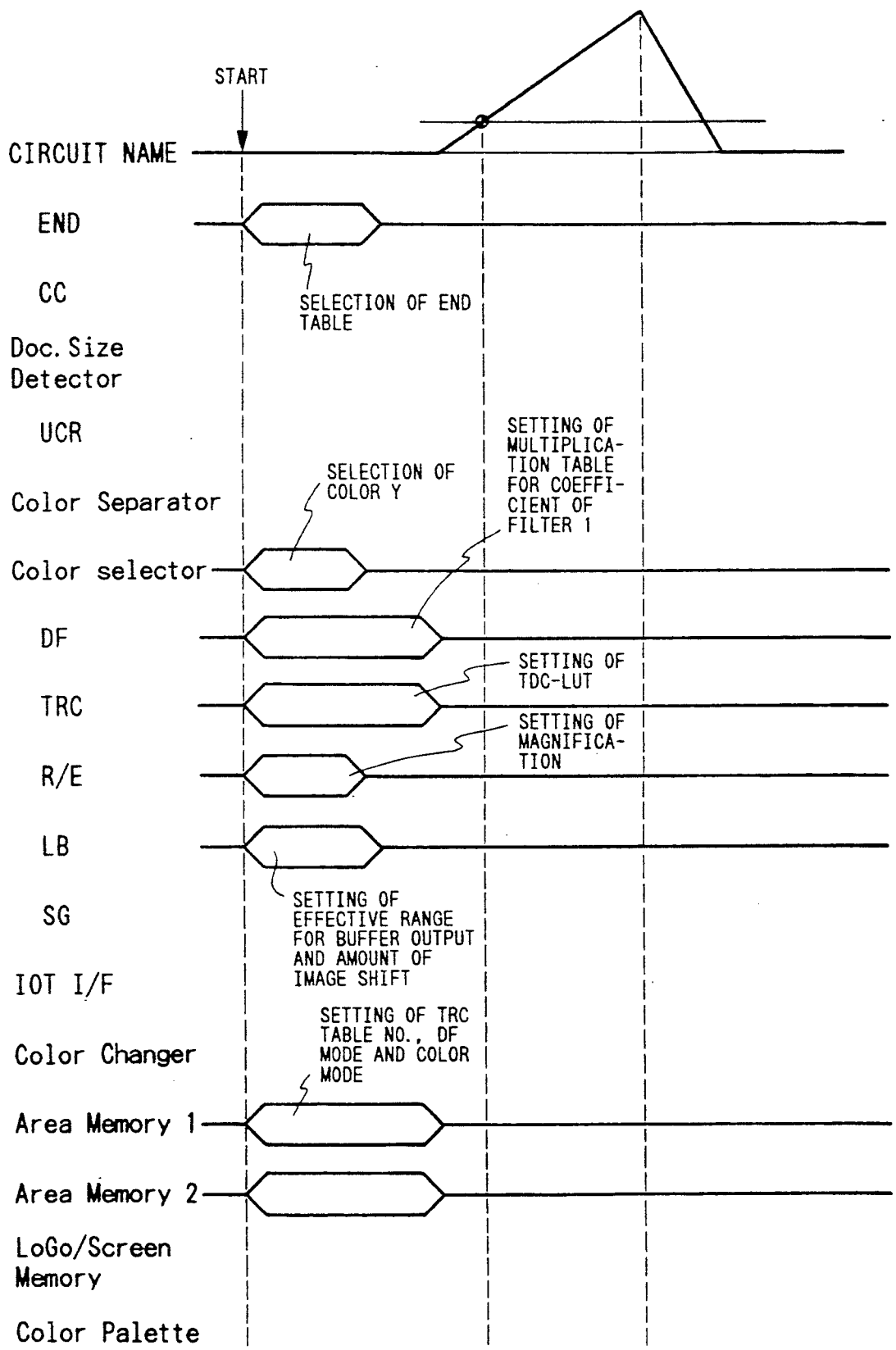
Figure 41G:
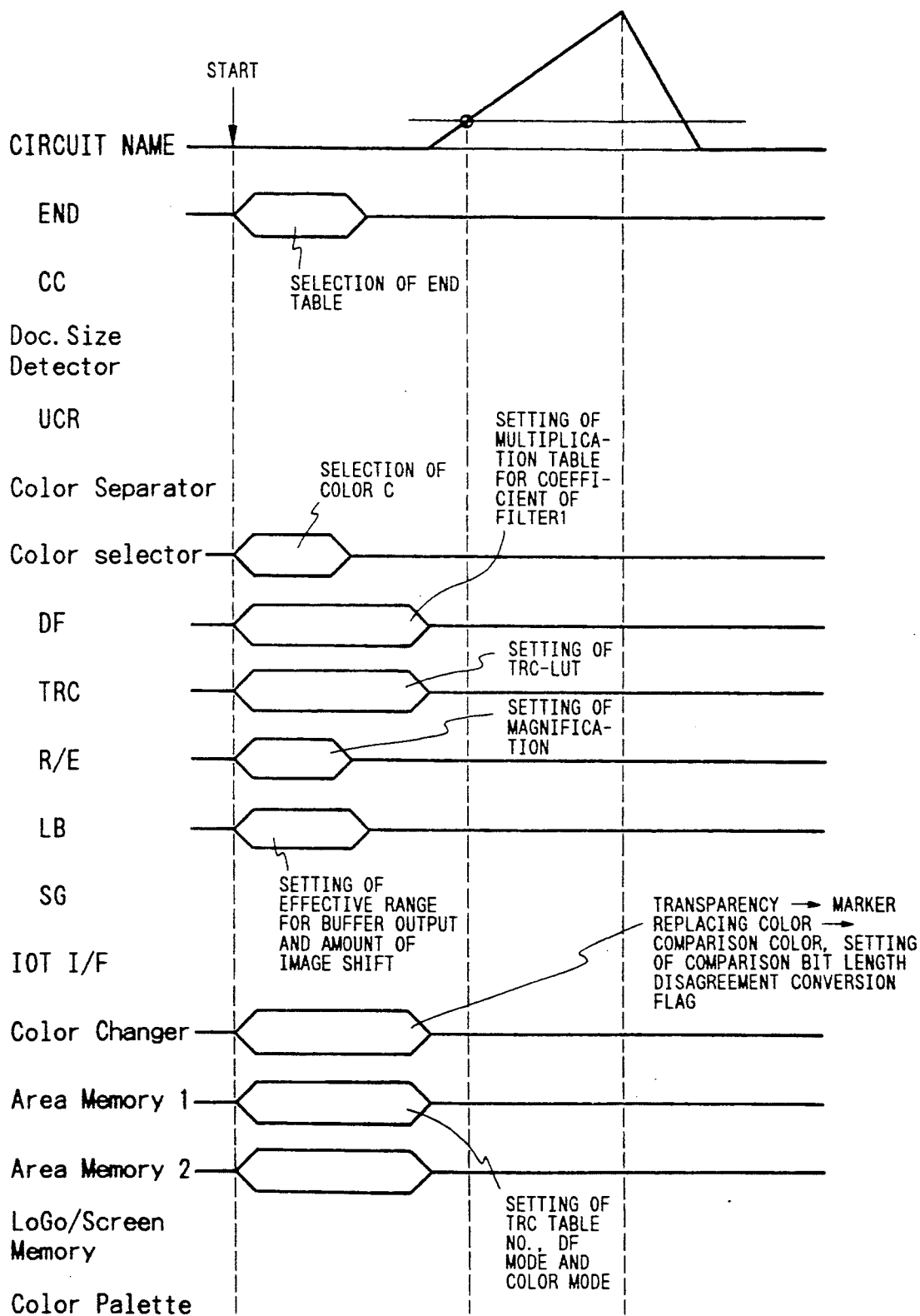

Moreover, FIG. 41(c) illustrates the process to be performed when the power is turned on, FIG. 41(d) illustrates the process at the time of the scanning for detecting the original, FIG. 41(e) illustrates the process at the time of the sample scanning, and FIG. 41(f) illustrates the process at the time of the scanning for coloring the area within a frame, and FIG. 41(g) is the process at the time of the marker scanning. Thus, the IPS system has the particular contents to be set in the individual lower-ranking modules in accordance with the individual types of scanning and delivers the setting information, calling the lower-ranking modules in regular sequence and giving instructions on the setting of each LSI.

(III-4) Construction of Editing Control System (A) Combinations of Editing Functions The present invention sets up the combinations of functions and the order of priority based on an object-oriented concept for the purpose of realizing the final copy as imaged by the user. Toward this goal, the functions are divided between the adjusting functions for adjusting the image in accordance with the various modes and requirements and the annotating functions for applying specific patterns or the like over the image, and higher priority is given to the latter category of functions. The adjusting functions include such functions to be set by the basic copying, added feature, and copy quality pathways as the color mode (full color and single color, and color conversion), size reduction and enlargement, copy quality adjustment (sharpness, density, contrast, etc.), and copying position (binding margin, center shift, etc.), for example, and copies are produced in the image with these adjusting functions basically performed on the overall basis in the specified area and with the annotation placed over the area as so adjusted. That is to say, the annotation is applied as an overlay on the area processed for copying in full color or in a single color or for copying with color conversion. Thus, this system features a combination of functions with higher priority attached to the annotating functions as compared with the adjusting functions. These orders of priority are set by the arrangement of the modules for the realization of the individual functions in respect of the hardware and also by the construction of the logical processes in terms of the software. That is to say, the order of priority of the downstream functions will be higher than those in the upperstream since the processes in the downstream region are generally performed over the image data already processed in the upperstream region, as viewed from the standpoint of the flow of the image data. Moreover, when viewed from the standpoint of the setting process, the setting is processed in such a way as to give higher priority to the item specified later, with overlays being applied on the processed image in the sequence of the logical processes between the images and in the specifying order.

On the basis of the positioning mentioned above, the editing control modules are positioned in the rear section as illustrated in FIG. 35, and the color masking module, the color converting module, the UCR module, the space filter, and the TRC module, which are controlled with the area image control module, are positioned in the preceding section. Thus, the system selects either one of the two planes of the LUT composed of the plane for mono-color and that for full-color by the operation of the color converting module, and also selects whether or not the UCR module should be bypassed (mono-color), and then selects the converting circuit by the operation of the color converting module, and selects with the space filter one of the modulating LUT's, which are provided in a total of five planes each for the intense modulation and the weak modulation, depending on the distinction among photographs, characters, printed images, or mixtures, and selects the suitable one of the eight planes of the LUT by the operation of the TRC module, thereby performing such processes as the adjustments of sharpness, density, and contrast and the reversal. Furthermore, the reducing and enlarging module, which is arranged in the front stage of the editing control module, performs such processes as reduction/enlargement, binding margin, and center shift.

As mentioned above, the order of priority of the editing functions are set so as to give higher priority to them as compared with that of the adjusting functions by the construction of the connections in the hardware in such a way that the processing of the annotation is performed by the editing control module after the processing by the adjusting functions is done in correspondence with the flow of the image data. Therefore, in the relationship between the adjusting functions and trimming, for example, the trimming process is performed by the editing control module on the image data as processed by the adjusting functions, and accordingly trimming is made of the image of the original as processed by the adjusting functions without any regard to the relative timing of the operations. Also, the same applies to the relationship between the adjusting functions and trimming, in which case the area size changes, together with the image, by the effect of the reduction or enlargement in the process preceding the annotation. Moreover, among the adjusting functions, the order of priority is set with the area image control module in such a way as to assign higher priority to the later specified item, so that the functions for which the area is specified later will be given a higher order of priority, and, among the annotating functions, the order of priority is set with the software for setting the commands on the editing control module.

For example, in the relationship between trimming and masking (in the mask group), it would be perplexing to the operator to find that the copying output differs by the relative order of the operations. Therefore, the system according to this invention takes and outputs the AND value (logical product) between the images. Owing to this feature, the operator can readily understand the image of the copying output as it is sufficient for him to consider that the image is produced by the AND of trimming and masking, regardless of the relative order of the operations.

Moreover, in the combinations of the functions other than those of the mask group and logogram, the creation of the image by the functions of the mask group mentioned above will be done on the priority basis. Accordingly, in a combination of coloring and painting with trimming, for example, trimming is done on the image as processed by coloring and trimming. Yet, in view of the point that a logogram is more likely to be specified in the masked area, logograms are processed so as to output them without any regard to the creation of images with the functions of the mask group. Also in the combinations of logogram with the other functions, logograms are processed with the highest priority.

In the combinations of the coloring within a framed area (paint 1) with the other annotating functions, the priority of paint 1 is set at the lowest level. Consequently, in case paint 1 and another annotating function, for example, are specified in their partial overlapping, the other annotating function is given higher priority with respect to such a part, and, in case paint 1 is combined with entire area coloring, the image with the entire area coloring will be output.

As mentioned above, the present invention attaches the highest order of priority to the logogram inserting function in respect of the software, with the order of priority set for giving priority to the masking function, the trimming function and the other annotating functions and the paint 1 function, and the color converting function is positioned in the uppermost stream in the flow of the image data and is thereby assigned the lowest order of priority. Therefore, the means of realizing the individual functions are arranged in such a way that the functions with the higher priority are performed later. For example, in case the color converting function and the paint 1 function are combined, the paint 1 function is applied to the image as processed with color conversion in the area specified for its processing with the combination of these functions. Now that the order of priority is fixed in reflection of the object-oriented concept as described so far, the system has become easier to use and makes it easy to envisage the output image.

(B) Outline of Overall Construction of Editing Control Circuit

Figure 42:
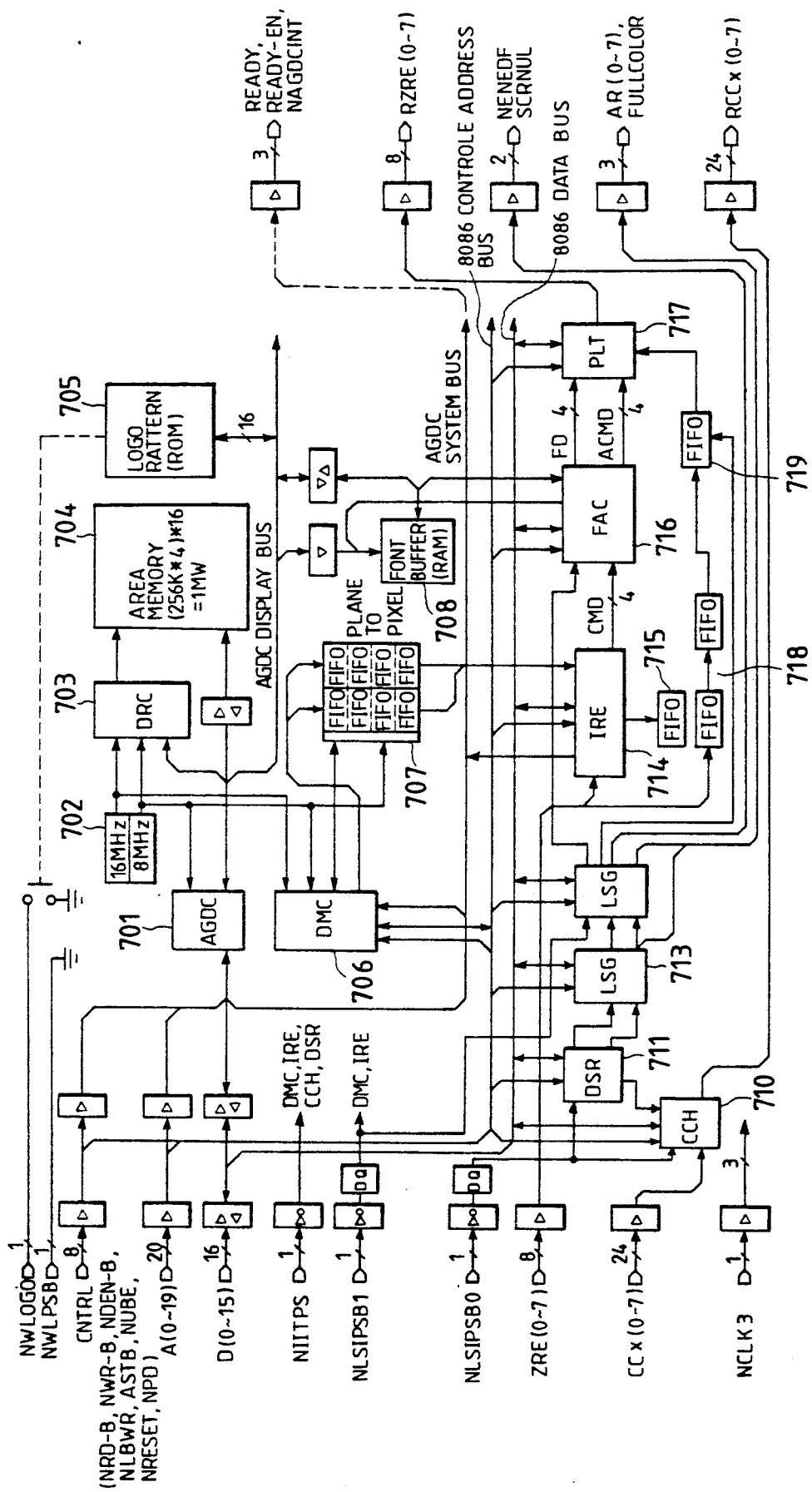
FIG. 42 illustrates the construction of the editing control circuit mounted with the LSI for performing the individual processes respectively for annotation, area specification, and color conversion.

FIG. 42 illustrates the construction of the editing control circuit board mounted with the LSI's which perform the individual processes for annotation, area specification, and color conversion.

The editing control circuit board is provided with an AGDC (Advanced Graphic Display Controller) 701, a plane memory 704, a DMC (DMA Controller) 706, FIFO 707 and 715, an IRE (Image Reduction and Enlargement controller) 714, an FAC (Front Address Controller) 716, a PLT (Palette) 717, and so forth as the circuits which form the editing control module and perform the processes for annotation, as illustrated in FIG. 42 and also with an area specifying circuit 711, which forms the area area image control module and operates as the circuit for generating the area command for the adjusting functions, and the color converting circuit 710, which operates as the circuit for converting the color of the original in the specified color in the specified area.

The circuit which performs the annotating processes replaces the character part only, both the character area and the background area, or the background area only with halftone, hatching, or solid or inserts a logogram, in a marker area, a closed area, a rectangular area, and a free-shaped area. In order to perform these functions, the system first writes the data to the plane memory 704 with respect to the specified area on the basis of the input of the coordinates from the marker scanning process, the closed area scanning process, and the digitizer and thereafter records the processing command in the particular area, and performs the process for replacing the command with image data, reading the command at the time of the main scanning operation. Moreover, in the circuit for generating the area command for the adjusting functions, the area based on the values of coordinates input from the UI and the command are set up, and these are read out at the time of the main scanning operation to perform the control of the adjusting functions therewith. One of such circuits is the color converting circuit 710. In the main scanning operation, therefore, the processes relating to the color converting function and other related adjusting functions are performed in the specified area for the image data, and the processes with the annotating functions are performed thereafter on the image data as processed for the said adjustments. Subsequently, a summary description is made of each of these blocks.

The plane memory 704 stores the commands when the input image is process for its replacement with another item, such as masking and a logogram. Since the annotating functions are applied to the processing of a specified area and hence do not require such a high degree of resolution as would be necessary for the processing of the input image, the plane memory is constructed with four planes each in the A4 standard size with the dimensions of 432 mm in the auxiliary scanning direction and 300 mm in the main scanning direction with a reduction of the memory capacity by a reduction of the resolution to 4 dots/mm, so that it sends out the colors and patterns corresponding to the bit images written on the said four planes. Accordingly, the plane memory is capable of performing $2^4$ or sixteen ways of processing. The functions in this category can be roughly divided between "the coloring of a closed area", which paints out the blank part in a closed area enclosing a specified point with the arbitrarily selected color or pattern, and "the coloring of the rectangular area", which paints out the rectangular area specified at two points with the arbitrarily selected color or pattern. These functions include the coloring of the framed area, which is performed with one point specified in the area, the color conversion, which consists in specifying the area with markers and converting the black color into an arbitrarily selected color by applying the process to n original in black and white, the halftone process, which consists in placing a halftone mesh over the image of the original while retaining the said image, masking, which paints out the area with white (to render the area transparent), trimming, which on the contrary paints out the part outside the area in white, specified shift, which works in the same way as extraction, and paint, which does not retain any image of the original.

The AGDC 701 performs hardware-based control of the memory, and it is a graphic display controller, which performs such operations as taking up the marker image and the closed area image on the original and writing such images to the plane memory 704 at the time of the closed area scanning and the marker scanning, drawing a bit pattern on the plane memory 704, and sending out the bit pattern out of the plane memory 704 at the time of the main scanning.

The IRE 714 performs the conversion of the image data into binary value data, as well as the process for their reduction, using the FIFO 715 at the time of prescanning and transfers the data to the AGDC 701 via the DMC (Direct Memory Access Control) 706 and performs the enlarging process, receiving the input of the data transferred from the AGDC 701 via the FIFO 707 at the time of the main scanning.

The DMC 706 performs the transfer of data from the IRE 714 to the AGDC 701 by the DMA write command and the put command and also performs the transfer of data from the AGDC 701 to the IRE 714 by the DMA read command and the get command. At this juncture, the DMC 706 performs the said transfer of data from the AGDC 701 to the IRE 714 through the FIFO 707 on the way and performs the said transfer of data with respect to the four planes of the plane memory 704. Also, the DMC 706 performs the said transfer of data from the IRE 714 to the AGDC 701 with respect to one plane in the plane memory 704.

The FAC 716 reads the bit map pattern data out of the font buffer, if the area command is for rendition in halftone or the insertion of a logogram, and sends out the data to the PLT 717.

The PLT 717 synthesizes halftone patterns and logograms out of the data transferred from the FAC 716 and sets the colors which correspond to the area command on the four planes of the plane memory 704. The data on the color components to be output are thus set in respect of each color for development, i.e. Y, M, C, and K. In this case, the data are set after their conversion by the TRC-LUT, so that the density, contrast, and color balance may be reflected.

In addition to these, the logogram pattern ROM 705 is to be set for each user, and the signal indicating whether or not this is installed is sent out with the on/-off operation. In the font buffer 708, the logogram pattern is copied after it is read out by the AGDC 701 from the logogram pattern ROM 705 and processed for its rotation, etc. and/or a halftone mesh pattern is drawn therein. The line synchronizing generator 713 generates synchronizing signals in correspondence with the image signals delayed as the result of the pipeline process. The FIFO 718 delays the image data by one line in correspondence with the amount of delay in the pipeline process, and the FIFO 719 adjusts the amount of delay less than one line.

The circuits described above form the editing control module explained earlier and execute the annotating processes, and the area specifying circuit 711 forms the area image control module and gives the table-selecting signals, etc. to the color masking circuit, the color converting circuit, the UCR, the space filter, the TRC, etc., generating an area command in each of the areas when the area as specified with the coordinates X and Y and the contents of editing in the area are set by the UI. The color converting circuit 710 performs the processes for the conversion of the color in agreement or the conversion of the color in disagreement, in accordance with the area command given by the area specifying circuit 711, with the color for comparison and the color for conversion being specified for the purpose of its judgment of the object of its converting process.

(C) Summary Description of Overall Operations

Next, a summary description is made of the overall operations in the circuits mentioned above.

First, with regard to editing, the UI specifies the area and the contents of the editing job to be performed in the area. Of these, the area-specifying data in coordinate values determined by the use of a digitizer or a key are stored in the plane memory 704 and fed into the AGDC 701 through the data buses, D0–D15, of the VCPU, and the area set with the input of the coordinates is written therein, and also the command is set in each register in the area specifying circuit 711.

Furthermore, if any marker scanning or closed area scanning is performed in advance of the main scanning, the image input data, ZRE 0-7, are turned into binary value data and processed for reduction with the FIFO 715 in the IRE 714 and are then transferred to the AGDC 701 via the DMC 706. Then, the marker image and the closed area frame image are taken into the AGDC 701 and written to the plane memory 704. Next, a command is set (in the form of drawing a bit pattern) in the editing area on the plane memory 704 by the VCPU via the AGDC 701. Moreover, in the case of the marker scanning operation, the marker color is converted into black on the entire area by the color converting circuit 710, and the other colors are converted into white, and only the image of the marker is processed with the image input data, ZRE 0-7.

Subsequently, when the operation shifts to the main scanning process, the area specifying circuit 711 generates area commands for the individual areas with higher priority attached to the later specified items in respect of eight areas including the entire area of the original. Therefore, the color conversion with the color converting circuit 710 and the processes related to other adjusting functions are performed. In the meanwhile, when the bit pattern in the plane memory 704 is fed out from the AGDC 701, the pattern is written for one plane at a time to the FIFO 707 via the DMC 706. The IRE 714 puts the patterns together into data for the four planes and applies the enlarging process to the data, thereafter transmitting the area command ACMD to the FAC 716. With this area command ACMD, the FAC 716 reads the bit map pattern data out of the font buffer 708 and synthesizes the data by the PLT 717 with the image data as adjusted for synchronization by the FIFO 718 and the FIFO 719, and then sends out the image output data RZRE 0-7.

(III-5) Area Specification

Figure 43A:
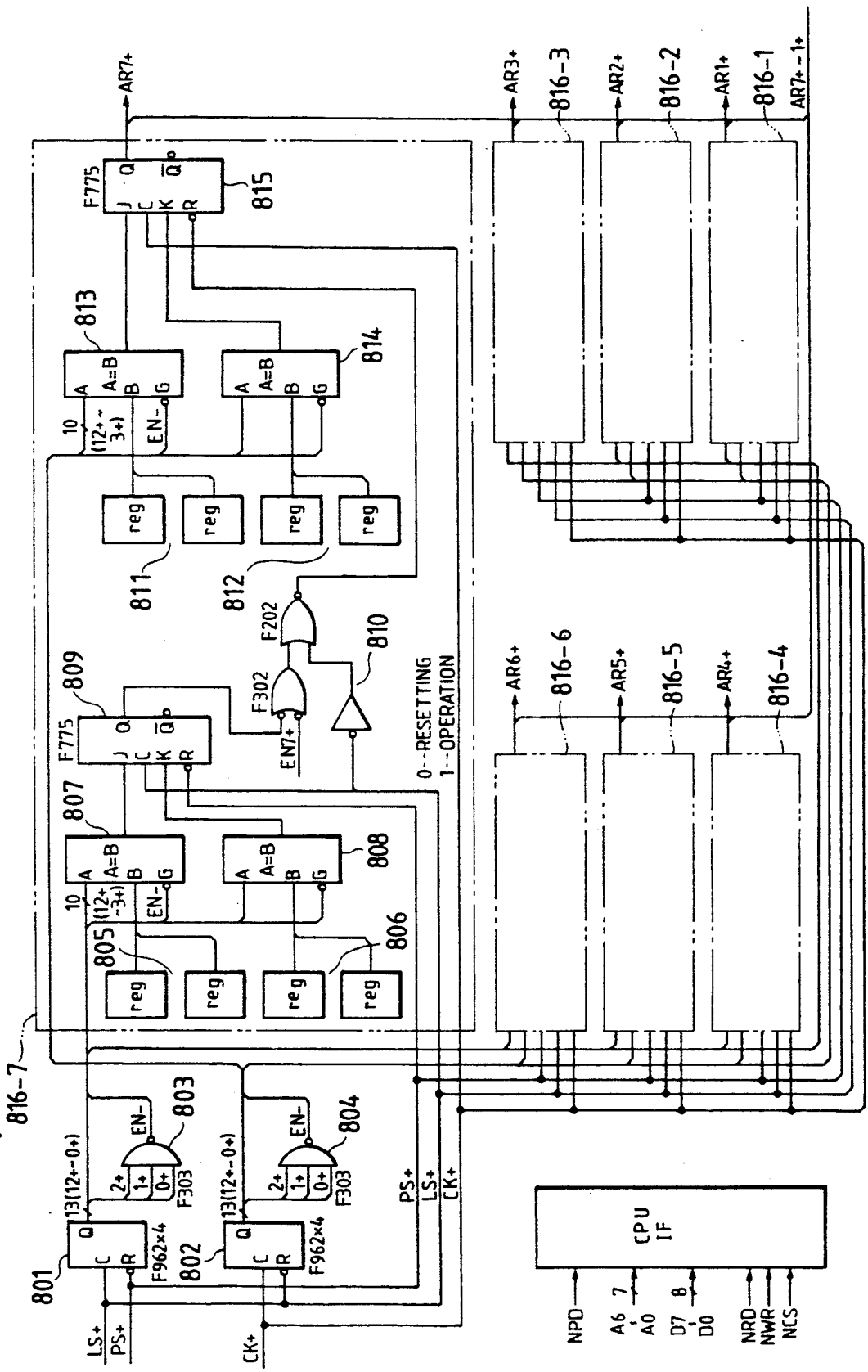
FIGS. 43(a) and 43(b) explain the circuit construction of the area specifying LSI.
Figure 43B:
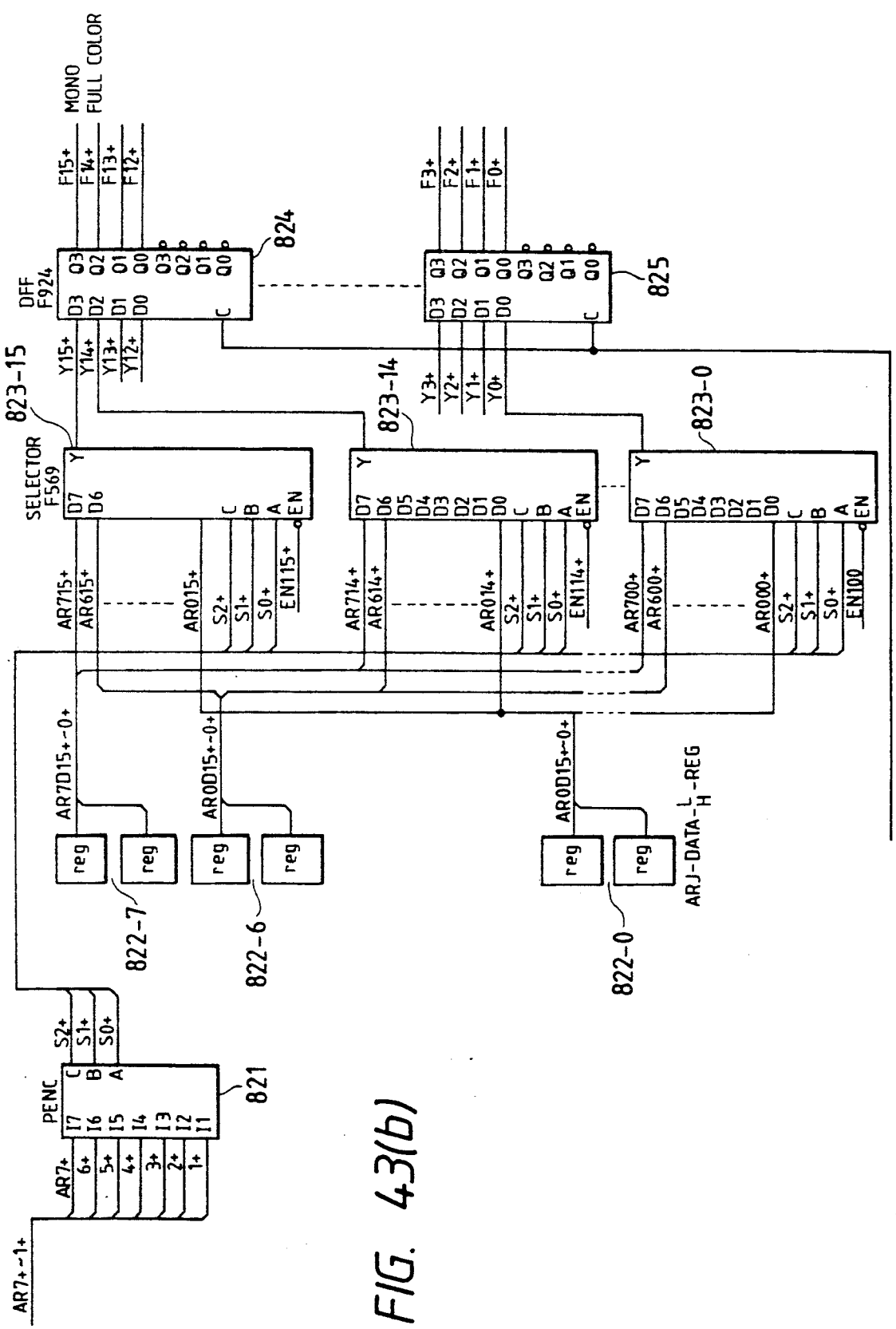
Figure 44:
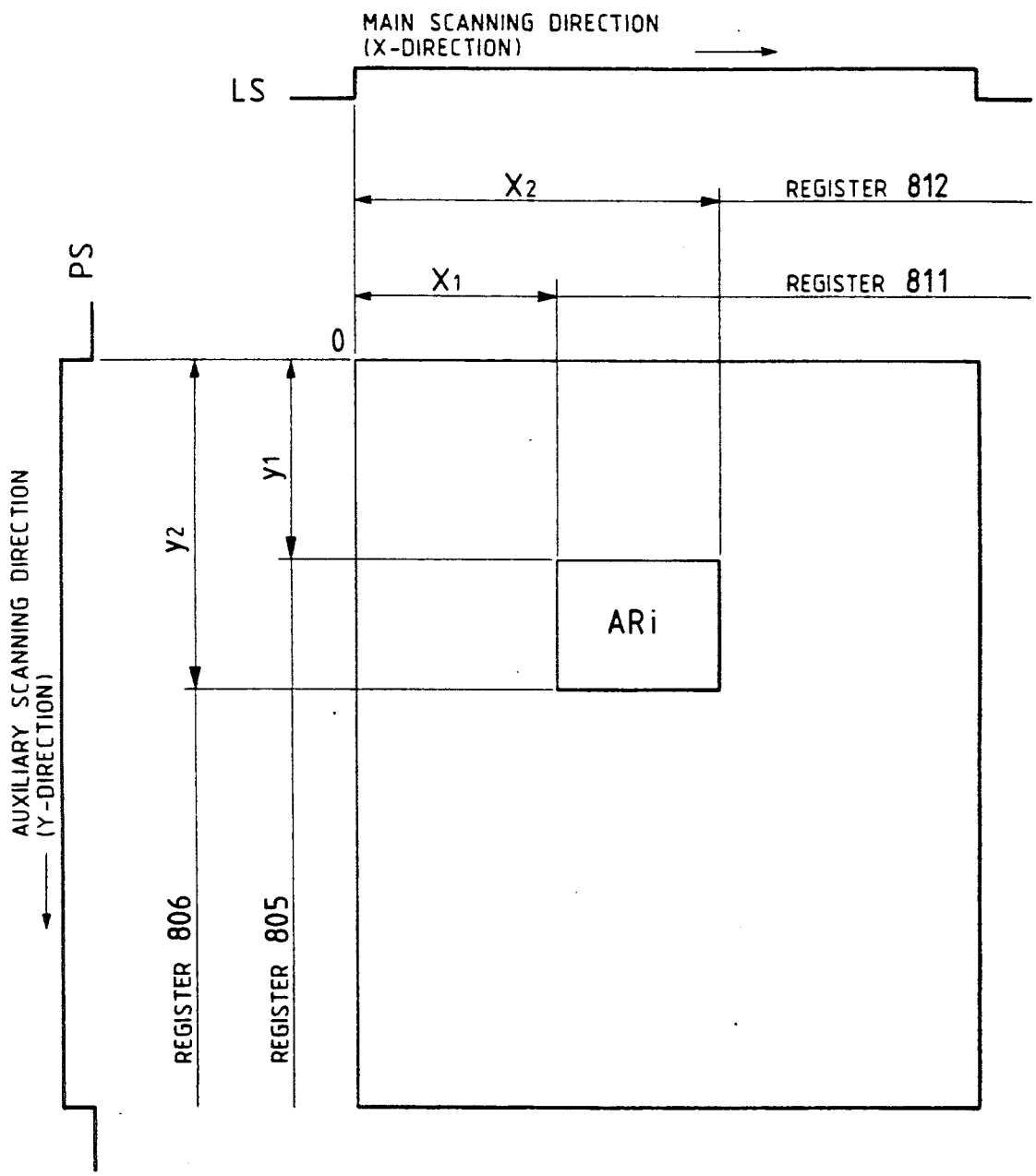
FIG. 44 illustrates the set area and the contents set in the area setting register.

FIG. 43 illustrates the circuit construction of the area-specifying LSI, and FIG. 44 shows the specified area and the contents set in the area-specifying register.

(A) Characteristics

As shown in FIG. 35, the IPS according to the present invention is designed to perform the neutral density equivalent conversion of the color decomposing signals for B, G, and R, when these signals are input from the IIT, thereafter to convert these signals into the recording signals for Y, M, and C, to perform the various processes for the detection of the size of the original, the color conversion, and the process with the UCR in the regular sequence, and thereafter to perform the various processes with the space filter, the TRC, the reduction and the enlargement, etc., with the color for development. The annotating process explained above is performed immediately before the process with the screen generator, which is performed after the various processes just mentioned. However, the area-specifying LSI is to realize the adjusting functions mentioned above in a rectangular area defined with the coordinates X and Y on the original, and it is designed, therefore, to control such processes as color masking, color conversion, the UCR, the space filter, the TRC, and the screen generator, issuing the commands for each specified area on the real-time basis, and to perform the switching of full color and mono color, the color conversion in four colors, the switching of the edge emphasizing mode and the sharpness mode, the negative-positive reversal, the tone control, and so forth for each specified area. For the areas which can be specified, the capacity equivalent to eight areas, including the entire area of the original, is made available, and this IPS generates commands in sixteen bits. In addition, the circuit construction employed for this area specifying process features a system whereby the higher priority is given to the later specified items in the order of their specification.

(B) Circuit Construction

The circuit for the area specification is provided with the counter 801 and the counter 802 for detecting the positions, as illustrated in FIG. 43, and is so constructed as to generate the area commands with the circuits divided between the circuits which generate the area signals in the auxiliary scanning direction and those which generate the area signals in the main scanning direction. The counter 801 detects the position in the auxiliary scanning direction (i.e. the scanning direction Y) by counting the line synchronizer LS and the counter 802 detects the position in the main scanning direction (i.e. the scanning direction X) by counting the video clock CK. On the basis of the output from these counters, the system detects the area in the auxiliary scanning direction and the area in the main scanning direction with the respective circuits, generating the area signals and issuing the area commands.

First, a description is made of the circuit which generates the area signals for the auxiliary scanning direction. The register 805 holds the starting position $y_1$ with respect to the auxiliary scanning direction, as illustrated in FIG. 44(a), and the register 806 holds the terminating position $y_2$ for the area specification in respect of the auxiliary scanning direction. The comparator 807 compares the starting position $y_1$ in the register 805 and the value on the counter 801, and the comparator 803 compares the terminating position $y_2$ in the register 806 and the value on the counter 801, and these comparing processes are performed respectively in synchronization with the output from the NAND gater 803 to which the less significant three bits in the counter 803 are applied as the input. In other words, the comparing process is performed for every eight lines. The J-K flop-flop 809 is set from the time when an agreement is detected with the comparator 807 with the line synchronizer LS used as the clock to the time when an agreement is detected with the comparator 808, and this flop-flop outputs the area signals in the auxiliary scanning direction. On the basis of this area signal, the GATE circuit 810 controls the area signals in the main scanning direction.

Next, a description is made of the circuit which generates the area signals in the main scanning direction.

The register 811 holds the starting position $x_1$ for the area specification in respect of the main scanning direction, as illustrated in FIG. 44(a), and the register 812 holds the terminating position $x_2$ for the area specification in the main scanning direction. The comparator 813 compares the starting position $x_1$ in the register 811 and the value on the counter 802, while the comparator 814 compares the terminating position $x_2$ in the register 812 and the value on the counter 802, and these comparing processes are performed in synchronization with the output from the NAND gater 804, to which the less significant three bits of the counter 802 are applied as the input. In other words, the comparing process is performed for every eight clocks. The J-K flop-flop 815 is set from the time when an agreement is detected with the comparator 813, with the video clock CK used as the clock, to the time when an agreement is detected with the comparator 814, and this flop-flop outputs the area signals in the main scanning direction. The output from the GATE circuit 810 is used as the resetting signal for this J-K flop-flop. The GATE circuit 810 outputs a low level when the output from the J-K flop-flop 809 is at a high level (within the area in the auxiliary scanning direction) or when the line synchronizer LS is at a low level, and thereby resets the J-K flip-flop 815.

Therefore, the output from the J-K flop-flop 815 is reset when the scanning position is outside the specified area in the auxiliary scanning direction or when it is in the auxiliary scanning direction (line) where the line synchronizer LS is at a low level, but, when the output comes into the specified area in the auxiliary scanning direction, the said output becomes "1" within the specified area in the main scanning direction in each line. The area signal generating circuit 816-7 generates the area signal AR 7+, and the area signal generating circuits 816-6 to 816-1 have an entirely identical construction.

The priority encoder 821 generates the encoding signals, performing the priority processing of the area signals from AR7+ to the AR1+ generated from the area signal generating circuits from 816-7 to 816-1, and the area signal AR 7+ indicates the highest priority, and AR 6+, AR 5+, . . . are given a declining scale of priority in the regular sequence. This priority encoder 821 outputs the value equivalent to the number of the area signal with the highest priority when a plural number of signals out of the area signals from AR 7+ to AR 1+ become "1". Accordingly, when the area signals AR 6+ and AR 1+, for example, have become "1", the output S2+ to S0+ thereof will be "110". The registers 822-7 to 822-0 set sixteen-bit area commands respectively in correspondence with the area signals AR 7+ to AR 0+ (AR 0+ indicates "unspecified", i.e. the area other than AR 7+ to AR 1+), and the selectors 823-15 to 823-0 select the data from the registers 822-7 to 822-0, respectively, in correspondence with the encoding signals. For example, when the encoding signals S 2+ to S 0+ are "110", an area command composed of sixteen bits from the register 822-6 is selected in each of the selectors 823-15 to 823-0 and held in the latching circuits 824 to 825 (in four bits each with four latching circuits). The individual bits in this area command are assigned to the mono-color, the full-color, and the other commands.

Moreover, the enable signal EN 7+, which is input in the GATE circuit 810, controls the occurrence of the unused area signals individually for the distinction between valid and invalid, and the enable signals EN 115+ to EN 100 are put into the enable terminals of the selectors 823-15 to 823-0, and these signals control the area commands for the distinction between valid and invalid with the bit as the unit.

(C) Area Specification and Operation

In case the editing work with the adjusting functions is performed on a rectangular area in the circuit constructed as mentioned above, the area based on the coordinates X and Y and the contents of the editing work are input and specified. With this operation, the area data based on the coordinates X and Y are set in the individual registers 805, 806, 811, and 812 in the area signal generating circuits, 816-1, 816-2, ... in the order of their specification, and the area commands corresponding to the contents of the editing work are set in the registers 822-1, .... Then, when one or a plural number of the area signals from AR 7+ to AR 1+ become "1" in the specified area, with the main scanning operation having been performed, the encoding signals S 2+ to S 0+ in the higher range are output from the priority encoder 821, and then the corresponding area commands are selected by and output from the selectors 823-15 to 823-0. In this regard, when all the area signals AR 7+ to AR 1+ are "0", the area command in the register 822-0 is sent out.

As mentioned above, the circuit of the area specifying LSI according to the present invention generates the encoding signals S 2+ to S 0+ for the area signals AR 7+ to AR 1+ in the higher priority range in accordance with the respective orders of priority in case the area signals AR 7+ to AR 0+ occur in overlapping and, holding the area commands corresponding to the area signals AR 7+ to AR 0+ are held in the latching circuit 824 in synchronization with the scan, sends out the said commands in the form of sixteen-bit command composed of F15+ through F0+.

This sixteen-bit command consisting of F15+ through F0+ allocates one bit each to mono color, full color, and edge emphasis, two bits to sharpness, three bits to TRC, and four bits to color conversion, for example. With the construction illustrated in FIG. 37, the area-specifying LSI is employed as the area command generating LSI 352 illustrated in FIG. 37(d), and the command in the sixteen bits, F15+ through F0+, is sent out as AREA CMD 8 to the color converting LSI 353 and to the other LSI's shown in FIG. 37(a) and FIG. 37(b). Therefore, if it is assumed that the command F15+ is the bit for mono-color (MONO1 in FIG. 37), this bit will be fed as the switching signal for the matrix in color masking and also as the control signal for the UCR. Also, with the allocation of a four-bit command to the color conversion, it is made possible to specify color conversion in four colors in the maximum in one area.

(III-6) Color Conversion (A) Functions and Characteristics

One of the significant characteristics of the digital color image processing equipment consists in having recorded data in 256 chromatic grades, for example, for each color. Therefore, it will be possible to recognize the colors selectively on an original in color and also to generate recorded data in 256 chromatic grades with no relation at all to the color on the original in color and arbitrarily to replace the image data of the original with these data. It is color conversion that utilizes this characteristic feature.

The color conversion represents a very useful function in the sense that it can offer the users diversity and versatility in editing, as well as expanded uses and possibilities, in a digital color image processing equipment. In the color conversion according to the present invention, the comparison color and the conversion color are specified, as already described in outline, and it is possible to select either one of the two color converting processes, one being the process of color conversion by agreement in color, in which the comparison color in the color original is detected and the part of the detected comparison color is changed into the specified conversion color, and the other being the process of color conversion by disagreement in color, in which the area other than that of the detected comparison color is changed into the specified conversion color, and these color conversion processes are designed to be applicable to the four colors. Moreover, this method of color conversion can be executed also in a plurality of areas over those areas which can be specified by the area specifying circuit since this method is specified for each area by the area specifying circuit.

Now, if it is possible to specify the areas as mentioned above with the color converting function and to convert the specified comparison color or any color other than the comparison color in the particular area into a specified conversion color, it is possible to give emphasis, as necessary, to the image in the part in non-conspicuous color in the original in the reproduction of a color original and, on the contrary, to render the image in a conspicuously colored part in a quiet tone in the context of the overall image. This feature means that the user, through his utilization of the color conversion process, can reproduce a color original, for example, in a freely modified expression of the chromatic keynote and to reproduce the original in an expression with a change of its image. Just for this reason, this method enables the user to produce creative works of images utilizing the original with a range of freedom extended so much.

In order to offer such functions in color conversion as will satisfy the user, it is one of the important elements to provide for a process of detecting the comparison color. For example, in case the image data are inferior in quality, it is likely that the detected color deviates from the comparison color specified by the user, with the result that the color converting process is performed even to such an extent as to include unintended colors or to such an extent as to leave a partially defective reproduction of the intended color. In addition, if the image data output after color conversion are distorted by any process in the downstream operation, the specified conversion color will suffer from a deterioration in its reproducibility. In view of these points, the evaluation of the reproduced images in color will rest on the position in which the color conversion is performed in the overall process in case various kinds of converting and adjusting processes are to be applied to the image data. Accordingly, the present invention proposes, as illustrated in FIG. 35 and FIG. 37, that the color conversion (304) should be executed at the step subsequent to the sequence, the END conversion (301), the color masking (302), and the detection of the size of the original (303), and the system is thus constructed to ensure the performance of color conversion with high-quality image data prepared by the application of the individual adjusting processes for equalizing neutral density and color-balancing to the image data.

(B) Circuit Construction

Figure 45:
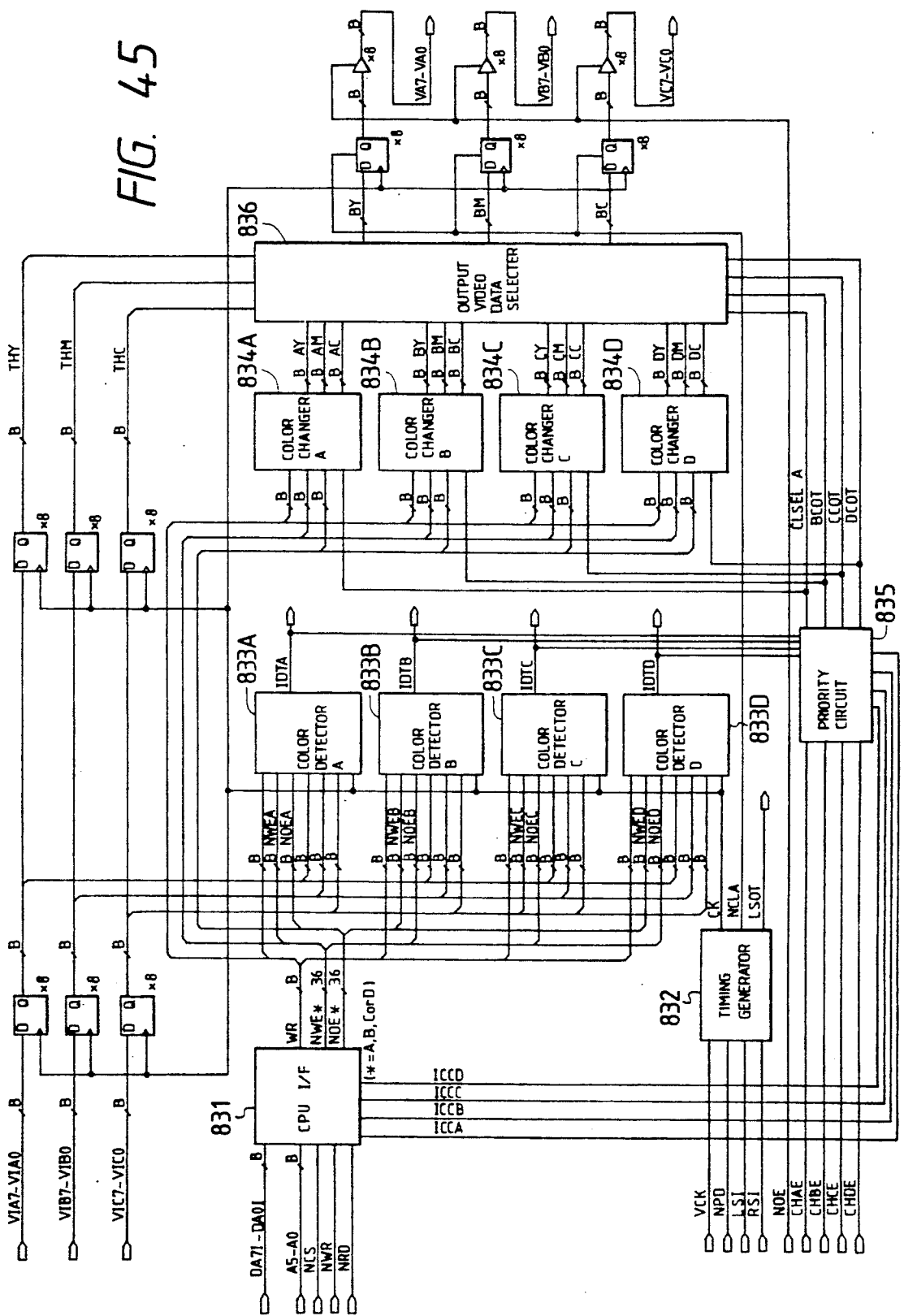
FIG. 45 illustrates the circuit construction of the color converting LSI.
Figure 46:
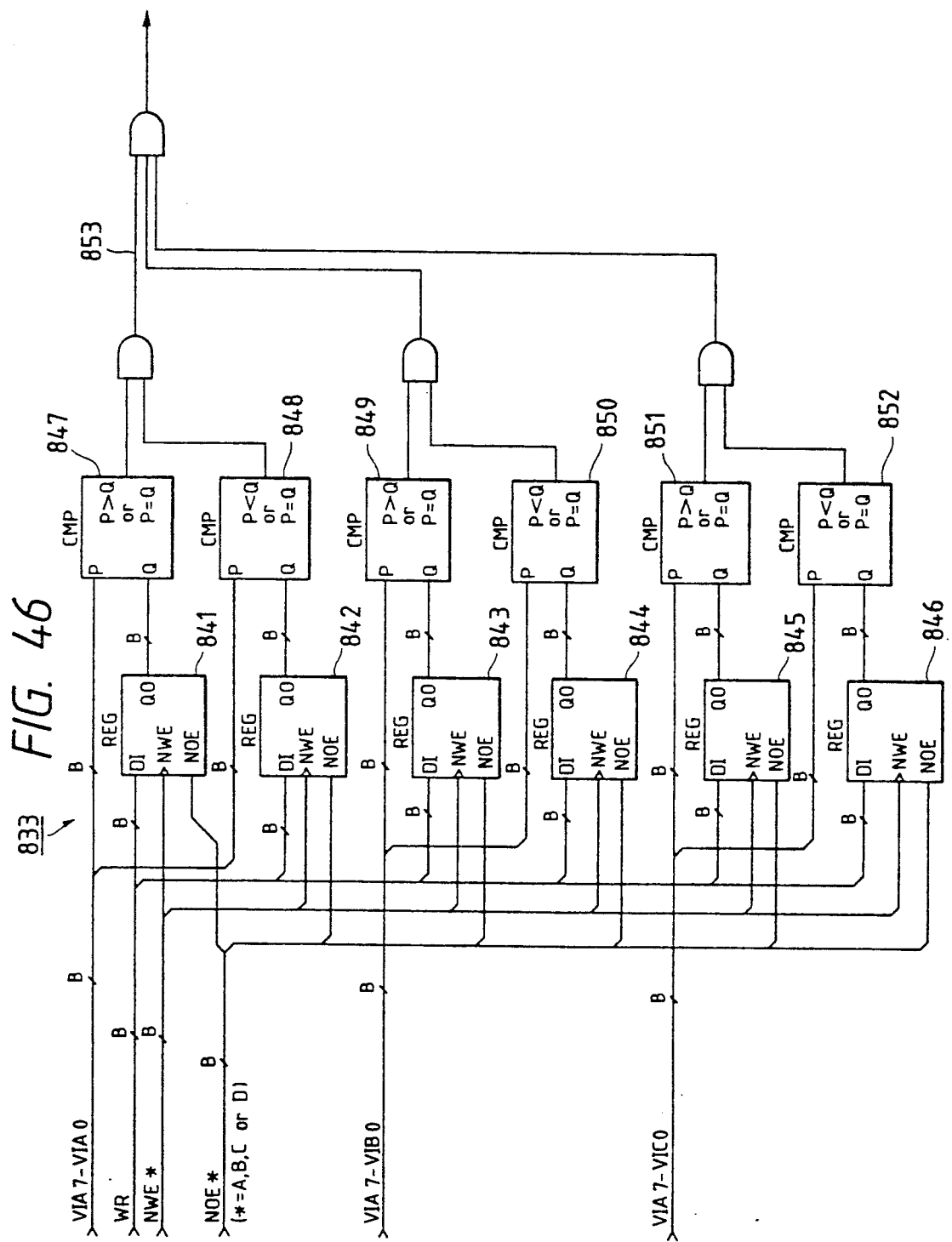
FIG. 46 illustrates the construction of the color detecting section.
Figure 47:
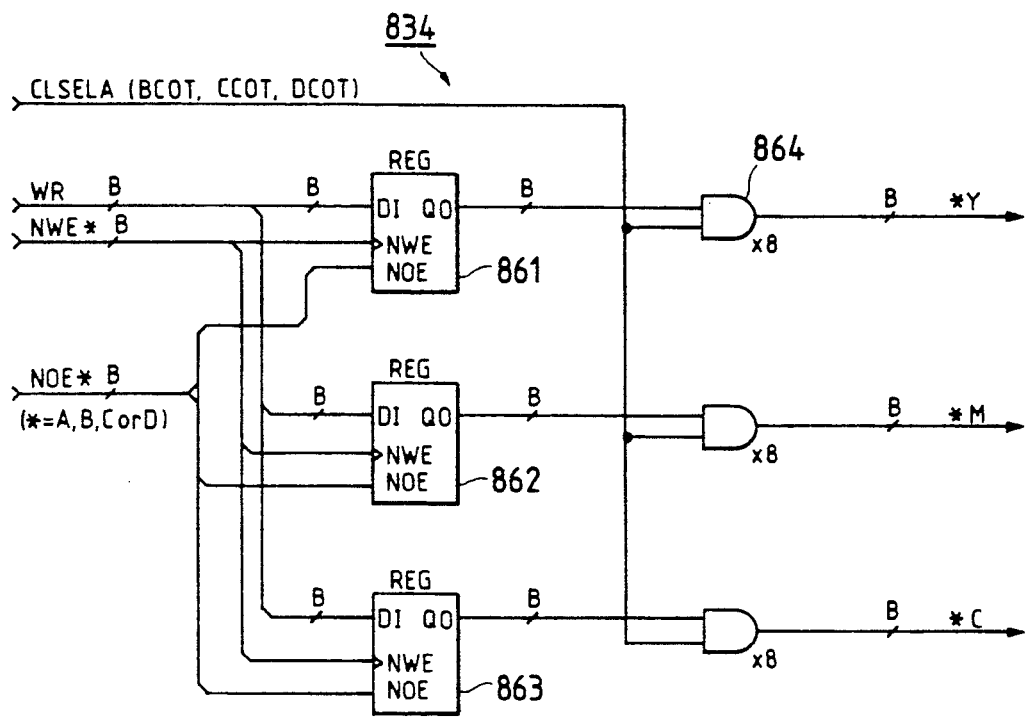
FIG. 47 illustrates the construction of the color detecting section.
Figure 48:
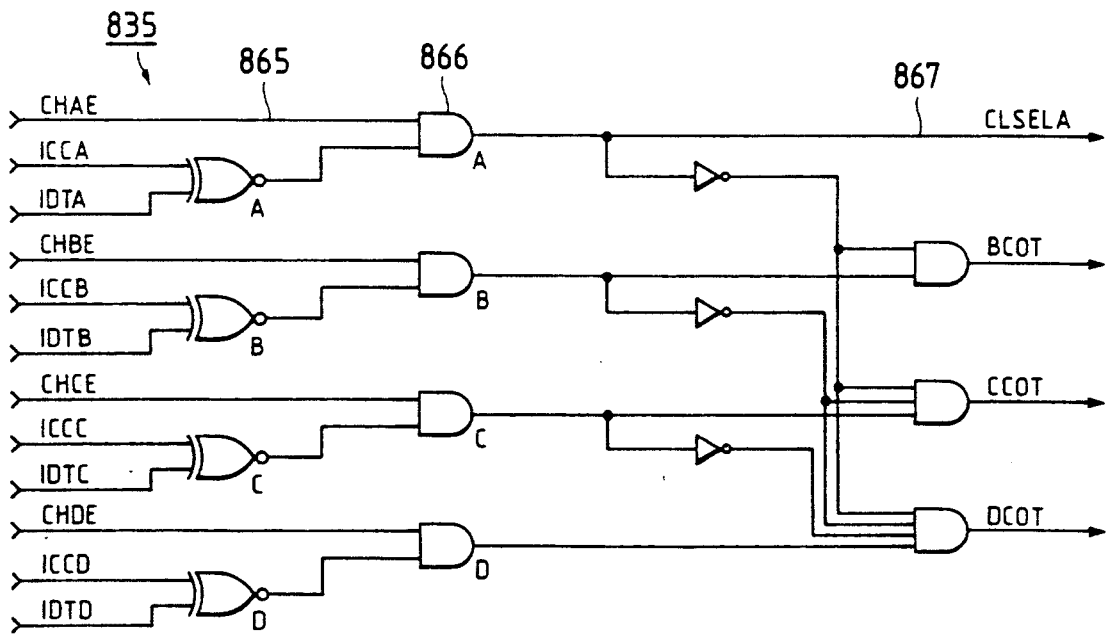
FIG. 48 illustrates the construction of the priority circuit.

FIG. 45 illustrates the circuit construction of the color converting LSI. FIG. 46 illustrates the construction of the color detecting section. FIG. 47 illustrates the circuit construction of the color converting section. FIG. 48 illustrates the construction of the priority circuit.

The color converting circuit according to this invention performs the color conversion by agreement in color, in which the conversion color is detected with reference to the three colors, Y, M, and C, and then changed to another color, and the color conversion by disagreement in color, in which a color other than the conversion color is changed to another color, and the color converting circuit is so designed that four colors in the maximum can be set as the conversion color. The output image data are controlled with the color conversion control signal, the control signals for the color conversion by agreement in color and the color conversion by disagreement in color, and the conversion color detecting signal.

In FIG. 45, the CPU interface 831 is provided with registers and performs the selection and setting of the color conversion by agreement in color vs. the color conversion by disagreement in color in the control register with respect to the conversion color. The selecting signals for the color conversion by agreement in color and the color conversion by disagreement in color are ICCA, ICCB, ICCC, and ICCD, and "1" is set in these bits when the color conversion by agreement in color is to be executed, but "0" is set in these bits when the color conversion by disagreement in color is to be executed. The four color detecting sections 833A to 833D and the four color converting sections 834A to 834D, respectively, are provided with registers as illustrated in FIG. 46 and FIG. 47, and the colors to be detected and the colors to be processed for conversion can be set independently in these registers.

The color detecting sections 833A to 833D are respectively provided with the registers 841, 843, and 845, in which the lower limit values for the three colors are set, and the registers 842, 844, and 846, in which the upper limit values for the said colors are set, as illustrated in FIG. 46. Then, these values are compared with the input image data by means of the comparators 847 through 852, and the system is so constructed that the AND gate circuit 853 outputs the detecting signal for the specified color, i.e., "1", on the condition that all the three colors are positioned between the upper limit value and the lower limit value.

The color converting sections 834A through 834D are provided respectively with the registers 861 through 863, which hold the conversion colors of Y, M, and C, as shown in FIG. 47, and the data WR are written with the input of the writing signal NWE and read out with the input of the reading signal NOE. And, the AND gate 864 is controlled by the selecting signal CLSEL, by which the conversion color is output.

The priority circuit 835 inputs the color detecting signals, IDTA, IDTB, IDTC, and IDTD, and the selecting signals for the color conversion by agreement in color/the color conversion by disagreement in color, ICCA, ICCB, ICCC, and ICCD, into the EXOR circuit 865, as illustrated in FIG. 48, and takes up the conversion color control signals, CHAE, CHBE, CHCE, and CHDE and AND in the AND gate 866, in case any one of these signals is "1", and processes the value on the priority basis in the priority processing gate circuit 867, and sends out either one of the signals in the order of priority of the conversion processing signals CLSELA, BCOT, CCOT, and DCOT.

The video data selector 836 outputs the input image data THY, THM, and THC just as they are in case all of the conversion processing signals CLSELA, BCOT, CCOT, and DCOT are "0", but, in case any of these conversion processing signals is "1", the said selector selects and outputs the output (AY, AM, AC), (BY, BM, BC), (CY, CM, CC), (DY, DM, DC) from the corresponding color converting sections 834A to 834D in place of the input image data.

The setting of the internal registers in the individual color detecting sections 833A to 833D and the color converting sections 834A to 834D is performed by the VCPU via the CPU interface 831.

As shown above, the color converting process can be executed when the color conversion control signal is "1" (i.e. at the high level), but the input image data are output as they are without performing the color converting process when the said color conversion control signal is "0". Then, in the color converting process, the converted image data are output when the detecting signal becomes "1" in the mode of color conversion with agreement in color, in which the selecting signal for the selection between the color conversion by agreement in color and the color conversion by disagreement in color is "1", but the converted image data are output when the detecting signal becomes "0" in the mode of the color conversion by disagreement in color, in which the selecting signal for the selection between the color conversion by agreement in color and the color conversion by disagreement in color is "0". In this case, the converted image data with the highest order of priority will be selected and output if color converting processes are in overlapping at one time.

For example, a description is made of the case in which the color A is processed for the color conversion by agreement in color while the color D is processed for the color conversion by disagreement in color.

In this case, the conversion color control signals CHAE and CHDE are set at "1" while the signals CHBE and CHCE are set at "0", and the selecting signal ICCA for the selection between the color conversion by agreement in color and the color conversion by disagreement in color is set at "1" while the selecting signals ICCD is set at "0". Then, the lower limit values of the respective colors are set in the registers 841, 843, and 845 in the color detecting sections 833A and 833D while the upper limit values for the respective colors are set in the registers 842, 844, and 846. Also, the conversion colors for Y, M, and C, respectively, are written to the registers 861 to 863 in the color converting sections 834A and 834D.

Now, a description is made of the examples of a combination of a case in which the input image data are positioned between the upper limit value and the lower limit value as set in the registers of the color detecting sections 833A and 833D and a case in which the input image data are not positioned between the said limit values.

(1) If it is assumed that both of the detecting signals IDTA and IDTD of the color detecting sections 833A and 833D are "1", i.e. the input image data are positioned between the upper limit value and the lower limit value of the two signals, only the output in the uppermost level of the AND gate 866 becomes "1", and the conversion processing signal CLSELA becomes "1". Accordingly, the conversion color signals AY, AM, and AC are output from the color converting section 834A, and these conversion signals AY, AM, and AC are selected by the video data selector 836 and sent out therefrom.

(2) On the contrary, it is assumed that both of the detecting signals IDTA and IDTD of the color detecting sections 833A and 833D are "0", that is to say, neither of these do not come between the upper limit value and the lower limit value of the two signals, and then only the lowermost output from the AND gate 866 shown in FIG. 48 will be "1". This being the case, the outputs other than that at the lowermost level in the AND gate 866 still remains at "0", and the reversal signals of these outputs are fed into the AND gate at the lowermost level in the priority processing gate circuit 867 through the reversal circuit. Therefore, the AND condition of this AND gate is satisfied, and only the converting process signal DCOT becomes "1". Hence, the color converting section 834D outputs the conversion color signals DY, DM, and DC, and the video data selector 836 selects and outputs these conversion color signals, DY, DM, and DC.

(3) Moreover, in case the detecting signal IDTDA of the color detecting section 833A is "1" and the detecting signal IDTD of the color detecting section 833D is "0", both of the uppermost output and the lowermost output from the AND gate 866 shown in FIG. 48 will become "1". In such a case like this, the signal with the higher priority is input into the lower-ranking AND gate through the reversal circuit in the priority processing gate circuit 867, as it is evident from the circuit construction shown in FIG. 48. Therefore, when the uppermost output from the AND gate 866 becomes "1", the input 1 into the AND gate lower than that will become "0", and only the conversion processing signal CLSELA becomes "1". Therefore, in the same way as in the case (1), the conversion color signals AY, AM, and AC are output from the color converting signals 834A, and the video data selector 836 selects and outputs these conversion color signals AY, AM, and AC.

(4) Contrary to the example cited in (3) above, in case the detecting signal IDTA of the color detecting section 833A is "0" and the detecting signal IDTD of the color detecting section 833D is "1", all the output from the AND gate 866 shown in FIG. 48 will become "0". Consequently, all of the conversion processing signals CLSELA, BCOT, CCOT, and DCOT will become "0", and, since the conversion color signal is not output from the color converting sections 834A through 834D, the video data selector 836 sends out the {image input data and} input image data THY, THM, and THC as they are.

(C) Operating Timing

FIG. 49 illustrates the waveform for the operating timing of the color converting LSI.

Figure 49A:
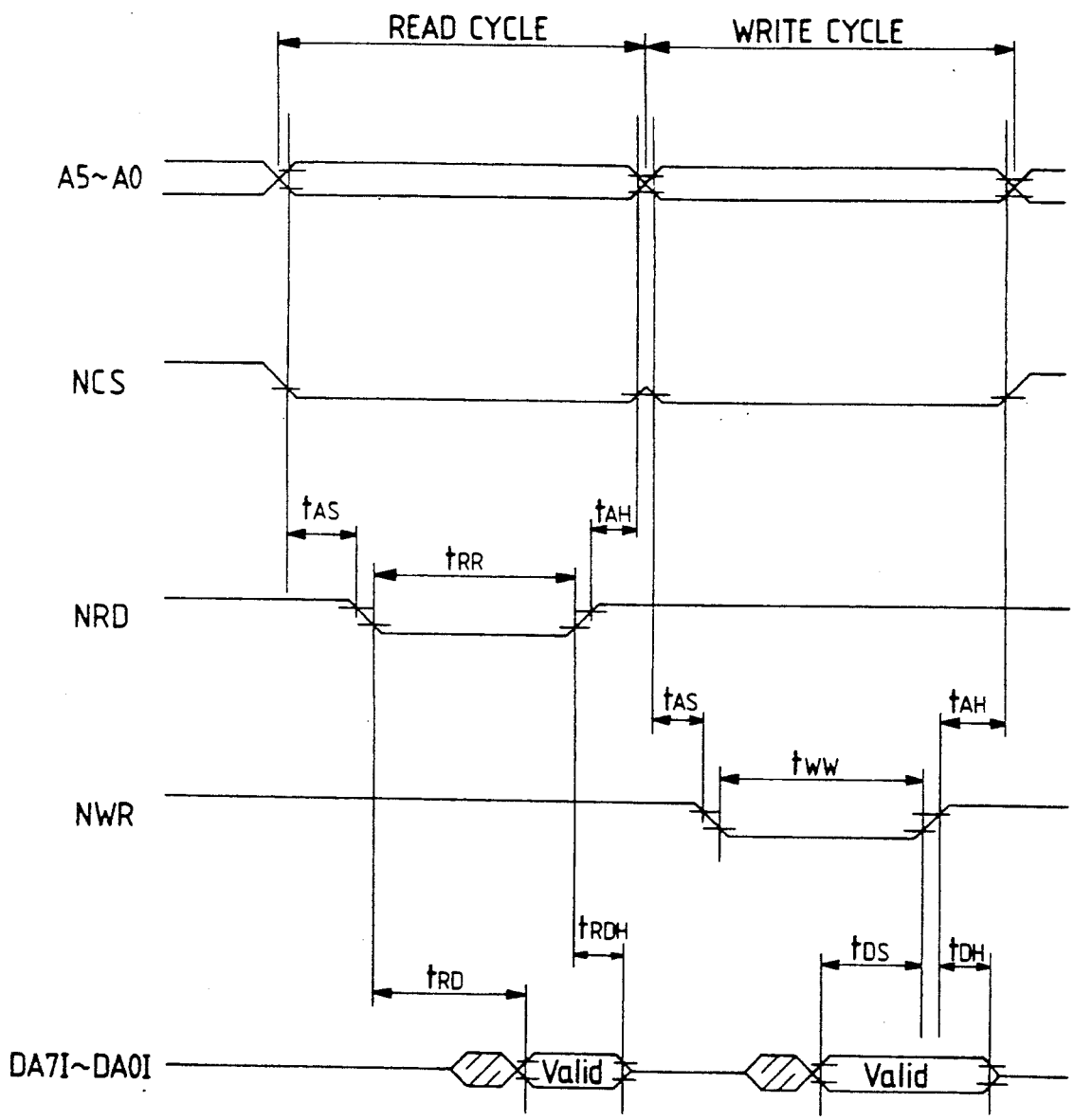
FIGS. 49(a) and 49(b) illustrate the operating waveform for the color converting LSI.

In the reading cycle for the access by the VCPU, the reading signal NRD in the register in the chip is turned to the low level after the passage of the address set-up time $t_{AS}$ as illustrated in FIG. 49(a), and, with the elapse of the data settling time t thereafter, the data bus DA 7I through DA 0I are made effective. Also, in the writing cycle, the writing signal NWR in the register in the chip is set at the low level after the passage of the address set-up time $t_{AS}$.

Figure 49B:
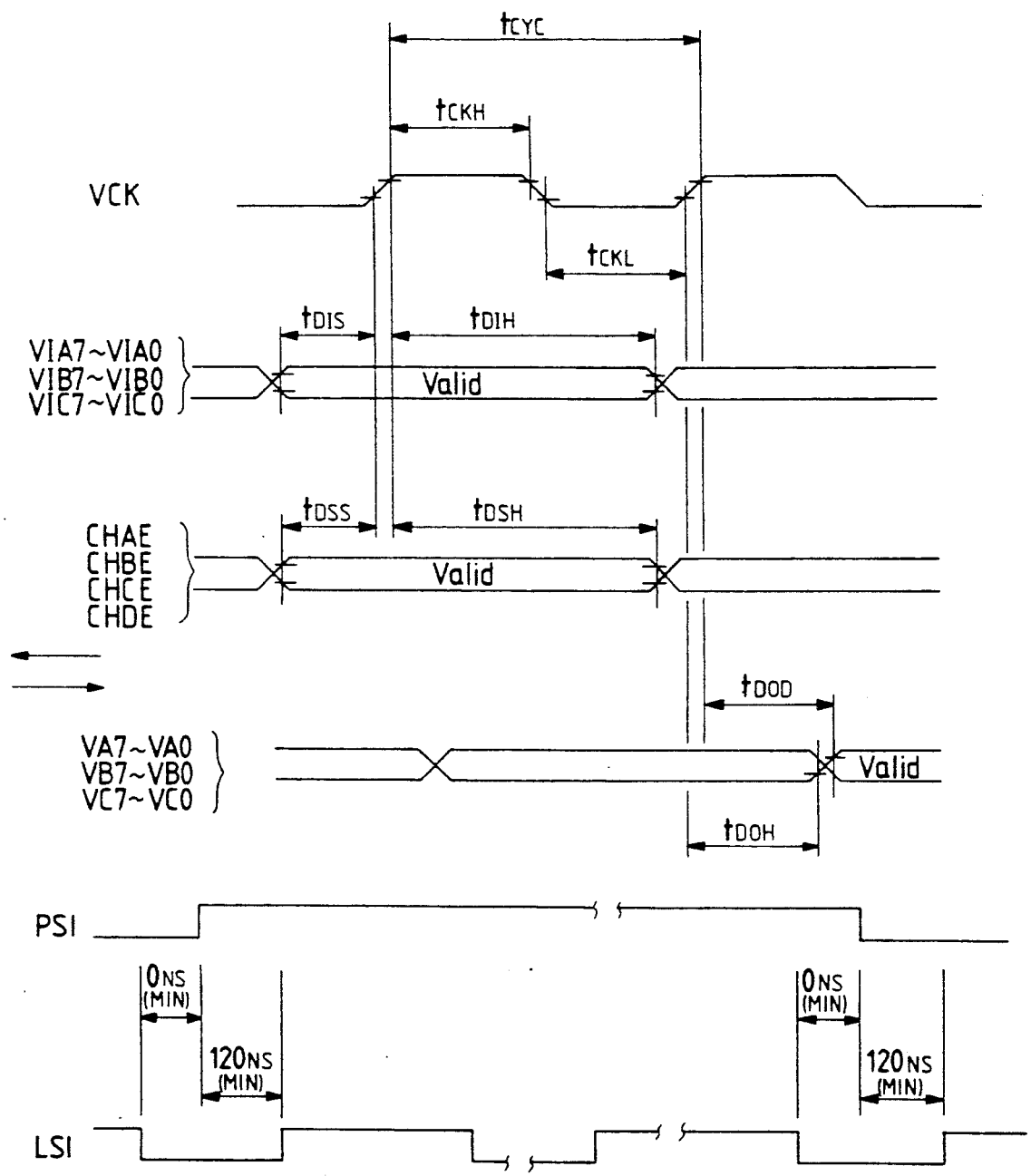

In the processing of the image data, the input image data VIA 7-0, VIB 7-0, and the VIC 7-0 and the conversion color control signals CHAE, CHBE, CHCE, and CHDE become effective in the image set-up time $t_{DIS}$ until the video clock VCLK attains the high level, the other control signal set-up time $t_{DSS}$ and the data hold time $t_{DIH}$, and the other control signal hold time $t_{DSH}$, as shown in FIG. 49(b). Then, the output image data VA 7-0, VB 7-0. and VC 7-0 become effective after the image data output delay time $t_{DOD}$ from the cycle subsequent to the video clock VCLK.

Figure 1B:
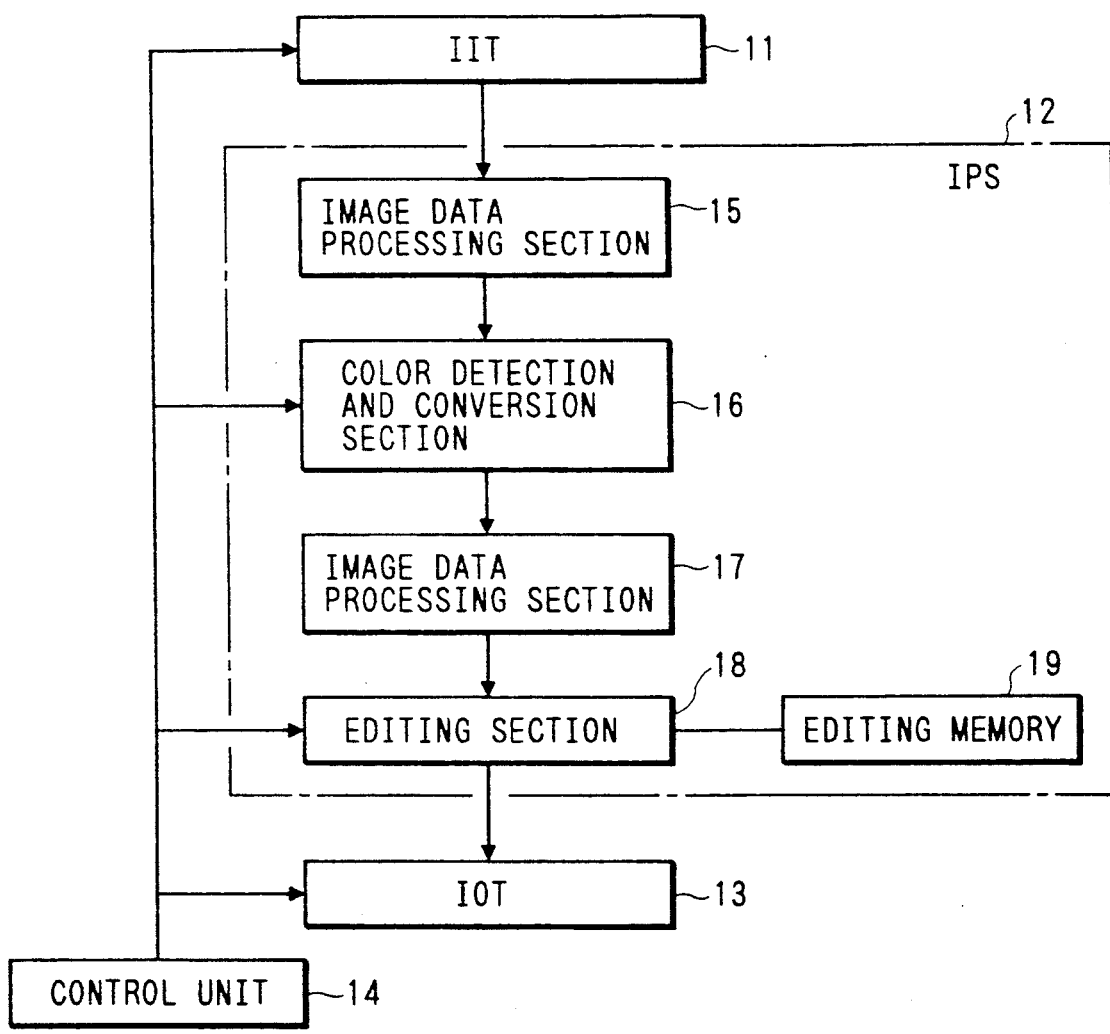
FIGS. 1(b) and 1(c) are charts for explaining an embodiment of a marker editing control system according to this invention for application to the image recording equipment.
Figure 1C:
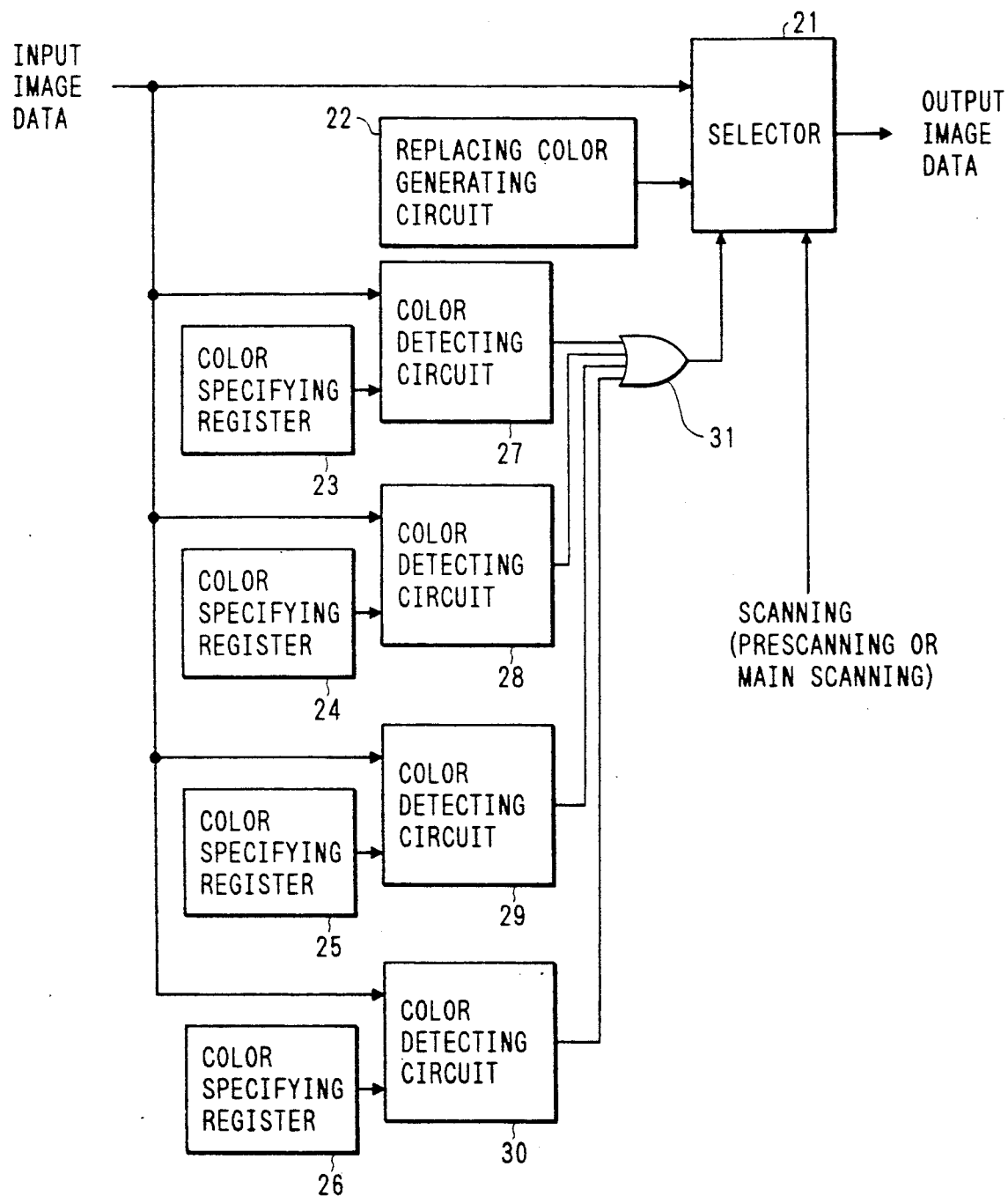
Figure 50:
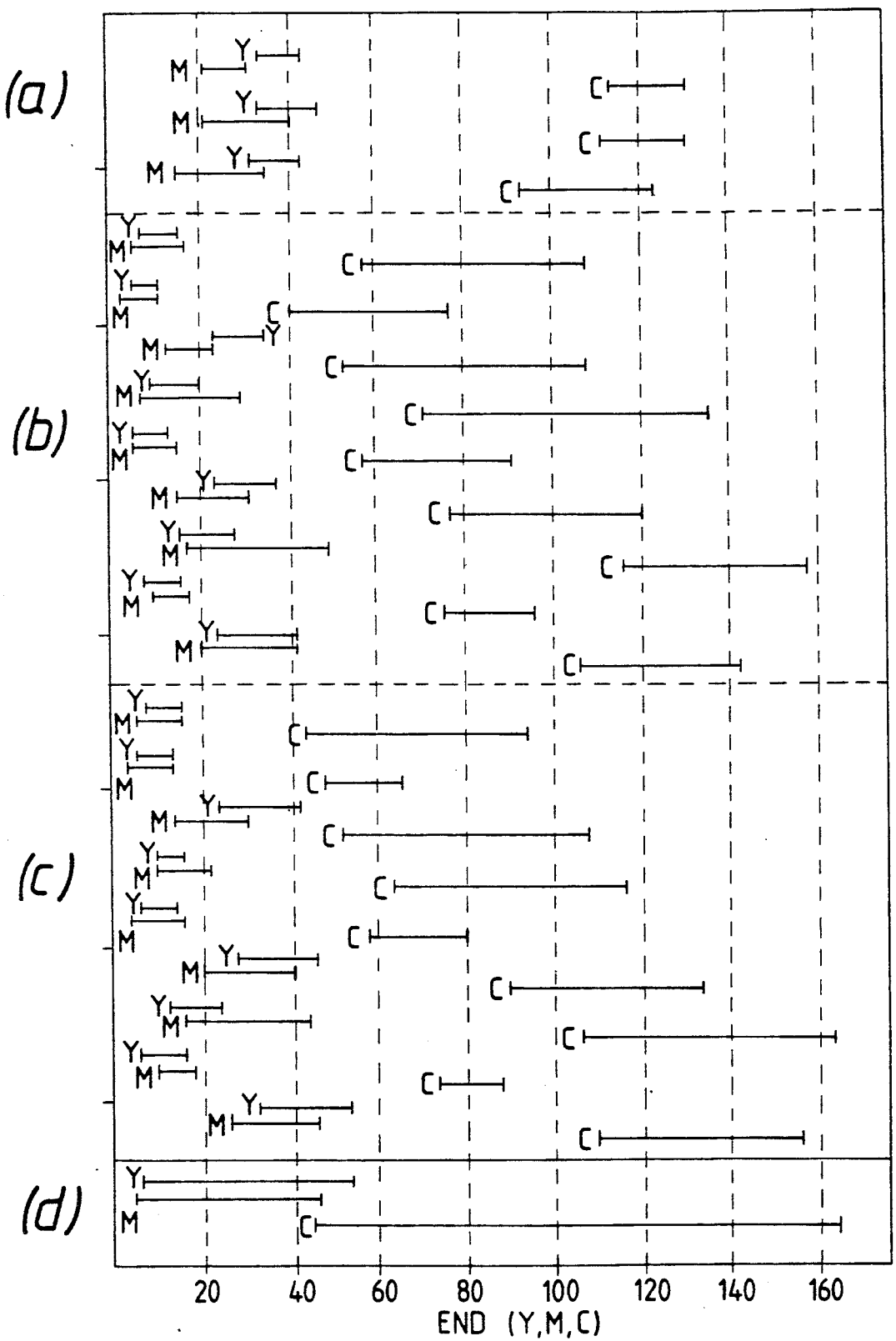
FIG. 50 illustrates examples of the color distribution by the type of marker.

FIG. 1(b) and FIG. 1(c) illustrate one embodiment of the marker editing system according to the present invention FIG. 50 shows examples of dispersion of the color distribution classified in accordance with types of markers, and FIG. 51 shows examples of the dispersion classified in accordance with characteristics of the color distribution.

In FIG. 1(b), IIT 11, IPS 12, and IOT 13 correspond respectively to those explained earlier with reference to FIG. 35. A control unit 14 controls all of these sections. A color detection and conversion section 16 and an editing section 18 in the IPS 12 correspond to the color converting module 304 and the editing control module shown in FIG. 35, respectively. Accordingly, an image data processing section 15 is composed of the END conversion module 301, the color masking module 302 and the original size detection module 303, and an image data processing section 17 is composed of the UCR & black generating module 305, the spatial filter module 306, the TRC module 307, the reduction and enlargement processing module 308, etc. An editing memory 19 draws a closed area indicated by a marker, and thus draws images corresponding to the editing commands for that area. This memory is composed of a plural number of plane memories as explained earlier.

With the construction described above, the present invention sets threshold values for the recognition of the marker in the color detection and conversion section 16 in such a manner that the threshold values are determined for each sorted color distribution, the sorting including the distributions of, for example, a non-transparent marker, a marker with low density, a marker with high density, and a marker close in the distribution to the three primary colors. The system recognizes the marker by either one of these threshold values. An example of the construction of the color detection and conversion section 16 is illustrated in FIG. 1(c).

In FIG. 1(c), color specifying registers 23 through 26 respectively hold the upper-limit threshold values and the lower-limit threshold values for the sorted markers, and color detecting circuits 27 through 30 detect the corresponding markers by comparing the input image data with the threshold value set in the respective color specifying registers. An OR-gate 31 outputs the logical sum of the outputs from the color detecting circuits 27 through 30 as a marker detection signal to a selector 21. A replacing color generating circuit 22 generates the image data in the color to be output as a result of color conversion. and at the time of the marker pickup, this circuit generates the image data for converting the marker into black and the rest of the area into white. Also, at the time of the marker drop, the circuit 22 generates the image data for converting the marker into white. The selector 21 outputs the input image data or the image data generated by the replacing color generating circuit 22 by switching from one to the other, and the switching operation is controlled by the marker detecting signal from the OR-gate 31 and a scanning signal representing the prescanning operation or the main scanning operation.

The switching of the image data in the selector 21 is different basically between the prescanning and main scanning. That is, marker pickup is performed in the prescanning operation, and only the marker is converted into black and written into the editing memory 19 in the editing section 18. Thus, when the marker detection signal from the OR-gate 31 is on, the selector 21 outputs the image data in black generated in the replacing color generating circuit 22, and when the marker detection signal is off, the selector 21 outputs the image data in white generated in the replacing color generating circuit 22. Therefore, the input image data are in the state of being virtually cut off. In the main scanning operation, on the other hand, only the marker is converted into white and the input image data are passed through for the rest of the area because of the marker drop taking place in the main scanning operation. Accordingly, the image data in white as generated in the replacing color generating circuit 22 are output only when the marker detection signal from the OR-gate 31 is on, and the input image data are output as they are any other time.

Next, the marker editing process is outlined.

First, a plural number of sets of threshold values for the recognition of the markers are set in the color detection and conversion section 16, and also the selection procedure is set such that black is output when a marker is detected, and white is output (color conversion) when no marker is detected. With this setup, the system performs the γ correction process and the color correction process in the image data processing section 15 in the prescanning operation on the signals read out with the IIT 11, and then makes a comparison of the signals with the threshold values in the color detection and conversion section 16. Then, picture elements which have been recognized as the marker are written into the editing memory 19, thereby forming a closed area. In this closed area, the system performs drawing of commands in correspondence with either one of trimming, masking color painting and mesh, by the time the main scanning operation starts, and, at the same time, sets to white the marker replacing color in the color detecting and converting section 16. Next, in the main scanning operation, the system performs the process for dropping the marker from the image data after the image data have been subjected to the γ correction and color correction in the image data processing section 15, and then performs the editing job specified by the commands on the image data within the closed area.

FIG. 50 presents examples of the color distribution of 21 kinds of markers different in such conditions as their manufacturers, marker types and the paper quality; parts (a) through (c) of FIG. 50 show the color distributions classified in accordance with the type of marking while part (d) of FIG. 50 illustrates the ranges necessary for covering all the distributions. Moreover, FIG. 51 presents examples of the dispersions as viewed in terms of the color distribution characteristics. If the threshold values are set in accordance with the sorted distributions (a) through (d), the ranges of the threshold values for the individual colors can be set, for example, as follows:

For the non-transparent marker of FIG. 51(a):

$Y=0$ to 60

$M=0$ to 60

$C=85$ to 255

For marking showing low density in Y and M (FIG. 51(b)):

$Y=0$ to 20

$M=0$ to 25

$C=40$ to 255

For marking showing high density in C (FIG. 51(c)):

$Y=0$ to 55

$M=0$ to 55

$C=70$ to 255

For marking showing distributions of Y and M and distribution of C which are close to each other (FIG. 51(d)):

$Y=20$ to 40

$M=10$ to 45

$C=50$ to 255.

As it is evident from the examples of the setting of the threshold values given above, each sorted set of threshold range. However, whatever marker is used, its image data comes within the range of either one set of these threshold values, so that the marker detection signal excluding highlight gray can be obtained by taking logical sum of the outputs derived from the comparison of the marker data with the individual sets of threshold values.

The color converting circuits mentioned above is constructed in such a way as to be capable of independently performing the color conversion of agreement mode or the color conversion of disagreement mode. Thus, in the marker editing process, the circuit outputs in the prescanning operation the marker as converted into K (black), if the replacing color is set to K, and the color to be replaced is set to the threshold values for the marker, and the conversion flag is set to the agreement mode. Therefore, this output is written into the editing memory 19 of the editing section 18 illustrated in FIG. 1(b), and then the editing commands can be set in the closed area so formed. In this regard, the system may be constructed in such a way that the image data other than the marker are cut off by the color converting circuit (for example, the video data selector 36) or that such image data are converted into W whose Y, M and C are 0 in the color conversion of disagreement with the marker. Then, if the replacing color is changed from K to W at the time of the main scanning operation, the marker is converted into white, a the result that the marker is deleted. Thus, the image data of the original sheet with the marker so deleted are output, and the editing process set in the editing memory 19 is performed in the editing section 18 on the image data in the marker area.

What is claimed is:

1. A color converting system for image processing equipment which controls conversion/non-conversion of input image data into replacing color data to produce output image data, comprising:

color detecting means for detecting a comparison color from said input image data by judging whether said input image data is within a preset comparison color range which is defined by upper and lower limit values or by a reference value and upper and lower ranges, said color detecting means detecting said comparison color for each of recording signals of primary colors;

replacing color means for providing said replacing color data to selecting means; and said selecting means for selecting and outputting as said output image data said input image data or said replacing color data on the basis of a judgment in said color detecting means.

2. A color converting system for image processing equipment which controls conversion/non-conversion of input image data into replacing color data to produce output image data, comprising:

color detecting means for detecting a comparison color from said input image data by judging whether said input image data is within a preset comparison color range which is defined by upper and lower limit values or by a reference value and upper and lower ranges;

replacing color means for providing said replacing color data to selecting means; and said selecting means for selecting and outputting as said output image data said input image data or said replacing color data on the basis of a judgment in said color detecting means, further comprising conversion mode setting means for setting agreement mode or disagreement mode, wherein if said agreement mode is set by said conversion mode setting means, said selecting means selects said replacing color data when said comparison color is detected in said color detecting means, and selects said input image data when said comparison color is not detected, when if said disagreement mode is set by said conversion mode setting means, said selecting means selects said input image data when said comparison color is detected, and selects said replacing color data when said comparison color is not detected.

3. A color converting system for image processing equipment which controls conversion/non-conversion of input image data into replacing color data to produce output image data, comprising:

color detecting means for detecting a comparison color from said input image data by judging whether said input image data is within a preset comparison color range which is defined by upper and lower limit values or by a reference value and upper and lower ranges;

replacing color means for providing said replacing color data to selecting means; and said selecting means for selecting and outputting as said output image data said input image data or said replacing color data on the basis of the judgment in said color detecting means, wherein said color converting system performs a color conversion operation with a plurality of comparison colors and replacing colors which are set individually.

4. A color converting system according to claim 3, further comprising priority processing means.

5. A color converting system for image processing equipment which controls conversion/non-conversion of input image data into replacing color data to produce output image data, comprising:

color detecting means for detecting a comparison color from said input image data by judging whether said input image data is within a preset comparison color range which is defined by upper and lower limit values or by a reference value and upper and lower ranges;

replacing color means for providing said replacing color data to selecting means; and said selecting means for selecting and outputting as said output image data said input image data or said replacing color data on the basis of a judgment in said color detecting means, further comprising area specifying means for specifying a color conversion area for which a color conversion operation is performed, and for providing a color conversion control signal associated with said color conversion area, said color conversion control signal being used to control said selecting means.

6. A color converting system according to claim 5, wherein said area specifying means specifies a plurality of color conversion areas and produces a plurality of color conversion control signals associated with said respective color conversion areas.

7. A color converting system for image processing equipment which controls conversion/non-conversion of input image data into replacing color data to produce output image data, comprising:

color detecting means for detecting a comparison color from said input image data by judging whether said input image data is within a preset comparison color range which is defined by upper and lower limit values or by a reference value and upper and lower ranges;

replacing color means for providing said replacing color data to selecting means; and said selecting means for selecting and outputting as said output image data said input image data or said replacing color data on the basis of a judgment in said color detecting means, wherein said color detecting means is arranged after color masking means.

8. A color converting system for image processing equipment which controls conversion/non-conversion of input image data into replacing color data to produce output image data, comprising:

color detecting means comprising a plurality of setting means for setting respective comparison color ranges each range being defined by upper and lower limit values or by a reference value and upper and lower ranges, and said color detecting means detecting one of preset comparison colors by judging whether said input image data is within any one of said comparison color ranges;

replacing color means for providing for providing said replacing color data to selecting means; and said selecting means for selecting and outputting as said output image data said input image data or said replacing color data on the basis of a judgment in said color detecting means.

9. A color converting system according to claim 8, wherein each of said comparison color range consists of three ranges for the primary colors of light.

10. A color converting system according to claim 8, wherein each of said comparison color ranges consists of three ranges for yellow, magenta and cyan.

11. A color converting system according to claim 8, wherein said comparison color ranges represent different densities of a single color.

12. A color converting system according to claim 8, further comprising conversion mode setting means for setting agreement mode or disagreement mode, wherein if said agreement mode is set by said conversion mode setting means, said selecting means selects said replacing color data when one of said comparison colors is detected in said color detecting means, and selects said input image data when said comparison colors are not detected.

13. A color converting system according to claim 12, wherein if said disagreement mode is set by said conversion mode setting means, said selecting means selects said replacing color data when one of said comparison colors is detected, and selects said input image data when said comparison colors are not detected.

14. A color converting system according to claim 8, wherein said color converting system performs a color conversion operation with a plurality of comparison colors and replacing colors which are set individually.

15. A color converting system according to claim 14, further comprising priority processing means.

16. A color converting system according to claim 8, further comprising area specifying means for specifying a color conversion area for which color conversion operation is performed, and for producing a color conversion control signal associated with said color conversion area, said color conversion control signal being used to control said selecting means.

17. A color converting system according to claim 16, wherein said area specifying means specifies a plurality of color conversion areas and produces a plurality of color conversion control signals associated with said respective color conversion areas.

18. A color converting system according to claim 8, wherein said color detecting means is arranged after color masking means.

19. In a marker editing system for image processing equipment comprising image reading means for producing image data by scanning an original sheet, image data processing means for processing and editing said image data read out by said image reading means, recording means for recording said image data processed and edited by said image data processing means, and control means for controlling said image reading means, said image data processing means and said reading means, wherein marker editing information and said image data of said original sheet which are obtained by scanning said original sheet are edited and recorded, the improvement wherein:
said image data processing means a plurality of comparison ranges for respective marker colors, and if it is detected that color of a marking on said original sheet is within any one of said comparison ranges, an editing operation based on said detected marker is performed.

20. A marker editing system according to claim 19, wherein said marker editing information is read out in a prescanning operation, and said image data of said original sheet is read out in a main scanning operation.

21. A marker editing system according to claim 19, wherein distributions of said marker colors are sorted in advance in accordance with marker types, and each of said comparison ranges is set for each of sorted distributions.

22. A marker editing system according to claim 19, wherein said comparison ranges include ranges for a non-transparent marker, a marker with low density, a marker with high density, and a marker having distributions of the three primary colors close to one another.

* * * * *

UNITED STATES PATENT AND TRADEMARK OFFICE
CERTIFICATE OF CORRECTION

PATENT NO. : 5,132,786
DATED : July 21, 1992
INVENTOR(S) : MASAHIRO ISHIWATA

It is certified that error appears in the above-indentified patent and that said Letters Patent is hereby corrected as shown below:

On the title page, item [75], change "Ebina" to --Kanagawa and insert as additional inventors --Yoshihiro Terada, Hiroshi Sekine, both of Kanagawa, Japan--.

Title page, Abstract, line 4, change "comparision" to --comparison--.

Claim 3, column 83, line 60, change "the" (second occurence to --a--.

Claim 9, column 84, line 64, change "range" to --ranges--.

Signed and Sealed this

Fifteenth Day of February, 1994

Attest:

BRUCE LEHMAN

*Attesting Officer*

*Commissioner of Patents and Trademarks*